US012440539B2

(12) United States Patent
Seehra et al.

(10) Patent No.: US 12,440,539 B2
(45) Date of Patent: Oct. 14, 2025

(54) METHODS OF USING ACTIVIN RECEPTOR TYPE IIB VARIANTS

(71) Applicant: Keros Therapeutics, Inc., Lexington, MA (US)

(72) Inventors: Jasbir S. Seehra, Lexington, MA (US); Jennifer Lachey, Lincoln, MA (US); Elissa Furutani, Belmont, MA (US)

(73) Assignee: Keros Therapeutics, Inc., Lexington, MA (US)

( * ) Notice: Subject to any disclaimer, the term of this patent is extended or adjusted under 35 U.S.C. 154(b) by 609 days.

(21) Appl. No.: 17/945,328

(22) Filed: Sep. 15, 2022

(65) Prior Publication Data

US 2023/0087128 A1 Mar. 23, 2023

Related U.S. Application Data

(63) Continuation of application No. PCT/US2021/023339, filed on Mar. 19, 2021.

(60) Provisional application No. 63/109,764, filed on Nov. 4, 2020, provisional application No. 63/073,329, filed on Sep. 1, 2020, provisional application No. 63/029,442, filed on May 23, 2020, provisional application No. 62/992,879, filed on Mar. 20, 2020.

(51) Int. Cl.
*A61K 38/17* (2006.01)
*A61K 35/19* (2015.01)
*C07K 14/78* (2006.01)

(52) U.S. Cl.
CPC ............ *A61K 38/179* (2013.01); *A61K 35/19* (2013.01); *C07K 14/78* (2013.01); *C07K 2319/30* (2013.01)

(58) Field of Classification Search
None
See application file for complete search history.

(56) References Cited

U.S. PATENT DOCUMENTS

| | | |
|---|---|---|
| 7,612,041 B2 | 11/2009 | Knopf et al. |
| 7,709,605 B2 | 5/2010 | Knopf et al. |
| 7,842,663 B2 | 11/2010 | Knopf et al. |
| 7,947,646 B2 | 5/2011 | Sun et al. |
| 7,951,771 B2 | 5/2011 | Knopf et al. |
| 7,960,343 B2 | 6/2011 | Knopf et al. |
| 7,988,973 B2 | 8/2011 | Sherman |
| 8,007,809 B2 | 8/2011 | Sherman |
| 8,058,229 B2 | 11/2011 | Seehra et al. |
| 8,067,360 B2 | 11/2011 | Knopf et al. |
| 8,067,562 B2 | 11/2011 | Han et al. |
| 8,101,564 B2 | 1/2012 | Choi et al. |
| 8,138,142 B2 | 3/2012 | Seehra et al. |
| 8,173,601 B2 | 5/2012 | Knopf et al. |
| 8,178,488 B2 | 5/2012 | Knopf et al. |
| 8,216,997 B2 | 7/2012 | Seehra et al. |
| 8,252,900 B2 | 8/2012 | Knopf et al. |
| 8,293,881 B2 | 10/2012 | Seehra et al. |
| 8,343,933 B2 | 1/2013 | Knopf et al. |
| 8,361,957 B2 | 1/2013 | Seehra et al. |
| 8,367,611 B2 | 2/2013 | Knopf et al. |
| 8,501,768 B2 | 8/2013 | Conte et al. |
| 8,614,292 B2 | 12/2013 | Han et al. |
| 8,629,109 B2 | 1/2014 | Knopf et al. |
| 8,703,927 B2 | 4/2014 | Seehra et al. |
| 8,710,016 B2 | 4/2014 | Seehra et al. |
| 8,716,459 B2 | 5/2014 | Sun et al. |
| 8,871,209 B2 | 10/2014 | Stitt et al. |
| 8,895,016 B2 | 11/2014 | Sherman et al. |
| 8,999,917 B2 | 4/2015 | Sun et al. |
| 9,138,459 B2 | 9/2015 | Knopf et al. |
| 9,163,075 B2 | 10/2015 | Knopf et al. |
| 9,181,533 B2 | 11/2015 | Seehra et al. |
| 9,273,114 B2 | 3/2016 | Sun et al. |
| 9,284,364 B2 | 3/2016 | Han et al. |
| 9,353,356 B2 | 5/2016 | Knopf et al. |
| 9,399,669 B2 | 7/2016 | Knopf et al. |
| 9,439,945 B2 | 9/2016 | Seehra et al. |
| 9,447,165 B2 | 9/2016 | Sun et al. |
| 9,493,556 B2 | 11/2016 | Seehra et al. |
| 9,505,813 B2 | 11/2016 | Seehra et al. |
| 9,526,759 B2 | 12/2016 | Knopf et al. |
| 9,572,865 B2 | 2/2017 | Knopf et al. |
| 9,610,327 B2 | 4/2017 | Sun et al. |
| 9,617,319 B2 | 4/2017 | Seehra et al. |
| 9,745,559 B2 | 8/2017 | Seehra et al. |
| 9,809,638 B2 | 11/2017 | Sun et al. |

(Continued)

FOREIGN PATENT DOCUMENTS

| | | |
|---|---|---|
| AU | 2013204964 A1 | 5/2013 |
| AU | 2016250354 A1 | 11/2016 |

(Continued)

OTHER PUBLICATIONS

U.S. Appl. No. 19/067,565 filed Filed Feb. 28, 2025, Seehra et al.
U.S. Appl. No. 19/077,471 filed Filed Mar. 12, 2025, Seehra et al.
"Activin receptor type IIa/b (ActRIIa/b) extracellular protein SEQ 69.", XP93181721, retrieved from EBI accession No. GSP:BFH21078, dated Jun. 28, 2018 (1 page).
Agapova et al. "Ligand trap for the activin type IIA receptor protects against vascular disease and renal fibrosis in mice with chronic kidney disease," Kidney International. 89(1): 1231-1243 (Published online Mar. 11, 2016).
Bose et al., "Sotatercept (ACE-011) Alone and in Combination with Ruxolitinib in Patients (pts) with Myeloproliferative Neoplasm (MPN)-Associated Myelofibrosis (MF) and Anemia," Blood. 130(Suppl_1):255 (Dec. 2017) (3 pages).

(Continued)

Primary Examiner — Tigabu Kassa
(74) Attorney, Agent, or Firm — Clark & Elbing LLP

(57) ABSTRACT

The invention features polypeptides that include an extracellular ActRIIB variant. In some embodiments, a polypeptide of the invention includes an extracellular ActRIIB variant fused to an Fc domain monomer or moiety. The invention also features pharmaceutical compositions containing said polypeptides and methods of using the polypeptides to treat diseases and conditions including neuromuscular diseases, osteogenesis imperfecta, myelofibrosis, thrombocytopenia, neutropenia, and metabolic disease.

10 Claims, 14 Drawing Sheets

Specification includes a Sequence Listing.

(56) References Cited

U.S. PATENT DOCUMENTS

| | | |
|---|---|---|
| 9,850,298 B2 | 12/2017 | Attie |
| 9,932,379 B2 | 4/2018 | Seehra et al. |
| 10,093,707 B2 | 10/2018 | Sherman et al. |
| 10,131,700 B2 | 11/2018 | Seehra et al. |
| 10,189,882 B2 | 1/2019 | Attie et al. |
| 10,227,393 B2 | 3/2019 | Kumar et al. |
| 10,259,861 B2 | 4/2019 | Knopf et al. |
| 10,308,704 B2 | 6/2019 | Sun et al. |
| 10,358,476 B2 | 7/2019 | Kumar et al. |
| 10,358,633 B2 | 7/2019 | Seehra et al. |
| 10,377,996 B2 | 8/2019 | Seehra et al. |
| 10,407,487 B2 | 9/2019 | Sun et al. |
| 10,487,144 B2 | 11/2019 | Attie |
| 10,550,170 B2 | 2/2020 | Sherman et al. |
| 11,013,785 B2 | 5/2021 | Seehra et al. |
| 11,090,361 B2 | 8/2021 | Seehra et al. |
| 11,484,573 B2 | 11/2022 | Lachey et al. |
| 11,717,558 B2 | 8/2023 | Seehra et al. |
| 11,884,715 B2 | 1/2024 | Seehra et al. |
| 12,269,858 B2 | 4/2025 | Seehra et al. |
| 2006/0068468 A1 | 3/2006 | Knopf et al. |
| 2009/0005308 A1 | 1/2009 | Knopf et al. |
| 2009/0163417 A1 | 6/2009 | Sherman |
| 2010/0028331 A1 | 2/2010 | Sherman et al. |
| 2010/0028332 A1 | 2/2010 | Sherman et al. |
| 2010/0068215 A1 | 3/2010 | Seehra et al. |
| 2010/0266591 A1 | 10/2010 | Bugelski et al. |
| 2010/0267133 A1 | 10/2010 | Knopf et al. |
| 2010/0316644 A1 | 12/2010 | Seehra et al. |
| 2011/0038831 A1 | 2/2011 | Seehra et al. |
| 2011/0092670 A1 | 4/2011 | Knopf et al. |
| 2011/0135638 A1 | 6/2011 | Seehra et al. |
| 2011/0250198 A1 | 10/2011 | Wolfman et al. |
| 2012/0015877 A1 | 1/2012 | Seehra et al. |
| 2012/0121576 A1 | 5/2012 | Seehra et al. |
| 2012/0148588 A1 | 6/2012 | Knopf et al. |
| 2013/0065299 A1 | 3/2013 | Knopf et al. |
| 2013/0071393 A1 | 3/2013 | Seehra et al. |
| 2013/0177559 A1 | 7/2013 | Seehra et al. |
| 2013/0288983 A1 | 10/2013 | Sun et al. |
| 2013/0315924 A1 | 11/2013 | Hsu et al. |
| 2014/0079700 A1 | 3/2014 | Knopf et al. |
| 2014/0314759 A1 | 10/2014 | Seehra et al. |
| 2015/0023970 A1 | 1/2015 | Seehra et al. |
| 2015/0023981 A1 | 1/2015 | De Kretser et al. |
| 2015/0030595 A1 | 1/2015 | Lee et al. |
| 2015/0183845 A1 | 7/2015 | Sherman et al. |
| 2016/0039922 A1 | 2/2016 | Attie |
| 2016/0108379 A1 | 4/2016 | Knopf et al. |
| 2016/0298093 A1 | 10/2016 | Kumar et al. |
| 2016/0333418 A1 | 11/2016 | Haqq |
| 2017/0058016 A1 | 3/2017 | Knopf et al. |
| 2017/0304397 A1 | 10/2017 | Hruska et al. |
| 2017/0327800 A1 | 11/2017 | Seehra et al. |
| 2017/0360887 A1 | 12/2017 | Attie et al. |
| 2017/0369879 A1 | 12/2017 | Duffield et al. |
| 2018/0050089 A1 | 2/2018 | Kumar et al. |
| 2018/0125928 A1 | 5/2018 | Attie et al. |
| 2018/0148491 A1 | 5/2018 | Han et al. |
| 2018/0161426 A1 | 6/2018 | Cappellini et al. |
| 2018/0334673 A1 | 11/2018 | Wood et al. |
| 2019/0085067 A1 | 3/2019 | Schurpf et al. |
| 2019/0151463 A1 | 5/2019 | Gegg et al. |
| 2019/0225664 A1 | 7/2019 | Sherman et al. |
| 2019/0233486 A1 | 8/2019 | Attie et al. |
| 2019/0256605 A1 | 8/2019 | Han et al. |
| 2019/0282663 A1 | 9/2019 | Seehra et al. |
| 2019/0330307 A1 | 10/2019 | Han et al. |
| 2019/0345225 A1 | 11/2019 | Seehra et al. |
| 2019/0352619 A1 | 11/2019 | Knopf et al. |
| 2020/0055919 A1 | 2/2020 | Kumar et al. |
| 2020/0071381 A1 | 3/2020 | Knopf et al. |
| 2020/0407415 A1 | 12/2020 | Seehra et al. |
| 2021/0015807 A1 | 1/2021 | Poydenot et al. |
| 2021/0030841 A1 | 2/2021 | Lachey et al. |
| 2021/0052698 A1 | 2/2021 | Seehra et al. |
| 2021/0275637 A1 | 9/2021 | Seehra et al. |
| 2021/0322514 A1 | 10/2021 | Kumar et al. |
| 2022/0049257 A1 | 2/2022 | Watanabe et al. |
| 2023/0079602 A1 | 3/2023 | Seehra et al. |
| 2023/0134083 A1 | 5/2023 | Li et al. |
| 2023/0265162 A1 | 8/2023 | Seehra et al. |
| 2023/0348565 A1 | 11/2023 | Seehra et al. |
| 2024/0050528 A1 | 2/2024 | Seehra et al. |
| 2024/0141012 A1 | 5/2024 | Seehra et al. |
| 2024/0218061 A1 | 7/2024 | Seehra et al. |
| 2024/0228583 A1 | 7/2024 | Seehra et al. |
| 2024/0252631 A1 | 8/2024 | Seehra et al. |

FOREIGN PATENT DOCUMENTS

| | | |
|---|---|---|
| CN | 102131515 A | 7/2011 |
| CN | 103298832 A | 9/2013 |
| EP | 2314617 A2 | 4/2011 |
| EP | 2303918 A0 | 8/2012 |
| EP | 2318028 | 8/2012 |
| EP | 2594280 A1 | 5/2013 |
| WO | WO-2004/039948 A2 | 5/2004 |
| WO | WO-2006/012627 A2 | 2/2006 |
| WO | WO-2006/012627 A3 | 2/2006 |
| WO | WO-2008/076437 A2 | 6/2008 |
| WO | WO-2008/094708 A2 | 8/2008 |
| WO | WO-2008/097541 A2 | 8/2008 |
| WO | WO-2008/100384 A2 | 8/2008 |
| WO | WO-2009/015345 A1 | 1/2009 |
| WO | WO-2009/158015 A2 | 12/2009 |
| WO | WO-2009/158015 A3 | 12/2009 |
| WO | WO-2009/158025 A2 | 12/2009 |
| WO | WO-2009/158033 A2 | 12/2009 |
| WO | WO-2009/158035 A2 | 12/2009 |
| WO | WO-2010/062383 A2 | 6/2010 |
| WO | WO-2010/083034 A1 | 7/2010 |
| WO | WO-2010/151426 A1 | 12/2010 |
| WO | WO-2011/020045 A1 | 2/2011 |
| WO | WO-2011/031901 A1 | 3/2011 |
| WO | WO-2011/056896 A1 | 5/2011 |
| WO | WO-2011/063018 A1 | 5/2011 |
| WO | WO-2012/027065 A2 | 3/2012 |
| WO | WO-2012/064771 A1 | 5/2012 |
| WO | WO-2013/059347 A1 | 4/2013 |
| WO | WO-2013/188448 A3 | 12/2013 |
| WO | WO-2014/058881 A1 | 4/2014 |
| WO | WO-2014/066487 A2 | 5/2014 |
| WO | WO-2014/138485 A1 | 9/2014 |
| WO | WO-2014/144903 A1 | 9/2014 |
| WO | WO-2015/143403 A1 | 9/2015 |
| WO | WO-2015/161220 A1 | 10/2015 |
| WO | WO-2015/192111 A1 | 12/2015 |
| WO | WO-2015/192127 A2 | 12/2015 |
| WO | WO-2016/029027 A2 | 2/2016 |
| WO | WO-2016/069234 A1 | 5/2016 |
| WO | WO-2016/090077 A1 | 6/2016 |
| WO | WO-2016/090188 A1 | 6/2016 |
| WO | WO-2016/164501 A1 | 10/2016 |
| WO | WO-2016/171948 A1 | 10/2016 |
| WO | WO-2016/183280 A1 | 11/2016 |
| WO | WO-2016/187378 A1 | 11/2016 |
| WO | WO-2017/079591 A2 | 5/2017 |
| WO | WO-2017/091706 A1 | 6/2017 |
| WO | WO-2017/147182 A1 | 8/2017 |
| WO | WO-2018/013936 A1 | 1/2018 |
| WO | WO-2018/022762 A1 | 2/2018 |
| WO | WO-2018/067740 A1 | 4/2018 |
| WO | WO-2018/067874 A1 | 4/2018 |
| WO | WO-2018/067879 A1 | 4/2018 |
| WO | WO-2018/075747 A1 | 4/2018 |
| WO | WO-2018/089706 A2 | 5/2018 |
| WO | WO-2018/089715 A1 | 5/2018 |
| WO | WO-2018/100483 A1 | 6/2018 |
| WO | WO-2018/144542 A1 | 8/2018 |
| WO | WO-2018/144968 A1 | 8/2018 |
| WO | WO-2018/231905 A1 | 12/2018 |
| WO | WO-2019/094751 A1 | 5/2019 |
| WO | WO-2019/140283 A1 | 7/2019 |

(56) References Cited

FOREIGN PATENT DOCUMENTS

| WO | WO-2019/217715 A1 | 11/2019 |
|---|---|---|
| WO | WO-2020/020896 A1 | 1/2020 |
| WO | WO-2021/062163 A1 | 4/2021 |
| WO | WO-2021/189006 A1 | 9/2021 |
| WO | WO-2021/189019 A1 | 9/2021 |
| WO | WO-2021/222322 A1 | 11/2021 |
| WO | WO-2021/262718 A1 | 12/2021 |
| WO | WO-2022/072882 A1 | 4/2022 |
| WO | WO-2022/099166 A1 | 5/2022 |
| WO | WO-2022/235620 A1 | 11/2022 |
| WO | WO-2022/271716 A2 | 12/2022 |
| WO | WO-2023/003815 A1 | 1/2023 |
| WO | WO-2023/023345 A2 | 2/2023 |
| WO | WO-2023/028606 A1 | 3/2023 |
| WO | WO-2023/141724 A1 | 8/2023 |
| WO | WO-2024/054985 A2 | 3/2024 |
| WO | WO-2024/102906 A2 | 5/2024 |
| WO | WO-2024/130435 A1 | 6/2024 |
| WO | WO-2024/238920 A1 | 11/2024 |
| WO | WO-2024/238950 A1 | 11/2024 |
| WO | WO-2025/019954 A1 | 1/2025 |

OTHER PUBLICATIONS

Extended European Search Report for European Application No. 21770547.4, dated Jul. 16, 2024 (29 pages).

Fabre et al., "Anti-Sclerostin Antibodies in Osteoporosis and Other Bone Diseases," J. Clin. Med. 9, 3439 (Oct. 2020) (16 pages).

Farrell et al., "Bisphosphonate conjugation for bone specific drug targeting," Bone Reports 9:47-60 (Jul. 2018) (14 pages).

Gilson et al., "Follistatin induces muscle hypertrophy through satellite cell proliferation and inhibition of both myostatin and activin," Am J Physiol Endocrinol Metab. 297(1):E157-E164 (May 2009) (8 pages).

Gudelsky et al., "RKER-012, a Novel Activin Receptor Type IIB (ActRIIB) Ligand Trap, Inhibited Mediators of Dysregulated Vascular Remodeling in Pulmonary Endothelial and Smooth Muscle Cells," 2023 ATS International Conference, presented May 22, 2023, retrieved from: <https://kerostx.com/wp-content/uploads/RKER-012-a-Novel-Activin-Receptor-Type-IIB-ActRIIB-Ligand-Trap-Inhibited-Mediators-of-Dysregulated-Vascular-Re.pdf>.

Hardy et al., "The activin A antagonist follistatin inhibits cystic fibrosis-like lung inflammation and pathology," Immunology and Cell Biology 93:567-574 (Mar. 2015) (8 pages).

"Human ActRII extracellular region chimera, SEQ ID 174.", retrieved from EBI accession No. GSP:BKX55865, dated May 19, 2022 (1 page).

"Human ActRII extracellular region chimera, SEQ ID 209.", XP93181867, retrieved from EBI accession No. GSP:BKX55900, dated May 19, 2022 (1 page).

"Human ActRII extracellular region chimera, SEQ ID 213.", XP93181717, retrieved from EBI accession No. GSP:BKX55904, dated May 19, 2022 (1 page).

"Human hybrid soluble ActRIIB-ECD polypeptide, SEQ ID 82.", XP93181873, retrieved from EBI accession No. GSP:BFF66009, dated Jun. 14, 2018 (1 page).

Humbert et al., "Development of KER-012, a Novel Investigational Activin Receptor Type IIB Ligand Trap with High Activin/GDF Specificity and Target Engagement for the Treatment of Pulmonary Arterial Hypertension: Rationale and Design of the TROPOS Phase 2 Study," PVRI 2024 Annual Congress, presented Feb. 2, 2024, retrieved from: <https://kerostx.com/wp-content/uploads/Development-of-KER-012-a-Novel-Investigational-Activin-Receptor-Type-IIB.pdf>.

"Hybrid human mutant activin IIB receptor hu-ActRIIB-ECD, SEQ ID 114.", retrieved from EBI accession No. GSP:BDH87204, dated Dec. 15, 2016 (1 page).

International Search Report and Written Opinion for International Patent Application No. PCT/US2023/073749, mailed Jan. 19, 2024 (15 pages).

Jiang et al. "Activin A as a Novel Chemokine Induces Migration of L929 Fibroblasts by ERK Signaling in Microfluidic Devices," Frontiers in Cell and Developmental Biology 9, 660316 (May 2021) (11 pages).

Lach-Trifilieff et al., "An Antibody Blocking Activin Type II Receptors Induces Strong Skeletal Muscle Hypertrophy and Protects from Atrophy," Mol Cell Biol. 34(4):606-618 (Feb. 2014) (13 pages).

Langdon et al., "RAP-011, an activin receptor ligand trap, increases hemoglobin concentration in Hepcidin transgenic mice," Am J. Hematol. 90(1): 8-14 (Jan. 2015) (18 pages).

Lema et al., "KER-050, a novel muscle anabolic, functions as a ligand trap that binds myo-catabolic TGFβ ligands and has reduced binding affinity for BMP9, a critical vascular remodeling ligand," Neuromuscular Disorders. 29:Abstract p. 127 (Oct. 2019) (1 page).

Morrell et al., "Targeting BMP signalling in cardiovascular disease and anaemia," Nat Rev Cardiol. 13(2):106-20 (with supplemental material) (Aug. 2016) (32 pages).

Mulivor et al., "RAP-011, a Soluble Activin Receptor Type IIa Murine IgG-Fc Fusion Protein, Prevents Chemotherapy Induced Anemia," Blood. 114(22):161 (Nov. 2009) (2 pages).

Paddock and O'Meara, "Steps toward therapeutically targeting the activin type II receptor for treating heart failure," Am J Physiol Heart Circ Physiol. 318:H326-H328 (Jan. 2020) (3 pages).

Ralston and Gaston, "Management of Osteogenesis Imperfecta," Frontiers in Endocrinology 10, 924 (Feb. 2020) (10 pages).

Roh et al., "Activin type II receptor signaling in cardiac aging and heart failure," Sci. Transl. Med. 11, eaau8680 (Mar. 2019) (15 pages).

Ruffenach et al., "Role for Runt-related Transcription Factor 2 in Proliferative and Calcified Vascular Lesions in Pulmonary Arterial Hypertension," Am J Respir Crit Care Med. 194(10):1273-1285 (Nov. 2016).

Soomro et al. "A therapeutic target for CKD: activin A facilitates TGFbeta1 profibrotic signaling," Cellular Molecular Biology Letters. 28(10): 1-22 (Published: Jan. 30, 2023).

Valent et al., "Proposed diagnostic criteria for classical chronic myelomonocytic leukemia (CMML), CMML variants and pre-CMML conditions," Haematologica. 104(10):1935-49 (Epub May 2019) (Oct. 2019).

Zhang et al. "The caveolin-1 regulated protein follistatin protects against diabetic kidney disease," Kidney International. 96(1): 1134-1149 (Published online Jun. 17, 2019).

"A Phase 2 Study of Intravenous or Subcutaneous Dosing of Sotatercept (ACE-011) in Patients With End-Stage Kidney Disease on Hemodialysis," U.S. National Library of Medicine, <clinicaltrials.gov/ct2/show/NCT01999582?term=sotatercept&draw=2&rank=9>, first posted Dec. 3, 2013, retrieved on Mar. 30, 2020 (6 pages).

"A Phase IIa Study of Sotatercept on Bone Mass and Turnover in Patients With Multiple Myeloma," U.S. National Library of Medicine, <clinicaltrials.gov/ct2/show/NCT02230917?term=sotatercept&draw=2&rank=4>, first posted Sep. 3, 2014, retrieved Mar. 30, 2020 (7 pages).

"A Study of Sotatercept for the Treatment of Pulmonary Arterial Hypertension (PAH) (PULSAR)," U.S. National Library of Medicine, <clinicaltrials.gov/ct2/show/NCT03496207?term=sotatercept&draw=2&rank=3>, first posted Apr. 12, 2018, retrieved Mar. 30, 2020 (8 pages).

"A Study of Sotatercept for the Treatment of Pulmonary Arterial Hypertension (SPECTRA)," U.S. National Library of Medicine, <clinicaltrials.gov/ct2/show/NCT03738150?term=sotatercept&draw=2&rank=1>, first posted Nov. 13, 2018, retrieved on Mar. 30, 2020 (9 pages).

"Efficacy and Safety Study of Luspatercept (ACE-536) Versus Epoetin Alfa for the Treatment of Anemia Due to IPSS-R Very Low, Low or Intermediate Risk Myelodysplastic Syndromes (MDS) in ESA Naïve Subjects Who Require Red Blood Cell Transfusions (Commands)," U.S. National Library of Medicine, <clinicaltrials.gov/ct2/show/NCT03682536?term=luspatercept&draw=2&rank=10>, first posted Sep. 24, 2018, retrieved Mar. 30, 2020 (13 pages).

"Keros Therapeutics Presents Results from Preclinical Studies Investigating KER-012 at the American Society for Bone and Mineral Research 2020 Annual Meeting," Keros Therapeutics,

(56) References Cited

OTHER PUBLICATIONS

<https://www.globenewswire.com/news-release/2020/09/11/2092586/0/en/Keros-Therapeutics-Presents-Results-from-Preclinical-Studies-Investigating-KER-012-at-the-American-Society-for-Bone-and-Mineral-Research-2020-Annual-Meeting.html>, dated Sep. 11, 2020, retrieved on Feb. 25, 2021 (4 pages).
"Safety and Efficacy Study of Sotatercept in Adults With Transfusion Dependent Diamond Blackfan Anemia (ACE-011-DBA)," U.S. National Library of Medicine, <clinicaltrials.gov/ct2/show/NCT01464164?term=sotatercept&draw=2&rank=2>, first posted Nov. 3, 2011, retrieved Mar. 30, 2020 (10 pages).
"Sotatercept in Treating Patients With Myeloproliferative Neoplasm-Associated Myelofibrosis or Anemia, " U.S. National Library of Medicine, <clinicaltrials.gov/ct2/show/NCT01712308?term=sotatercept&draw=2&rank=8>, first posted Oct. 23, 2012, retrieved Mar. 30, 2020 (7 pages).
"Study of ACE-536 for the Treatment of Anemia in Patients With Myelodysplastic Syndromes (MDS), " U.S. National Library of Medicine, <clinicaltrials.gov/ct2/show/NCT01749514?term=luspatercept&draw=2&rank=12>, first posted Dec. 13, 2012, retrieved Mar. 30, 2020 (8 pages).
"Study of ACE-536 in Healthy Postmenopausal Women," U.S. National Library of Medicine, <clinicaltrials.gov/ct2/show/NCT01432717?term=luspatercept&draw=2&rank=13>, first posted Sep. 13, 2011, retrieved Mar. 30, 2020 (5 pages).
"Study of Sotatercept for the Treatment of Anemia in low-or Intermediate-1 Risk Myelodysplastic Syndromes (MDS) or Nonproliferative Chronic Myelomonocytic Leukemia (CMML)," U.S. National Library of Medicine, <clinicaltrials.gov/ct2/show/NCT01736683?term=sotatercept&draw=2&rank=5>, first posted Nov. 29, 2012, retrieved Mar. 30, 2020 (12 pages).
"Study to Evaluate Effect of a Single Dose of Sotatercept (ACE-011) on Red Blood Cell Mass and Plasma Volume in Subjects With Solid Tumors," U.S. National Library of Medicine, <clinicaltrials.gov/ct2/show/NCT01190644?term=sotatercept&draw=2&rank=7>, first posted Aug. 27, 2010, retrieved Mar. 30, 2020 (6 pages).
"Study to Evaluate the Effects of ACE-536 in Patients With Beta-thalassemia," U.S. National Library of Medicine, <clinicaltrials.gov/ct2/show/NCT01749540?term=luspatercept&draw=2&rank=11>, first posted Dec. 13, 2012, retrieved Mar. 30, 2020 (8 pages).
"To Determine Safe and Effective Dose of ACE-011 for the Treatment of Chemotherapy Induced Anemia in Patients With Advanced Non-small Cell Lung Cancer," U.S. National Library of Medicine,<clinicaltrials.gov/ct2/show/NCT01284348?term=sotatercept&draw=2&rank=6>, first posted Jan. 27, 2011, retrieved Mar. 30, 2020 (10 pages).
"To Document the Burden of Illness on the Quality of Life and the Impact on Healthcare Utilization in (Beta)-thalassemia Subjects Who Are Transfusion Dependent (TD) and Non-transfusion Dependent (NTD) Receiving Standard of Care," U.S. National Library of Medicine, <clinicaltrials.gov/ct2/show/NCT02626689?term=luspatercept&draw=2&rank=14>, first posted Dec. 10, 2015, retrieved Mar. 30, 2020 (9 pages).
Abdulkadyrov et al., "Sotatercept in Patients with Osteolytic Lesions of Multiple Myeloma," Br J Haematol. 165(6):814-823 (2014).
Akpan et al., "The effects of a soluble activin type IIB receptor on obesity and insulin sensitivity," available in PMC May 1, 2010, published in final edited form as: Int J Obes (Lond). 33(11):1265-73 (2009) (17 pages).
Attie et al., "A phase 1 study of ACE-536, a regulator of erythroid differentiation, in healthy volunteers," Am J Hematol. 89(7): 766-770 (2014) (5 pages).
Attie et al., "A single ascending-dose study of muscle regulator ACE-031 in healthy volunteers." Muscle Nerve. 47(3):416-23 (2013).
Badesch et al., "PULSAR: A Phase 2, Randomized, Double-Blind, Placebo-Controlled Study to Assess the Efficacy and Safety of Sotatercept (ACE-011) When Added to Standard of Care for the Treatment of Pulmonary Arterial Hypertension (PAH)," ERS International Congress, Sep. 28-Oct. 2, 2019, Madrid, Spain, Poster PA4750, Abstract 19918, retrieved from <acceleronpharma.com/wp-content/uploads/2019/10/Badesch-et-al-ERS-2019-PULSAR-TIP-Poster_FINAL-2.pdf> (2019) (1 page).
Ballen et al., "Outcome of transplantation for myelofibrosis," Biol Blood Marrow Transplant. 16(3):358-67 (Mar. 2010).
Bauer et al., "Complement C3 Deficiency Attenuates Chronic Hypoxia-Induced Pulmonary Hypertension in Mice," PLoS ONE 6(12):e28578 (Dec. 2011) (10 pages).
Bernstein et al., "Activin Decoy Receptor ActRIIB:Fc Lowers FSH and Therapeutically Restores Oocyte Yield, Prevents Oocyte Chromosome Misalignments and Spindle Aberrations, and Increases Fertility in Midlife Female SAMP8 Mice," Endocrinology. 157(3):1234-47 (2016).
Bond et al., "Modeling Energy Dynamics in Mice with Skeletal Muscle Hypertrophy Fed High Calorie Diets," Int J Biol Sci. 12(5):617-30 (2016).
Bose et al. "Management of Myelofibrosis-Related Cytopenias," Curr Hematol Malig Rep. 13(3):164-172 (May 2018).
Cadena et al., "Administration of a soluble activin type IIB receptor promotes skeletal muscle growth independent of fiber type," J Appl Physiol. 109(3):635-642 (2010) (21 pages).
Campbell et al., "Myostatin inhibitor ACE-031 treatment of ambulatory boys with Duchenne muscular dystrophy: Results of a randomized, placebo-controlled clinical trial," Muscle Nerve. 55(4):458-464 (2017).
Cappellini et al., "A Phase 2a, Open-Label, Dose-Finding Study To Determine The Safety and Tolerability Of Sotatercept (ACE-011) In Adults With Beta-Thalassemia: Interim Results," 55th Annual Meeting of the American Society of Hematology (ASH), Dec. 7-10, New Orleans, LA, Poster 3448 (2013) (1 page).
Cappellini et al., "The BELIEVE Trial: Results of a Phase 3, Randomized, Double-Blind, Placebo- Controlled Study of Luspatercept in Adult Beta-Thalassemia Patients Who Require Regular Red Blood Cell (RBC) Transfusions," 60th Annual Meeting of the American Society of Hematology (ASH), Dec. 1-4, San Diego CA, Oral Presentation, retrieved from <http://acceleronpharma.com/wp-content/uploads/2018/12/BELIEVE-ASH-2018-Oral-Presentation-for-upload.pdf> (2018) (17 pages).
Carlson et al., "Soluble Activin Receptor Type IIB Increases Forward Pulling Tension in the MDX Mouse," available in PMC May 1, 2012, published in final edited form as: Muscle Nerve. 43(5):694-699 (2011) (11 pages).
Carrancio et al., "An activin receptor IIA ligand trap promotes erythropoiesis resulting in a rapid induction of red blood cells and haemoglobin," Br J Haematol. 165(6):870-882 (2014).
Cash et al., "The structure of myostatin:follistatin 288: insights into receptor utilization and heparin binding," EMBO J. 28(17):2662-76 (2009).
Chantry et al., "Inhibiting activin—A signaling stimulates bone formation and prevents cancer-induced bone destruction in vivo." J Bone Miner Res. 25(12):2633-46 (2010).
Chen et al., "Pharmacokinetics and Exposure-Response of Luspatercept in Patients With Anemia Due to Low- or Intermediate-1-Risk Myelodysplastic Syndromes (MDS): Preliminary Results From Phase 2 Studies," 58th Annual Meeting of the American Society of Hematology (ASH), Dec. 3-6, San Diego, California, Poster 1990, retrieved from <acceleronpharma.com/wp-content/uploads/2017/03/Chen-ASH-2016-Poster-Luspatercept-PK-MDS.pdf>, (2016) (1 page).
Chen et al., "Pharmacokinetics and Exposure-Response of Luspatercept in Patients With Beta-Thalassemia: Preliminary Results From Phase 2 Studies," 58th Annual Meeting of the American Society of Hematology (ASH), Dec. 3-6, San Diego, CA, Poster 2463, retrieved from <acceleronpharma.com/wp-content/uploads/2017/03/20161204-Chen-ASH-2016-Poster-Luspatercept-PK-B-thal.pdf>, (2016) (1 page).
Dellanna, "Safety and Hemoglobin Effect of Sotatercept, Administered Intravenously and Subcutaneously, for Maintenance of Hemoglobin in Hemodialysis Subjects: Interim Analysis of a Phase 2 Study," 48th Annual American Society of Nephrology Kidney Week, November 3-8, San Diego, CA, retrieved from <acceleronpharma.com/wp-content/uploads/2017/03/20151106-ASN-2015_Sotatercept-REN-002-Oral-Presentation_10-22-15-v3-Final.pdf>, (2015) (14 pages).
DiGirolamo et al., "Administration of soluble activin receptor 2B increases bone and muscle mass in a mouse model of osteogenesis imperfecta," Bone Res. 3:14042 (2015) (6 pages).

(56) References Cited

OTHER PUBLICATIONS

Dussiot et al., "An activin receptor IIA ligand trap corrects ineffective erythropoiesis in beta-thalassemia," Nat Med. 20(4):398-407 (2014) (12 pages).
El-Shahawy et al., "Interim Analysis of ACE-011-REN-001: The First 28 Day Dose Cycle of Low and Medium Starting Doses of Sotatercept Compared to Placebo for Correction of Anemia in Hemodialysis Subjects," National Kidney Foundation (NKF) 2014 Spring Clinical Meeting, Apr. 22-26, Las Vegas, NV, retrieved from <acceleronpharma.com/wp-content/uploads/2017/03/20140423-NKF-2014_REN-001-Interim-Analysis-Poster_FINAL.pdf>, (2014) (7 pages).
El-Shahawy et al., "Long-term Effects of Sotatercept Compared With Placebo for Correction of Anemia in Hemodialysis Subjects: Interim Analysis of ACE-011-REN-001 Phase 2A Study," 51st Congress of the European Renal Association and European Dialysis and Transplant Association, May 31-Jun. 3, Amsterdam, Poster SP244, retrieved from <acceleronpharma.com/wp-content/uploads/2014/06/20140601-Long-Term-Effects-of-Sotatercept-Compared-with-Placebo-for-Correction-of-Anemia.pdf>, (2014) (7 pages).
El-Shahawy et al., "Safety and Hemoglobin Effect of the First 28-Day Dose Cycle of Sotatercept 0.7 mg/kg Compared With Lower Doses and Placebo for Correction of Anemia in Hemodialysis Subjects: Interim Analysis," American Society of Nephrology Kidney Week, Nov. 11-16, 2016, Philadelphia, PA. Poster, retrieved from <acceleronpharma.com/wp-content/uploads/2014/11/20141113-El-Shahawy-ASN-2014-Sotatercept-Safety-Poster.pdf>, (2014) (1 page).
Fajardo et al., "Treatment with a soluble receptor for activin improves bone mass and structure in the axial and appendicular skeleton of female cynomolgus macaques (Macaca fascicularis)," Bone. 46(1):64-71 (2010).
Fakhfakh et al., "Administration of a soluble activin type IIB receptor promotes the transplantation of human myoblasts in dystrophic mice," available in PMC Jul. 10, 2014, published in final edited form as: Cell Transplant. 21(7):1419-30 (2012) (19 pages).
Feigenson et al., "Ker-050, a Modified Actriia Ligand Trap, Alleviates Cytopenia Arising from Multiple Etiologies," Blood. 136(Supplement 1):38 (2 Pages) (Nov. 2020).
Fenaux et al., "Assessment of Longer-Term Efficacy and Safety in the Phase 3, Randomized, Double-Blind, Placebo-Controlled MEDALIST Trial of Luspatercept to Treat Anemia in IPSS-R Very Low-, Low-, or Int-Risk RBC Transfusion-Dependent MDS with Ring Sideroblasts," 61st Annual Meeting of the American Society of Hematology (ASH), Dec. 7-10, Orlando, Florida, retrieved from <acceleronpharma.com/wp-content/uploads/2019/12/ASH-2019-MEDALIST-long-term-analysis-Fenaux-oral-7-Dec-2019V2.pdf>, (2019) (18 pages).
Fenaux et al., "Luspatercept for the treatment of anemia in myelodysplastic syndromes and primary myelofibrosis," Blood. 133(8):790-794 (Feb. 2019) (5 pages).
Fenaux et al., "Luspatercept in Patients with Lower-Risk Myelodysplastic Syndromes," N Engl J Med. 382(2):140-151 (Jan. 2020).
Fenaux et al., "The MEDALIST Trial: Results of a Phase 3, Randomized, Double-Blind, Placebo-Controlled Study of Luspatercept to Treat Patients With Very Low-, Low-, or Intermediate-Risk Myelodysplastic Syndromes (MDS) Associated Anemia With Ring Sideroblasts (RS) Who Require Red Blood Cell (RBC) Transfusions," 60th Annual Meeting of the American Society of Hematology (ASH), Dec. 1-4, San Diego, California, Oral Presentation (2018) (18 pages).
Fields et al., "Activin receptor antagonists for cancer-related anemia and bone disease," Exp Opin Invest Drugs. 22(1):87-101 (2013) (16 pages).
Galiè et al., "2015 ESC/ERS Guidelines for the diagnosis and treatment of pulmonary hypertension: The Joint Task Force for the Diagnosis and Treatment of Pulmonary Hypertension of the European Society of Cardiology (ESC) and the European Respiratory Society (ERS): Endorsed by: Association for European Paediatric and Congenital Cardiology (AEPC), International Society for Heart and Lung Transplantation (ISHLT)," European Heart Journal. 37:67-119 (2016) (58 pages).
Garcia-Manero et al., "Hematologic Improvement-Neutrophil and -Platelet in the MEDALIST Trial: Multilineage Data from a Phase 3, Randomized, Double-Blind, Placebo-Controlled Study of Luspatercept to Treat Anemia in Patients with Very Low-, Low-, or Intermediate-Risk Myelodysplastic Syndromes with Ring Sideroblasts Who Require Red Blood Cell (RBC) Transfusions," 61st Annual Meeting of the American Society of Hematology (ASH), Dec. 7-10, Orlando, Florida, Abstract 4243 (2019) (1 page).
Gerds et al., "A Phase 2 Study of Luspatercept in Patients With Myelofibrosis-Associated Anemia," 61st Annual Meeting of the American Society of Hematology (ASH), Dec. 7-10, Orlando FL, Presentation, Abstract 557, retrieved from <acceleronpharma.com/wp-content/uploads/2019/12/Gerds-et al.-Luspatercept-in-MF_ASH-2019-7-Dec-2019-FINAL-FOR-UPLOAD.pdf>, (2019) (13 pages).
Giagounidis et al., "Luspatercept Increases Hemoglobin and Reduces Transfusion Burden in Patients With Lower-Risk Myelodysplastic Syndromes (MDS): Long-Term Results From the Phase 2 PACE-MDS Study," 22nd European Hematology Association Congress, Jun. 22-25, Madrid, Spain, Abstract P666, retrieved from <acceleronpharma.com/wp-content/uploads/2017/06/EHA-2017-MDS-Poster-20Jun2017-FINAL.pdf>, (2017) (1 page).
Giagounidis et al., "Luspatercept Treatment Leads to Long Term Increases in Hemoglobin and Reductions in Transfusion Burden in Patients with Low or Intermediate-1 Risk Myelodysplastic Syndromes (MDS): Preliminary Results from the Phase 2 PACE-MDS Extension Study," Presentation. (2015) (16 pages).
Goh et al., "Activin receptor type 2A (ACVR2A) functions directly in osteoblasts as a negative regulator of bone mass," J Biol Chem. 292(33):13809-13822 (2017).
Graham et al., "A Soluble Activin Receptor IIB Fails to Prevent Muscle Atrophy in a Mouse Model of Spinal Cord Injury," J Neurotrauma. 33(12):1128-1135 (2016).
Guo et al., "Myostatin inhibition in muscle, but not adipose tissue, decreases fat mass and improves insulin sensitivity," PLoS One. 4(3):e4937 (2009) (11 pages).
Guo et al., "Myostatin inhibition prevents diabetes and hyperphagia in a mouse model of lipodystrophy," Diabetes. 61(10):2414-23 (2012).
Havill et al., "Sotatercept Improves Anemia, Vascular Calcification, and Bone Loss in Patients With End-Stage Kidney Disease on Hemodialysis," American Society of Nephrology Kidney Week, Nov. 5-8, 2015, San Diego, CA, Poster TH-P0038, retrieved from <acceleronpharma.com/wp-content/uploads/2017/03/20151105-ASN-2015_Sotatercept-REN-001-Poster 10.20.15-Final-1.pdf>, (2015) (1 page).
Highland et al., "Development of the Pulmonary Hypertension Functional Classification Self-Report: a patient version adapted from the World Health Organization Functional Classification measure," Health Qual Life Outcomes. 19(1):202 (Aug. 2021) (13 pages).
Hoffmann et al., "Compartment-specific expression of collagens and their processing enzymes in intrapulmonary arteries of IPAH patients," Am J Physiol Lung Cell Mol Physiol. 308(10):L1002-L1013 (2015) (12 pages).
Huertas et al., "Immune Dysregulation and Endothelial Dysfunction in Pulmonary Arterial Hypertension: a complex interplay," Circulation. 129(12):1332-40 (Mar. 2014) (9 pages).
Humeniuk et al., "Brief Report: Loss of p15Ink4b Accelerates Development of Myeloid Neoplasms in Nup98-HoxD13 Transgenic Mice," Stem Cells. 32(5):1361-1366 (2014).
International Search Report and Written Opinion for International Application No. PCT/US17/60960, mailed Aug. 9, 2018 (14 pages).
International Search Report and Written Opinion for International Application No. PCT/US17/60970, mailed Mar. 27, 2018 (15 pages).
International Search Report and Written Opinion for International Application No. PCT/US2018/060076, mailed Mar. 14, 2019 (18 pages).
International Search Report and Written Opinion for International Application No. PCT/US2019/013329, mailed May 13, 2019 (19 pages).

(56) References Cited

OTHER PUBLICATIONS

International Search Report and Written Opinion for International Application No. PCT/US2019/031573, mailed Sep. 17, 2019 (16 pages).
International Search Report and Written Opinion for International Application No. PCT/US2021/023335, mailed Jul. 9, 2021 (29 pages).
International Search Report and Written Opinion for International Application No. PCT/US2021/023339, mailed Jun. 21, 2021 (23 pages).
International Search Report and Written Opinion for International Application No. PCT/US2021/023353, mailed Jul. 20, 2021 (9 pages).
International Search Report and Written Opinion for International Application No. PCT/US2021/053239, mailed Feb. 23, 2022 (13 pages).
International Search Report and Written Opinion for International Application No. PCT/US2022/027399, mailed Sep. 21, 2022 (14 pages).
International Search Report and Written Opinion for International Application No. PCT/US2022/034366, mailed Jan. 4, 2023 (13 pages).
International Search Report and Written Opinion for International Application No. PCT/US2022/040920, dated Mar. 29, 2023 (13 pages).
Joshi et al., "ActRIIA-Fc (Sotatercept) Reverses Pulmonary Vascular Remodeling to Attenuate Pulmonary Arterial Hypertension by Rebalancing Activin/BMP Signaling in a Preclinical Model," American Thoracic Society 2019 International Conference, May 17-22, Dallas, TX, Poster, retrieved from <acceleronpharma.com/wp-content/uploads/2019/06/Joshi-SR-et-al-ATS-2019-Poster-Sotatercept-Reverses-Pulmonary-Vascular-R...-1.pdf>, (2019) (1 page).
Joshi et al., "RAP-011, a Murine Ortholog of ACTRIIA-FC (Sotatercept), Improves Pulmonary Hemodynamics and Restores Right Ventricular Structure and Function in a Preclinical Model of Severe Angio-obliterative Pulmonary Arterial Hypertension," American Heart Association Scientific Session, November 10-12, Chicago, Illinois, retrieved from <http://acceleronpharma.com/wp-content/uploads/2018/11/SRJ-AHA-2018-Poster.pdf>, (2018) (1 page).
Komrokji et al., "A Phase 2, Dose-Finding Study of Sotatercept (ACE-011) in Patients with Lower-Risk Myelodysplastic Syndromes or Non-Proliferative Chronic Myelomonocytic Leukemia and Anemia Requiring Transfusion," The 13th International Symposium on Myelodysplastic Syndromes, Apr. 29-May 2, Washington, D.C., retrieved from <http://acceleronpharma.com/wp-content/uploads/2017/03/20150429-Komrokji-MDS-001_MDSF-2015-presentation_29-April- 2015_FINAL.pdf>, (2015) (21 pages).
Komrokji et al., "An Open-Label, Phase 2, Dose-Finding Study of Sotatercept (ACE-011) in Patients with Low or Intermediate (Int)-1-Risk Myelodysplastic Syndromes (MDS) or Non-Proliferative Chronic Myelomonocytic Leukemia (CMML) and Anemia Requiring Transfusion," 56th Annual Meeting of the American Society of Hematology (ASH), Dec. 6-9, San Francisco, California. Poster P3251 (2014) (1 page).
Kuo et al., "MB109 as bioactive human bone morphogenetic protein-9 refolded and purified from *E. coli* inclusion bodies," Microb Cell Fact. 13(1):29 (2014) (13 pages).
Lee et al., "Growth differentiation factor 11 signaling controls retinoic acid activity for axial vertebral development," available in PMC Nov. 1, 2011, published in final edited form as: Dev Biol. 347(1):195-203 (2010) (19 pages).
Lee et al., "Myostatin and the control of skeletal muscle mass," Curr Opin Genet Devel. 9(5):604-607 (1999).
Lee et al., "Regulation of muscle growth by multiple ligands signaling through activin type II receptors," Proc Natl Acad Sci U S A. 102(50):18117-18122 (2005).
Lee et al., "Regulation of myostatin activity and muscle growth," Proc Natl Acad Sci U S A. 98(16):9306-9311 (2001).
Lee et al., "Role of satellite cells versus myofibers in muscle hypertrophy induced by inhibition of the myostatin/activin signaling pathway," Proc Natl Acad Sci U S A. 109(35):E2353-60 (2012).
Lotinun et al., "A soluble activin receptor Type IIA fusion protein (ACE-011) increases bone mass via a dual anabolic-antiresorptive effect in Cynomolgus monkeys." Bone. 46(4):1082-8 (2010).
MacDonald et al., "Denervation atrophy is independent from Akt and mTOR activation and is not rescued by myostatin inhibition," first posted online on Feb. 6, 2014, published in final edited form as: Dis Model Mech. 7(4):471-81 (2014) (Author manuscript) (39 pages).
Malluche et al., "Sotatercept: Initial Signal-Seeking Quantitative Computed Tomography Results for Bone Mass and Vascular Calcification in Hemodialysis Subjects Treated With Escalating Doses: Interim Analysis of ACE-011-REN-001," American Society of Nephrology Kidney Week, Nov. 11-16, 2014, Philadelphia, PA, retrieved from <http://acceleronpharma.com/wp-content/uploads/2017/03/20141113-Malluche_ASN-2014_Sotatercept-Bone-Mass-VC-Poster_11- 10-14-Final.pdf>, (2014) (1 page).
Malluche et al., "The Role of Activin Signaling in the Pathogenesis of Renal Osteodystrophy of CKD-MBD," 52nd ERA-EDTA Congress, May 28-31, London, United Kingdom, Poster FP406, retrieved from <acceleronpharma.com/wp-content/uploads/2017/03/20150529-ERA-2015_RAP-011-Bone-Histomorphometry-Poster_05.22.15-Final-for-QR-Code.pdf>, (2015) (1 page).
Marisavljevic et al., "Myelofibrosis in primary myelodysplastic syndromes: clinical and biological significance," Med Oncol. 21(4):325-31 (2004) (Abstract only) (2 pages).
Martinez, "Luspatercept Inhibits pSmad2/3 Signaling and Promotes Erythroid Maturation Through a GATA1 Dependent Mechanism," 23rd European Hematology Association Congress, Jun. 14- 17, Stockholm, Sweden, Oral Presentation, retrieved from <acceleronpharma.com/wp-content/uploads/2018/06/EHA2018PMFinal.pdf>, (2018) (25 pages).
Martinez, "RAP-536 (Murine ACE-536/Luspatercept) Inhibits Smad2/3 Signaling and Promotes Erythroid Differentiation By Restoring GATA1 Function in Murine Beta-thalassemia," 21st European Hematology Association Congress, Jun. 9-12, Copenhagen, Denmark, Oral Presentation, retrieved from <acceleronpharma.com/wp-content/uploads/2017/03/20160610-PedroEHA2016Final.pdf> (2016) (23 pages).
Martinez, "RAP-536 (Murine ACE-536/Luspatercept) Inhibits Smad2/3 Signaling and Promotes Erythroid Differentiation By Restoring GATA1 Function in Murine Beta-thalassemia," Oral Presentation, Blood. 126(23):751 (2015) (25 pages).
McPherron et al., "Double muscling in cattle due to mutations in the myostatin gene," Proc Natl Acad Sci USA. 94(23):12457-61 (1997).
McPherron et al., "GDF-3 and GDF-9: two new members of the transforming growth factor-beta superfamily containing a novel pattern of cysteines*," J Biol Chem. 268(5):3444-3449 (1993) (7 pages).
McPherron et al., "Redundancy of myostatin and growth/differentiation factor 11 function," BMC Dev Biol. 9:24 (2009) (9 pages).
McPherron et al., "Regulation of anterior/posterior patterning of the axial skeleton by growth/differentiation factor 11," Nat Genet. 22(3):260-264 (1999).
McPherron et al., "Regulation of skeletal muscle mass in mice by a new TGF-beta superfamily member," Nature. 387(6628):83-90 (1997).
McPherron et al., "Soluble activin receptor type IIB treatment does not cause fat loss in mice with diet-induced obesity," available in PMC Mar. 1, 2013, published in final edited form as: Diabetes Obes Metab. 14(3):279-82 (2012) (6 pages).
McPherron et al., "Suppression of body fat accumulation in myostatin-deficient mice," J Clin Invest. 109(5):595-601 (2002).
McPherron et al., "The transforming growth factor beta superfamily," Growth Factors and Cytokines in Health and Disease. 1:357-393 (1996).
Mesa et al., "A Phase 2, Multicenter, Open-Label Study of the Safety and Efficacy of Luspatercept in Subjects With Myeloproliferative Neoplasm (MPN)-Associated Myelofibrosis and Anemia With or Without RBC Transfusion Dependence," American Society of

(56) References Cited

OTHER PUBLICATIONS

Clinical Oncology (ASCO) Annual Meeting, Jun. 1-5, Chicago Illinois, Poster TPS7083, retrieved from <http://acceleronpharma.com/wp-content/uploads/2018/06/Mesa-MF-TIP-ASCO-2018-Poster-May-24-2018_FINAL-1.pdf>, (2018) (1 page).
Morgenroth et al., "Insights into bone health in Duchenne muscular dystrophy," Bonekey Rep. 1:9 (2012) (11 pages).
Morine et al., "Activin IIB receptor blockade attenuates dystrophic pathology in a mouse model of Duchenne muscular dystrophy," available in PMC Jul. 17, 2015, published in final edited form as: Muscle Nerve. 42(5):722-30 (2010) (17 pages).
Nagy et al., "Electrical impedance myography as a biomarker of myostatin inhibition with ActRIIB-mFc: a study in wild-type mice," Future Sci OA. 04(06):FSO308 (2018) (10 pages).
Ngo et al., Computational Complexity, Protein Structure Prediction, and the Levinthal Paradox. *The Protein Folding Problem and Tertiary Structure Prediction*. Birkhäuser Boston, pp. 433, 492-495 (1994).
Nielsen et al., "Postnatal Hyperplasic Effects of ActRIIB Blockade in a Severely Dystrophic Muscle," J Cell Physiol. 232(7):1774-1793 (2016) (21 pages).
Ogawa et al., "Long-term patient survival with idiopathic/heritable pulmonary arterial hypertension treated at a single center in Japan," Life Science 118(2):414-419 (2014) (6 pages).
Park et al., "The prognostic value of serum erythropoietin in patients with lower-risk myelodysplastic syndromes: a review of the literature and expert opinion." Ann Hematol. 99(1):7-19 (Jan. 2020).
Paulson, "Targeting a new regulator of erythropoiesis to alleviate anemia," Nat Med. 20(4):334-335 (2014).
Pearsall et al., "A soluble activin type IIA receptor induces bone formation and improves skeletal integrity," Proc Nat Acad Sci U S A. 105(19):7082-7087 (2008).
Piga et al., "Improvements in Hemoglobin, Quality of Life, and Six-Minute-Walk Distance in Adults with beta-Thalassemia Treated with Luspatercept: Long-Term Phase 2 Study," 23rd European Hematology Association Congress, Jun. 14-17, Stockholm, Sweden, Oral Presentation, retrieved from <acceleronpharma.com/wp-content/uploads/2018/06/Piga-et-al-EHA-2018-Presentation-Improvements-in-Hemoglobin-Quality-of-Life-and-Six-Minute-Walk-Distance.pdf>, (2018) (22 pages).
Piga et al., "Luspatercept (ACE-536) Increases Hemoglobin and Decreases Transfusion Burden and Liver Iron Concentration in Adults with Beta-Thalassemia: Preliminary Results from a Phase 2 Study," EHA (2015) (22 pages).
Piga et al., "Luspatercept (ACE-536) Increases Hemoglobin and Decreases Transfusion Burden and Serum Ferritin in Adults with Beta-Thalassemia: Preliminary Results from a Phase 2 Study," American Society of Hematology, Oral Presentation, dated Dec. 7, 2014 (21 pages).
Piga et al., "Luspatercept Decreases Transfusion Burden and Liver Iron Concentration in Regularly Transfused Adults with Beta-Thalassemia," 21st European Hematology Association Congress, Jun. 9-12, Copenhagen, Denmark, Presentation, retrieved from <acceleronpharma.com/wp-content/uploads/2017/03/20160612-EHA-2016-Luspatercept-Thal-TD-FINAL.pdf>, (2016) (15 pages).
Piga et al., "Luspatercept improves hemoglobin levels and blood transfusion requirements in a study of patients with beta-thalassemia," Blood. 133(12):1279-1289 (2019).
Platzbecker et al., "Luspatercept Increases Hemoglobin and Reduces Transfusion Burden in Patients with Low-Intermediate Risk Myelodysplastic Syndromes (MDS): Long-Term Results From Phase 2 PACE-MDS Study," 21st European Hematology Association Congress, Jun. 9-12, Copenhagen, Denmark, Presentation, retrieved from <http://acceleronpharma.com/wp-content/uploads/2017/03/20160610-EHA-2016-Luspatercept-MDS-FINAL.pdf> (2016) (16 pages).
Piga et al., "Luspatercept Increases Hemoglobin, Decreases Transfusion Burden, and Improves Patient-Reported Outcomes in Adults with Beta-Thalassemia," 58th Annual Meeting of the American Society of Hematology (ASH), Dec. 3-6, San Diego, California, Oral Presentation, retrieved from <http://acceleronpharma.com/wp-content/uploads/2017/03/20161205-Luspatercept-Increases-Hemoglobin.pdf>, (2016) (21 pages).
Piga et al., "Luspatercept Increases Hemoglobin, Reduces Liver Iron Concentration and Improves Quality of Life in Non-Transfusion Dependent Adults with Beta-Thalassemia," 21st European Hematology Association Congress, Jun. 9-12, Copenhagen, Denmark, Abstract P758, retrieved from <http://acceleronpharma.com/wp-content/uploads/2017/03/20160611-EHA-2016-Luspatercept-BThal-NTD-poster-FINAL.pdf>, (2016) (1 page).
Piga et al., "Luspatercept Increases Hemoglobin, Reduces Liver Iron Concentration and Improves Quality of Life in Non-Transfusion Dependent Adults with Beta-Thalassemia," 2nd MEGMA Conference, Nov. 11-12, Amman, Jordan, retrieved from <http://acceleronpharma.com/wp-content/uploads/2017/03/20161111-TIF-2016-Luspatercept-BThal-NTD-poster_FINAL_16-10-31.pdf>, (2016) (1 page).
Platzbecker et al., "Biomarkers of Ineffective Erythropoiesis Predict Response to Luspatercept in Patients with Low or Intermediate-1 Risk Myelodysplastic Syndromes (MDS): Final Results from the Phase 2 PACE-MDS Study," 57th American Society of Hematology Annual Meeting and Exposition, Dec. 5-8, Orlando, FL, Abstract 2862, retrieved from <Biomarkers of Ineffective Erythropoiesis Predict Response to Luspatercept in Patients with Low or Intermediate-1 Risk Myelodysplastic Syndromes (MDS): Final Results from the Phase 2 PACE-MDS Study>, (2015) (1 page).
Platzbecker et al., "Erythropoietic cellular analyses in luspatercept-treated lower-risk myelodysplastic syndromes (MDS): Phase 2 PACE-MDS study," 2018 American Society of Clinical Oncology (ASCO) Annual Meeting, Jun. 1-5, Chicago, Illinois, Abstract 7018, retrieved from <http://acceleronpharma.com/wp-content/uploads/2018/06/Platzbecker-ASCO-2018-Poster-Erythropoietic-Cellular-Analyses-Ph-2-PACE-MDS-Study-1.pdf>, (2018) (1 page).
Platzbecker et al., "Luspatercept (ACE-536) Increases Hemoglobin and Reduces Transfusion Burden in Patients with Low or Intermediate-1 Risk Myelodysplastic Syndromes (MDS): Preliminary Results from a Phase 2 Study," American Society of Hematology, Oral Presentation (2014) (21 pages).
Platzbecker et al., "Luspatercept for the treatment of anaemia in patients with lower-risk myelodysplastic syndromes (PACE-MDS): a multicentre, open-label phase 2 dose-finding study with long-term extension study," Lancet Oncol. 18(10):P1338-1347 (2017).
Platzbecker et al., "Luspatercept Increases Hemoglobin And Reduces Transfusion Burden In Patients With Low Or Intermediate-1 Risk Myelodysplastic Syndromes (MDS): Preliminary Results From A Phase 2 Study," EHA MDS Oral Presentation, Jun. 13, 2015 (16 pages).
Platzbecker et al., "Luspatercept Increases Hemoglobin And Reduces Transfusion Burden In Patients With Low Or Intermediate-1 Risk Myelodysplastic Syndromes (MDS): Preliminary Results From A Phase 2 Study," Advancing Research & Patient Care, The 13th International Symposium on Myelodyplastic Syndromes, Washington, D.C., Apr. 19-May 2, 2015 (15 pages).
Platzbecker et al., "Luspatercept Response in New Subpopulations of Patients With Lower-Risk Myelodysplastic Syndromes (MDS): Update of the PACE Study," 14th International Symposium on Myelodysplastic Syndromes, May 3-6, Valencia, Spain, Oral Presentation, retrieved from <acceleronpharma.com/wp-content/uploads/2017/05/Platzbecker-U-MDS-Symposium-2017-Slides-Luspatercept-Response-in-New-Subpopulations-Website-Version.pdf>, (2017) (16 pages).
Platzbecker et al., "Luspatercept Significantly Reduces Red Blood Cell (RBC) Transfusion Burden, Regardless of Gene Mutation Frequency, Spectrum, and Prognostic Significance, Among Patients with Lower-Risk Myelodysplastic Syndromes Enrolled in the MED-ALIST Trial," retrieved from < http://acceleronpharma.com/wp-content/uploads/2019/12/ASH-2019-Platzbecker-MEDALIST-Mutational-analysis.pdf>, (2019) (1 page).
Platzbecker et al., "Mutational and Subgroup Analyses of Lower-Risk Myelodysplastic Syndromes (MDS) Patients Treated With Luspatercept: Phase 2 PACE-MDS Study," 23rd European Hematology Association Congress, Jun. 14-17, Stockholm, Sweden,

(56) References Cited

OTHER PUBLICATIONS

Abstract PF498, retrieved from <http://acceleronpharma.com/wp-content/uploads/2018/06/EHA-2018-MDS-Poster-06June2018.pdf>, (2018) (1 page).
Platzbecker et al., "Mutational Profile and Analysis of Lower-Risk Myelodysplastic Syndromes (MDS) Patients Treated with Luspatercept: Phase 2 PACE-MDS Study," American Society of Hematology (ASH) 59th Annual Meeting & Exposition, Dec. 9-12, Atlanta, GA, Abstract 2982, retrieved from <acceleronpharma.com/wp-content/uploads/2017/12/Platzbecker-U-ASH-2017-MDS-Luspatercept-Poster-Final.pdf> (2017) (1 page).
Porter et al., "Effects of Luspatercept on Iron Overload and Impact on Responders to Luspatercept: Results from the BELIEVE Trial," 61st Annual Meeting of the American Society of Hematology (ASH), Abstract 2245, Blood. 134(Supplement 1):2245 (2019) (1 page).
Rabinovitch et al., "Inflammation and Immunity in the Pathogenesis of Pulmonary Arterial Hypertension," Circ Res. 115(1):165-175 (Jun. 2014) (11 pages).
Raftopoulos et al., "Sotatercept (ACE-011) for the treatment of chemotherapy-induced anemia in patients with metastatic breast cancer or advanced or metastatic solid tumors treated with platinum-based chemotherapeutic regimens: results from two phase 2 studies," Support Care Cancer. 24(4):1517-25 (2015).
Rodgarkia-Dara et al., "The activin axis in liver biology and disease," Mutat Res. 613(2-3):123-37 (2006).
Ruckle et al., "Single-Dose, Randomized, Double-Blind, Placebo-Controlled Study of ACE-011 (ActRIIA-IgG1) in Postmenopausal Women," J Bone Mineral Res. 24(4):744-752 (2009).
Sako et al., "Characterization of the ligand binding functionality of the extracellular domain of activin receptor Type Iib," J Biol Chem. 285(27):21037-48 (2010).
Sanchez et al., "Evaluation of Electrical Impedance as a Biomarker of Myostatin Inhibition in Wild Type and Muscular Dystrophy Mice," PLoS One. 10(10):e0140521 (2015) (14 pages).
Sherman et al., "Multiple-Dose, Safety, Pharmacokinetic, and Pharmacodynamic Study of Sotatercept (ActRIIA-IgGI), a Novel Erythropoietic Agent, in Healthy Postmenopausal Women," J Clin Pharmacol. 53(11):1121-1130 (2013).
Smith et al., "Long-term Effects of Sotatercept Compared With Placebo for Correction of Anemia in Hemodialysis Subjects: Interim Analysis of ACE-011-REN-001," 52nd ERA-EDTA Congress, May 28-31, London, UK, Poster FP661, retrieved from <http://acceleronpharma.com/wp-content/uploads/2017/03/20150529-ERA-2015_Sotatercept-Hb-Safety-Poster_05.22.15-Final-for-QR-Code-1.pdf>, (2015) (1 page).
Smith et al., "Quantitative Computed Tomography Results for Bone Mass and Abdominal Aortic Vascular Calcification in Hemodialysis Subjects Treated With Escalating Dose Levels of Sotatercept: Interim Analysis of ACE-011-REN-001," 52nd ERA-EDTA Congress, May 28-31, London, UK, Poster SP645, retrieved from <acceleronpharma.com/wp-content/uploads/2017/03/20150530-ERA-2015_Sotatercept-QCT-Poster_05.22.15-Final-for-QR-Code.pdf>, (2015) (1 page).
Stegelmann et al., "Updated Results from the German Mpnsg-0212 Combination Trial: Ruxolitinib Plus Pomalidomide in Myelofibrosis with Anemia," Blood. 134(Supplement_1):672 (5 pages) (Nov. 2019).
Sunada, "Anti-myostatin antibody therapy for myopathies," Clin Neurol. 51:1157-1159 (2011) (3 pages) (English abstract included).
Sunada, "Myostatin Blockade Therapy for Muscular Atrophy," Brain Nerve. 63(11):1271-7 (2011) (Abstract only) (2 pages).
Suragani et al., "Modified activin receptor IIB ligand trap mitigates ineffective erythropoiesis and disease complications in murine beta-thalassemia," Blood. 123(25):3864-3872 (2014).
Suragani et al., "Modified ActRIIB-Fc Fusion Protein (ACE-536) Decreases Irreversible Sickle Cells in a Murine Model of Sickle Cell Disease," EHA, Poster P535, retrieved from <acceleronpharma.com/wp-content/uploads/2017/03/20140614-ACE-536-20140613-Modified-ActRIIB-Fc-Fusion-Protein-Decreases-Irreversible-Sickle-Cells-in-a-Murine-Model-of-1.pdf>, (2014) (1 page).
Suragani et al., "Modified ActRIIB-mFc Fusion Protein (murine ortholog of Luspatercept) Mitigates Sickling and Red Cell Pathology in a Murine Model of Sickle Cell Disease," ASH 56th Annual Meeting, Dec. 6-9, San Francisco, California. Poster 4055 (2014) (1 page).
Suragani et al., "Transforming growth factor-beta superfamily ligand trap ACE-536 corrects anemia by promoting late-stage erythropoiesis," Nat Med. 20(4):408-414 (2014) (10 pages).
Thevis et al., "Emerging drugs affecting skeletal muscle function and mitochondrial biogenesis—Potential implications for sports drug testing programs," Rapid Commun Mass Spectrom. 30(5):635-51 (2016).
Tomillero et al., "Gateways to Clinical Trials," Methods Find Exp Clin Pharmacol. 32(1):47-86 (2010).
Tournier et al., "Calibrated automated thrombography demonstrates hypercoagulability in patients with idiopathic pulmonary arterial hypertension," Thrombosis Res. 126:e418-e422 (2010) (5 pages).
Townson et al., "Specificity and Structure of a High Affinity Activin Receptor-like Kinase 1 (ALK1) Signaling Complex," J Biol Chem. 287(33):27313-27325 (2012).
Vallet et al., "Activin A promotes multiple myeloma-induced osteolysis and is a promising target for myeloma bone disease," Proc Nat Acad Sci. 107(11):5124-9 (2010).
Viprakasit et al., "Evaluating Luspatercept Responders in the Phase 3, Randomized, Double-Blind, Placebo-Controlled BELIEVE Trial of Luspatercept in Adult beta-Thalassemia Patients Who Require Regular Red Blood Cell Transfusions," Blood. 134(Supplement 1):3545 (2019) (1 page).
Wagner et al., "Loss of myostatin attenuates severity of muscular dystrophy in mdx mice," Ann Neurol. 52(6):832-6 (2002).
Wang et al., "A soluble activin receptor Type IIB does not improve blood glucose in streptozotocin- treated mice," Int J Biol Sci. 11(2):199-208 (2015).
Wang et al., "Myostatin inhibition induces muscle fibre hypertrophy prior to satellite cell activation," J Physiol. 590(9):2151-65 (2012).
Wells, "Additivity of mutational effects in proteins," Biochemistry. 29(37):8509-17 (1990).
Wolfman et al., "Activation of latent myostatin by the BMP-1/tolloid family of metalloproteinases," Proc Nat Acad Sci. 100(26):15842-6 (2003).
Wu et al., "Identification and analysis of type II TGF-beta receptors in BMP-9-induced osteogenic differentiation of C3H10T1/2 mesenchymal stem cells," Acta Biochim Biophys Sin (Shanghai). 42(10):699-708 (2010).
Yee et al., "Phase 1 Dose-Escalation Study of Sotatercept (ACE-011) in Combination with Lenalidomide and Dexamethasone in Patients with Relapsed and/or Refractory Multiple Myeloma," Headache. 1:0 (2015) (1 page).
Yndestad et al., "Elevated levels of activin A in clinical and experimental pulmonary hypertension," J Appl Physiol 106(4):1356-1364 (2009) (9 pages).
Yu, "Sotatercept for rebalancing BMP/TGF-beta/activin signaling in PAH," Scientific Sessions Presentation (2018) (12 pages).
Yung et al., "ACTRIIA-Fc rebalances BMP and activin/TGF-beta signaling to attenuate experimental pulmonary hypertension," American Heart Association Scientific Session, Nov. 11-15, Anaheim, CA, retrieved from <acceleronpharma.com/wp-content/uploads/2017/11/Dr.-Yu-Presentation-AHA-17-1.pdf>, (2017) (15 pages).
Yung, "ACTRIIA-Fc Rebalances Activin/GDF and BMP9 Signaling to Attenuate Experimental Pulmonary Hypertension," American Heart Association Scientific Session, Nov. 10-12, Chicago, Illinois, retrieved from <acceleronpharma.com/wp-content/uploads/2018/11/Lai-Ming-AHA-2018-ActRIIa-Fc-v2-final.pdf>, (2018) (14 pages).
Zimmers et al., "Induction of Cachexia in Mice by Systemically Administered Myostatin," Science. 296(5572):1486-8 (2002) (4 pages).
"Results from the Cibotercept Tropos Pah Phase 2 Trial", Keros Therapeutics. May 29, 2025 (14 pages).

(56) References Cited

OTHER PUBLICATIONS

Komrokji et al., "Sotatercept with long-term extension for the treatment of anaemia in patients with lower-risk myelodysplastic syndromes: a phase 2, dose-ranging trial," Lancet Haematol. 5(2):e63-e72 (Epub Jan. 2018) (Feb. 2018).

FIG. 1

METHODS OF USING ACTIVIN RECEPTOR TYPE IIB VARIANTS

SEQUENCE LISTING

The instant application contains a Sequence Listing which has been submitted electronically in XML format and is hereby incorporated by reference in its entirety. Said XML copy, created on Oct. 20, 2022, is named 51184-020006_Sequence_Listing_10_20_22 and is 97,579 bytes in size.

BACKGROUND OF THE INVENTION

Thrombocytopenia is a condition characterized by abnormally low levels of platelets, also called thrombocytes, in the blood, and occurs when the bone marrow makes too few platelets or when too many platelets are destroyed or accumulate within an enlarged spleen. Patients with thrombocytopenia may experience internal or external bleeding, bleeding under the skin, and/or bruising. Treatment for thrombocytopenia depends on its cause and severity and is primarily focused on preventing death or disability caused by bleeding. Certain types of thrombocytopenia (e.g., immune thrombocytopenia) may be treated using corticosteroids, but other types of thrombocytopenia may require splenectomy or platelet transfusion.

Neutropenia is a condition characterized by an abnormally low number of neutrophils in the blood. Neutrophils typically constitute 45% to 75% of all white blood cells in the bloodstream and serve as the primary defense against infections. Reduced numbers of neutrophils can lead to difficulty in controlling infections and increase the risk of dying from an infection. In patients with severe neutropenia, infections can rapidly become severe or fatal. Antibiotics are used treat infection in patients having neutropenia, but treatments for neutropenia itself are limited, and primarily involve the use of growth factors, such as colony stimulating factors, to stimulate the production of white blood cells. Blood transfusions have not proven effective.

Myelofibrosis is an uncommon type of bone marrow cancer that disrupts the normal production of blood cells. It can cause extensive scarring in the bone marrow, leading to severe anemia and a low number of platelets. Symptoms of myelofibrosis include fatigue, bone pain, easy bruising, easy bleeding, and fever. Patients with aggressive or high-risk myelofibrosis may require a blood transfusion or bone marrow transplant. Other treatment options include therapies that have known risks, such as androgen therapy and treatment with thalidomide or related medications. For patients with intermediate-risk myelofibrosis, treatment is typically directed at symptom management.

Myelodysplastic syndromes, or MDS, is a collection of bone marrow disorders characterized by ineffective hematopoiesis, often with a dramatic expansion of progenitor cells that are unable to mature into functioning blood cells. In the United States, there are 60,000 to 170,000 patients with MDS and 15,000 to 20,000 new cases of MDS reported each year. MDS predominantly affects older adults, with approximately 75% of patients aged 60 years or older at diagnosis. Median survival ranges from approximately nine years for very low-risk patients to less than a year for high-risk patients. Anemia is the most frequent consequence of ineffective hematopoiesis in patients with MDS due to low red blood cell production, and impacts 90% of MDS patients. Another consequence is thrombocytopenia. Patients with MDS-associated anemia are generally treated with red blood cell transfusions and erythropoiesis stimulating agents (ESAs), which are not approved for such treatment. MDS-associated thrombocytopenia is treated with platelet transfusions and platelet-stimulating agents.

Osteogenesis imperfecta, also known as brittle bone disease, is a group of genetic disorders that mainly affect the bones. People with this condition have bones that break (fracture) easily, often from mild trauma or with no apparent cause. Multiple fractures are common, and in severe cases, can occur even before birth. Milder cases may involve only a few fractures over a person's lifetime. There are at least 19 recognized forms of osteogenesis imperfecta, designated type I through type XIX, with type I being the least severe and type II the most severe. Mild forms of osteogenesis imperfecta, such as type I, are characterized by bone fractures during childhood and adolescence that often result from minor trauma, such as falling while learning to walk. Fractures occur less frequently in adulthood. More severe types of osteogenesis imperfecta can feature frequent bone fractures that are present at birth and result from little or no trauma, in addition to short stature, curvature of the spine (scoliosis), joint deformities (contractures), hearing loss, respiratory problems, and a disorder of tooth development called dentinogenesis imperfecta. Mobility can be reduced in affected individuals, and some may use a walker or wheelchair. There is no cure for osteogenesis imperfecta, and treatment may include care of broken bones, pain medication, physical therapy, braces or wheelchairs, and surgery.

Neuromuscular diseases are a broadly defined group of disorders that impair the functioning of the muscles and may involve injury or dysfunction of peripheral nerves or muscle. The site of injury can be in the cell bodies (e.g., amyotrophic lateral sclerosis (ALS) or sensory ganglionopathies), axons (e.g., axonal peripheral neuropathies or brachial plexopathies), Schwann cells (e.g., chronic inflammatory demyelinating polyradiculoneuropathy), neuromuscular junction (e.g., myasthenia gravis or Lambert-Eaton myasthenic syndrome), muscle (e.g., inflammatory myopathy or muscular dystrophy), or any combination of these sites. Some neuromuscular diseases are also associated with central nervous system disease, such as ALS, but most are restricted to the peripheral nervous system. Neuromuscular diseases may feature muscle weakness, muscle atrophy, muscle pain, fasciculations, numbness, and/or paresthesia. There is no cure for most neuromuscular diseases, but some can be managed and treated using immunosuppressive drugs. Anticonvulsants and antidepressants may be used to treat pain associated with neuromuscular diseases.

Excess body weight is an increasing problem in large parts of the world, with about 39% of adults aged 18 years and over found to be overweight in 2016 and about 13% of the world's adult population found to be obese. Increased visceral and subcutaneous fact causes dysfunction of various organs. Excessive body weight is a risk factor for an array of complications, including diabetes (e.g., Type 1 and Type 2 diabetes), cardiovascular disease, and several forms of cancer. Insulin resistance is also associated with obesity and results in pancreatic tissues producing an elevated amount of insulin. Once pancreatic β cells can no longer produce sufficient insulin to meet the demand, hyperglycemia occurs and Type 2 diabetes develops. Adipocytes, which are increased in obesity, are believed to play a role in this process. Despite the prevalence of obesity and metabolic diseases few therapeutic options are available.

There exists a need for novel and effective treatments for thrombocytopenia, neutropenia, myelofibrosis, myelodysplastic syndromes, osteogenesis imperfecta, neuromuscular diseases, and metabolic diseases.

SUMMARY OF THE INVENTION

The present invention features polypeptides that include an extracellular activin receptor type IIB (ActRIIB) variant. In some embodiments, a polypeptide of the invention includes an extracellular ActRIIB variant fused to the N- or C-terminus of an Fc domain monomer or another moiety. Such moieties may be attached by amino acid or other covalent bonds and may increase stability of the polypeptide. A polypeptide including an extracellular ActRIIB variant fused to an Fc domain monomer may also form a dimer (e.g., a homodimer or heterodimer) through the interaction between two Fc domain monomers. The polypeptides of the invention may be used to increase lean mass, muscle mass, and/or strength in a subject having or at risk of developing a disease or condition involving weakness or atrophy of muscles, e.g., a neuromuscular disease, cachexia, disuse atrophy, treatment-related muscle loss or atrophy, hypotonia, hypoxia, or muscle loss or atrophy associated with a burn. The polypeptides of the invention may also be used to increase bone mass or bone mineral density in a subject having or at risk of developing osteogenesis imperfecta, neuromuscular disease-related bone loss, burn-induced bone loss, or anorexia-related bone loss. Additionally, the polypeptides of the invention may be used to increase red blood cell levels (e.g., increase hemoglobin levels, increase hematocrit, and/or increase red blood cell count) promote or increase the maturation and/or differentiation of erythroid progenitors, increase late-stage erythroid precursor maturation, or recruit early-stage progenitors into the erythroid lineage in a subject having or at risk of developing myelofibrosis or a myelodysplastic syndrome, to increase platelet levels (e.g., increase platelet count) in a subject in need thereof, e.g., a subject having or at risk of developing thrombocytopenia, or to increase neutrophil levels (e.g., increase neutrophil count) in a subject in need thereof, e.g., a subject having or at risk of developing neutropenia. The polypeptides of the invention may also be used to reduce body weight, reduce body fat, increase glucose clearance, increase insulin sensitivity, or reduce fasting insulin levels in a subject having or at risk of developing a metabolic disease (e.g., obesity, Type 1 diabetes, or Type 2 diabetes). Further, the polypeptides of the invention may also be used to affect myostatin, activin (e.g., activin A and/or activin B), and/or bone morphogenetic protein 9 (BMP9) signaling in a subject having a risk of developing or having a disease or condition described herein.

Exemplary embodiments of the invention are described in the enumerated paragraphs below.

E1. A polypeptide comprising an extracellular activin receptor type IIB (ActRIIB) variant, the variant having one or more amino acid substitutions relative to the sequence of GRGEAETRECIYYNANWELERTNQS-GLERCEGEQDKRLHCYASWRN-SSGTIELVKKGCWLDDF NCYDRQECVATEEN-PQVYFCCCEGNFCNERFTHLPEAGGPEVTYE-PPPTAPT (SEQ ID NO: 17), wherein the variant comprises one or more amino acid substitutions that impart reduced BMP9 binding relative to wild type extracellular ActRIIB and one or more additional amino acid substitutions, wherein the substitutions that reduce BMP9 binding comprise one or more of:
  a) amino acid substitution E75K;
  b) amino acid substitutions Q69T and E70D; or
  c) amino acid substitutions Q69D and E70T, optionally wherein the variant is truncated from the N-terminus by deletion of 1, 2, 3, 4, 5, 6, or 7 amino acids.
E2. The polypeptide of E1, wherein the variant comprises one or more amino acid substitutions selected from the group consisting of I11L, Y12F, L19K, E20D, S25T, L27V, R29P, E31Y, E33D, Q34K, L38R, Y41F, R45K, S47I, S48T, T50S, I51L, L53I, K56Q, F63I, T74K, E76D, N77S, Q79E, and F89M.
E3. The polypeptide of E1 or E2, wherein the variant comprises amino acid substitutions E75K, E20D, and F63I.
E4. The polypeptide of E1 or E2, wherein the variant comprises amino acid substitution E75K.
E5. The polypeptide of E4, wherein the variant comprises amino acid substitutions T74K, E76D, N77S, and Q79E.
E6. The polypeptide of E5, wherein the variant further comprises one or more additional amino acid substitutions.
E7. The polypeptide of E6, wherein the variant comprises amino acid substitutions Y41F, R45K, and K56Q.
E8. The polypeptide of E7, wherein the variant further comprises amino acid substitutions Y12F, L19K, E20D, R29P, E31Y, E33D, L38R, and F63I.
E9. The polypeptide of E6, wherein the variant comprises amino acid substitutions S25T and S47I. E10. The polypeptide of E9, wherein the variant comprises amino acid substitution S48T.
E11. The polypeptide of E6, wherein the variant comprises amino acid substitution R29P.
E12. The polypeptide of E6, wherein the variant comprises amino acid substitutions E31Y, E33D, and Q34K.
E13. The polypeptide of E6, wherein the variant comprises amino acid substitutions Y12F, L19K, and E20D.
E14. The polypeptide of E6, wherein the variant comprises amino acid substitutions E31Y, E33D, and L38R.
E15. The polypeptide of E1 or E2, wherein the variant comprises amino acid substitutions Q69T and E70D.
E16. The polypeptide of any one of E1, E2, and E15, wherein the variant comprises amino acid substitutions Q69T and E70D and additional amino acid substitutions I11L, L27V, Q34K, T50S, I51L, L53I, and F89M.
E17. The polypeptide of E1 or E2, wherein the variant comprises amino acid substitutions Q69D and E70T.
E18. The polypeptide of any one of E1, E2, or E17, wherein the variant comprises amino acid substitutions Q69D and E70T and additional amino acid substitutions I11L, L27V, Q34K, T50S, I51L, L53I, and F89M.
E19. The polypeptide of any one of E15-E18, wherein the variant comprises amino acid substitution E75K.
E20. A polypeptide comprising an ActRIIB variant, the variant having a sequence of GRGEAETRECX$_1$X$_2$YNANWEX$_3$X$_4$RTNQX$_5$ GX$_6$EX$_7$CX$_8$GX$_9$X$_{10}$DKRX$_{11}$HCX$_{12}$ASWX$_{13}$ NX$_{14}$X$_{15}$G X$_{16}$X$_{17}$EX$_{18}$VKX$_{19}$GC WLDDX$_{20}$NCYDRX$_{21}$X$_{22}$CVAX$_{23}$X$_{24}$X$_{25}$X$_{26}$P X$_{27}$VYFCCCEGNX$_{28}$CNERFTHLP EAGGPE-VTYEPPPTAPT (SEQ ID NO: 1), wherein X$_1$ is 1 or L; X$_2$ is F or Y; X$_3$ is L or K; X$_4$ is D or E; X$_5$ is T or S; X$_6$ is L or V; X$_7$ is P or R; X$_8$ is Y or E; X$_9$ is D or E; X$_{10}$ is K or Q; X$_{11}$ is R or L; X$_{12}$ is Y or F; X$_{13}$ is R or K; X$_{14}$ is S or I; X$_{15}$ is S or T; X$_{16}$ is S or T; X$_{17}$ is I or L; X$_{18}$ is I or L; X$_{19}$ is K or Q; X$_{20}$ is F or I; X$_{21}$ is Q, T, or D; X$_{22}$ is E, D, or T; X$_{23}$ is K or T; X$_{24}$ is K or E; X$_{25}$ is D or E; X$_{26}$ is S or N; X$_{27}$ is E or Q; and $X_{28}$ is F or M, and wherein $X_{24}$ is E and/or either $X_{21}$ is T and $X_{22}$ is D or $X_{21}$ is D and $X_{22}$ is T, and wherein the variant has at least one amino acid substitution relative to a wild-type extracellular ActRIIB having the sequence of SEQ ID NO: 17, optionally wherein the variant is truncated from the N-terminus by deletion of 1, 2, 3, 4, 5, 6, or 7 amino acids.

E21. The polypeptide of E20, wherein $X_1$ is I.
E22. The polypeptide of E20, wherein $X_1$ is L.
E23. The polypeptide of any one of E20-E22, wherein $X_2$ is F.
E24. The polypeptide of any one of E20-E22, wherein $X_2$ is Y.
E25. The polypeptide of any one of E20-E24, wherein $X_3$ is L.
E26. The polypeptide of any one of E20-E24, wherein $X_3$ is K.
E27. The polypeptide of any one of E20-E26, wherein $X_4$ is D.
E28. The polypeptide of any one of E20-E26, wherein $X_4$ is E.
E29. The polypeptide of any one of E20-E28, wherein $X_5$ is T.
E30. The polypeptide of any one of E20-E28, wherein $X_5$ is S.
E31. The polypeptide of any one of E20-E30, wherein $X_6$ is L.
E32. The polypeptide of any one of E20-E30, wherein $X_6$ is V.
E33. The polypeptide of any one of E20-E32, wherein $X_7$ is P.
E34. The polypeptide of any one of E20-E32, wherein $X_7$ is R.
E35. The polypeptide of any one of E20-E34, wherein $X_8$ is Y.
E36. The polypeptide of any one of E20-E34, wherein $X_8$ is E.
E37. The polypeptide of any one of E20-E36, wherein $X_9$ is D.
E38. The polypeptide of any one of E20-E36, wherein $X_9$ is E.
E39. The polypeptide of any one of E20-E38, wherein $X_{10}$ is K.
E40. The polypeptide of any one of E20-E38, wherein $X_{10}$ is Q.
E41. The polypeptide of any one of E20-E40, wherein $X_{11}$ is R.
E42. The polypeptide of any one of E20-E40, wherein $X_{11}$ is L.
E43. The polypeptide of any one of E20-E42, wherein $X_{12}$ is Y.
E44. The polypeptide of any one of E20-E42, wherein $X_{12}$ is F.
E45. The polypeptide of any one of E20-E44, wherein $X_{13}$ is R.
E46. The polypeptide of any one of E20-E44, wherein $X_{13}$ is K.
E47. The polypeptide of any one of E20-E46, wherein $X_{14}$ is S.
E48. The polypeptide of any one of E20-E46, wherein $X_{14}$ is I.
E49. The polypeptide of any one of E20-E48, wherein $X_{15}$ is S.
E50. The polypeptide of any one of E20-E48, wherein $X_{15}$ is T.
E51. The polypeptide of any one of E20-E50, wherein $X_{16}$ is S.
E52. The polypeptide of any one of E20-E50, wherein $X_{16}$ is T.
E53. The polypeptide of any one of E20-E52, wherein $X_{17}$ is I.
E54. The polypeptide of any one of E20-E52, wherein $X_{17}$ is L.
E55. The polypeptide of any one of E20-E54, wherein $X_{18}$ is I.
E56. The polypeptide of any one of E20-E54, wherein $X_{18}$ is L.
E57. The polypeptide of any one of E20-E56, wherein $X_{19}$ is K.
E58. The polypeptide of any one of E20-E56, wherein $X_{19}$ is Q.
E59. The polypeptide of any one of E20-E58, wherein $X_{20}$ is F.
E60. The polypeptide of any one of E20-E58, wherein $X_{20}$ is I.
E61. The polypeptide of any one of E20-E60, wherein $X_{21}$ is Q.
E62. The polypeptide of any one of E20-E60, wherein $X_{21}$ is T.
E63. The polypeptide of any one of E20-E60, wherein $X_{21}$ is D.
E64. The polypeptide of any one of E20-E61, wherein $X_{22}$ is E.
E65. The polypeptide of any one of E20-E60 and E62, wherein $X_{22}$ is D.
E66. The polypeptide of any one of E20-E60 and E63, wherein $X_{22}$ is T.
E67. The polypeptide of any one of E20-E66, wherein $X_{23}$ is K.
E68. The polypeptide of any one of E20-E66, wherein $X_{23}$ is T.
E69. The polypeptide of any one of E20-E68, wherein $X_{24}$ is K.
E70. The polypeptide of any one of E20-E60, E62, E63, and E65-E68, wherein $X_{24}$ is E.
E71. The polypeptide of any one of E20-E70, wherein $X_{25}$ is D.
E72. The polypeptide of any one of E20-E70, wherein $X_{25}$ is E.
E73. The polypeptide of any one of E20-E72, wherein $X_{26}$ is S.
E74. The polypeptide of any one of E20-E72, wherein $X_{26}$ is N.
E75. The polypeptide of any one of E20-E74, wherein $X_{27}$ is E.
E76. The polypeptide of any one of E20-E74, wherein $X_{27}$ is Q.
E77. The polypeptide of any one of E20-E76, wherein $X_{28}$ is F.
E78. The polypeptide of any one of E20-E76, wherein $X_{28}$ is M.
E79. The polypeptide of any one of E20-E78, wherein $X_{23}$ is T, $X_{24}$ is K, $X_{25}$ is E, and $X_{26}$ is N.
E80. The polypeptide of any one of E20-E78, wherein $X_{23}$ is T, $X_{24}$ is E, $X_{25}$ is E, and $X_{26}$ is N.
E81. The polypeptide of any one of E20-E78, wherein $X_{23}$ is K, $X_{24}$ is K, $X_{25}$ is D, and $X_{26}$ is S.
E82. The polypeptide of any one of E1-E81, wherein the variant has the sequence of any one of SEQ ID NOs: 2-15.
E83. The polypeptide of E82, wherein the variant has the sequence of SEQ ID NO: 3.
E84. The polypeptide of E82, wherein the variant has the sequence of SEQ ID NO: 9.

E85. The polypeptide of E82, wherein the variant has the sequence of SEQ ID NO: 12.
E86. The polypeptide of E82, wherein the variant has the sequence of SEQ ID NO: 13.
E87. The polypeptide of E82, wherein the variant has the sequence of SEQ ID NO: 14.
E88. The polypeptide of E82, wherein the variant has the sequence of SEQ ID NO: 15.
E89. The polypeptide of any one of E1-E88, wherein the amino acid at position $X_{24}$ is replaced with the amino acid K.
E90. The polypeptide of any one of E1-E88, wherein the amino acid at position $X_{24}$ is replaced with the amino acid E.
E91. The polypeptide of any one of E1-E90, wherein the variant is truncated from the N-terminus by deletion of one amino acid.
E92. The polypeptide of any one of E1-E90, wherein the variant is truncated from the N-terminus by deletion of two amino acids.
E93. The polypeptide of any one of E1-E90, wherein the variant is truncated from the N-terminus by deletion of three amino acids.
E94. The polypeptide of any one of E1-E90, wherein the variant is truncated from the N-terminus by deletion of four amino acids.
E95. The polypeptide of any one of E1-E90, wherein the variant is truncated from the N-terminus by deletion of five amino acids.
E96. The polypeptide of any one of E1-E90, wherein the variant is truncated from the N-terminus by deletion of six amino acids.
E97. The polypeptide of any one of E1-E90, wherein the variant is truncated from the N-terminus by deletion of seven amino acids.
E98. The polypeptide of any one of E1-E97, further comprising an Fc domain monomer fused to the C-terminus of the polypeptide by way of a linker.
E99. The polypeptide of E98, wherein the Fc domain monomer comprises the sequence of SEQ ID NO: 19.
E100. The polypeptide of E98 or E99, wherein the polypeptide forms a dimer.
E101. The polypeptide of any one of E1-E97, further comprising a wild-type Fc domain fused to the C-terminus of the polypeptide by way of a linker.
E102. The polypeptide of E101, wherein the wild-type Fc domain comprises the sequence of SEQ ID NO: 71 or SEQ ID NO: 75.
E103. The polypeptide of E102, wherein the wild-type Fc domain comprises the sequence of SEQ ID NO: 71.
E104. The polypeptide of E102, wherein the wild-type Fc domain comprises the sequence of SEQ ID NO: 75.
E105. The polypeptide of any one of E1-E97, further comprising an Fc domain comprising amino acid substitutions fused to the C-terminus of the polypeptide by way of a linker.
E106. The polypeptide of E105, wherein the Fc domain does not form a dimer.
E107. The polypeptide of any one of E1-E97, further comprising an albumin-binding peptide fused to the C-terminus of the polypeptide by way of a linker.
E108. The polypeptide of E107, wherein the albumin-binding peptide comprises the sequence of SEQ ID NO: 72.
E109. The polypeptide of any one of E1-E97, further comprising a fibronectin domain fused to the C-terminus of the polypeptide by way of a linker.
E110. The polypeptide of E109, wherein the fibronectin domain comprises the sequence of SEQ ID NO: 73.
E111. The polypeptide of any one of E1-E97, further comprising a human serum albumin fused to the C-terminus of the polypeptide by way of a linker.
E112. The polypeptide of E111, wherein the human serum albumin comprises the sequence of SEQ ID NO: 74.
E113. The polypeptide of any one of E98-E112, wherein the linker is an amino acid spacer.
E114. The polypeptide of E113, wherein the amino acid spacer is GGG, GGGA (SEQ ID NO: 20), GGGG (SEQ ID NO: 22), GGGAG (SEQ ID NO: 52), GGGAGG (SEQ ID NO: 53), or GGGAGGG (SEQ ID NO: 54).
E115. The polypeptide of E114, wherein the amino acid spacer is GGG.
E116. The polypeptide of E103 or E115, wherein the polypeptide has the sequence of SEQ ID NO: 76.
E117. The polypeptide of E113, wherein the amino acid spacer is GA, GS, GG, GGA, GGS, GGG, GGGS (SEQ ID NO: 21), GGGGA (SEQ ID NO: 23), GGGGS (SEQ ID NO: 24), GGGGG (SEQ ID NO: 25), GGAG (SEQ ID NO: 26), GGSG (SEQ ID NO: 27), AGGG (SEQ ID NO: 28), SGGG (SEQ ID NO: 29), GAGA (SEQ ID NO: 30), GSGS (SEQ ID NO: 31), GAGAGA (SEQ ID NO: 32), GSGSGS (SEQ ID NO: 33), GAGAGAGA (SEQ ID NO: 34), GSGSGSGS (SEQ ID NO: 35), GAGAGAGAGA (SEQ ID NO: 36), GSGSGSGSGS (SEQ ID NO: 37), GAGAGAGAGAGA (SEQ ID NO: 38), GSGSGSGSGSGS (SEQ ID NO: 39), GGAGGA (SEQ ID NO: 40), GGSGGS (SEQ ID NO: 41), GGAGGAGGA (SEQ ID NO: 42), GGSGGSGGS (SEQ ID NO: 43), GGAGGAGGAGGA (SEQ ID NO: 44), and GGSGGSGGSGGS (SEQ ID NO: 45), GGAGGGAG (SEQ ID NO: 46), GGSGGGSG (SEQ ID NO: 47), GGAGGGAGGGAG (SEQ ID NO: 48), and GGSGGGSGGGSG (SEQ ID NO: 49), GGG-GAGGGGAGGGGA (SEQ ID NO: 50), GGGGSGGGGSGGGGS (SEQ ID NO: 51), AAAL (SEQ ID NO: 55), AAAK (SEQ ID NO: 56), AAAR (SEQ ID NO: 57), EGKSSGSGSESKST (SEQ ID NO: 58), GSAGSAAGSGEF (SEQ ID NO: 59), AEAAAKEAAAKA (SEQ ID NO: 60), KESGSVSSE-QLAQFRSLD (SEQ ID NO: 61), GENLYFQSGG (SEQ ID NO: 62), SACYCELS (SEQ ID NO: 63), RSIAT (SEQ ID NO: 64), RPACKIPNDLKQKVMNH (SEQ ID NO: 65), GGSAGGSGSGSSGGSS-GASGTGTAGGTGSGSGTGSG (SEQ ID NO: 66), AAANSSIDLISVPVDSR (SEQ ID NO: 67), GGSGGGSEGGGSEGGGSEGGGSEGGGSEGG-GSGGGS (SEQ ID NO: 68), EAAAK (SEQ ID NO: 69), or PAPAP (SEQ ID NO: 70).
E118. The polypeptide of any one of E1-E117, wherein the polypeptide has a serum half-life of at least 7 days.
E119. The polypeptide of any one of E1-E118, wherein the polypeptide binds to activin A, activin B, and/or myostatin and has reduced or weak binding to human BMP9.
E120. The polypeptide of E119, wherein the polypeptide does not substantially bind to human BMP9.
E121. The polypeptide of any one of E1-E120, wherein the polypeptide binds to human activin A with a $K_D$ of 800 pM or less.
E122. The polypeptide of any one of E1-E121, wherein the polypeptide binds to human activin B with a $K_D$ of 800 pM or less.

E123. The polypeptide of any one of E1-E122, wherein the polypeptide binds to human GDF-11 with a $K_D$ of 5 pM or higher.

E124. A nucleic acid molecule encoding a polypeptide of any one of E1-E123.

E125. A vector comprising the nucleic acid molecule of E124.

E126. A host cell that expresses a polypeptide of any one of E1-E123, wherein the host cell comprises a nucleic acid molecule of E124 or a vector of E125, wherein the nucleic acid molecule or vector is expressed in the host cell.

E127. A method of preparing a polypeptide of any one of E1-E123, the method comprising:
 a) providing a host cell comprising a nucleic acid molecule of E124 or a vector of E125, and
 b) expressing the nucleic acid molecule or vector in the host cell under conditions that allow for the formation of the polypeptide.

E128. A pharmaceutical composition comprising a polypeptide of any one of E1-E123, a nucleic acid molecule of E124, or a vector of E125, and one or more pharmaceutically acceptable carriers or excipients.

E129. The pharmaceutical composition of E128, wherein the polypeptide is in a therapeutically effective amount.

E130. A method of increasing platelet levels in a subject in need thereof by administering to the subject a therapeutically effective amount of the polypeptide of any one of E1-E123, the nucleic acid molecule of E124, the vector of E125, or the pharmaceutical composition of E128 or E129.

E131. A method of increasing platelet count in a subject in need thereof by administering to the subject a therapeutically effective amount of the polypeptide of any one of E1-E123, the nucleic acid molecule of E124, the vector of E125, or the pharmaceutical composition of E128 or E129.

E132. A method of promoting or increasing platelet production in a subject in need thereof by administering to the subject a therapeutically effective amount of the polypeptide of any one of E1-E123, the nucleic acid molecule of E124, the vector of E125, or the pharmaceutical composition of E128 or E129.

E133. A method of increasing or inducing megakaryocyte differentiation and/or maturation in a subject in need thereof by administering to the subject a therapeutically effective amount of the polypeptide of any one of E1-E123, the nucleic acid molecule of E124, the vector of E125, or the pharmaceutical composition of E128 or E129.

E134. A method of reducing the accumulation of platelet progenitor cells in a subject in need thereof by administering to the subject a therapeutically effective amount of the polypeptide of any one of E1-E123, the nucleic acid molecule of E124, the vector of E125, or the pharmaceutical composition of E128 or E129.

E135. The method of any one of E130-E134, wherein the subject has or is at risk of developing thrombocytopenia.

E136. A method of affecting myostatin, activin A, activin B, and/or BMP9 signaling (e.g., reducing or inhibiting the binding of myostatin, activin A, activin B, and/or BMP9 to their endogenous receptors) in a subject having or at risk of developing a disease or condition involving low platelet levels by administering to the subject a therapeutically effective amount of the polypeptide of any one of E1-E123, the nucleic acid molecule of E124, the vector of E125, or the pharmaceutical composition of E128 or E129.

E137. The method of E136, wherein the disease or condition is thrombocytopenia.

E138. A method of treating a subject having or at risk of developing thrombocytopenia by administering to the subject a therapeutically effective amount of the polypeptide of any one of E1-E123, the nucleic acid molecule of E124, the vector of E125, or the pharmaceutical composition of E128 or E139. A method of promoting platelet production by contacting a megakaryocyte with the polypeptide of any one of E1-E123, the nucleic acid molecule of E124, or the vector of E125 in an amount effective to promote platelet production.

E140. The method of E139, wherein the contacting is in vitro.

E141. A method of treating a subject having or at risk of developing thrombocytopenia by administering to the subject a platelet produced by the method of E139 or E140.

E142. The method of any one of E135, E137, E138, and E141, wherein the thrombocytopenia is or is associated with a bone marrow defect, a myelodysplastic syndrome, bone marrow transplantation, myelofibrosis, myelofibrosis treatment (e.g., treatment with a JAK inhibitor, such as with ruxolitinib or fedratinib), ineffective hematopoiesis, Gaucher disease, aplastic anemia, Fanconi anemia, Diamond Blackfan anemia, Shwachman Diamond syndrome, heavy alcohol consumption, cirrhosis of the liver, cancer (e.g., leukemia or lymphoma), an autoimmune disease, a viral infection, a bacterial infection, an enlarged spleen, a vitamin deficiency, cancer treatment, thrombotic thrombocytopenic purpura, idiopathic thrombocytopenic purpura, disseminated intravascular coagulation, hemolytic uremic syndrome, paroxysmal nocturnal hemoglobinuria, a reduction of platelets caused by medication (medication-induced thrombocytopenia, e.g., thrombocytopenia caused by treatment with heparin, quinine, a sulfa-containing antibiotic, such as vancomycin, rifampin, or trimethoprim, or an anticonvulsant, such as phenytoin), a dilution of platelets caused by a blood transfusion, hematopoietic stem cell transplantation, acquired amegakaryocytic thrombocytopenia, Pearson syndrome, dyskeratosis congenita, or contraindication to transfusion.

E143. The method of any one of E135, E137, E138, E141, and E142, wherein the thrombocytopenia is associated with a myelodysplastic syndrome (e.g., the subject has a myelodysplastic syndrome).

E144. The method of any one of E135, E137, E138, E141, and E142, wherein the thrombocytopenia is associated with myelofibrosis (e.g., the subject has myelofibrosis).

E145. The method of any one of E135, E137, E138, E141, and E142, wherein the thrombocytopenia is associated with a bone marrow defect.

E146. The method of any one of E135, E137, E138, E141, and E142, wherein the thrombocytopenia is associated with bone marrow transplantation.

E147. The method of any one E135, E137, E138, E141, and E142, wherein the thrombocytopenia is associated with cancer.

E148. The method of any one of E135, E137, E138, E141, and E142, wherein the thrombocytopenia is associated with cancer treatment (e.g., chemotherapy or radiation).

E149. The method of any one of E135, E137, E138, E141, and E142, wherein the thrombocytopenia is associated with hematopoietic stem cell transplantation.

E150. The method of any one of E135, E137, E138, E141, and E142, wherein the thrombocytopenia is associated with an autoimmune disease.

E151. The method of any one of E135, E137, E138, E141, and E142, wherein the thrombocytopenia is associated with contraindication to transfusion.

E152. The method of any one of E135, E137, E138, E141, and E142, wherein the thrombocytopenia is associated with myelofibrosis treatment.

E153. The method of any one of E135, E137, E138, E141, and E142, wherein the thrombocytopenia is associated with ineffective hematopoiesis.

E154. The method of any one of E135, E137, E138, and E141, wherein the thrombocytopenia is familial thrombocytopenia.

E155. The method of E154, wherein the familial thrombocytopenia is May-Hegglin anomaly, Sebastian syndrome, Fechtner syndrome, Epstein's syndrome, Wiskott-Aldrich syndrome, congenital amegakaryocytic thrombocytopenia, platelet storage pool deficiency, Hermansky-Pudlak syndrome, Bernard-Soulier syndrome, Von Willebrand Disease Type 2B, ANKRD26-related thrombocytopenia, familial platelet disorder with associated myeloid malignancy (FPD/AML), thrombocytopenia associated with a mutation in Filamin-A, thrombocytopenia absent radius syndrome, or thrombocytopenia associated with a mutation in GATA1.

E156. The method of any one of E135, E137, E138, and E141, wherein the thrombocytopenia is immune thrombocytopenia.

E157. The method of any one of E130-E156, wherein the method increases platelet count, platelet production, and/or megakaryocyte differentiation and/or maturation.

E158. The method of any one of E130-E157, wherein the method reduces the accumulation of platelet progenitor cells.

E159. The method of any one of E130-E158, wherein the method improves blood clotting, reduces bleeding events (e.g., reduces the incidence of bleeding events), and/or reduces bleeding in the skin of the subject.

E160. The method of any one of E130-E139 and E141-159, wherein the subject is identified as having thrombocytopenia prior to administration of the polypeptide of any one of E1-E123, the nucleic acid molecule of E124, the vector of E125, or the pharmaceutical composition of E128 or E129 or the platelets produced by the method of E139 or E140.

E161. The method of any one of E130-E139 and E141-159, wherein the method further comprises identifying the subject as having thrombocytopenia prior to administration of the polypeptide of any one of E1-E123, the nucleic acid molecule of E124, the vector of E125, or the pharmaceutical composition of E128 or E129 or the platelets produced by the method of E139 or E140.

E162. The method of any one of E130-E139 and E141-161, wherein the method further comprises evaluating platelet levels after administration of the polypeptide of any one of E1-E123, the nucleic acid molecule of E124, the vector of E125, or the pharmaceutical composition of E128 or E129 or the platelets produced by the method of E139 or E140.

E163. A method of increasing neutrophil levels in a subject in need thereof by administering to the subject a therapeutically effective amount of the polypeptide of any one of E1-E123, the nucleic acid molecule of E124, the vector of E125, or the pharmaceutical composition of E128 or E129.

E164. A method of increasing neutrophil count in a subject in need thereof by administering to the subject a therapeutically effective amount of the polypeptide of any one of E1-E123, the nucleic acid molecule of E124, the vector of E125, or the pharmaceutical composition of E128 or E129.

E165. A method of promoting or increasing neutrophil production in a subject in need thereof by administering to the subject a therapeutically effective amount of the polypeptide of any one of E1-E123, the nucleic acid molecule of E124, the vector of E125, or the pharmaceutical composition of E128 or E129.

E166. A method of promoting or increasing the differentiation and/or maturation of progenitor cells (e.g., myeloid progenitors, myeloblasts, and/or myelocytes) into neutrophils in a subject in need thereof by administering to the subject a therapeutically effective amount of the polypeptide of any one of E1-E123, the nucleic acid molecule of E124, the vector of E125, or the pharmaceutical composition of E128 or E129.

E167. The method of any one of E163-E166, wherein the subject has or is at risk of developing neutropenia.

E168. A method of affecting myostatin, activin A, activin B, and/or BMP9 signaling (e.g., reducing or inhibiting the binding of myostatin, activin A, activin B, and/or BMP9 to their endogenous receptors) in a subject having or at risk of developing a disease or condition involving low neutrophil levels by administering to the subject a therapeutically effective amount of the polypeptide of any one of E1-E123, the nucleic acid molecule of E124, the vector of E125, or the pharmaceutical composition of E128 or E129.

E169. The method of E168, wherein the disease or condition is neutropenia.

E170. A method of treating a subject having or at risk of developing neutropenia by administering to the subject a therapeutically effective amount of the polypeptide of any one of E1-E123, the nucleic acid molecule of E124, the vector of E125, or the pharmaceutical composition of E128 or E129.

E171. The method of any one of E167, E169, and E170, wherein the neutropenia is associated with a bone marrow defect, a myelodysplastic syndrome, bone marrow transplantation, myelofibrosis, ineffective hematopoiesis, aplastic anemia, Fanconi anemia, Diamond Blackfan anemia, Shwachman Diamond syndrome, paroxysmal nocturnal hemoglobinuria, cancer (e.g., leukemia), a vitamin deficiency, an enlarged spleen, an autoimmune disease, a viral infection, a bacterial infection, cancer treatment, a reduction in neutrophils caused by medication (e.g., medication used to treat overactive thyroid, such as methimazole and propylthiouracil; an antibiotic, such as vancomycin, penicillin G, trimethoprim, and oxacillin; an antiviral drug, such as ganciclovir and valganciclovir; an anti-inflammatory medication for ulcerative colitis or rheumatoid arthritis, such as sulfasalazine; a drug used to treat irregular heart rhythms, such as quinidine and procainamide; an anticonvulsant, such as phenytoin and valproate; an antipsychotic, such as clozapine; or levamisole), inflammation, hematopoietic stem cell transplantation, Pearson syndrome, dyskeratosis congenita, or contraindication to transfusion.

E172. The method of any one of E167 and E169-E171, wherein the neutropenia is associated with a myelodysplastic syndrome (e.g., the subject has a myelodysplastic syndrome).

E173. The method of any one of E167 and E169-E171, wherein the neutropenia is associated with myelofibrosis (e.g., the subject has myelofibrosis).

E174. The method of any one of E167 and E169-E171, wherein the neutropenia is associated with a bone marrow defect.

E175. The method of any one of E167 and E169-E171, wherein the neutropenia is associated with bone marrow transplantation.

E176. The method of any one of E167 and E169-E171, wherein the neutropenia is associated with cancer.

E177. The method of any one of E167 and E169-E171, wherein the neutropenia is associated with cancer treatment (e.g., chemotherapy or radiation).

E178. The method of any one of E167 and E169-E171, wherein the neutropenia is associated with hematopoietic stem cell transplantation.

E179. The method of any one of E167 and E169-E171, wherein the neutropenia is associated with inflammation.

E180. The method of any one of E167 and E169-E171, wherein the neutropenia is associated with contraindication to transfusion.

E181. The method of any one of E167 and E169-E171, wherein the neutropenia is associated with ineffective hematopoiesis.

E182. The method of any one of E167, E169, and E170, wherein the neutropenia is chronic idiopathic neutropenia.

E183. The method of any one of E167, E169, and E170, wherein the neutropenia is familial neutropenia.

E184. The method of E183, wherein the familial neutropenia is cyclic neutropenia, chronic benign neutropenia, or severe congenital neutropenia (SCN) (e.g., neutropenia associated with a mutation in the gene ELANE (associated with SCN1), HAX1 (associated with SCN3), G6PC3 (associated with SCN4), GFI1 (associated with SCN2), CSF3R, WAS (associated with X-linked neutropenia/X-linked SCN), CXCR4, VPS45A (associated with SCN5), or JAGN1).

E185. The method of any one of E163-E184, wherein the method increases neutrophil count, neutrophil production, and/or the differentiation and/or maturation of progenitor cells into neutrophils.

E186. The method of any one of E163-E185, wherein the method reduces the subject's susceptibility to infection.

E187. The method of any one of E163-E186, wherein the subject is identified as having neutropenia prior to administration of the polypeptide of any one of E1-E123, the nucleic acid molecule of E124, the vector of E125, or the pharmaceutical composition of E128 or E129.

E188. The method of any one of E163-E186, wherein the method further comprises identifying the subject as having neutropenia prior to administration of the polypeptide of any one of E1-E123, the nucleic acid molecule of E124, the vector of E125, or the pharmaceutical composition of E128 or E129.

E189. The method of any one of E163-E186, wherein the method further comprises evaluating neutrophil levels after administration of the polypeptide of any one of E1-E123, the nucleic acid molecule of E124, the vector of E125, or the pharmaceutical composition of E128 or E129.

E190. A method of increasing red blood cell levels (e.g., increasing hemoglobin levels, red blood cell count, or hematocrit) in a subject having or at risk of developing myelofibrosis, a myelodysplastic syndrome, ineffective hematopoiesis, anemia associated with myelofibrosis treatment, Pearson syndrome, dyskeratosis congenita, congenital dyserythropoietic anemia, or congenital sideroblastic anemia by administering to the subject a therapeutically effective amount of the polypeptide of any one of E1-E123, the nucleic acid molecule of E124, the vector of E125, or the pharmaceutical composition of E128 or E129.

E191. A method of increasing red blood cell count in a subject having or at risk of developing myelofibrosis, a myelodysplastic syndrome, ineffective hematopoiesis, anemia associated with myelofibrosis treatment, Pearson syndrome, dyskeratosis congenita, congenital dyserythropoietic anemia, or congenital sideroblastic anemia by administering to the subject a therapeutically effective amount of the polypeptide of any one of E1-E123, the nucleic acid molecule of E124, the vector of E125, or the pharmaceutical composition of E128 or E129.

E192. A method of increasing hemoglobin levels in a subject having or at risk of developing myelofibrosis, a myelodysplastic syndrome, ineffective hematopoiesis, anemia associated with myelofibrosis treatment, Pearson syndrome, dyskeratosis congenita, congenital dyserythropoietic anemia, or congenital sideroblastic anemia by administering to the subject a therapeutically effective amount of the polypeptide of any one of E1-E123, the nucleic acid molecule of E124, the vector of E125, or the pharmaceutical composition of E128 or E129.

E193. A method of increasing hematocrit in a subject having or at risk of developing myelofibrosis, a myelodysplastic syndrome, ineffective hematopoiesis, anemia associated with myelofibrosis treatment, Pearson syndrome, dyskeratosis congenita, congenital dyserythropoietic anemia, or congenital sideroblastic anemia by administering to the subject a therapeutically effective amount of the polypeptide of any one of E1-E123, the nucleic acid molecule of E124, the vector of E125, or the pharmaceutical composition of E128 or E129.

E194. A method of promoting or increasing red blood cell production in a subject having or at risk of developing myelofibrosis, a myelodysplastic syndrome, ineffective hematopoiesis, anemia associated with myelofibrosis treatment, Pearson syndrome, dyskeratosis congenita, congenital dyserythropoietic anemia, or congenital sideroblastic anemia by administering to the subject a therapeutically effective amount of the polypeptide of any one of E1-E123, the nucleic acid molecule of E124, the vector of E125, or the pharmaceutical composition of E128 or E129.

E195. A method of affecting myostatin, activin A, activin B, and/or BMP9 signaling (e.g., reducing or inhibiting the binding of myostatin, activin A, activin B, and/or BMP9 to their endogenous receptors) in a subject having or at risk of developing myelofibrosis, a myelodysplastic syndrome, ineffective hematopoiesis, anemia associated with myelofibrosis treatment, Pearson syndrome, dyskeratosis congenita, congenital dyserythropoietic anemia, or congenital sideroblastic anemia by administering to the subject a therapeutically effective amount of the polypeptide of any one of E1-E123, the nucleic acid molecule of E124, the vector of E125, or the pharmaceutical composition of E128 or E129.

E196. A method of promoting or increasing the maturation and/or differentiation of erythroid progenitors (e.g., early-stage or late- (e.g., terminal) stage erythroid progenitors, e.g., maturation and/or differentiation of early-stage erythroid progenitors, such as colony forming unit-erythroid cells (CFU-Es) and burst forming unit-erythroid cells (BFU-Es), into proerythroblasts, reticulocytes, or red blood cells) in a subject having or at risk of developing myelofibrosis, a myelodysplastic syndrome, ineffective hematopoiesis, anemia associated with myelofibrosis treatment, Pearson syndrome, dyskeratosis congenita, congenital dyserythropoietic anemia, or congenital sideroblastic anemia by administering to the subject a therapeutically effective amount of the polypeptide of any one of E1-E123, the nucleic acid molecule of E124, the vector of E125, or the pharmaceutical composition of E128 or E129.

E197. A method of promoting or increasing proerythroblasts (e.g., proerythroblast numbers or proerythroblast count) in a subject having or at risk of developing myelofibrosis, a myelodysplastic syndrome, ineffective hematopoiesis, anemia associated with myelofibrosis treatment, Pearson syndrome, dyskeratosis congenita, congenital dyserythropoietic anemia, or congenital sideroblastic anemia by administering to the subject a therapeutically effective amount of the polypeptide of any one of E1-E123, the nucleic acid molecule of E124, the vector of E125, or the pharmaceutical composition of E128 or E129.

E198. A method of promoting or increasing reticulocytes (e.g., reticulocyte numbers or reticulocyte count) in a subject having or at risk of developing myelofibrosis, a myelodysplastic syndrome, ineffective hematopoiesis, anemia associated with myelofibrosis treatment, Pearson syndrome, dyskeratosis congenita, congenital dyserythropoietic anemia, or congenital sideroblastic anemia by administering to the subject a therapeutically effective amount of the polypeptide of any one of E1-E123, the nucleic acid molecule of E124, the vector of E125, or the pharmaceutical composition of E128 or E129.

E199. A method of promoting the recruitment of early-stage progenitors into the erythroid lineage in a subject having or at risk of developing myelofibrosis, a myelodysplastic syndrome, ineffective hematopoiesis, anemia associated with myelofibrosis treatment, Pearson syndrome, dyskeratosis congenita, congenital dyserythropoietic anemia, or congenital sideroblastic anemia by administering to the subject a therapeutically effective amount of the polypeptide of any one of E1-E123, the nucleic acid molecule of E124, the vector of E125, or the pharmaceutical composition of E128 or E129.

E200. A method of promoting or increasing late-stage erythroid precursor maturation (e.g., terminal maturation, such as the maturation of reticulocytes into red blood cells or the maturation of erythroblasts into reticulocytes and/or red blood cells) in a subject having or at risk of developing myelofibrosis, a myelodysplastic syndrome, ineffective hematopoiesis, anemia associated with myelofibrosis treatment, Pearson syndrome, dyskeratosis congenita, congenital dyserythropoietic anemia, or congenital sideroblastic anemia by administering to the subject a therapeutically effective amount of the polypeptide of any one of E1-E123, the nucleic acid molecule of E124, the vector of E125, or the pharmaceutical composition of E128 or E129.

E201. A method of reducing the accumulation of red blood cell progenitor cells in a subject having or at risk of developing myelofibrosis, a myelodysplastic syndrome, ineffective hematopoiesis, anemia associated with myelofibrosis treatment, Pearson syndrome, dyskeratosis congenita, congenital dyserythropoietic anemia, or congenital sideroblastic anemia by administering to the subject a therapeutically effective amount of the polypeptide of any one of E1-E123, the nucleic acid molecule of E124, the vector of E125, or the pharmaceutical composition of E128 or E129.

E202. A method of increasing the number of early-stage erythroid precursors and/or progenitors (e.g., expanding the early-stage precursor and/or progenitor populations) in a subject having or at risk of developing myelofibrosis, a myelodysplastic syndrome, ineffective hematopoiesis, anemia associated with myelofibrosis treatment, Pearson syndrome, dyskeratosis congenita, congenital dyserythropoietic anemia, or congenital sideroblastic anemia by administering to the subject a therapeutically effective amount of the polypeptide of any one of E1-E123, the nucleic acid molecule of E124, the vector of E125, or the pharmaceutical composition of E128 or E129.

E203. A method of promoting the progression of erythroid precursors and/or progenitors through erythropoiesis in a subject having or at risk of developing myelofibrosis, a myelodysplastic syndrome, ineffective hematopoiesis, anemia associated with myelofibrosis treatment, Pearson syndrome, dyskeratosis congenita, congenital dyserythropoietic anemia, or congenital sideroblastic anemia by administering to the subject a therapeutically effective amount of the polypeptide of any one of E1-E123, the nucleic acid molecule of E124, the vector of E125, or the pharmaceutical composition of E128 or E129.

E204. A method of treating anemia in a subject having myelofibrosis, a myelodysplastic syndrome, ineffective hematopoiesis, anemia associated with myelofibrosis treatment, Pearson syndrome, dyskeratosis congenita, congenital dyserythropoietic anemia, or congenital sideroblastic anemia by administering to the subject a therapeutically effective amount of the polypeptide of any one of E1-E123, the nucleic acid molecule of E124, the vector of E125, or the pharmaceutical composition of E128 or E129.

E205. The method of any one of E190-E204, wherein the subject has or is at risk of developing a myelodysplastic syndrome (e.g., anemia associated with a myelodysplastic syndrome).

E206. The method of any one of E190-E204, wherein the subject has or is at risk of developing myelofibrosis (e.g., anemia associated with myelofibrosis).

E207. The method of any one of E190-E204, wherein the subject has or is at risk of developing anemia associated with myelofibrosis treatment.

E208. The method of any one of E142, E152, E190-E204 and E207, wherein the myelofibrosis treatment is treatment with a JAK inhibitor (e.g., ruxolitinib or fedratinib).

E209. The method of any one of E190-E204, wherein the subject has or is at risk of developing Pearson syndrome.

E210. The method of any one of E190-E204, wherein the subject has or is at risk of developing dyskeratosis congenita.

E211. The method of any one of E190-E204, wherein the subject has or is at risk of developing congenital dyserythropoietic anemia.

E212. The method of any one of E190-E204, wherein the subject has or is at risk of developing congenital sideroblastic anemia.

E213. The method of E212, wherein the congenital sideroblastic anemia is associated with a mutation in ALAS2, SLC25A38, FECH, GLRXS, HSPA9, HSCB, SLC25A38, or ABCB7.

E214. The method of E212, wherein the congenital sideroblastic anemia is associated with a mutation in PUS1, YARS2, LARS2, TRNT1, MT-ATP6, NDUFB11, or SLC19A2, or with an mtDNA mutation.

E215. The method of any one of E190-E214, wherein the subject has or is at risk of developing ineffective hematopoiesis (e.g., ineffective erythropoiesis).

E216. The method of any one of E190-E215, wherein the method increases red blood cell production, red blood cell count, hematocrit, hemoglobin levels, erythrocyte progenitor differentiation and/or maturation (e.g., of early and/or terminal stage erythroid progenitors), late-stage erythroid precursor maturation, recruitment of early-stage progenitors into the erythroid lineage, pro-erythroblast numbers, early-stage erythroid precursor and/or progenitor numbers (e.g., increases the early-stage precursor and/or progenitor population), the progression of erythroid precursors and/or progenitors through erythropoiesis, and/or reticulocyte numbers.

E217. The method of any one of E190-E216, wherein the method reduces the accumulation of red blood cell progenitor cells.

E218. A method of treating a subject having or at risk of developing a myelodysplastic syndrome by administering to the subject a therapeutically effective amount of the polypeptide of any one of E1-E123, the nucleic acid molecule of E124, the vector of E125, or the pharmaceutical composition of E128 or E129.

E219. A method of increasing platelet count, increasing platelet production, increasing or inducing megakaryocyte differentiation and/or maturation, reducing the accumulation of platelet progenitor cells, increasing neutrophil count, increasing neutrophil production, increasing or inducing the differentiation and/or maturation of progenitor cells into neutrophils, improving blood clotting, reducing bleeding events, reducing bleeding in the skin, and/or reducing susceptibility to infection in a subject having or at risk of developing a myelodysplastic syndrome by administering to the subject a therapeutically effective amount of the polypeptide of any one of E1-E123, the nucleic acid molecule of E124, the vector of E125, or the pharmaceutical composition of E128 or E129.

E220. The method of any one of E142, E143, E171, E172, E190-E205, E218, and E219, wherein the myelodysplastic syndrome is myelodysplastic syndrome with unilineage dysplasia (MDS-SLD), myelodysplastic syndrome with multilineage dysplasia (MDS-MLD), myelodysplastic syndrome with ring sideroblasts (MDS-RS, which includes single lineage dysplasia (MDS-RS-SLD) and multilineage dysplasia (MDS-RS-MLD)), myelodysplastic syndrome associated with isolated del chromosome abnormality (myelodysplastic syndrome with isolated del(5q)), myelodysplastic syndrome with excess blasts (e.g., myelodysplastic syndrome with excess blasts—type 1 (MDS-EB-1) or myelodysplastic syndrome with excess blasts—type 2 (MDS-EB-2)), myelodysplastic syndrome, unclassifiable (MDS-U), or myelodysplastic syndrome/myeloproliferative neoplasm with ring sideroblasts and thrombocytosis (MDS/MPN-RS-T).

E221. The method of any one of E142, E143, E171, E172, E190-E205, and E218-E220, wherein the myelodysplastic syndrome is MDS-SLD.

E222. The method of any one of E142, E143, E171, E172, E190-E205, and E218-E220, wherein the myelodysplastic syndrome is MDS-MLD.

E223. The method of any one of E142, E143, E171, E172, E190-E205, and E218-E220, wherein the myelodysplastic syndrome is MDS-RS-SLD.

E224. The method of any one of E142, E143, E171, E172, E190-E205, and E218-E220, wherein the myelodysplastic syndrome is MDS-RS-MLD.

E225. The method of any one of E142, E143, E171, E172, E190-E205, and E218-E220, wherein the myelodysplastic syndrome is myelodysplastic syndrome with isolated del(5q).

E226. The method of any one of E142, E143, E171, E172, E190-E205, and E218-E220, wherein the myelodysplastic syndrome is MDS-EB-1.

E227. The method of any one of E142, E143, E171, E172, E190-E205, and E218-E220, wherein the myelodysplastic syndrome is MDS-EB-2.

E228. The method of any one of E142, E143, E171, E172, E190-E205, and E218-E220, wherein the myelodysplastic syndrome is MDS-U.

E229. The method of any one of E142, E143, E171, E172, E190-E205, and E218-E220, wherein the myelodysplastic syndrome is MDS/MPN-RS-T.

E230. The method of any one of E142, E143, E171, E172, E190-E205, and E218-E229, wherein the myelodysplastic syndrome is a ring sideroblast positive myelodysplastic syndrome (RS positive MDS, e.g., the subject has ring sideroblasts).

E231. The method of E230, wherein the RS-positive myelodysplastic syndrome is associated with a splicing factor mutation.

E232. The method of E231, wherein the splicing factor mutation is a mutation in Splicing Factor 3b Subunit 1 (SF3B1).

E233. The method of any one of E142, E143, E171, E172, E190-E205, E218-E222 and E225-E229, wherein the myelodysplastic syndrome is a non-ring sideroblast myelodysplastic syndrome (non-RS, e.g., the subject lacks ring sideroblasts).

E234. The method of any one of E142, E143, E171, E172, E190-E205, and E218-E233, wherein the myelodysplastic syndrome is a very low, low, or intermediate risk myelodysplastic syndrome (e.g., as determined by the Revised International Prognostic Scoring System).

E235. The method of E234, wherein the myelodysplastic syndrome is a very low risk myelodysplastic syndrome (e.g., as determined by the Revised International Prognostic Scoring System).

E236. The method of E234, wherein the myelodysplastic syndrome is a low risk myelodysplastic syndrome (e.g., as determined by the Revised International Prognostic Scoring System).

E237. The method of E234, wherein the myelodysplastic syndrome is an intermediate risk myelodysplastic syndrome (e.g., as determined by the Revised International Prognostic Scoring System).

E238. The method of any one of E142, E143, E171, E172, E190-E205, and E218-E237, wherein the myelodysplastic syndrome is associated with a defect in terminal maturation.

E239. The method of any one of E142, E143, E171, E172, E190-E205, and E218-E237, wherein the myelodysplastic syndrome is associated with a defect in early-stage hematopoiesis (e.g., commitment or differentiation of progenitor cells).

E240. The method of any one of E142, E143, E171, E172, E190-E205, and E218-E237, wherein the myelodysplastic syndrome is associated with elevated endogenous erythropoietin levels.

E241. The method of any one of E142, E143, E171, E172, E190-E205, and E218-E240, wherein the myelodysplastic syndrome is associated with hypocellular bone marrow (e.g., the subject has hypocellular bone marrow).

E242. A method of treating a subject having or at risk of developing myelofibrosis by administering to the subject a therapeutically effective amount of the polypeptide of any one of E1-E123, the nucleic acid molecule of E124, the vector of E125, or the pharmaceutical composition of E128 or E243. A method of increasing platelet count, increasing platelet production, increasing or inducing megakaryocyte differentiation and/or maturation, reducing the accumulation of platelet progenitor cells, increasing neutrophil count, increasing neutrophil production, increasing or inducing the differentiation and/or maturation of progenitor cells into neutrophils, improving blood clotting, reducing bleeding events, reducing bleeding in the skin, and/or reducing susceptibility to infection in a subject having or at risk of developing myelofibrosis by administering to the subject a therapeutically effective amount of the polypeptide of any one of E1-E123, the nucleic acid molecule of E124, the vector of E125, or the pharmaceutical composition of E128 or E129.

E244. The method of any one of E130-E243, wherein the subject does not respond well to treatment with erythropoietin (EPO), is susceptible to the adverse effects of EPO, or does not respond well to treatment with an erythroid maturation agent.

E245. The method of any one of E130-E244, wherein the subject has previously been treated with an erythropoiesis stimulating agent (ESA).

E246. The method of any one of E130-E244, wherein the subject has not previously been treated with an erythropoiesis stimulating agent (ESA).

E247. The method of any one of E130-E246, wherein the subject has a low transfusion burden. E248. The method of E247, wherein the subject has received 1-3 units of RBCs (1-3 RBC transfusions) within eight weeks prior to starting treatment with the polypeptide of any one of E1-E123, the nucleic acid molecule of E124, the vector of E125, or the pharmaceutical composition of E128 or E129.

E249. The method of E247, wherein the subject has received 0 units of RBCs (0 RBC transfusions) within eight weeks prior to starting treatment with the polypeptide of any one of E1-E123, the nucleic acid molecule of E124, the vector of E125, or the pharmaceutical composition of E128 or E129.

E250. The method of any one of E130-E246, wherein the subject has a high transfusion burden.

E251. The method of any one of E190-E250, wherein the method reduces the subject's need for a blood transfusion (e.g., reduces transfusion burden).

E252. A method of increasing lean mass in a subject having or at risk of developing a neuromuscular disease, cachexia, disuse atrophy, treatment-related muscle loss or atrophy, hypotonia, muscle loss or atrophy associated with hypoxia, or muscle loss or atrophy associated with a burn injury by administering to the subject a therapeutically effective amount of the polypeptide of any one of E1-E123, the nucleic acid molecule of E124, the vector of E125, or the pharmaceutical composition of E128 or E129.

E253. A method of increasing muscle mass in a subject having or at risk of developing a neuromuscular disease, cachexia, disuse atrophy, treatment-related muscle loss or atrophy, hypotonia, muscle loss or atrophy associated with hypoxia, or muscle loss or atrophy associated with a burn injury by administering to the subject a therapeutically effective amount of the polypeptide of any one of E1-E123, the nucleic acid molecule of E124, the vector of E125, or the pharmaceutical composition of E128 or E129.

E254. A method of affecting myostatin, activin A, activin B, and/or BMP9 signaling (e.g., reducing or inhibiting the binding of myostatin, activin A, activin B, and/or BMP9 to their endogenous receptors) in a subject having or at risk of developing a neuromuscular disease, cachexia, disuse atrophy, treatment-related muscle loss or atrophy, hypotonia, muscle loss or atrophy associated with hypoxia, or muscle loss or atrophy associated with a burn injury by administering to the subject a therapeutically effective amount of the polypeptide of any one of E1-E123, the nucleic acid molecule of E124, the vector of E125, or the pharmaceutical composition of E128 or E129.

E255. The method of any one of E252-E254, wherein the subject has or is at risk of developing a neuromuscular disease.

E256. A method of treating a subject having or at risk of developing a neuromuscular disease by administering to the subject a therapeutically effective amount of the polypeptide of any one of E1-E123, the nucleic acid molecule of E124, the vector of E125, or the pharmaceutical composition of E128 or E129.

E257. The method of any one of E252-E254, wherein the subject has or is at risk of developing disuse atrophy.

E258. A method of treating a subject having or at risk of developing disuse atrophy by administering to the subject a therapeutically effective amount of the polypeptide of any one of E1-E123, the nucleic acid molecule of E124, the vector of E125, or the pharmaceutical composition of E128 or E129.

E259. The method of any one of E252-E254, wherein the subject has or is at risk of developing treatment-related muscle loss or atrophy.

E260. A method of treating a subject having or at risk of developing treatment-related muscle loss or atrophy by administering to the subject a therapeutically effective amount of the polypeptide of any one of E1-E123, the nucleic acid molecule of E124, the vector of E125, or the pharmaceutical composition of E128 or E129.

E261. The method of any one of E252-E254, E259, and E260, wherein the treatment is glucocorticoid treatment, FGF-21 treatment, GLP-1 treatment, bariatric surgery (e.g., gastric bypass), cancer therapy, or treatment for obesity or Type 2 diabetes.

E262. The method of any one of E252-E254, wherein the subject has or is at risk of developing hypotonia.

E263. A method of treating a subject having or at risk of developing hypotonia by administering to the subject a therapeutically effective amount of the polypeptide of any one of E1-E123, the nucleic acid molecule of E124, the vector of E125, or the pharmaceutical composition of E128 or E129.

E264. The method of any one of E252-E254, wherein the subject has or is at risk of developing muscle loss or atrophy associated with hypoxia.

E265. A method of treating a subject having or at risk of developing muscle loss or atrophy associated with hypoxia by administering to the subject a therapeutically effective amount of the polypeptide of any one of E1-E123, the nucleic acid molecule of E124, the vector of E125, or the pharmaceutical composition of E128 or E129.

E266. The method of any one of E252-E254, wherein the subject has or is at risk of developing muscle loss or atrophy associated with a burn injury.

E267. A method of treating a subject having or at risk of developing muscle loss or atrophy associated with a burn injury by administering to the subject a therapeutically effective amount of the polypeptide of any one of E1-E123, the nucleic acid molecule of E124, the vector of E125, or the pharmaceutical composition of E128 or E129.

E268. The method of any one of E252-E254, wherein the subject has or is at risk of developing cachexia.

E269. The method of any one of E252-E254 and E268, wherein the cachexia is HIV-related cachexia, cardiac cachexia, cachexia associated with chronic kidney disease, or pulmonary cachexia.

E270. A method of treating a subject having or at risk of developing HIV-related cachexia, cardiac cachexia, cachexia associated with chronic kidney disease, or pulmonary cachexia by administering to the subject a therapeutically effective amount of the polypeptide of any one of E1-E123, the nucleic acid molecule of E124, the vector of E125, or the pharmaceutical composition of E128 or E129.

E271. The method of any one of E252-E270, wherein the method increases lean mass and/or muscle mass.

E272. A method of increasing bone mineral density in a subject having or at risk of developing osteogenesis imperfecta, neuromuscular disease-related bone loss, burn-induced bone loss, anorexia-related bone loss, bone loss associated with bariatric surgery (e.g., gastric bypass), or bone loss associated with androgen or estrogen deprivation therapy by administering to the subject a therapeutically effective amount of the polypeptide of any one of E1-E123, the nucleic acid molecule of E124, the vector of E125, or the pharmaceutical composition of E128 or E129.

E273. A method of reducing bone resorption in a subject having or at risk of developing osteogenesis imperfecta, neuromuscular disease-related bone loss, burn-induced bone loss, anorexia-related bone loss, bone loss associated with bariatric surgery, or bone loss associated with androgen or estrogen deprivation therapy by administering to the subject a therapeutically effective amount of the polypeptide of any one of E1-E123, the nucleic acid molecule of E124, the vector of E125, or the pharmaceutical composition of E128 or E129.

E274. A method of increasing bone formation in a subject having or at risk of developing osteogenesis imperfecta, neuromuscular disease-related bone loss, burn-induced bone loss, anorexia-related bone loss, bone loss associated with bariatric surgery, or bone loss associated with androgen or estrogen deprivation therapy by administering to the subject a therapeutically effective amount of the polypeptide of any one of E1-E123, the nucleic acid molecule of E124, the vector of E125, or the pharmaceutical composition of E128 or E129.

E275. A method of increasing bone strength in a subject having or at risk of developing osteogenesis imperfecta, neuromuscular disease-related bone loss, burn-induced bone loss, anorexia-related bone loss, bone loss associated with bariatric surgery, or bone loss associated with androgen or estrogen deprivation therapy by administering to the subject a therapeutically effective amount of the polypeptide of any one of E1-E123, the nucleic acid molecule of E124, the vector of E125, or the pharmaceutical composition of E128 or E129.

E276. A method of reducing the risk or occurrence of bone fracture in a subject having or at risk of developing osteogenesis imperfecta, neuromuscular disease-related bone loss, burn-induced bone loss, anorexia-related bone loss, bone loss associated with bariatric surgery, or bone loss associated with androgen or estrogen deprivation therapy by administering to the subject a therapeutically effective amount of the polypeptide of any one of E1-E123, the nucleic acid molecule of E124, the vector of E125, or the pharmaceutical composition of E128 or E129.

E277. A method of affecting myostatin, activin A, activin B, and/or BMP9 signaling (e.g., reducing or inhibiting the binding of myostatin, activin A, activin B, and/or BMP9 to their endogenous receptors) in a subject having or at risk of developing osteogenesis imperfecta, neuromuscular disease-related bone loss, burn-induced bone loss, anorexia-related bone loss, bone loss associated with bariatric surgery, or bone loss associated with androgen or estrogen deprivation therapy by administering to the subject a therapeutically effective amount of the polypeptide of any one of E1-E123, the nucleic acid molecule of E124, the vector of E125, or the pharmaceutical composition of E128 or E129.

E278. The method of any one of E272-E277, wherein the subject has or is at risk of developing osteogenesis imperfecta.

E279. A method of treating a subject having or at risk of developing osteogenesis imperfecta by administering to the subject a therapeutically effective amount of the polypeptide of any one of E1-E123, the nucleic acid molecule of E124, the vector of E125, or the pharmaceutical composition of E128 or E129.

E280. The method of any one of E272-E277, wherein the subject has or is at risk of developing bone loss associated with bariatric surgery.

E281. A method of treating a subject having or at risk of developing bone loss associated with bariatric surgery by administering to the subject a therapeutically effective amount of the polypeptide of any one of E1-E123, the nucleic acid molecule of E124, the vector of E125, or the pharmaceutical composition of E128 or E129.

E282. The method of any one of E272-E277, wherein the subject has or is at risk of developing bone loss associated with androgen or estrogen deprivation therapy.

E283. A method of treating a subject having or at risk of developing bone loss associated with androgen or estrogen deprivation therapy by administering to the subject a therapeutically effective amount of the polypeptide of any one of E1-E123, the nucleic acid molecule of E124, the vector of E125, or the pharmaceutical composition of E128 or E129.

E284. The method of any one of E272-E277, wherein the subject has or is at risk of developing neuromuscular disease-related bone loss.

E285. A method of treating a subject having or at risk of developing neuromuscular disease-related bone loss by administering to the subject a therapeutically effective amount of the polypeptide of any one of E1-E123, the nucleic acid molecule of E124, the vector of E125, or the pharmaceutical composition of E128 or E129.

E286. The method of any one of E252-E255, E272-E277, E284, and E285, wherein the neuromuscular disease is a muscular dystrophy, autonomic neuropathy, botulism, Charcot-Marie-Tooth disease (CMT), chronic inflammatory demyelinating polyradiculoneuropathy, congenital myasthenic syndrome, a congenital myopathy, cramp-fasciculation syndrome, dermatomyositis, diabetic neuropathy, a distal myopathy, a dystrophinopathy, an endocrine myopathy, a focal muscular atrophy, glycogen storage disease type II, Guillain-Barre syndrome, hereditary spastic paraplegia, Isaac's syndrome, Kearns-Sayre syndrome, Kennedy disease, Lambert-Eaton myasthenic syndrome, a metabolic myopathy, a metabolic neuropathy, a mitochondrial myopathy, a motor neuron disease, multiple sclerosis, myasthenia gravis, myotonic dystrophy, a necrotizing myopathy, neuromyotonia, neuropathy of Friedreich's Ataxia, a nutritional neuropathy, peripheral neuropathy, polymyositis, primary lateral sclerosis, Schwartz-Jampel Syndrome, small fiber neuropathy, spinal and bulbar muscular atrophy, spinal muscular atrophy (SMA), spinal muscular atrophy with respiratory distress type 1, stiff person syndrome, toxic neuropathy, or Troyer syndrome.

E287. The method of E286, wherein the neuromuscular disease is a muscular dystrophy.

E288. The method of E287, wherein the muscular dystrophy is Becker muscular dystrophy, myotonic dystrophy, congenital muscular dystrophy, limb-girdle muscular dystrophy, distal muscular dystrophy, oculopharyngeal muscular dystrophy, or Emery-Dreifuss muscular dystrophy.

E289. The method of E288, wherein the muscular dystrophy is a congenital muscular dystrophy.

E290. The method of E289, wherein the congenital muscular dystrophy is congenital muscular dystrophy type 1A (MDC1A), congenital muscular dystrophy type 1C, congenital muscular dystrophy type 1 D, congenital muscular dystrophy type 1B, Fukuyama congenital muscular dystrophy, muscle-eye-brain disease, Walker-Warburg Syndrome, rigid spine muscular dystrophy, Ullrich congenital muscular dystrophy, or muscular dystrophy associated with a mutation in integrin alpha 7, integrin alpha 9, docking protein 7, laminin A/C, SECIS binding protein 2, or choline kinase beta.

E291. The method of E290, wherein the congenital muscular dystrophy is MDC1A.

E292. The method of E286, wherein the neuromuscular disease is CMT.

E293. The method of E286, wherein the neuromuscular disease is SMA.

E294. The method of any one of E272-E277, wherein the subject has or is at risk of developing burn-induced bone loss.

E295. A method of treating a subject having or at risk of developing burn-induced bone loss by administering to the subject a therapeutically effective amount of the polypeptide of any one of E1-E123, the nucleic acid molecule of E124, the vector of E125, or the pharmaceutical composition of E128 or E129.

E296. The method of any one of E272-E277, wherein the subject has or is at risk of developing anorexia-related bone loss.

E297. A method of treating a subject having or at risk of developing anorexia-related bone loss by administering to the subject a therapeutically effective amount of the polypeptide of any one of E1-E123, the nucleic acid molecule of E124, the vector of E125, or the pharmaceutical composition of E128 or E129.

E298. The method of any one of E272-E297, wherein the subject is at risk of bone fracture.

E299. The method of any one of E272-E298, wherein the method increases bone formation in the subject.

E300. The method of any one of E272-E299, wherein the method decreases bone resorption in the subject.

E301. The method of any one of E272-E300, wherein the method increases osteoblast activity or osteoblastogenesis.

E302. The method of any one of E272-E301, wherein the method decreases osteoclast activity or decreases osteoclastogenesis.

E303. The method of any one of E272-E302, wherein the method reduces the risk or occurrence of bone fracture.

E304. The method of any one of E272-E303, wherein the method increases bone strength.

E305. The method of any one of E272-E304, wherein the bone is cortical bone.

E306. The method of any one of E272-E304, wherein the bone is trabecular bone.

E307. A method of reducing body fat in a subject in need thereof by administering to the subject a therapeutically effective amount of the polypeptide of any one of E1-E123, the nucleic acid molecule of E124, the vector of E125, or the pharmaceutical composition of E128 or E129.

E308. A method of reducing body weight in a subject in need thereof by administering to the subject a therapeutically effective amount of the polypeptide of any one of E1-E123, the nucleic acid molecule of E124, the vector of E125, or the pharmaceutical composition of E128 or E129.

E309. A method of reducing blood glucose in a subject in need thereof by administering to the subject a therapeutically effective amount of the polypeptide of any one of E1-E123, the nucleic acid molecule of E124, the vector of E125, or the pharmaceutical composition of E128 or E129.

E310. A method of increasing insulin sensitivity in a subject in need thereof, by administering to the subject a therapeutically effective amount of the polypeptide of any one of E1-E123, the nucleic acid molecule of E124, the vector of E125, or the pharmaceutical composition of E128 or E129. E311. The method of any one of E307-E310, wherein the subject has or is at risk of developing a metabolic disease.

E312. A method of affecting myostatin, activin A, activin B, and/or BMP9 signaling (e.g., reducing or inhibiting the binding of myostatin, activin A, activin B, and/or BMP9 to their receptors) in a subject having or at risk of developing a metabolic disease by administering to the subject a therapeutically effective amount of the polypeptide of any one of E1-E123, the nucleic acid molecule of E124, the vector of E125, or the pharmaceutical composition of E128 or E129.

E313. A method of treating and/or preventing a metabolic disease in a subject by administering to the subject a therapeutically effective amount of the polypeptide of any one of E1-E123, the nucleic acid molecule of E124, the vector of E125, or the pharmaceutical composition of E128 or E129.

E314. The method of any one of E311-E313, wherein the metabolic disease is age-related metabolic disease.

E315. The method of any one of E311-E313, wherein the metabolic disease is treatment-related metabolic disease.

E316. The method of E315, wherein the treatment is treatment with a glucocorticoids (e.g., a corticosteroid, such as prednisone), a selective serotonin reuptake inhibitors (SSRI, e.g., paroxetine, mirtazapine, fluoxetine, escitalopram, or sertraline), a serotonin-norepinephrine reuptake inhibitor (SNRI), a tricyclic antidepressant (e.g., amitriptyline), a mood stabilizer (e.g., valproic acid or lithium), an antipsychotic (e.g., olanzapine, chlorpromazine, or clozapine), or a diabetes medication (e.g., insulin, chlorpropamide).

E317. The method of any one of E311-E316, wherein the metabolic disease is obesity, Type 1 diabetes, or Type 2 diabetes.

E318. The method of E317, wherein the metabolic disease is obesity.

E319. The method of E317, wherein the metabolic disease is Type 1 diabetes.

E320. The method of E317, wherein the metabolic disease is Type 2 diabetes.

E321. The method of any one of E307-E320, wherein the method reduces body weight and/or percentage of body weight gain of said subject.

E322. The method of any one of E307-E321, wherein the method reduces amount of body fat and/or percentage of body fat of said subject.

E323. The method of any one of E307-E322, wherein the method does not affect the appetite for food intake of said subject.

E324. The method of any one of E307-E323, wherein the method reduces adiposity of said subject.

E325. The method of any one of E307-E324, wherein the method reduces the weights of epididymal and perirenal fat pads of said subject.

E326. The method of any one of E307-E325, wherein the method reduces the amount of subcutaneous, visceral, and/or hepatic fat of said subject.

E327. The method of any one of E307-E326, wherein the method lowers the level of fasting insulin of said subject.

E328. The method of any one of E307-E327, wherein the method lowers the level of blood glucose of said subject.

E329. The method of any one of E307-E328, wherein the method increases insulin sensitivity of said subject.

E330. The method of any one of E307-E329, wherein the method increases the rate of glucose clearance of said subject.

E331. The method of any one of E307-E330, wherein the method improves the serum lipid profile of said subject.

E332. The method of any one of E307-E331, wherein the method delays, reduces, or eliminates the need for insulin treatment.

E333. The method of any one of E307-E332, wherein the method does not reduce lean mass.

E334. The method of any one of E130-E333, wherein the method reduces or inhibits the binding of activin A, activin B, and/or myostatin to their receptors (e.g., their endogenous receptors).

E335. The method of any one of E130-E162, E218-E251, and E334, wherein the composition is administered in an amount sufficient to increase platelet levels, increase platelet production, increase platelet count, increase or induce megakaryocyte differentiation and/or maturation, reduce the accumulation of platelet progenitor cells, improve blood clotting, reduce bleeding events, reduce bleeding in the skin, treat thrombocytopenia, affect myostatin, activin A, activin B, and/or BMP9 signaling in the subject, or reduce or inhibit the binding of activin A, activin B, and/or myostatin to their receptors.

E336. The method of any one of E163-E189, E218-E251, and E334, wherein the composition is administered in an amount sufficient to increase neutrophil levels, increase neutrophil production, increase neutrophil count, increase or induce the differentiation and/or maturation of progenitor cells into neutrophils, treat neutropenia, reduce susceptibility to infection, affect myostatin, activin A, activin B, and/or BMP9 signaling in the subject, or reduce or inhibit the binding of activin A, activin B, and/or myostatin to their receptors.

E337. The method of any one of E190-E251 and E334, wherein the composition is administered in an amount sufficient to increase red blood cell levels, increase hemoglobin levels, increase red blood cell production, increase red blood cell count, increase hematocrit, reduce the need for a blood transfusion, increase the maturation and/or differentiation of erythroid progenitors (e.g., early and/or terminal stage erythroid progenitors), increase late-stage erythroid precursor maturation, recruit early-stage progenitors into the erythroid lineage, increase reticulocytes, increase proerythroblast numbers, reduce the accumulation of red blood cell progenitor cells, increase the number of early-stage erythroid precursors and/or progenitors, promote the progression of erythroid precursors and/or progenitors through erythropoiesis, treat anemia, affect myostatin, activin A, activin B, and/or BMP9 signaling in the subject, or reduce or inhibit the binding of activin A, activin B, and/or myostatin to their receptors.

E338. The method of any one of E252-E271, E286-E290, and E334, wherein the composition is administered in an amount sufficient to increase muscle mass and/or strength, increase lean mass, affect myostatin, activin A, activin B, and/or BMP9 signaling in the subject, or reduce or inhibit the binding of activin A, activin B, and/or myostatin to their receptors.

E339. The method of any one of E72-E306 and E334, wherein the composition is administered in an amount sufficient to increase mineral bone density, reduce bone resorption, reduce the rate of bone resorption, increase bone formation, increase the rate of bone formation, reduce osteoclast activity, increase osteoblast activity, increase bone strength, reduce the risk or occurrence of bone fracture, affect myostatin, activin A, activin B, and/or BMP9 signaling in the subject, or reduce or inhibit the binding of activin A, activin B, and/or myostatin to their receptors.

E340. The method of any one of E307-E334, wherein the composition is administered in an amount sufficient to reduce body fat, reduce the amount of subcutaneous fat, reduce the amount of visceral and/or hepatic fat, reduce adiposity, reduce the weights of epididymal and perirenal fat pads, reduce body fat percentage, reduce body weight, reduce the percentage of body weight gain, reduce fasting insulin levels, reduce blood glucose levels, increase insulin sensitivity, affect myostatin, activin A, activin B, and/or BMP9 signaling in the subject, reduce the proliferation of adipose cells, reduce or inhibit the binding of activin A, activin B, and/or myostatin to their receptors, reduce LDL, reduce triglycerides, improve the serum lipid profile, regulate insulin biosynthesis and/or secretion from β-cells, delay, postpone, or reduce the need for insulin, or increase glucose clearance.

E341. The method of any one of E130-E340, wherein the method does not cause a vascular complication in the subject.

E342. The method of E341, wherein the method does not increase vascular permeability or leakage.

E343. The method of any one of E130-E342, wherein the subject is a human.

Definitions

To facilitate the understanding of this invention, a number of terms are defined below. Terms defined herein have meanings as commonly understood by a person of ordinary skill in the areas relevant to the invention. Terms such as "a", "an," and "the" are not intended to refer to only a singular entity but include the general class of which a specific example may be used for illustration. The terminology herein is used to describe specific embodiments of the invention, but their usage does not limit the invention, except as outlined in the claims.

As used herein, the term "about" refers to a value that is within 10% above or below the value being described.

As used herein, any values provided in a range of values include both the upper and lower bounds, and any values contained within the upper and lower bounds.

As used herein, the term "extracellular activin receptor type IIB (ActRIIB) variant" refers to a peptide including a soluble, extracellular portion of the single transmembrane receptor, ActRIIB, that has at least one amino acid substitution relative to a wild-type extracellular ActRIIB (e.g., bold portion of the sequence of SEQ ID NO: 18 shown below). The sequence of the wild-type, human ActRIIB is shown below (SEQ ID NO: 18), in which the signal peptide is italicized and the extracellular portion is bold.

```
Wild-type human ActRIIB (SEQ ID NO: 18):
MTAPWVALALLWGSLCAGSGRGEAETRECIYYNANWELERTNQSGLERCE

GEQDKRLHCYASWRNSSGTIELVKKGCWLDDFNCYDRQECVATEENPQVY

FCCCEGNFCNERFTHLPEAGGPEVTYEPPPTAPTLLTVLAYSLLPIGGLS

LIVLLAFWMYRHRKPPYGHVDIHEDPGPPPPSPLVGLKPLQLLEIKARGR
```

-continued
```
FGCVWKAQLMNDFVAVKIFPLQDKQSWQSEREIFSTPGMKHENLLQFIAA

EKRGSNLEVELWLITAFHDKGSLTDYLKGNIITWNELCHVAETMSRGLSY

LHEDVPWCRGEGHKPSIAHRDFKSKNVLLKSDLTAVLADFGLAVRFEPGK

PPGDTHGQVGTRRYMAPEVLEGAINFQRDAFLRIDMYAMGLVLWELVSRC

KAADGPVDEYMLPFEEEIGQHPSLEELQEVVVHKKMRPTIKDHWLKHPGL

AQLCVTIEECWDHDAEARLSAGCVEERVSLIRRSVNGTTSDCLVSLVTSV

TNVDLPPKESSI
```

An extracellular ActRIIB variant may have a sequence of any one of SEQ ID NOs: 1-15. In particular embodiments, an extracellular ActRIIB variant has a sequence of any one of SEQ ID NOs: 2-15 (Table 2). In some embodiments, an extracellular ActRIIB variant may have at least 85% (e.g., at least 85%, 87%, 90%, 92%, 95%, 96%, 97%, 98%, 99%, or greater) amino acid sequence identity to the sequence of a wild-type extracellular ActRIIB (SEQ ID NO: 17). The extracellular ActRIIB variant may also have an N-terminal truncation of 1-7 amino acids relative to the extracellular portion of ActRIIB.

As used herein, the term "N-terminal truncation" refers to a deletion of 1-9 amino acids (e.g., 1, 2, 3, 4, 5, 6, or 7 amino acids) from the N-terminus of an extracellular ActRIIB variant (e.g., an extracellular ActRIIB variant having the sequence of any one of SEQ ID NOs: 1-15 (e.g., SEQ ID NOs: 2-15)). The N-terminal truncation can remove amino acids up two to amino acids before the first cysteine (e.g., the two amino acids before the first cysteine (RE) are retained in the N-terminally truncated ActRIIB variants).

As used herein, the term "linker" refers to a linkage between two elements, e.g., peptides or protein domains. A polypeptide described herein may include an extracellular ActRIIB variant (e.g., an extracellular ActRIIB variant having the sequence of any one of SEQ ID NOs: 1-15 (e.g., SEQ ID NOs: 2-15)), fused to a moiety. The moiety may increase stability or improve pharmacokinetic properties of the polypeptide. The moiety (e.g., Fc domain monomer, a wild-type Fc domain, an Fc domain with amino acid substitutions (e.g., one or more substitutions that reduce dimerization), an albumin-binding peptide, a fibronectin domain, or a human serum albumin) may be fused to the polypeptide by way of a linker. A linker can be a covalent bond or a spacer. The term "bond" refers to a chemical bond, e.g., an amide bond or a disulfide bond, or any kind of bond created from a chemical reaction, e.g., chemical conjugation. The term "spacer" refers to a moiety (e.g., a polyethylene glycol (PEG) polymer) or an amino acid sequence (e.g., a 1-200 amino acid sequence) occurring between two elements, e.g., peptides or protein domains, to provide space and/or flexibility between the two elements. An amino acid spacer is part of the primary sequence of a polypeptide (e.g., fused to the spaced peptides via the polypeptide backbone). The formation of disulfide bonds, e.g., between two hinge regions that form an Fc domain, is not considered a linker.

As used herein, the term "Fc domain" refers to a dimer of two Fc domain monomers. An Fc domain has at least 80% sequence identity (e.g., at least 85%, 90%, 95%, 97%, or 100% sequence identity) to a human Fc domain that includes at least a $C_H2$ domain and a $C_H3$ domain. An Fc domain monomer includes second and third antibody constant domains ($C_H2$ and $C_H3$). In some embodiments, the Fc domain monomer also includes a hinge domain. An Fc domain does not include any portion of an immunoglobulin that is capable of acting as an antigen-recognition region, e.g., a variable domain or a complementarity determining region (CDR). In the wild-type Fc domain, the two Fc domain monomers dimerize by the interaction between the two $C_H3$ antibody constant domains, as well as one or more disulfide bonds that form between the hinge domains of the two dimerizing Fc domain monomers. In some embodiments, an Fc domain may be mutated to lack effector functions, typical of a "dead Fc domain." In certain embodiments, each of the Fc domain monomers in an Fc domain includes amino acid substitutions in the $C_H2$ antibody constant domain to reduce the interaction or binding between the Fc domain and an Fcγ receptor. In some embodiments, the Fc domain contains one or more amino acid substitutions that reduce or inhibit Fc domain dimerization. An Fc domain can be any immunoglobulin antibody isotype, including IgG, IgE, IgM, IgA, or IgD. Additionally, an Fc domain can be an IgG subtype (e.g., IgG1, IgG2a, IgG2b, IgG3, or IgG4). The Fc domain can also be a non-naturally occurring Fc domain, e.g., a recombinant Fc domain.

As used herein, the term "albumin-binding peptide" refers to an amino acid sequence of 12 to 16 amino acids that has affinity for and functions to bind serum albumin. An albumin-binding peptide can be of different origins, e.g., human, mouse, or rat. In some embodiments, an albumin-binding peptide has the sequence DICLPRWGCLW (SEQ ID NO: 72).

As used herein, the term "endogenous" describes a molecule (e.g., a polypeptide, nucleic acid, or cofactor) that is found naturally in a particular organism (e.g., a human) or in a particular location within an organism (e.g., an organ, a tissue, or a cell, such as a human cell, e.g., a human hair cell).

As used herein, the term "fibronectin domain" refers to a high molecular weight glycoprotein of the extracellular matrix, or a fragment thereof, that binds to, e.g., membrane-spanning receptor proteins such as integrins and extracellular matrix components such as collagens and fibrins. In some embodiments, a fibronectin domain is a fibronectin type III domain (SEQ ID NO: 73) having amino acids 610-702 of the sequence of UniProt ID NO: P02751. In other embodiments, a fibronectin domain is an adnectin protein.

As used herein, the term "human serum albumin" refers to the albumin protein present in human blood plasma. Human serum albumin is the most abundant protein in the blood. It constitutes about half of the blood serum protein. In some embodiments, a human serum albumin has the sequence of UniProt ID NO: P02768 (SEQ ID NO: 74).

As used herein, the term "fused" is used to describe the combination or attachment of two or more elements, components, or protein domains, e.g., peptides or polypeptides, by means including chemical conjugation, recombinant means, and chemical bonds, e.g., amide bonds. For example, two single peptides in tandem series can be fused to form one contiguous protein structure, e.g., a polypeptide, through chemical conjugation, a chemical bond, a peptide linker, or any other means of covalent linkage. In some embodiments of a polypeptide described herein, an extracellular ActRIIB variant (e.g., an extracellular ActRIIB variant having the sequence of any one of SEQ ID NOs: 1-15 (e.g., SEQ ID NOs: 2-15)), may be fused in tandem series to the N- or C-terminus of a moiety (e.g., Fc domain monomer (e.g., the sequence of SEQ ID NO: 19) a wild-type Fc domain (e.g., the sequence of SEQ ID NO: 71 or SEQ ID NO: 75), an Fc domain with amino acid substitutions (e.g., one or more substitutions that reduce dimerization), an albumin-binding peptide (e.g., the sequence of SEQ ID NO: 72), a fibronectin domain (e.g., the sequence of SEQ ID NO: 73), or a human serum albumin (e.g., the sequence of SEQ ID NO: 74)) by way of a linker. For example, an extracellular ActRIIB variant is fused to a moiety (e.g., an Fc domain monomer, a wild-type Fc domain, an Fc domain with amino acid substitutions (e.g., one or more substitutions that reduce dimerization), an albumin-binding peptide, a fibronectin domain, or a human serum albumin) by way of a peptide linker, in which the N-terminus of the peptide linker is fused to the C-terminus of the extracellular ActRIIB variant through a chemical bond, e.g., a peptide bond, and the C-terminus of the peptide linker is fused to the N-terminus of the moiety (e.g., Fc domain monomer, wild-type Fc domain, Fc domain with amino acid substitutions (e.g., one or more substitutions that reduce dimerization), albumin-binding peptide, fibronectin domain, or human serum albumin) through a chemical bond, e.g., a peptide bond.

As used herein, the terms "bone mineral density (BMD)," "bone density," and "bone mass" refer to a measure of the amount of bone mineral (e.g., calcium) in bone tissue. BMD may be measured by well-established clinical techniques known to one of skill in the art (e.g., by single-1 or dual-energy photon or X-ray absorptiometry). The concept of BMD relates to the mass of mineral per volume of bone, although clinically it is measured by proxy according to optical density per square centimeter of bone surface upon imaging. BMD measurement is used in clinical medicine as an indirect indicator of osteoporosis and fracture risk. In some embodiments, BMD test results are provided as a T-score, where the T-score represents the BMD of a subject compared to the ideal or peak bone mineral density of a healthy 30-year-old adult. A score of 0 indicates that the BMD is equal to the normal reference value for a healthy young adult. Differences between the measured BMD of subject and that of the reference value for a healthy young adult are measured in standard deviations units (SDs). Accordingly, a T-score of between +1 SD and −1 SD may indicate a normal BMD, a T-score of between −1 SD and −2.5 SD may indicate low bone mass (e.g., osteopenia), and a T-score lower than −2.5 SD may indicate osteoporosis or severe osteoporosis. In some embodiments, a polypeptide of the invention including an extracellular ActRIIB variant (e.g., an extracellular ActRIIB variant having the sequence of any one of SEQ ID NOs: 1-15 (e.g., SEQ ID NOs: 2-15)), a nucleic acid encoding such a polypeptide, or a vector containing such a nucleic acid molecule is administered to a subject in need thereof, wherein the patient has low bone mass (e.g., a T-Score of between −1 SD and −2.5 SD). In some embodiments, a polypeptide of the invention including an extracellular ActRIIB variant (e.g., an extracellular ActRIIB variant having the sequence of any one of SEQ ID NOs: 1-15 (e.g., SEQ ID NOs: 2-15)), a nucleic acid encoding such a polypeptide, or a vector containing such a nucleic acid molecule is administered to a subject in need thereof, wherein the patient has osteoporosis (e.g., a T-Score of less than −2.5 SD). In some embodiments, administration of a polypeptide of the invention including an extracellular ActRIIB variant (e.g., an extracellular ActRIIB variant having the sequence of any one of SEQ ID NOs: 1-15 (e.g., SEQ ID NOs: 2-15)), a nucleic acid encoding such a polypeptide, or a vector containing such a nucleic acid molecule treats the subject by increasing their BMD. In some embodiments, administration of a polypeptide of the invention including an extracellular ActRIIB variant (e.g., an extracellular ActRIIB variant having the sequence of any one of SEQ ID NOs: 1-15 (e.g., SEQ ID NOs: 2-15)), a nucleic acid encoding such a polypeptide, or a vector containing such a nucleic acid molecule increases the BMD of a subject resulting in an increase in the T-Score of the subject (e.g., resulting in an increase in the T-Score of the subject of 0.1 or more, 0.2 or more, 0.3 or more, 0.4 or more, 0.5 or more, 1.0 or more, or 2.0 or more).

As used herein, the term "bone strength" refers to a measurement of bone that is determined by bone quality in addition to bone mineral density. Bone quality is influenced by bone geometry, microarchitecture, and the properties of constituent tissues. Bone strength can be used to assess the bone's risk of fracture.

As used herein, the term "bone disease" refers to a condition characterized by bone damage (e.g., decreased bone mineral density, decreased bone strength, and/or bone loss). Such diseases or conditions may be caused by an imbalance in osteoblast and/or osteoclast activity (e.g., increased bone resorption or reduced bone formation). Bone diseases include primary osteoporosis, secondary osteoporosis, osteopenia, osteopetrosis, bone fracture, bone cancer or cancer metastasis-related bone loss (e.g., bone loss associated with multiple myeloma), Paget's disease, renal osteodystrophy, osteogenesis imperfecta, neuromuscular disease-related bone loss, burn-induced bone loss, anorexia-related bone loss, treatment-related bone loss, diet-related bone loss, bone loss associated with the treatment of obesity, low gravity-related bone loss, and immobility-related bone loss.

As used herein, the term "neuromuscular disease-related bone loss" refers to bone loss that occurs in a subject having a neuromuscular disease. Poor bone health is often a significant problem for patients with neuromuscular disease. Deficiency of bone mineral density and increased incidence of bone fractures, for example, are a well-recognized clinical consequence of diseases such as DMD, ALS, and SMA.

As used herein, the terms "bone remodeling" or "bone metabolism" refer to the process for maintaining bone strength and ion homeostasis by replacing discrete parts of old bone with newly synthesized packets of proteinaceous matrix. Bone is resorbed by osteoclasts and is deposited by osteoblasts in a process called ossification. Osteocyte activity plays a key role in this process. Conditions that result in a decrease in bone mass, can either be caused by an increase in resorption, or a decrease in ossification. In a healthy individual, during childhood, bone formation exceeds resorption. As the aging process occurs, resorption exceeds formation. Bone resorption rates are also typically much higher in post-menopausal older women due to estrogen deficiency related to menopause.

As used herein, the terms "bone resorption" or "bone catabolic activity" refer to a process by which osteoclasts break down the tissue in bones and release the minerals, resulting in a transfer of the mineral (e.g., calcium) from bone tissue to the blood. Increased rates of bone resorption are associated with aging, including in post-menopausal women. High rates of bone resorption, or rates of bone resorption that exceed the rate of ossification, are associated with bone disorders, such as decreased bone mineral density, including osteopenia and osteoporosis, and can result in bone loss. In some embodiments, a polypeptide of the invention including an extracellular ActRIIB variant (e.g., an extracellular ActRIIB variant having the sequence of any one of SEQ ID NOs: 1-15 (e.g., SEQ ID NOs: 2-15)), a nucleic acid encoding such a polypeptide, or a vector containing such a nucleic acid molecule is administered to a subject in need thereof to decrease bone resorption (e.g., decrease bone loss) in the subject (e.g., the amount or rate of bone resorption in the subject).

As used herein, the terms "bone formation," "ossification," "osteogenesis," or "bone anabolic activity" refer to the process of forming new bone tissue by osteoblasts. In some embodiments, a polypeptide of the invention including an extracellular ActRIIB variant (e.g., an extracellular ActRIIB variant having the sequence of any one of SEQ ID NOs: 1-15 (e.g., SEQ ID NOs: 2-15)), a nucleic acid encoding such a polypeptide, or a vector containing such a nucleic acid molecule is administered to a subject in need thereof, to increase bone formation (e.g., increase the amount or rate of bone formation or osteogenesis in the subject). Reduced rates of bone formation, or rates of bone formation that are exceeded by the rate of bone resorption, can result in bone loss.

As used herein, the terms "increasing" and "decreasing" refer to modulating resulting in, respectively, greater or lesser amounts, of function, expression, or activity of a metric relative to a reference. For example, subsequent to administration of a polypeptide of the invention including an extracellular ActRIIB variant in a method described herein, the amount of a marker of a metric (e.g., lean mass) as described herein may be increased or decreased in a subject relative to the amount of the marker prior to administration. Generally, the metric is measured subsequent to administration at a time that the administration has had the recited effect, e.g., at least one week, one month, 3 months, or 6 months, after a treatment regimen has begun.

As used herein, the terms "increase red blood cell levels" and "promote red blood cell formation" refer to clinically observable metrics, such as hematocrit, red blood cell counts, and hemoglobin measurements, and are intended to be neutral as to the mechanism by which such changes occur. The term "low red blood cell levels" as used herein refers to red blood cell counts, hematocrit, and hemoglobin measurements that are below the range of values that is considered normal for the subject's age and gender.

As used herein, the terms "red blood cell formation" and "red blood cell production" refer to the generation of red blood cells, such as the process of erythropoiesis in which red blood cells are produced in the bone marrow.

As used herein, the term "anemia" refers to any abnormality in hemoglobin or red blood cells that leads to reduced oxygen levels in the blood. Anemia can be associated with abnormal production, processing, or performance of erythrocytes and/or hemoglobin. The term anemia refers to any reduction in the number of red blood cells and/or level of hemoglobin in blood relative to normal blood levels.

As used herein, the terms "increase platelet levels" and "promote platelet formation" refer to clinically observable metrics, such as platelet counts, and are intended to be neutral as to the mechanism by which such changes occur. The term "low platelet levels" as used herein refers to platelet counts that are below the range of values that is considered normal for the subject's age and gender. The terms "platelet formation" and "platelet production" refer to the generation of platelets, such as the process in which platelets are produced from megakaryocytes.

As used herein, the terms "increase neutrophil levels" and "promote neutrophil formation" refer to clinically observable metrics, such as neutrophil counts, and are intended to be neutral as to the mechanism by which such changes occur. The term "low neutrophil levels" as used herein refers to neutrophil counts that are below the range of values that is considered normal for the subject's age and gender. The terms "neutrophil formation" and "neutrophil production" refer to the generation of neutrophils such as the process in which neutrophils are produced in the bone marrow.

As used herein, the term "thrombocytopenia" refers to a condition in which the blood contains a lower than normal number of platelets, which may be due to a deficiency in platelet production, accumulation of platelets within an enlarged spleen, or the destruction of platelets. Normal blood platelet levels range from about 150,000 to 450,000 per microliter blood in humans. A platelet count of less than 150,000 platelets per microliter is lower than normal. Bleeding can occur after a relatively minor injury if the platelet count falls below 50,000 platelets per microliter of blood, and serious bleeding may occur without any recognized injury if the platelet count falls below 10,000 to 20,000 platelets per microliter of blood.

As used herein, the term "immune thrombocytopenia" is used herein to refer to any type of thrombocytopenia arising from an autoimmune response directed against an individual's own platelets. Immune thrombocytopenia includes primary immune thrombocytopenia, in which autoimmune response is the original cause for the decrease in the platelet counts, such as idiopathic thrombocytopenic purpura. Immune thrombocytopenia also includes secondary immune thrombocytopenia, in which the decrease in platelet counts is associated with one or more other diseases that cause an individual's body to generate an autoimmune response against its own platelets, such as systemic lupus erythematosus (SLE), antiphospholipid syndrome (APS), Evans syndrome, immune thyroid disease, leukemia (e.g., chronic lymphocytic leukemia or large granular T-lymphocyte lymphocytic leukemia), or chronic infection (e.g., with *Helicobacter pylori*, human immunodeficiency virus (HIV), or Hepatitis C).

As used herein, the term "neutropenia" refers to a condition in which the blood contains an abnormally low number of neutrophils. The typical lower limit of the neutrophil count is about 1500 cells per microliter of blood. Below this level, the risk of infection increases. Neutropenia severity is classified as: mild (1000 to 1500 neutrophils per microliter of blood), moderate (500 to 1000 neutrophils per microliter of blood), and severe (below 500 neutrophils per microliter of blood). Neutropenia has many causes, but they typically fall into two main categories: destruction or depletion of neutrophils faster than the bone marrow can produce new neutrophils, or reduced production of neutrophils in the bone marrow.

As used herein, the term "low transfusion burden" refers to a condition of a subject that has received less than four units of red blood cells (RBCs) within eight weeks (e.g., 3, 2, 1, or 0 units of RBCs within eight weeks) prior to treatment with an ActRIIB variant described herein. A subject with a low transfusion burden can be identified as having anemia based on measurements of mean hemoglobin concentration. A subject with a low transfusion burden and a mean hemoglobin concentration of less than 10.0 g/dL of two measurements performed at least one week apart prior to treatment with an ActRIIB variant described herein (e.g., one measurement performed within one day prior to treatment and the other performed 7-28 days prior, not influenced by RBC transfusion within seven days of measurement) is defined as having anemia. In some embodiments, a subject with a low transfusion burden receives 1-3 units of RBCs (1-3 RBC transfusions) within eight weeks prior to treatment with an ActRIIB variant described herein. In some embodiments, a subject with a low transfusion burden does not receive any units of RBCs (0 RBC transfusions) within eight weeks prior to treatment with an ActRIIB variant described herein.

As used herein, the term "high transfusion burden" refers to a condition of a subject requiring greater than or equal to four units of RBCs (e.g., 4, 5, 6, 7, 8, or more units) within eight weeks prior to treatment with an ActRIIB variant described herein. A subject with a high transfusion burden can be identified as having anemia based on measurements of mean hemoglobin concentration. A subject with a high transfusion burden and a mean hemoglobin concentration of less than or equal to 9.0 g/dL is defined as having anemia.

As used herein, the term "ineffective hematopoiesis" refers to the failure to produce fully mature hematopoietic cells (e.g., the failure to produce red blood cells, platelets, and neutrophils). Ineffective hematopoiesis may be due to single or multiple defects, such as abnormal proliferation and/or differentiation of progenitor cells (e.g., an excessive production of progenitors that are unable to complete differentiation), that can lead to a hyperproliferation or a shortage of progenitor cells.

As used herein, the terms "erythropoiesis stimulating agent" and "ESA" refer to a class of drugs that act on the proliferation stage of red blood cell development by expanding the pool of early-stage progenitor cells. Examples of erythropoiesis-stimulating agents are epoetin alfa and darbepoetin alfa.

As used herein, the term "metabolic disease" refers to a disease, disorder, or syndrome that is related to a subject's metabolism, such as breaking down carbohydrates, proteins, and fats in food to release energy, and converting chemicals into other substances and transporting them inside cells for energy utilization and/or storage. Some symptoms of a metabolic disease include high serum triglycerides, high low-density cholesterol (LDL), low high-density cholesterol (HDL), and/or high fasting insulin levels, elevated fasting plasma glucose, abdominal (central) obesity, and elevated blood pressure. Metabolic diseases increase the risk of developing other diseases, such as cardiovascular disease. In the present invention, metabolic diseases include, but are not limited to, obesity, Type 1 diabetes, and Type 2 diabetes.

As used herein, the term "treatment-related metabolic disease" refers to a metabolic disease (e.g., obesity, Type 1 diabetes, or Type 2 diabetes) associated with a medication taken by the subject (e.g., a metabolic disease developed during treatment with the medication). The medication can be one that the subject continues to take, or one taken previously that led to the development of metabolic disease. Medications associated with the development of obesity include glucocorticoids (e.g., corticosteroids, such as prednisone), selective serotonin reuptake inhibitors (SSRIs, e.g., paroxetine, mirtazapine, fluoxetine, escitalopram, sertraline), tricyclic antidepressants (e.g., amitriptyline), mood stabilizers (e.g., valproic acid, lithium), antipsychotics (e.g., olanzapine, chlorpromazine, clozapine), and diabetes medication (e.g., insulin, chlorpropamide). Medications associated with the development of diabetes include glucocorticoids (e.g., corticosteroids, which may cause glucocorticoid-induced diabetes mellitus), SSRIs, serotonin-norepinephrine reuptake inhibitors (SNRIs), mood stabilizers (e.g., lithium and valproic acid), and antipsychotics (e.g., olanzapine and clozapine). In some embodiments, the development of obesity may lead to the development of diabetes.

As used herein, the term "age-related metabolic disease" refers to a metabolic disease (e.g., obesity, Type 1 diabetes, or Type 2 diabetes) that develops with age. For example, the risk of diabetes increases with age and is more common in older adults, with approximately 25% of adults over 60 having diabetes. Adults can develop Type 2 diabetes or new-onset Type 1 diabetes. Rates of obesity also increase with age, with the highest rates of obesity in the United States occurring in adults aged 40-59 (with a prevalence of obesity of 45%). Aging also reduces the body's ability to burn fat, leading to increased fat surrounding internal organs.

As used herein, the term "percentage of body weight gain" refers to the percentage of gained body weight compared to a prior body weight of a subject at a prior time. The percentage of body weight gain can be calculated as follows:

100×[(body weight at a later time−body weight at a prior time)/(body weight at a prior time)]

In the present invention, administration of a polypeptide including an extracellular ActRIIB variant (e.g., an extracellular ActRIIB variant having the sequence of any one of SEQ ID NOs: 1-15 (e.g., SEQ ID NOs: 2-15)), a nucleic acid molecule encoding a such polypeptide, or vector containing such a nucleic acid molecule to a subject can reduce the percentage of body weight gain of the subject.

As used herein, the term "appetite for food intake" refers to a subject's natural desire or need for food. The appetite for food intake of a subject can be monitored by measuring the amount of food consumed after the polypeptide including an extracellular ActRIIB variant (e.g., an extracellular ActRIIB variant having the sequence of any one of SEQ ID NOs: 1-15 (e.g., SEQ ID NOs: 2-15)) is administered. In the present invention, administration of a polypeptide including an extracellular ActRIIB variant (e.g., an extracellular ActRIIB variant having the sequence of any one of SEQ ID NOs: 1-15 (e.g., SEQ ID NOs: 2-15)), a nucleic acid molecule encoding such a polypeptide, or vector containing such a nucleic acid molecule to a subject does not affect the subject's appetite for food intake.

As used herein, the term "adiposity" refers to the fat stored in the adipose tissue of a subject. In the present invention, administration of a polypeptide including an extracellular ActRIIB variant (e.g., an extracellular ActRIIB variant having the sequence of any one of SEQ ID NOs: 1-15 (e.g., SEQ ID NOs: 2-15)), a nucleic acid molecule encoding such a polypeptide, or vector containing such a nucleic acid molecule to a subject can reduce the subject's adiposity without affecting lean mass.

As used herein, the term "epididymal and perirenal fat pads" refers to the tightly packed fat cells in the epididymis and around the kidney. In the present invention, administration of a polypeptide including an extracellular ActRIIB variant (e.g., an extracellular ActRIIB variant having the sequence of any one of SEQ ID NOs: 1-15 (e.g., SEQ ID NOs: 2-15)), a nucleic acid molecule encoding such a polypeptide, or vector containing such a nucleic acid molecule to a subject can reduce the weights of epididymal and perirenal fat pads of the subject.

As used herein, the term "fasting insulin" refers to a subject's level of insulin while the subject has not had any food intake for a length of time (i.e., 12-24 hours). Fasting insulin level is used in diagnosing metabolic diseases. Fasting insulin level is also used as an indication of whether a subject is at the risk of developing a metabolic disease. Normally, in a subject suffering from Type 1 diabetes, the subject's fasting insulin level is low compared to that of a healthy subject. In a subject suffering from insulin resistance (i.e., Type 2 diabetes), the subject's fasting insulin level is high compared to that of a healthy subject. In the present invention, administration of a polypeptide including an extracellular ActRIIB variant (e.g., an extracellular ActRIIB variant having the sequence of any one of SEQ ID NOs: 1-15 (e.g., SEQ ID NOs: 2-15)), a nucleic acid molecule encoding such a polypeptide, or vector containing such a nucleic acid molecule to a subject can modulate the subject's fasting insulin level.

As used herein, the term "rate of glucose clearance" refers to the rate at which glucose is being cleared from the blood. The rate of glucose clearance can be measured in a glucose tolerance test (GTT). In a GTT, a subject is given a certain amount of glucose and blood samples are taken afterward to determine how quickly it is cleared from the blood. The rate of glucose clearance can be used as a parameter in diagnosing and/or determining the risk of developing metabolic diseases such as obesity, diabetes, and insulin resistance.

As used herein, the term "serum lipid profile" refers to the measurement of the distribution of different types of lipids and lipoproteins in a subject's serum. Such measurement can be accomplished by a panel of blood tests. The types of lipids and lipoproteins in a subject's serum include, but are not limited to, cholesterol (e.g., high-density lipoprotein (HDL) and low-density lipoprotein (LDL)), triglyceride, and free fatty acid (FFA). The distribution of the different types of lipids and lipoproteins can be used as a parameter in diagnosing and/or determining the risk of developing metabolic diseases such as obesity, diabetes, and insulin resistance. High levels of cholesterol, especially low-density lipoprotein, is generally regarded as an indication or risk factor for developing certain metabolic diseases, or in some severe medical cases, cardiovascular diseases. In the present invention, administration of a polypeptide including an extracellular ActRIIB variant (e.g., an extracellular ActRIIB variant having the sequence of any one of SEQ ID NOs: 1-15 (e.g., SEQ ID NOs: 2-15)), a nucleic acid molecule encoding such a polypeptide, or vector containing such a nucleic acid molecule to a subject improves the subject's serum lipid profile such that the levels of cholesterol (especially low-density lipoprotein) and triglyceride are lowered.

As used herein, the term "percent (%) identity" refers to the percentage of amino acid (or nucleic acid) residues of a candidate sequence that are identical to the amino acid (or nucleic acid) residues of a reference sequence after aligning the sequences and introducing gaps, if necessary, to achieve the maximum percent identity (i.e., gaps can be introduced in one or both of the candidate and reference sequences for optimal alignment and non-homologous sequences can be disregarded for comparison purposes). Alignment for purposes of determining percent identity can be achieved in various ways that are within the skill in the art, for instance, using publicly available computer software such as BLAST, ALIGN, or Megalign (DNASTAR) software. Those skilled in the art can determine appropriate parameters for measuring alignment, including any algorithms needed to achieve maximal alignment over the full length of the sequences being compared. In some embodiments, the percent amino acid (or nucleic acid) sequence identity of a given candidate sequence to, with, or against a given reference sequence (which can alternatively be phrased as a given candidate sequence that has or includes a certain percent amino acid (or nucleic acid) sequence identity to, with, or against a given reference sequence) is calculated as follows:

100×(fraction of $A/B$)

where A is the number of amino acid (or nucleic acid) residues scored as identical in the alignment of the candidate sequence and the reference sequence, and where B is the total number of amino acid (or nucleic acid) residues in the reference sequence. In some embodiments where the length of the candidate sequence does not equal to the length of the reference sequence, the percent amino acid (or nucleic acid)

sequence identity of the candidate sequence to the reference sequence would not equal to the percent amino acid (or nucleic acid) sequence identity of the reference sequence to the candidate sequence.

In particular embodiments, a reference sequence aligned for comparison with a candidate sequence may show that the candidate sequence exhibits from 50% to 100% identity across the full length of the candidate sequence or a selected portion of contiguous amino acid (or nucleic acid) residues of the candidate sequence. The length of the candidate sequence aligned for comparison purpose is at least 30%, e.g., at least 40%, e.g., at least 50%, 60%, 70%, 80%, 90%, or 100% of the length of the reference sequence. When a position in the candidate sequence is occupied by the same amino acid (or nucleic acid) residue as the corresponding position in the reference sequence, then the molecules are identical at that position.

As used herein, the term "serum half-life" refers to, in the context of administering a therapeutic protein to a subject, the time required for plasma concentration of the protein in the subject to be reduced by half. The protein can be redistributed or cleared from the bloodstream, or degraded, e.g., by proteolysis. Serum half-life comparisons can be made by comparing the serum half-life of Fc fusion proteins.

As used herein, the term "lean mass" refers to a component of body composition which includes, e.g., lean mass, body fat, and body fluid. Normally lean mass is calculated by subtracting the weights of body fat and body fluid from total body weight. Typically, a subject's lean mass is between 60% and 90% of totally body weight. In the present invention, administration of a polypeptide including an extracellular ActRIIB variant (e.g., an extracellular ActRIIB variant having the sequence of any one of SEQ ID NOs: 1-15 (e.g., SEQ ID NOs: 2-15)), a nucleic acid molecule encoding such a polypeptide, or vector containing such a nucleic acid molecule to a subject increases the subject's lean mass.

As used herein, the term "muscle mass" refers to the primary component of lean mass. Muscle mass can be measured experimentally by measuring muscle weight.

As used herein, the term "neuromuscular disease" refers to a disease that affects voluntary or involuntary muscle function due to problems in the nerves and muscles, typically leading to muscle weakness. Exemplary neuromuscular diseases include amyotrophic lateral sclerosis (ALS), autonomic neuropathy, botulism, Charcot-Marie-Tooth disease (CMT), chronic inflammatory demyelinating polyradiculoneuropathy, congenital myasthenic syndrome, congenital myopathies, cramp-fasciculation syndrome, dermatomyositis, diabetic neuropathy, distal myopathies, dystrophinopathies, endocrine myopathies, focal muscular atrophies, glycogen storage disease type II, Guillain-Barre syndrome, hereditary spastic paraplegia, inclusion body myositis (IBM), Isaac's syndrome, Kearns-Sayre syndrome, Kennedy disease, Lambert-Eaton myasthenic syndrome, metabolic myopathies, metabolic neuropathies, mitochondrial myopathies, motor neuron diseases, multiple sclerosis, muscular dystrophy (e.g., Duchenne (DMD), Becker (BMD), myotonic (DM), facioscapulohumeral (FSHD), limb-girdle (LGMD), distal (DD), oculopharyngeal (OPMD), Emery-Dreifuss (EDMD), and congenital (e.g., MDC1A, MDC1B, MDC1C, FCMD, WWS, RSMD1, MEB, and UCMD)), myasthenia gravis, myotonic dystrophy, necrotizing myopathies, neuromyotonia, neuropathy of Friedreich's Ataxia, nutritional neuropathy, peripheral neuropathy, polymyositis, primary lateral sclerosis, Schwartz-Jampel Syndrome, small fiber neuropathy, spinal and bulbar muscular atrophy, spinal muscular atrophy, spinal muscular atrophy with respiratory distress type 1, spinocerebellar ataxia, stiff person syndrome, toxic neuropathy, and Troyer syndrome. A neuromuscular disease may be inherited in an autosomal dominant or recessive pattern or mutations may occur spontaneously.

As used herein, the term "affinity" or "binding affinity" refers to the strength of the binding interaction between two molecules. Generally, binding affinity refers to the strength of the sum total of non-covalent interactions between a molecule and its binding partner, such as an extracellular ActRIIB variant and BMP9 or activin A. Unless indicated otherwise, binding affinity refers to intrinsic binding affinity, which reflects a 1:1 interaction between members of a binding pair. The binding affinity between two molecules is commonly described by the dissociation constant ($K_D$) or the affinity constant (KA). Two molecules that have low binding affinity for each other generally bind slowly, tend to dissociate easily, and exhibit a large $K_D$. Two molecules that have high affinity for each other generally bind readily, tend to remain bound longer, and exhibit a small $K_D$. The $K_D$ of two interacting molecules may be determined using methods and techniques well known in the art, e.g., surface plasmon resonance. $K_D$ is calculated as the ratio of $k_{off}/k_{on}$.

As used herein, the phrase "affecting myostatin, activin A, activin B, and/or BMP9 signaling" means changing the binding of myostatin, activin A, activin B, and/or BMP9 to their receptors, e.g., ActRIIA, ActRIIB, and/or BMPRII (e.g., endogenous ActRIIB). In some embodiments, a polypeptide including an extracellular ActRIIB variant described herein reduces or inhibits the binding of myostatin, activin A, activin B, and/or BMP9 to their receptors, e.g., ActRIIA, ActRIIB, and/or BMPRII (e.g., endogenous ActRIIB).

As used herein, the term "vascular complication" refers to a vascular disorder or any damage to the blood vessels, such as damage to the blood vessel walls. Damage to the blood vessel walls may cause an increase in vascular permeability or leakage. The term "vascular permeability or leakage" refers to the capacity of the blood vessel walls to allow the flow of small molecules, proteins, and cells in and out of blood vessels. An increase in vascular permeability or leakage may be caused by an increase in the gaps (e.g., an increase in the size and/or number of the gaps) between endothelial cells that line the blood vessel walls and/or thinning of the blood vessel walls.

As used herein, the term "polypeptide" describes a single polymer in which the monomers are amino acid residues which are covalently conjugated together through amide bonds. A polypeptide is intended to encompass any amino acid sequence, either naturally occurring, recombinant, or synthetically produced.

As used herein, the term "homodimer" refers to a molecular construct formed by two identical macromolecules, such as proteins or nucleic acids. The two identical monomers may form a homodimer by covalent bonds or non-covalent bonds. For example, an Fc domain may be a homodimer of two Fc domain monomers if the two Fc domain monomers contain the same sequence. In another example, a polypeptide described herein including an extracellular ActRIIB variant fused to an Fc domain monomer may form a homodimer through the interaction of two Fc domain monomers, which form an Fc domain in the homodimer.

As used herein, the term "heterodimer" refers to a molecular construct formed by two different macromolecules, such as proteins or nucleic acids. The two monomers may form a heterodimer by covalent bonds or non-covalent bonds. For example, a polypeptide described herein including an extracellular ActRIIB variant fused to an Fc domain monomer may form a heterodimer through the interaction of two Fc domain monomers, each fused to a different ActRIIB variant, which form an Fc domain in the heterodimer.

As used herein, the term "host cell" refers to a vehicle that includes the necessary cellular components, e.g., organelles, needed to express proteins from their corresponding nucleic acids. The nucleic acids are typically included in nucleic acid vectors that can be introduced into the host cell by conventional techniques known in the art (transformation, transfection, electroporation, calcium phosphate precipitation, direct microinjection, etc.). A host cell may be a prokaryotic cell, e.g., a bacterial cell, or a eukaryotic cell, e.g., a mammalian cell (e.g., a CHO cell or a HEK293 cell).

As used herein, the term "therapeutically effective amount" refers an amount of a polypeptide, nucleic acid, or vector of the invention or a pharmaceutical composition containing a polypeptide, nucleic acid, or vector of the invention effective in achieving the desired therapeutic effect in treating a patient having a disease or condition, such as a disease or condition involving weakness and atrophy of muscles (e.g., a neuromuscular disease, such as a muscular dystrophy, SMA, CMT, myasthenia gravis, or multiple sclerosis; or cachexia), a disease or condition involving bone damage (e.g., osteogenesis imperfecta, neuromuscular disease-related bone loss, burn-induced bone loss, or anorexia-related bone loss), a disease or condition involving low red blood cell levels (e.g., myelofibrosis or a myelodysplastic syndrome), a disease or condition involving low platelet levels (e.g., thrombocytopenia), a disease or condition involving low neutrophil levels (e.g., neutropenia), or a metabolic disease. In particular, the therapeutically effective amount of the polypeptide, nucleic acid, or vector avoids adverse side effects.

As used herein, the term "pharmaceutical composition" refers to a medicinal or pharmaceutical formulation that includes an active ingredient as well as excipients and diluents to enable the active ingredient suitable for the method of administration. The pharmaceutical composition of the present invention includes pharmaceutically acceptable components that are compatible with the polypeptide, nucleic acid, or vector. The pharmaceutical composition may be in tablet or capsule form for oral administration or in aqueous form for intravenous or subcutaneous administration.

As used herein, the term "pharmaceutically acceptable carrier or excipient" refers to an excipient or diluent in a pharmaceutical composition. The pharmaceutically acceptable carrier must be compatible with the other ingredients of the formulation and not deleterious to the recipient. In the present invention, the pharmaceutically acceptable carrier or excipient must provide adequate pharmaceutical stability to the polypeptide including an extracellular ActRIIB variant, the nucleic acid molecule(s) encoding the polypeptide, or a vector containing such nucleic acid molecule(s). The nature of the carrier or excipient differs with the mode of administration. For example, for intravenous administration, an aqueous solution carrier is generally used; for oral administration, a solid carrier is preferred.

As used herein, the term "treating and/or preventing" refers to the treatment and/or prevention of a disease or condition, e.g., a disease or condition involving weakness and atrophy of muscles (e.g., a neuromuscular disease, such as a muscular dystrophy, SMA, CMT, myasthenia gravis, or multiple sclerosis; or cachexia), a disease or condition involving bone damage (e.g., osteogenesis imperfecta, neuromuscular disease-related bone loss, burn-induced bone loss, or anorexia-related bone loss), a disease or condition involving low red blood cell levels (e.g., myelofibrosis or a myelodysplastic syndrome), a disease or condition involving low platelet levels (e.g., thrombocytopenia), a disease or condition involving low neutrophil levels (e.g., neutropenia), or a metabolic disease, using methods and compositions of the invention. Generally, treating a disease or condition involving weakness and atrophy of muscles, bone damage, low red blood cell levels, low platelet levels, low neutrophil levels, or a metabolic disease occurs after a subject has developed the disease or condition. Preventing a disease or condition involving weakness and atrophy of muscles, bone damage, low red blood cell levels, low platelet levels, low neutrophil levels, or a metabolic disease refers to steps or procedures taken when a subject is at risk of developing the disease or condition. The subject may show signs or mild symptoms that are judged by a physician to be indications or risk factors for developing a disease or condition involving weakness and atrophy of muscles, bone damage, low red blood cell levels, low platelet levels, low neutrophil levels, or a metabolic disease, have another disease or condition associated with the development of a disease or condition involving weakness and atrophy of muscles, bone damage, low red blood cell levels, low platelet levels, low neutrophil levels, or a metabolic disease, be undergoing treatment that may cause a disease or condition involving weakness and atrophy of muscles, bone damage, low red blood cell levels, low platelet levels, low neutrophil levels, or a metabolic disease, or have a family history or genetic predisposition of developing a disease or condition involving weakness and atrophy of muscles, bone damage, low red blood cell levels, low platelet levels, low neutrophil levels, or a metabolic disease, but has not yet developed the disease or condition.

As used herein, the term "subject" refers to a mammal, e.g., preferably a human. Mammals include, but are not limited to, humans and domestic and farm animals, such as monkeys (e.g., a cynomolgus monkey), mice, dogs, cats, horses, and cows, etc.

DESCRIPTION OF THE DRAWINGS

Figure 1:
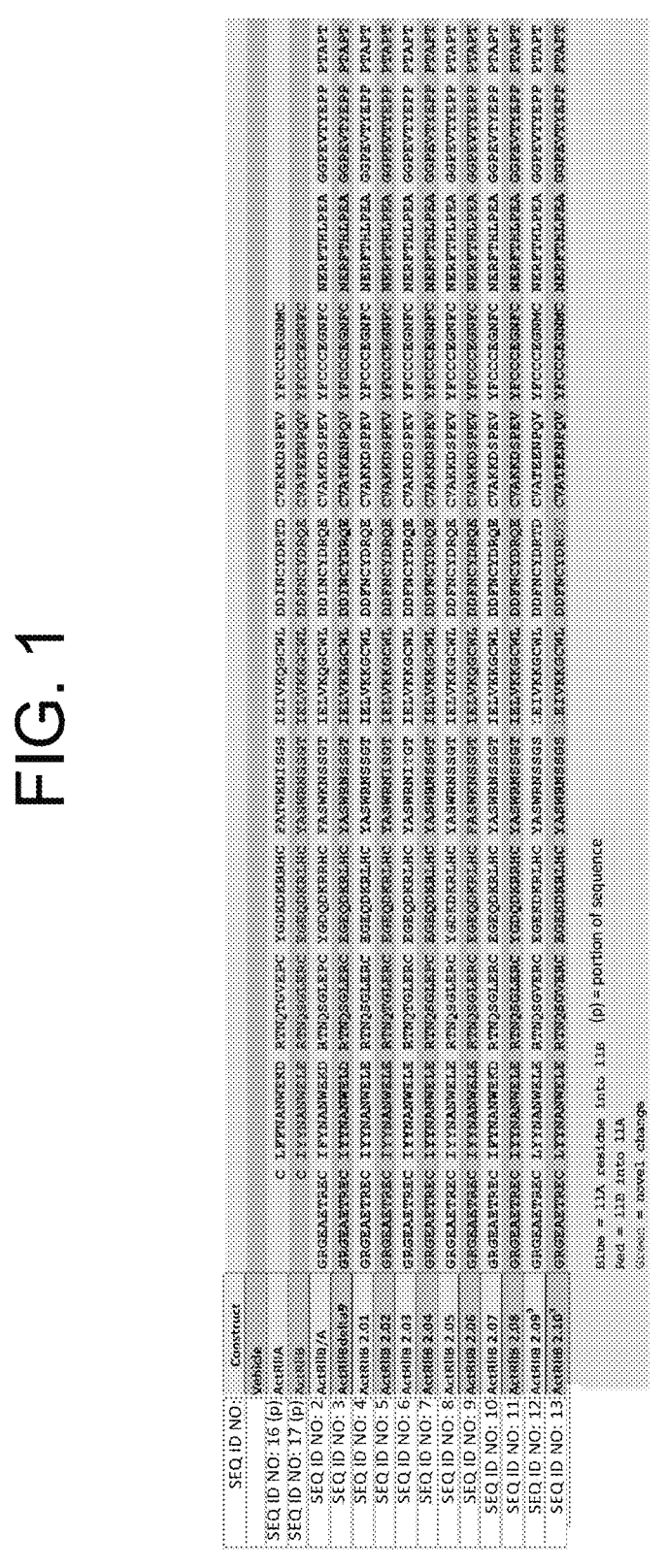

FIG. 1 is a sequence alignment showing the wild-type sequences of extracellular ActRIIA and ActRIIB and the amino acid substitutions in exemplary ActRIIB variants.

FIG. 2D shows the results of incubating ActRIIB 2.12-Fc with BMP-9. Data displayed are mean±SD.

FIG. 3F provides representative μCT images from vehicle- and ActRIIB 2.12-Fc-treated mouse tibias. $p<0.01$; *$p<0.001$ versus vehicle. Data are displayed as mean+SEM.

FIG. 5A shows the serum concentration of each variant. The percent changes in body-weight and lean mass observed after treatment are shown in FIGS. 5B-5C. FIGS. 5D-5G show the effect of the ActRIIB variants on red cell mass parameters, including RBC levels, hemoglobin levels, hematocrit levels, and reticulocytes. Data are shown as average±SEM. Statistics were performed using 1-way ANOVA with a Fisher's LSD post test and are shown relative to vehicle. *P≤0.05, P<0.01, *P<0.001, and ****P<0.0001.

DETAILED DESCRIPTION OF THE INVENTION

Figure 2A:
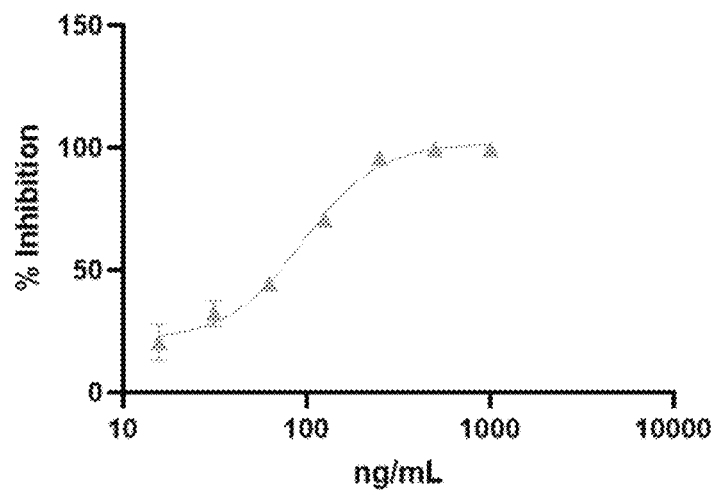
FIGS. 2A-2D are a series of graphs showing that ActRIIB 2.12 (SEQ ID NO: 15)-Fc inhibits transforming growth factor β (TGF-β) superfamily ligands GDF-11 (FIG. 2A), activin A (FIG. 2B), and activin B (FIG. 2C), which normally signal through SMAD2/3 and suppress bone production.
Figure 2B:
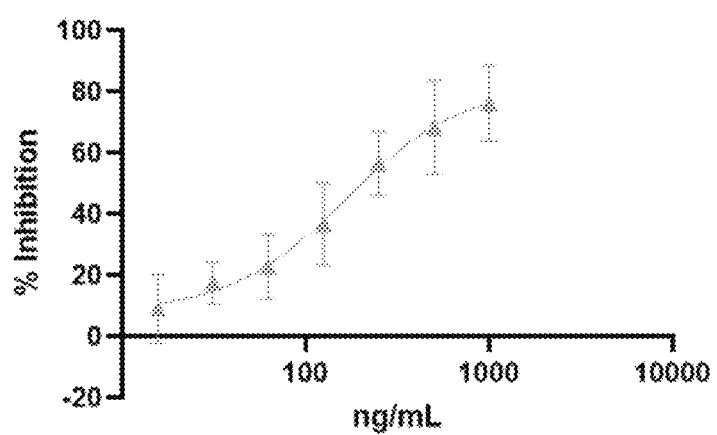
Figure 2C:
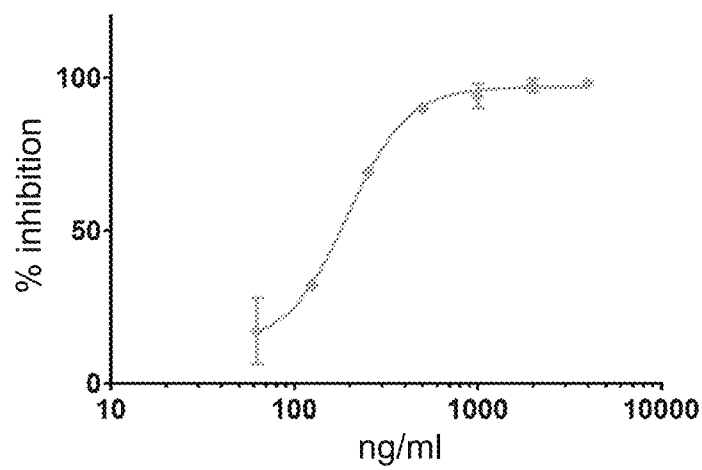
Figure 2D:
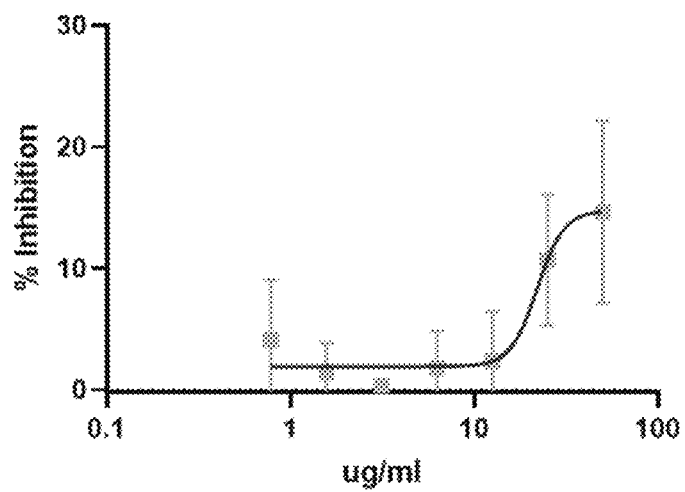

The invention features polypeptides that include an extracellular activin receptor type IIB (ActRIIB) variant. In some embodiments, a polypeptide of the invention includes an extracellular ActRIIB variant fused to a moiety (e.g., Fc domain monomer, a wild-type Fc domain, an Fc domain with amino acid substitutions (e.g., one or more substitutions that reduce dimerization), an albumin-binding peptide, a fibronectin domain, or a human serum albumin). A polypeptide including an extracellular ActRIIB variant fused to an Fc domain monomer may also form a dimer (e.g., homodimer or heterodimer) through the interaction between two Fc domain monomers. The ActRIIB variants described herein may have reduced binding to bone morphogenetic protein 9 (BMP9) relative to the wild-type extracellular ActRIIB, or have weak binding affinity or no binding affinity to BMP9 compared to binding affinity to activins and myostatin. The invention also includes methods of treating diseases and conditions involving weakness and atrophy of muscles (e.g., neuromuscular diseases, cachexia, disuse atrophy, and hypotonia), methods of treating or preventing bone damage (e.g., osteogenesis imperfecta or burn injury-related or anorexia-related bone loss), methods of treating or preventing low blood cell levels (e.g., anemia, such as anemia related to myelofibrosis or a myelodysplastic syndrome) by increasing red blood cell levels (e.g., red blood cell count, hemoglobin levels, or hematocrit), red blood cell production, or erythroid progenitor maturation and/or differentiation (e.g., the maturation and/or differentiation of early-stage or late- (e.g., terminal) stage erythroid progenitors into proerythroblasts, reticulocytes, or red blood cells), late-stage precursor (erythroid precursor) maturation (e.g., terminal maturation, such as the maturation of reticulocytes into red blood cells or the maturation of erythroblasts into reticulocytes and/or red blood cells), by recruiting early-stage progenitors into the erythroid lineage, by reducing the accumulation of red blood cell progenitor cells (e.g., by stimulating progenitor cells to progress to maturation), by increasing the number of early-stage erythroid precursors and/or progenitors (e.g., by expanding the early-stage precursor and/or progenitor population to provide a continuous supply of precursors to replenish polychromatic erythroblasts and allow for a continuous supply of maturing reticulocytes), or by promoting the progression of erythroid precursors and/or progenitors through erythropoiesis, methods of treating or preventing low platelet levels (e.g., thrombocytopenia) by increasing platelet levels (e.g., platelet count, megakaryocyte differentiation and/or maturation, and/or platelet production) or by reducing the accumulation of platelet progenitor cells (e.g., by stimulating progenitor cells to progress to maturation), methods of treating or preventing low neutrophil levels (e.g., neutropenia) by increasing neutrophil levels (e.g., neutrophil count, e.g., neutrophil production) or differentiation and/or maturation of progenitor cells (e.g., myeloid progenitors, myeloblasts, or myelocytes) into neutrophils, methods of treating or preventing metabolic disease (e.g., obesity, Type 1 diabetes, or Type 2 diabetes), or methods of affecting myostatin, activin (e.g., activin A and/or activin B), and/or BMP9 signaling in a subject by administering to the subject a polypeptide including an extracellular ActRIIB variant described herein.

I. Extracellular Activin Receptor Type IIB Variants

Activin type II receptors are single transmembrane domain receptors that modulate signals for ligands in the transforming growth factor β (TGF-β) superfamily. Ligands in the TGF-β superfamily are involved in a host of physiological processes, such as muscle growth, vascular growth, cell differentiation, homeostasis, and osteogenesis. Examples of ligands in the TGF-β superfamily include, e.g., activin (e.g., activin A and activin B), inhibin, growth differentiation factors (GDFs) (e.g., GDF8, also known as myostatin), and bone morphogenetic proteins (BMPs) (e.g., BMP9).

Myostatin and activins are known to play a role in the regulation of skeletal muscle growth. For example, mice without myostatin show a large increase in skeletal muscle mass. In addition, activins are expressed abundantly in bone tissues and regulate bone formation by controlling both osteoblast and osteoclast functions. Activin A has been reported to be upregulated in bone disease and inhibits osteoblast activity. Myostatin is also implicated in bone homeostasis through increasing osteogenesis and inhibiting osteoblast activity. TGF-β signaling pathways also regulate hematopoiesis, with signaling pathways involving activins preventing the differentiation of red blood cell, platelet, and neutrophil progenitor cells in order to maintain progenitor cells in a quiescent state, and signaling pathways involving BMPs promoting differentiation of progenitor cells. Homeostasis of this process is essential to ensure that all cell types, including red cells, white cells, and platelets, are properly replenished in the blood. Relatedly, activin receptor ligand GDF11 has been found to be overexpressed in a mouse model of hemolytic anemia and associated with defects in red blood cell production. Furthermore, activins are highly expressed in adipose tissue, and increased myostatin levels and activin receptor levels have been observed in subcutaneous and visceral fat of obese mice. Additionally, myostatin has been shown to be elevated in skeletal muscle and plasma of obese and insulin resistant women, and both type I and type II activin receptors have been linked to pancreatic function and diabetes. These data suggest that increased signaling through activin receptors, either due to increased expression of activin receptor ligands (e.g., activin A, activin B, myostatin) or increased expression of activin receptors themselves, could contribute to a variety of diseases and conditions, including muscle atrophy or weakness, bone disease, anemia, thrombocytopenia, neutropenia, and metabolic disease. Methods that reduce or inhibit activin or myostatin signaling could, therefore, be used in the treatment of diseases and conditions involving muscle atrophy or weakness (e.g., neuromuscular diseases), bone damage (e.g., osteogenesis imperfecta), low red blood cell levels (e.g., anemia), low platelet levels (e.g., thrombocytopenia), low neutrophil levels (e.g., neutropenia), or metabolic disorders (e.g., obesity, Type 1 diabetes, or Type 2 diabetes).

There exist two types of activin type II receptors: ActRIIA and ActRIIB. Studies have shown that BMP9 binds ActRIIB with about 300-fold higher binding affinity than ActRIIA (see, e.g., Townson et al., *J. Biol. Chem.* 287:27313, 2012). ActRIIA-Fc is known to have a longer half-life compared to ActRIIB-Fc. The present invention describes extracellular ActRIIB variants that are constructed by introducing amino acid residues of ActRIIA into ActRIIB, or by introducing novel amino acid substitutions, with the goal of reducing BMP9 binding to prevent or reduce disruption of endogenous BMP9 signaling. The amino acid substitutions may also impart beneficial physiological and pharmacokinetic properties of ActRIIA, such as longer half-life as an Fc fusion protein or the capability to increase red blood cell levels. The optimum peptides increase muscle mass or lean mass, reduce bone damage, increase red blood cell levels (e.g., increase red blood cell production, increase red blood cell count, increase hemoglobin levels, or increase hematocrit), increase erythroid progenitor (e.g., early and/or terminal stage erythroid progenitor) maturation and/or differentiation, recruit early-stage progenitors into the erythroid lineage, increase late-stage erythroid precursor maturation (e.g., terminal maturation, such as the maturation of reticulocytes into red blood cells, or the maturation of erythroblasts into reticulocytes and/or red blood cells), increase the number of early-stage erythroid precursors and/or progenitors (e.g., expand the early-stage precursor and/or progenitor populations), promote the progression of erythroid precursors and/or progenitors through erythropoiesis, increase platelet levels (e.g., increase platelet count), increase neutrophil levels (e.g., increase neutrophil count), and/or reduce body fat or body weight, while having reduced binding affinity to BMP9, for example. The preferred ActRIIB variants also exhibit similar or improved binding to activins and/or myostatin compared to wild-type ActRIIB, which allows them to compete with endogenous activin receptors for ligand binding and reduce or inhibit endogenous activin receptor signaling. These variants can be used to treat disorders in which activin receptor signaling is elevated, such as muscle disease (e.g., neuromuscular disease, cachexia, hypotonia or disuse atrophy), bone disease (e.g., osteogenesis imperfecta or burn injury-related or anorexia-related bone loss), anemia (e.g., anemia associated with myelofibrosis or a myelodysplastic syndrome), thrombocytopenia, neutropenia, or metabolic disease (e.g., obesity, Type 1 diabetes, or Type 2 diabetes) by increasing lean mass or muscle strength, reducing bone resorption, increasing bone mineral density or bone formation, increasing red blood cell levels (e.g., increasing hemoglobin levels, hematocrit, or red blood cell count, e.g., increasing red blood cell production and/or red cell mass or volume), increasing erythroid progenitor maturation and/or differentiation (e.g., the maturation and/or differentiation of early-stage or late- (e.g., terminal) stage erythroid progenitors into proerythroblasts, reticulocytes, or red blood cells), reducing the accumulation of red blood cell progenitor cells (e.g., by stimulating progenitor cells to progress to maturation), increasing late-stage precursor (erythroid precursor) maturation (e.g., terminal maturation, such as the maturation of reticulocytes into red blood cells, or the maturation of erythroblasts into reticulocytes and/or red blood cells), recruiting early-stage progenitors into the erythroid lineage, increasing the number of early-stage erythroid precursors and/or progenitors, promoting the progression of erythroid precursors and/or progenitors through erythropoiesis (e.g., progression through the erythropoiesis pathway), increasing platelet levels (e.g., increasing platelet count, megakaryocyte differentiation and/or maturation, and/or platelet production), reducing the accumulation of platelet progenitor cells, increasing neutrophil levels (e.g., increasing neutrophil count, e.g., increasing neutrophil production), increasing the differentiation and/or maturation of progenitor cells (e.g., myeloid progenitors, myeloblasts, or myelocytes) into neutrophils, or reducing body fat, body weight, blood glucose levels, or insulin resistance. In some embodiments, amino acid substitutions may be introduced to an extracellular ActRIIB variant to reduce or remove the binding affinity of the variant to BMP9. The wild-type amino acid sequences of the extracellular portions of human ActRIIA and ActRIIB are shown below.

Human ActRIIA, extracellular portion (SEQ ID NO: 16):
GAILGRSETQECLFFNANWEKDRTNQTGVEPCYGDKDKRRHCFATWKNIS

GSIEIVKQGCWLDDINCYDRTDCVEKKDSPEVYFCCCEGNMCNEKFSYFP

EMEVTQPTS

Human ActRIIB, extracellular portion (SEQ ID NO: 17):
GRGEAETRECIYYNANWELERTNQSGLERCEGEQDKRLHCYASWRNSSGT

IELVKKGCWLDDFNCYDRQECVATEENPQVYFCCCEGNFCNERFTHLPEA

GGPEVTYEPPPTAPT

Polypeptides described herein include an extracellular ActRIIB variant having at least one amino acid substitution relative to the wild-type extracellular ActRIIB having the sequence of SEQ ID NO: 17. Possible amino acid substitutions at 28 different positions may be introduced to an extracellular ActRIIB variant (Table 1). An extracellular ActRIIB variant may have one or more (e.g., 1-28, 1-25, 1-23, 1-21, 1-19, 1-17, 1-15, 1-13, 1-11, 1-9, 1-7, 1-5, 1-3, or 1-2; e.g., 1, 2, 3, 4, 5, 6, 7, 8, 9, 10, 11, 12, 13, 14, 15, 16, 17, 18, 19, 20, 21, 22, 23, 24, 25, 26, 27, or 28) amino acid substitutions relative the sequence of a wild-type extracellular ActRIIB (SEQ ID NO: 17). In some embodiments, an extracellular ActRIIB variant (e.g., an extracellular ActRIIB variant having a sequence of SEQ ID NO: 1) may include amino acid substitutions at all of the 28 positions as listed in Table 1. In some embodiments, an extracellular ActRIIB variant may include amino acid substitutions at a number of positions, e.g., at 3, 4, 5, 6, 7, 8, 9, 10, 12, 15, 16, 18, 20, 22, 24, 26, or 27 out of the 28 positions, as listed in Table 1. In some embodiments, the substitutions are substitutions of an amino acid from ActRIIA into the same position in ActRIIB. In some embodiments, the substitutions are novel changes (e.g., substitutions of amino acids that are not in the corresponding position of ActRIIA, e.g., S48T, 151 L, Q69D, or E70T).

Amino acid substitutions can worsen or improve the activity and/or binding affinity of the ActRIIB variants of the invention (e.g., an extracellular ActRIIB variant having the sequence of any one of SEQ ID NOs: 1-15 (e.g., SEQ ID NOs: 2-15)). In some embodiments, the amino acid substitutions worsen the binding affinity of the ActRIIB variants to BMP9 (e.g., the variants have reduced binding to BMP9 relative to wild-type extracellular ActRIIB, or have lower binding to BMP9 than to other ActRIIB ligands (e.g., activin A or B, myostatin, or GDF-11)). In some embodiments, the ActRIIB variants have reduced, weak, or no substantial binding to BMP9. In some embodiments, the amino acid substitutions improve the binding affinity of ActRIIB to myostatin, activin A or B, and/or GDF-11 (e.g., the variants have improved binding affinity relative to wild-type extracellular ActRIIB, or bind more strongly to myostatin, activin A or B, or GDF-11 than to BMP9). In some embodiments, the amino acid substitutions reduce the binding affinity of ActRIIB to myostatin, activin A or B, and/or GDF-11 (e.g., the variants have decreased binding affinity relative to wild-type extracellular ActRIIB, or bind more weakly to myostatin, activin A or B, or GDF-11 than to BMP9). In some embodiments, the amino acid substitutions do not substantially change extracellular ActRIIB function (e.g., the ActRIIB variants increase lean mass, muscle mass, bone mineral density, or reduce or prevent fibrosis, by a similar amount as wild-type extracellular ActRIIB, e.g., the ActRIIB variants are functionally equivalent to the wild-type extracellular ActRIIB). In some embodiments, the amino acid substitutions confer an ActRIIA property or activity on the ActRIIB variant (e.g., the ActRIIB variant can increase red blood cell levels or has a longer half-life as an Fc fusion protein than WT extracellular ActRIIB-Fc). Preferably, the ActRIIB variants have one or more, two or more, or three or more of the above properties (e.g., reduced BMP9 binding and improved binding to activin A or B, myostatin, and/or GDF-11, or reduced BMP9 binding and functional equivalence to wild-type ActRIIB in increasing lean mass, muscle mass, or bone mineral density, or reducing or preventing fibrosis).

The ActRIIB variants of the invention (e.g., an extracellular ActRIIB variant having the sequence of any one of SEQ ID NOs: 1-15 (e.g., SEQ ID NOs: 2-15)) preferably have one or more amino acid substitutions that reduce BMP9 binding. In some embodiments, the amino acid substitution that reduces BMP9 binding is E75K (e.g., $X_{24}$ is K in SEQ ID NO: 1). In some embodiments, the amino acid substitutions that reduce BMP9 binding are Q69T and E70D (e.g., $X_{21}$ is T and $X_{22}$ is D in SEQ ID NO: 1). In some embodiments, the amino acid substitutions that reduce BMP9 binding are Q69D and E70T (e.g., $X_{21}$ is D and $X_{22}$ is T in SEQ ID NO: 1). In some embodiments, the amino acid substitutions that reduce BMP9 binding are T74K, E75K, E76D, N77S, and Q79E (e.g., $X_{23}$, $X_{24}$, $X_{25}$, $X_{26}$, and $X_{28}$ are K, K, D, S, and E, respectively, in SEQ ID NO: 1). In some embodiments, the ActRIIB variants have more than one of the aforementioned amino acid substitutions that reduce BMP9 binding (e.g., substitution E75K and substitutions Q69D and E70T, or substitution E75K and substitutions Q69T and E70D). In some embodiments, the ActRIIB variants of the invention have one or more amino acid substitutions that reduce BMP9 binding, and one or more additional amino acid substitutions. The additional amino acid substitutions may confer other beneficial properties, such as altered binding to activins or myostatin or improved activity. For example, amino acid substitutions T74K, E75K, E76D, N77S, and Q79E lead to a reduction in ActRIIB variant activity (e.g., the variant has a reduced effect on lean mass and muscle mass compared to wild-type extracellular ActRIIB), but including additional substitutions S25T and S47I; E31Y, E33D, and Q34K; or Y41F, R45K, and K56Q improves the effect of the ActRIIB variant on lean mass and/or muscle mass. The additional amino acid substitutions may include one or more of substitutions I11L, Y12F, L19K, E20D, S25T, L27V, R29P, E31Y, E33D, Q34K, L38R, Y41F, R45K, S47I, S48T, T50S, I51L, L53I, K56Q, F63I, T74K, E76D, N77S, Q79E, or F89M.

In some embodiments, a polypeptide described herein includes an extracellular ActRIIB variant having the sequence of SEQ ID NO: 1.

TABLE 1

Amino acid substitutions in an extracellular ActRIIB variant having a sequence of SEQ ID NO: 1

GRGEAETRECX$_1$X$_2$YNANWEX$_3$X$_4$RTNQX$_5$GX$_6$EX$_7$CX$_8$GX$_9$X$_{10}$DKR
X$_{11}$HCX$_{12}$ASWX$_{13}$NX$_{14}$X$_{15}$GX$_{16}$X$_{17}$EX$_{18}$VKX$_{19}$GCWLDDX$_{20}$NC
YDRX$_{21}$X$_{22}$CVAX$_{23}$X$_{24}$X$_{25}$X$_{26}$PX$_{27}$VYFCCCEGNX$_{28}$CNERFTHL
PEAGGPEVTYEPPPTAPT
(SEQ ID NO: 1)

| | | | |
|---|---|---|---|
| $X_1$ | I or L | $X_{15}$ | S or T |
| $X_2$ | F or Y | $X_{16}$ | S or T |
| $X_3$ | L or K | $X_{17}$ | I or L |
| $X_4$ | D or E | $X_{18}$ | I or L |
| $X_5$ | T or S | $X_{19}$ | K or Q |
| $X_6$ | L or V | $X_{20}$ | F or I |
| $X_7$ | P or R | $X_{21}$ | Q, T, or D |
| $X_8$ | Y or E | $X_{22}$ | E, D, or T |
| $X_9$ | D or E | $X_{23}$ | K or T |
| $X_{10}$ | K or Q | $X_{24}$ | K or E |
| $X_{11}$ | R or L | $X_{25}$ | D or E |
| $X_{12}$ | Y or F | $X_{26}$ | S or N |
| $X_{13}$ | R or K | $X_{27}$ | E or Q |
| $X_{14}$ | S or I | $X_{28}$ | F or M |

In some embodiments, a polypeptide described herein includes an extracellular ActRIIB variant having a sequence of any one of SEQ ID NOs: 2-15 (Table 2).

TABLE 2

Extracellular ActRIIB variants having the sequences of SEQ ID NOs: 2-15

| SEQ ID NO | Amino Acid Sequence |
|---|---|
| 2 | GRGEAETRECIFYNANWEKDRTNQSGLEPCYGDQDKRRHCFASWKNSSGTIELVK QGCWLDDINCYDRQECVAKKDSPEVYFCCCEGNFCNERFTHLPEAGGPEVTYEP PPTAPT |

TABLE 2-continued

Extracellular ActRIIB variants having the sequences of SEQ ID NOs: 2-15

| SEQ ID NO | Amino Acid Sequence |
|---|---|
| 3 | GRGEAETRECIYYNANWELDRTNQSGLERCEGEQDKRLHCYASWRNSSGTIELVK<br>KGCWLDDINCYDRQECVATKENPQVYFCCCEGNFCNERFTHLPEAGGPEVTYEPP<br>PTAPT |
| 4 | GRGEAETRECIYYNANWELERTNQSGLERCEGEQDKRLHCYASWRNSSGTIELVK<br>KGCWLDDFNCYDRQECVAKKDSPEVYFCCCEGNFCNERFTHLPEAGGPEVTYEP<br>PPTAPT |
| 5 | GRGEAETRECIYYNANWELERTNQTGLERCEGEQDKRLHCYASWRNISGTIELVK<br>KGCWLDDFNCYDRQECVAKKDSPEVYFCCCEGNFCNERFTHLPEAGGPEVTYEP<br>PPTAPT |
| 6 | GRGEAETRECIYYNANWELERTNQTGLERCEGEQDKRLHCYASWRNITGTIELVKK<br>GCWLDDFNCYDRQECVAKKDSPEVYFCCCEGNFCNERFTHLPEAGGPEVTYEPP<br>PTAPT |
| 7 | GRGEAETRECIYYNANWELERTNQSGLEPCEGEQDKRLHCYASWRNSSGTIELVK<br>KGCWLDDFNCYDRQECVAKKDSPEVYFCCCEGNFCNERFTHLPEAGGPEVTYEP<br>PPTAPT |
| 8 | GRGEAETRECIYYNANWELERTNQSGLERCYGDKDKRLHCYASWRNSSGTIELVK<br>KGCWLDDFNCYDRQECVAKKDSPEVYFCCCEGNFCNERFTHLPEAGGPEVTYEP<br>PPTAPT |
| 9 | GRGEAETRECIYYNANWELERTNQSGLERCEGEQDKRLHCFASWKNSSGTIELVK<br>QGCWLDDFNCYDRQECVAKKDSPEVYFCCCEGNFCNERFTHLPEAGGPEVTYEP<br>PPTAPT |
| 10 | GRGEAETRECIFYNANWEKDRTNQSGLERCEGEQDKRLHCYASWRNSSGTIELVK<br>KGCWLDDFNCYDRQECVAKKDSPEVYFCCCEGNFCNERFTHLPEAGGPEVTYEP<br>PPTAPT |
| 11 | GRGEAETRECIYYNANWELERTNQSGLERCYGDQDKRRHCYASWRNSSGTIELV<br>KKGCWLDDFNCYDRQECVAKKDSPEVYFCCCEGNFCNERFTHLPEAGGPEVTYE<br>PPPTAPT |
| 12 | GRGEAETRECLYYNANWELERTNQSGVERCEGEKDKRLHCYASWRNSSGSLEIV<br>KKGCWLDDFNCYDRTDCVATEENPQVYFCCCEGNMCNERFTHLPEAGGPEVTYE<br>PPPTAPT |
| 13 | GRGEAETRECLYYNANWELERTNQSGVERCEGEKDKRLHCYASWRNSSGSLEIV<br>KKGCWLDDFNCYDRDTCVATEENPQVYFCCCEGNMCNERFTHLPEAGGPEVTYE<br>PPPTAPT |
| 14 | GRGEAETRECLYYNANWELERTNQSGVERCEGEKDKRLHCYASWRNSSGSLEIV<br>KKGCWLDDFNCYDRDTCVATKENPQVYFCCCEGNMCNERFTHLPEAGGPEVTYE<br>PPPTAPT |
| 15 | GRGEAETRECLYYNANWELERTNQSGVERCEGEKDKRLHCYASWRNSSGSLEIV<br>KKGCWLDDFNCYDRDTCVATKENPQVYFCCCEGNMCNERFTHLPEAGGPEVTYE<br>PPPTAPT |

In some embodiments, the extracellular ActRIIB variants described herein have an N-terminal truncation of 1-7 amino acids (e.g., 1, 2, 3, 4, 5, 6, or 7 amino acids). The N-terminal truncation can involve the removal of 1-7 amino acids from the N-terminus of any of the ActRIIB variants shown in Tables 1 and 2. The N-terminal truncation can remove amino acids up two to amino acids before the first cysteine (e.g., the two amino acids before the first cysteine (RE) are retained in the N-terminally truncated ActRIIB variants).

In some embodiments, a polypeptide of the invention including an extracellular ActRIIB variant may further include a moiety (e.g., Fc domain monomer, a wild-type Fc domain, an Fc domain with amino acid substitutions (e.g., one or more substitutions that reduce dimerization), an albumin-binding peptide, a fibronectin domain, or a human serum albumin), which may be fused to the N- or C-terminus (e.g., C-terminus) of the extracellular ActRIIB variant by way of a linker or other covalent bonds. A polypeptide including an extracellular ActRIIB variant fused to an Fc domain monomer may form a dimer (e.g., homodimer or heterodimer) through the interaction between two Fc domain monomers, which combine to form an Fc domain in the dimer.

Furthermore, in some embodiments, a polypeptide described herein (e.g., an ActRIIB variant-Fc fusion protein) has a serum half-life of at least 7 days in humans. The polypeptide may bind to activin A with a $K_D$ of 10 pM or higher. In some embodiments, the polypeptide does not bind to BMP9 or activin A. In some embodiments, the polypeptide binds to activin A, activin B, and/or myostatin and exhibits reduced (e.g., weak) binding to BMP9. In some embodiments, the polypeptide does not substantially bind to human BMP9.

In some embodiments, the polypeptide may bind to human activin A with a $K_D$ of about 800 pM or less (e.g., a $K_D$ of about 800, 700, 600, 500, 400, 300, 200, 100, 90, 80, 70, 60, 50, 40, 30, 20, 10, 9, 8, 7, 6, 5, 4, 3, 2, or 1 pM or less, e.g., a $K_D$ of between about 800 pM and about 200 pM). In some embodiments, the polypeptide may bind to human activin B with a $K_D$ of 800 pM or less (e.g., a $K_D$ of about 800, 700, 600, 500, 400, 300, 200, 100, 90, 80, 70, 60, 50, 40, 30, 20, 10, 9, 8, 7, 6, 5, 4, 3, 2, or 1 pM or less, e.g., a $K_D$ of between about 800 pM and about 200 pM) The polypeptide may also bind to growth and differentiation factor 11 (GDF-11) with a $K_D$ of approximately 5 pM or higher (e.g., a $K_D$ of about 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200 pM or higher).

II. Fc Domains

In some embodiments, a polypeptide described herein may include an extracellular ActRIIB variant fused to an Fc domain monomer of an immunoglobulin or a fragment of an Fc domain to increase the serum half-life of the polypeptide. A polypeptide including an extracellular ActRIIB variant fused to an Fc domain monomer may form a dimer (e.g., homodimer or heterodimer) through the interaction between two Fc domain monomers, which form an Fc domain in the dimer. As conventionally known in the art, an Fc domain is the protein structure that is found at the C-terminus of an immunoglobulin. An Fc domain includes two Fc domain monomers that are dimerized by the interaction between the $C_H3$ antibody constant domains. A wild-type Fc domain forms the minimum structure that binds to an Fc receptor, e.g., FcγRI, FcγRIIa, FcγRIIb, FcγRIIIa, FcγRIIIb, FcγRIV. In some embodiments, an Fc domain may be mutated to lack effector functions, typical of a "dead" Fc domain. For example, an Fc domain may include specific amino acid substitutions that are known to minimize the interaction between the Fc domain and an Fcγ receptor. In some embodiments, an Fc domain is from an IgG1 antibody and includes amino acid substitutions L234A, L235A, and G237A. In some embodiments, an Fc domain is from an IgG1 antibody and includes amino acid substitutions D265A, K322A, and N434A. The aforementioned amino acid positions are defined according to Kabat (Sequences of Proteins of Immunological Interest, 5th Ed. Public Health Service, National Institutes of Health, Bethesda, MD. (1991)). The Kabat numbering of amino acid residues may be determined for a given antibody by alignment at regions of homology of the sequence of the antibody with a "standard" Kabat numbered sequence. Furthermore, in some embodiments, an Fc domain does not induce any immune system-related response. For example, the Fc domain in a dimer of a polypeptide including an extracellular ActRIIB variant fused to an Fc domain monomer may be modified to reduce the interaction or binding between the Fc domain and an Fcγ receptor. The sequence of an Fc domain monomer that may be fused to an extracellular ActRIIB variant is shown below (SEQ ID NO: 19):

```
THTCPPCPAPELLGGPSVFLFPPKPKDTLMISRTPEVTCVVVDVSHEDPE

VKFNWYVDGVEVHNAKTKPREEQYNSTYRVVSVLTVLHQDWLNGKEYKCK

VSNKALPVPIEKTISKAKGQPREPQVYTLPPSREEMTKNQVSLTCLVKGF

YPSDIAVEWESNGQPENNYKTTPPVLDSDGPFFLYSKLTVDKSRWQQGNV

FSCSVMHEALHNHYTQKSLSLSPGK
```

In some embodiments, an Fc domain is from an IgG1 antibody and includes amino acid substitutions L12A, L13A, and G15A, relative to the sequence of SEQ ID NO: 19. In some embodiments, an Fc domain is from an IgG1 antibody and includes amino acid substitutions D43A, K100A, and N212A, relative to the sequence of SEQ ID NO: 19. In some embodiments, the terminal lysine is absent from the Fc domain monomer having the sequence of SEQ ID NO: 19. In some embodiments, an extracellular ActRIIB variant described herein (e.g., an extracellular ActRIIB variant having the sequence of any one of SEQ ID NOs: 1-15 (e.g., SEQ ID NOs: 2-15)) may be fused to the N- or C-terminus of an Fc domain monomer (e.g., SEQ ID NO: 19) through conventional genetic or chemical means, e.g., chemical conjugation. If desired, a linker (e.g., a spacer) can be inserted between the extracellular ActRIIB variant and the Fc domain monomer. The Fc domain monomer can be fused to the N- or C-terminus (e.g., C-terminus) of the extracellular ActRIIB variant.

In some embodiments, a polypeptide described herein may include an extracellular ActRIIB variant fused to an Fc domain. In some embodiments, the Fc domain contains one or more amino acid substitutions that reduce or inhibit Fc domain dimerization. In some embodiments, the Fc domain contains a hinge domain. The Fc domain can be of immunoglobulin antibody isotype IgG, IgE, IgM, IgA, or IgD. Additionally, the Fc domain can be an IgG subtype (e.g., IgG1, IgG2a, IgG2b, IgG3, or IgG4). The Fc domain can also be a non-naturally occurring Fc domain, e.g., a recombinant Fc domain.

Methods of engineering Fc domains that have reduced dimerization are known in the art. In some embodiments, one or more amino acids with large side-chains (e.g., tyrosine or tryptophan) may be introduced to the $C_H3$-$C_H3$ dimer interface to hinder dimer formation due to steric clash. In other embodiments, one or more amino acids with small side-chains (e.g., alanine, valine, or threonine) may be introduced to the $C_H3$-$C_H3$ dimer interface to remove favorable interactions. Methods of introducing amino acids with large or small side-chains in the $C_H3$ domain are described in, e.g., Ying et al. (*J Biol Chem.* 287:19399-19408, 2012), U.S. Patent Publication No. 2006/0074225, U.S. Pat. Nos. 8,216,805 and 5,731,168, Ridgway et al. (*Protein Eng.* 9:617-612, 1996), Atwell et al. (J Mol Biol. 270:26-35, 1997), and Merchant et al. (*Nat Biotechnol.* 16:677-681, 1998), all of which are incorporated herein by reference in their entireties.

In yet other embodiments, one or more amino acid residues in the $C_H3$ domain that make up the $C_H3$-$C_H3$ interface between two Fc domains are replaced with positively-charged amino acid residues (e.g., lysine, arginine, or histidine) or negatively-charged amino acid residues (e.g., aspartic acid or glutamic acid) such that the interaction becomes electrostatically unfavorable depending on the specific charged amino acids introduced. Methods of introducing charged amino acids in the $C_H3$ domain to disfavor or prevent dimer formation are described in, e.g., Ying et al. (*J Biol Chem.* 287:19399-19408, 2012), U.S. Patent Publication Nos. 2006/0074225, 2012/0244578, and 2014/0024111, all of which are incorporated herein by reference in their entireties.

In some embodiments of the invention, an Fc domain includes one or more of the following amino acid substitutions: T366W, T366Y, T394W, F405W, Y349T, Y349E, Y349V, L351T, L351H, L351N, L352K, P353S, S354D, D356K, D356R, D356S, E357K, E357R, E357Q, S364A, T366E, L368T, L368Y, L368E, K370E, K370D, K370Q, K392E, K392D, T394N, P395N, P396T, V397T, V397Q, L398T, D399K, D399R, D399N, F405T, F405H, F405R, Y407T, Y407H, Y407I, K409E, K409D, K409T, and K409I, relative to the sequence of human IgG1. In some embodiments, the terminal lysine is absent from the Fc domain amino acid sequence. In one particular embodiment, an Fc domain includes the amino acid substitution T366W, relative to the sequence of human IgG1. The sequence of wild-type Fc domain is shown below in SEQ ID NO: 71:

DKTHTCPPCPAPELLGGPSVFLFPPKPKDTLMISRTPEVTCVVVDVSHED

PEVKFNWYVDGVEVHNAKTKPREEQYNSTYRVVSVLTVLHQDWLNGKEYK

CKVSNKALPAPIEKTISKAKGQPREPQVYTLPPSRDELTKNQVSLTCLVK

GFYPSDIAVEWESNGQPENNYKTTPPVLDSDGSFFLYSKLTVDKSRWQQG

NVFSCSVMHEALHNHYTQKSLSLSPGK

An exemplary sequence for a wild-type Fc domain lacking the terminal lysine is provided below (SEQ ID NO: 75):

DKTHTCPPCPAPELLGGPSVFLFPPKPKDTLMISRTPEVTCVVVDVSHED

PEVKFNWYVDGVEVHNAKTKPREEQYNSTYRVVSVLTVLHQDWLNGKEYK

CKVSNKALPAPIEKTISKAKGQPREPQVYTLPPSRDELTKNQVSLTCLVK

GFYPSDIAVEWESNGQPENNYKTTPPVLDSDGSFFLYSKLTVDKSRWQQG

NVFSCSVMHEALHNHYTQKSLSLSPG

III. Albumin-Binding Peptide

In some embodiments, a polypeptide described herein may include an extracellular ActRIIB variant fused to a serum protein-binding peptide. Binding to serum protein peptides can improve the pharmacokinetics of protein pharmaceuticals.

As one example, albumin-binding peptides that can be used in the methods and compositions described here are generally known in the art. In one embodiment, the albumin binding peptide includes the sequence DICLPRWGCLW (SEQ ID NO: 72).

In the present invention, albumin-binding peptides may be joined to the N- or C-terminus (e.g., C-terminus) of an extracellular ActRIIB variant described herein (e.g., an extracellular ActRIIB variant having the sequence of any one of SEQ ID NOs: 1-15 (e.g., SEQ ID NOs: 2-15)) to increase the serum half-life of the extracellular ActRIIB variant. In some embodiments, an albumin-binding peptide is joined, either directly or through a linker, to the N- or C-terminus of an extracellular ActRIIB variant.

In some embodiments, an extracellular ActRIIB variant described herein (e.g., an extracellular ActRIIB variant having the sequence of any one of SEQ ID NOs: 1-15 (e.g., SEQ ID NOs: 2-15)) may be fused to the N- or C-terminus of albumin-binding peptide (e.g., SEQ ID NO: 72) through conventional genetic or chemical means, e.g., chemical conjugation. If desired, a linker (e.g., a spacer) can be inserted between the extracellular ActRIIB variant and the albumin-binding peptide. Without being bound to a theory, it is expected that inclusion of an albumin-binding peptide in an extracellular ActRIIB variant described herein may lead to prolonged retention of the therapeutic protein through its binding to serum albumin.

IV. Fibronectin Domain

In some embodiments, a polypeptide described herein may include an extracellular ActRIIB variant fused to fibronectin domains. Binding to fibronectin domains can improve the pharmacokinetics of protein pharmaceuticals.

Fibronectin domain is a high molecular weight glycoprotein of the extracellular matrix, or a fragment thereof, that binds to, e.g., membrane-spanning receptor proteins such as integrins and extracellular matrix components such as collagens and fibrins. In some embodiments of the present invention, a fibronectin domain is joined to the N- or C-terminus (e.g., C-terminus) of an extracellular ActRIIB variant described herein (e.g., an extracellular ActRIIB variant having the sequence of any one of SEQ ID NOs: 1-15 (e.g., SEQ ID NOs: 2-15)) to increase the serum half-life of the extracellular ActRIIB variant. A fibronectin domain can be joined, either directly or through a linker, to the N- or C-terminus of an extracellular ActRIIB variant.

As one example, fibronectin domains that can be used in the methods and compositions described here are generally known in the art. In one embodiment, the fibronectin domain is a fibronectin type III domain having amino acids 610-702 of the sequence of UniProt ID NO: P02751 (SEQ ID NO: 73, below):

GPVEVFITETPSQPNSHPIQWNAPQPSHISKYILRWRPKNSVGRWKEATI

PGHLNSYTIKGLKPGVVYEGQLISIQQYGHQEVTRFDFTTTST

In another embodiment, the fibronectin domain is an adnectin protein.

In some embodiments, an extracellular ActRIIB variant described herein (e.g., an extracellular ActRIIB variant having the sequence of any one of SEQ ID NOs: 1-15 (e.g., SEQ ID NOs: 2-15)) may be fused to the N- or C-terminus of a fibronectin domain (e.g., SEQ ID NO: 73) through conventional genetic or chemical means, e.g., chemical conjugation. If desired, a linker (e.g., a spacer) can be inserted between the extracellular ActRIIB variant and the fibronectin domain. Without being bound to a theory, it is expected that inclusion of a fibronectin domain in an extracellular ActRIIB variant described herein may lead to prolonged retention of the therapeutic protein through its binding to integrins and extracellular matrix components such as collagens and fibrins.

V. Serum Albumin

In some embodiments, a polypeptide described herein may include an extracellular ActRIIB variant fused to serum albumin. Binding to serum albumins can improve the pharmacokinetics of protein pharmaceuticals.

Serum albumin is a globular protein that is the most abundant blood protein in mammals. Serum albumin is produced in the liver and constitutes about half of the blood serum proteins. It is monomeric and soluble in the blood. Some of the most crucial functions of serum albumin include transporting hormones, fatty acids, and other proteins in the body, buffering pH, and maintaining osmotic pressure needed for proper distribution of bodily fluids between blood vessels and body tissues. In preferred embodiments, serum albumin is human serum albumin. In some embodiments of the present invention, a human serum albumin is joined to the N- or C-terminus (e.g., C-terminus) of an extracellular ActRIIB variant described herein (e.g., an extracellular ActRIIB variant having the sequence of any one of SEQ ID NOs: 1-15 (e.g., SEQ ID NOs: 2-15)) to increase the serum half-life of the extracellular ActRIIB variant. A human serum albumin can be joined, either directly or through a linker, to the N- or C-terminus of an extracellular ActRIIB variant.

As one example, serum albumins that can be used in the methods and compositions described herein are generally known in the art. In one embodiment, the serum albumin includes the sequence of UniProt ID NO: P02768 (SEQ ID NO: 74, below):

```
MKWVTFISLLFLFSSAYSRGVFRRDAHKSEVAHRFKDLGEENFKALVLIA

FAQYLQQCPFEDHVKLVNEVTEFAKTCVADESAENCDKSLHTLFGDKLCT

VATLRETYGEMADCCAKQEPERNECFLQHKDDNPNLPRLVRPEVDVMCTA

FHDNEETFLKKYLYEIARRHPYFYAPELLFFAKRYKAAFTECCQAADKAA

CLLPKLDELRDEGKASSAKQRLKCASLQKFGERAFKAWAVARLSQRFPKA

EFAEVSKLVTDLTKVHTECCHGDLLECADDRADLAKYICENQDSISSKLK

ECCEKPLLEKSHCIAEVENDEMPADLPSLAADFVESKDVCKNYAEAKDVF

LGMFLYEYARRHPDYSVVLLLRLAKTYETTLEKCCAAADPHECYAKVFDE

FKPLVEEPQNLIKQNCELFEQLGEYKFQNALLVRYTKKVPQVSTPTLVEV

SRNLGKVGSKCCKHPEAKRMPCAEDYLSVVLNQLCVLHEKTPVSDRVTKC

CTESLVNRRPCFSALEVDETYVPKEFNAETFTFHADICTLSEKERQIKKQ

TALVELVKHKPKATKEQLKAVMDDFAAFVEKCCKADDKETCFAEEGKKLV

AASQAALGL
```

In some embodiments, an extracellular ActRIIB variant described herein (e.g., an extracellular ActRIIB variant having the sequence of any one of SEQ ID NOs: 1-15 (e.g., SEQ ID NOs: 2-15)) may be fused to the N- or C-terminus of a human serum albumin (e.g., SEQ ID NO: 74) through conventional genetic or chemical means, e.g., chemical conjugation. If desired, a linker (e.g., a spacer) can be inserted between the extracellular ActRIIB variant and the human serum albumin. Without being bound to a theory, it is expected that inclusion of a human serum albumin in an extracellular ActRIIB variant described herein may lead to prolonged retention of the therapeutic protein.

VI. Linkers

A polypeptide described herein may include an extracellular ActRIIB variant (e.g., an extracellular ActRIIB variant having a sequence of any one of SEQ ID NOs: 1-15 (e.g., SEQ ID NOs: 2-15)) fused to a moiety by way of a linker. In some embodiments, the moiety increases stability of the polypeptide.

Exemplary moieties include an Fc domain monomer, a wild-type Fc domain, an Fc domain with amino acid substitutions (e.g., one or more substitutions that reduce dimerization), an albumin-binding peptide, a fibronectin domain, or a human serum albumin. In the present invention, a linker between a moiety (e.g., an Fc domain monomer (e.g., the sequence of SEQ ID NO: 19), a wild-type Fc domain (e.g., SEQ ID NO: 71 or SEQ ID NO: 75), an Fc domain with amino acid substitutions (e.g., one or more substitutions that reduce dimerization), an albumin-binding peptide (e.g., SEQ ID NO: 72), a fibronectin domain (e.g., SEQ ID NO: 73), or a human serum albumin (e.g., SEQ ID NO: 74)) and an extracellular ActRIIB variant (e.g., an extracellular ActRIIB variant having the sequence of any one of SEQ ID NOs: 1-15 (e.g., SEQ ID NOs: 2-15)), can be an amino acid spacer including 1-200 amino acids. Suitable peptide spacers are known in the art, and include, for example, peptide linkers containing flexible amino acid residues such as glycine, alanine, and serine. In some embodiments, a spacer can contain motifs, multiple or repeating motifs, of GA, GS, GG, GGA, GGS, GGG, GGGA (SEQ ID NO: 20), GGGS (SEQ ID NO: 21), GGGG (SEQ ID NO: 22), GGGGA (SEQ ID NO: 23), GGGGS (SEQ ID NO: 24), GGGGG (SEQ ID NO: 25), GGAG (SEQ ID NO: 26), GGSG (SEQ ID NO: 27), AGGG (SEQ ID NO: 28), or SGGG (SEQ ID NO: 29). In some embodiments, a spacer can contain 2 to 12 amino acids including motifs of GA or GS, e.g., GA, GS, GAGA (SEQ ID NO: 30), GSGS (SEQ ID NO: 31), GAGAGA (SEQ ID NO: 32), GSGSGS (SEQ ID NO: 33), GAGAGAGA (SEQ ID NO: 34), GSGSGSGS (SEQ ID NO: 35), GAGAGAGAGA (SEQ ID NO: 36), GSGSGSGSGS (SEQ ID NO: 37), GAGAGAGAGAGA (SEQ ID NO: 38), and GSGSGSGSGSGS (SEQ ID NO: 39). In some embodiments, a spacer can contain 3 to 12 amino acids including motifs of GGA or GGS, e.g., GGA, GGS, GGAGGA (SEQ ID NO: 40), GGSGGS (SEQ ID NO: 41), GGAGGAGGA (SEQ ID NO: 42), GGSGGSGGS (SEQ ID NO: 43), GGAGGAGGAGGA (SEQ ID NO: 44), and GGSGGSGGSGGS (SEQ ID NO: 45). In yet some embodiments, a spacer can contain 4 to 12 amino acids including motifs of GGAG (SEQ ID NO: 26), GGSG (SEQ ID NO: 27), e.g., GGAG (SEQ ID NO: 26), GGSG (SEQ ID NO: 27), GGAGGGAG (SEQ ID NO: 46), GGSGGGSG (SEQ ID NO: 47), GGAGGGAGGGAG (SEQ ID NO: 48), and GGSGGGSGGGSG (SEQ ID NO: 49). In some embodiments, a spacer can contain motifs of GGGGA (SEQ ID NO: 23) or GGGGS (SEQ ID NO: 24), e.g., GGGGAGGGGAGGGGA (SEQ ID NO: 50) and GGGGSGGGGSGGGGS (SEQ ID NO: 51). In some embodiments of the invention, an amino acid spacer between a moiety (e.g., an Fc domain monomer, a wild-type Fc domain, an Fc domain with amino acid substitutions (e.g., one or more substitutions that reduce dimerization), an albumin-binding peptide, a fibronectin domain, or a human serum albumin) and an extracellular ActRIIB variant (e.g., an extracellular ActRIIB variant having the sequence of any one of SEQ ID NOs: 1-15 (e.g., SEQ ID NOs: 2-15)) may be GGG, GGGA (SEQ ID NO: 20), GGGG (SEQ ID NO: 22), GGGAG (SEQ ID NO: 52), GGGAGG (SEQ ID NO: 53), or GGGAGGG (SEQ ID NO: 54).

In some embodiments, a spacer can also contain amino acids other than glycine, alanine, and serine, e.g., AAAL (SEQ ID NO: 55), AAAK (SEQ ID NO: 56), AAAR (SEQ ID NO: 57), EGKSSGSGSESKST (SEQ ID NO: 58), GSAGSAAGSGEF (SEQ ID NO: 59), AEAAAKEAAAKA (SEQ ID NO: 60), KESGSVSSEQLAQFRSLD (SEQ ID NO: 61), GENLYFQSGG (SEQ ID NO: 62), SACYCELS (SEQ ID NO: 63), RSIAT (SEQ ID NO: 64), RPACKIPNDLKQKVMNH (SEQ ID NO: 65), GGSAGGSGSGSSGGSSGASGTGTAGGTGSGSGTGSG (SEQ ID NO: 66), AAANSSIDLISVPVDSR (SEQ ID NO: 67), or GGSGGGSEGGGSEGGGSEGGGSEGGGSEGGGSGGGS (SEQ ID NO: 68). In some embodiments, a spacer can contain motifs, e.g., multiple or repeating motifs, of EAAAK (SEQ ID NO: 69). In some embodiments, a spacer can contain motifs, e.g., multiple or repeating motifs, of proline-rich sequences such as $(XP)_n$, in which X may be any amino acid (e.g., A, K, or E) and n is from 1-5 (SEQ ID NO: 77), and PAPAP (SEQ ID NO: 70).

The length of the peptide spacer and the amino acids used can be adjusted depending on the two proteins involved and the degree of flexibility desired in the final protein fusion polypeptide. The length of the spacer can be adjusted to ensure proper protein folding and avoid aggregate formation.

In some embodiments, the linker between a moiety (e.g., an Fc domain monomer (e.g., the sequence of SEQ ID NO:

19), a wild-type Fc domain (e.g., SEQ ID NO: 71 or SEQ ID NO: 75), an Fc domain with amino acid substitutions (e.g., one or more substitutions that reduce dimerization), an albumin-binding peptide (e.g., SEQ ID NO: 72), a fibronectin domain (e.g., SEQ ID NO: 73), or a human serum albumin (e.g., SEQ ID NO: 74)) and an extracellular ActRIIB variant described herein (e.g., an extracellular ActRIIB variant having the sequence of any one of SEQ ID NOs: 1-15 (e.g., SEQ ID NOs: 2-15)), is an amino acid spacer having the sequence GGG. For example, a polypeptide of the invention can contain an extracellular ActRIIB variant (e.g., any one of SEQ ID NOs: 2-15) fused to an Fc domain (e.g., SEQ ID NO: 75) by a GGG linker. An exemplary polypeptide containing an ActRIIB variant of SEQ ID NO: 15, a GGG linker, and an Fc domain (SEQ ID NO: 71) is provided below (SEQ ID NO: 76):

```
GRGEAETRECLYYNANWELERTNQSGVERCEGEKDKRLHCYASWRNSSGS

LEIVKKGCWLDDFNCYDRDTCVATKENPQVYFCCCEGNMCNERFTHLPEA

GGPEVTYEPPPTAPTGGGDKTHTCPPCPAPELLGGPSVFLFPPKPKDTLM

ISRTPEVTCVVVDVSHEDPEVKFNWYVDGVEVHNAKTKPREEQYNSTYRV

VSVLTVLHQDWLNGKEYKCKVSNKALPAPIEKTISKAKGQPREPQVYTLP

PSRDELTKNQVSLTCLVKGFYPSDIAVEWESNGQPENNYKTTPPVLDSDG

SFFLYSKLTVDKSRWQQGNVFSCSVMHEALHNHYTQKSLSLSPGK
```

VII. Vectors, Host Cells, and Protein Production

The polypeptides of the invention can be produced from a host cell. A host cell refers to a vehicle that includes the necessary cellular components, e.g., organelles, needed to express the polypeptides and fusion polypeptides described herein from their corresponding nucleic acids. The nucleic acids may be included in nucleic acid vectors that can be introduced into the host cell by conventional techniques known in the art (e.g., transformation, transfection, electroporation, calcium phosphate precipitation, direct microinjection, infection, or the like). The choice of nucleic acid vectors depends in part on the host cells to be used. Generally, preferred host cells are of either eukaryotic (e.g., mammalian) or prokaryotic (e.g., bacterial) origin.

Nucleic Acid Vector Construction and Host Cells

A nucleic acid sequence encoding the amino acid sequence of a polypeptide of the invention may be prepared by a variety of methods known in the art. These methods include, but are not limited to, oligonucleotide-mediated (or site-directed) mutagenesis and PCR mutagenesis. A nucleic acid molecule encoding a polypeptide of the invention may be obtained using standard techniques, e.g., gene synthesis. Alternatively, a nucleic acid molecule encoding a wild-type extracellular ActRIIB may be mutated to include specific amino acid substitutions using standard techniques in the art, e.g., QuikChange™ mutagenesis. Nucleic acid molecules can be synthesized using a nucleotide synthesizer or PCR techniques.

A nucleic acid sequence encoding a polypeptide of the invention may be inserted into a vector capable of replicating and expressing the nucleic acid molecule in prokaryotic or eukaryotic host cells. Many vectors are available in the art and can be used for the purpose of the invention. Each vector may include various components that may be adjusted and optimized for compatibility with the particular host cell. For example, the vector components may include, but are not limited to, an origin of replication, a selection marker gene, a promoter, a ribosome binding site, a signal sequence, the nucleic acid sequence encoding protein of interest, and a transcription termination sequence.

In some embodiments, mammalian cells may be used as host cells for the invention. Examples of mammalian cell types include, but are not limited to, human embryonic kidney (HEK) (e.g., HEK293, HEK 293F), Chinese hamster ovary (CHO), HeLa, COS, PC3, Vero, MC3T3, NS0, Sp2/0, VERY, BHK, MDCK, W138, BT483, Hs578T, HTB2, BT20, T47D, NS0 (a murine myeloma cell line that does not endogenously produce any immunoglobulin chains), CRL7O3O, and HsS78Bst cells. In some embodiments, E. coli cells may also be used as host cells for the invention. Examples of E. coli strains include, but are not limited to, E. coli 294 (ATCC® 31,446), E. coli λ 1776 (ATCC® 31,537, E. coli BL21 (DE3) (ATCC® BAA-1025), and E. coli RV308 (ATCC® 31,608). Different host cells have characteristic and specific mechanisms for the posttranslational processing and modification of protein products (e.g., glycosylation). Appropriate cell lines or host systems may be chosen to ensure the correct modification and processing of the polypeptide expressed. The above-described expression vectors may be introduced into appropriate host cells using conventional techniques in the art, e.g., transformation, transfection, electroporation, calcium phosphate precipitation, and direct microinjection. Once the vectors are introduced into host cells for protein production, host cells are cultured in conventional nutrient media modified as appropriate for inducing promoters, selecting transformants, or amplifying the genes encoding the desired sequences. Methods for expression of therapeutic proteins are known in the art, see, for example, Paulina Balbas, Argelia Lorence (eds.) *Recombinant Gene Expression: Reviews and Protocols* (*Methods in Molecular Biology*), Humana Press; 2nd ed. 2004 and Vladimir Voynov and Justin A. Caravella (eds.) *Therapeutic Proteins: Methods and Protocols* (*Methods in Molecular Biology*) Humana Press; 2nd ed. 2012.

Protein Production, Recovery, and Purification

Host cells used to produce the polypeptides of the invention may be grown in media known in the art and suitable for culturing of the selected host cells. Examples of suitable media for mammalian host cells include Minimal Essential Medium (MEM), Dulbecco's Modified Eagle's Medium (DMEM), Expi293™ Expression Medium, DMEM with supplemented fetal bovine serum (FBS), and RPMI-1640. Examples of suitable media for bacterial host cells include Luria broth (LB) plus necessary supplements, such as a selection agent, e.g., ampicillin. Host cells are cultured at suitable temperatures, such as from about 20° C. to about 39° C., e.g., from 25° C. to about 37° C., preferably 37° C., and $CO_2$ levels, such as 5 to 10%. The pH of the medium is generally from about 6.8 to 7.4, e.g., 7.0, depending mainly on the host organism. If an inducible promoter is used in the expression vector of the invention, protein expression is induced under conditions suitable for the activation of the promoter.

In some embodiments, depending on the expression vector and the host cells used, the expressed protein may be secreted from the host cells (e.g., mammalian host cells) into the cell culture media. Protein recovery may involve filtering the cell culture media to remove cell debris. The proteins may be further purified. A polypeptide of the invention may be purified by any method known in the art of protein purification, for example, by chromatography (e.g., ion exchange, affinity, and size-exclusion column chromatography), centrifugation, differential solubility, or by any other standard technique for the purification of proteins. For example, the protein can be isolated and purified by appropriately selecting and combining affinity columns such as Protein A column (e.g., POROS Protein A chromatography) with chromatography columns (e.g., POROS HS-50 cation exchange chromatography), filtration, ultra filtration, salting-out and dialysis procedures.

In other embodiments, host cells may be disrupted, e.g., by osmotic shock, sonication, or lysis, to recover the expressed protein. Once the cells are disrupted, cell debris may be removed by centrifugation or filtration. In some instances, a polypeptide can be conjugated to marker sequences, such as a peptide to facilitate purification. An example of a marker amino acid sequence is a hexa-histidine peptide (His-tag) (SEQ ID NO: 78), which binds to nickel-functionalized agarose affinity column with micromolar affinity. Other peptide tags useful for purification include, but are not limited to, the hemagglutinin "HA" tag, which corresponds to an epitope derived from influenza hemagglutinin protein (Wilson et al., *Cell* 37:767, 1984).

Alternatively, the polypeptides of the invention can be produced by the cells of a subject (e.g., a human), e.g., in the context of gene therapy, by administrating a vector (such as a viral vector (e.g., a retroviral vector, adenoviral vector, poxviral vector (e.g., vaccinia viral vector, such as Modified Vaccinia Ankara (MVA)), adeno-associated viral vector, and alphaviral vector)) containing a nucleic acid molecule encoding the polypeptide of the invention. The vector, once inside a cell of the subject (e.g., by transformation, transfection, electroporation, calcium phosphate precipitation, direct microinjection, infection, etc.) will promote expression of the polypeptide, which is then secreted from the cell. If treatment of a disease or disorder is the desired outcome, no further action may be required. If collection of the protein is desired, blood may be collected from the subject and the protein purified from the blood by methods known in the art.

VIII. Pharmaceutical Compositions and Preparations

The invention features pharmaceutical compositions that include the polypeptides described herein (e.g., a polypeptide including an extracellular ActRIIB variant (e.g., an extracellular ActRIIB variant having the sequence of any one of SEQ ID NOs: 1-15 (e.g., SEQ ID NOs: 2-15)). In some embodiments, a pharmaceutical composition of the invention includes a polypeptide including an extracellular ActRIIB variant (e.g., an extracellular ActRIIB variant having the sequence of any one of SEQ ID NOs: 1-15 (e.g., SEQ ID NOs: 2-15)) fused to a moiety (e.g., Fc domain monomer, or a dimer thereof, a wild-type Fc domain, an Fc domain with amino acid substitutions (e.g., one or more substitutions that reduce dimerization), an albumin-binding peptide, a fibronectin domain, or a human serum albumin) as the therapeutic protein. In some embodiments, a pharmaceutical composition of the invention including a polypeptide of the invention may be used in combination with other agents (e.g., therapeutic biologics and/or small molecules) or compositions in a therapy. In addition to a therapeutically effective amount of the polypeptide, the pharmaceutical composition may include one or more pharmaceutically acceptable carriers or excipients, which can be formulated by methods known to those skilled in the art. In some embodiments, a pharmaceutical composition of the invention includes a nucleic acid molecule (DNA or RNA, e.g., mRNA) encoding a polypeptide of the invention, or a vector containing such a nucleic acid molecule.

Acceptable carriers and excipients in the pharmaceutical compositions are nontoxic to recipients at the dosages and concentrations employed. Acceptable carriers and excipients may include buffers such as phosphate, citrate, HEPES, and TAE, antioxidants such as ascorbic acid and methionine, preservatives such as hexamethonium chloride, octadecyldimethylbenzyl ammonium chloride, resorcinol, and benzalkonium chloride, proteins such as human serum albumin, gelatin, dextran, and immunoglobulins, hydrophilic polymers such as polyvinylpyrrolidone, amino acids such as glycine, glutamine, histidine, arginine, and lysine, and carbohydrates such as glucose, mannose, sucrose, and sorbitol. Pharmaceutical compositions of the invention can be administered parenterally in the form of an injectable formulation. Pharmaceutical compositions for injection can be formulated using a sterile solution or any pharmaceutically acceptable liquid as a vehicle. Pharmaceutically acceptable vehicles include, but are not limited to, sterile water, physiological saline, and cell culture media (e.g., Dulbecco's Modified Eagle Medium (DMEM), α-Modified Eagles Medium (α-MEM), F-12 medium). Formulation methods are known in the art, see e.g., Banga (ed.) *Therapeutic Peptides and Proteins: Formulation, Processing and Delivery Systems* (3rd ed.) Taylor & Francis Group, CRC Press (2015).

The pharmaceutical compositions of the invention may be prepared in microcapsules, such as hydroxylmethylcellulose or gelatin-microcapsule and poly-(methylmethacrylate) microcapsule. The pharmaceutical compositions of the invention may also be prepared in other drug delivery systems such as liposomes, albumin microspheres, microemulsions, nanoparticles, and nanocapsules. Such techniques are described in Remington: The Science and Practice of Pharmacy $22^{nd}$ edition (2012). The pharmaceutical compositions to be used for in vivo administration must be sterile. This is readily accomplished by filtration through sterile filtration membranes.

The pharmaceutical compositions of the invention may also be prepared as a sustained-release formulation. Suitable examples of sustained-release preparations include semipermeable matrices of solid hydrophobic polymers containing the polypeptides of the invention. Examples of sustained release matrices include polyesters, hydrogels, polylactides, copolymers of L-glutamic acid and γ ethyl-L-glutamate, non-degradable ethylene-vinyl acetate, degradable lactic acid-glycolic acid copolymers such as LUPRON DEPOT™, and poly-D-(−)-3-hydroxybutyric acid. Some sustained-release formulations enable release of molecules over a few months, e.g., one to six months, while other formulations release pharmaceutical compositions of the invention for shorter time periods, e.g., days to weeks.

The pharmaceutical composition may be formed in a unit dose form as needed. The amount of active component, e.g., a polypeptide of the invention, included in the pharmaceutical preparations is such that a suitable dose within the designated range is provided (e.g., a dose within the range of 0.01-100 mg/kg of body weight).

The pharmaceutical composition for gene therapy can be in an acceptable diluent, or can include a slow release matrix in which the gene delivery vehicle is imbedded. If hydrodynamic injection is used as the delivery method, the pharmaceutical composition containing a nucleic acid molecule encoding a polypeptide described herein or a vector (e.g., a viral vector) containing the nucleic acid molecule is delivered rapidly in a large fluid volume intravenously. Vectors that may be used as in vivo gene delivery vehicle include, but are not limited to, retroviral vectors, adenoviral vectors, poxviral vectors (e.g., vaccinia viral vectors, such as Modified Vaccinia Ankara), adeno-associated viral vectors, and alphaviral vectors.

IX. Routes, Dosage, and Administration

Pharmaceutical compositions that include the polypeptides of the invention as the therapeutic proteins may be formulated for, e.g., intravenous administration, parenteral administration, subcutaneous administration, intramuscular administration, intra-arterial administration, intrathecal administration, or intraperitoneal administration. The pharmaceutical composition may also be formulated for, or administered via, oral, nasal, spray, aerosol, rectal, or vaginal administration. For injectable formulations, various effective pharmaceutical carriers are known in the art. See, e.g., ASHP Handbook on Injectable Drugs, Toissel, 18th ed. (2014).

In some embodiments, a pharmaceutical composition that includes a nucleic acid molecule encoding a polypeptide of the invention or a vector containing such nucleic acid molecule may be administered by way of gene delivery. Methods of gene delivery are well-known to one of skill in the art. Vectors that may be used for in vivo gene delivery and expression include, but are not limited to, retroviral vectors, adenoviral vectors, poxviral vectors (e.g., vaccinia viral vectors, such as Modified Vaccinia Ankara (MVA)), adeno-associated viral vectors, and alphaviral vectors. In some embodiments, mRNA molecules encoding polypeptides of the invention may be administered directly to a subject.

In some embodiments of the present invention, nucleic acid molecules encoding a polypeptide described herein or vectors containing such nucleic acid molecules may be administered using a hydrodynamic injection platform. In the hydrodynamic injection method, a nucleic acid molecule encoding a polypeptide described herein is put under the control of a strong promoter in an engineered plasmid (e.g., a viral plasmid). The plasmid is often delivered rapidly in a large fluid volume intravenously. Hydrodynamic injection uses controlled hydrodynamic pressure in veins to enhance cell permeability such that the elevated pressure from the rapid injection of the large fluid volume results in fluid and plasmid extravasation from the vein. The expression of the nucleic acid molecule is driven primarily by the liver. In mice, hydrodynamic injection is often performed by injection of the plasmid into the tail vein. In certain embodiments, mRNA molecules encoding a polypeptide described herein may be administered using hydrodynamic injection.

The dosage of the pharmaceutical compositions of the invention depends on factors including the route of administration, the disease to be treated, and physical characteristics, e.g., age, weight, general health, of the subject. A pharmaceutical composition of the invention may include a dosage of a polypeptide of the invention ranging from 0.01 to 500 mg/kg (e.g., 0.01, 0.1, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 100, 150, 200, 250, 300, 350, 400, 450, or 500 mg/kg) and, in a more specific embodiment, about 0.1 to about 30 mg/kg and, in a more specific embodiment, about 0.3 to about 30 mg/kg. The dosage may be adapted by the physician in accordance with conventional factors such as the extent of the disease and different parameters of the subject.

The pharmaceutical compositions are administered in a manner compatible with the dosage formulation and in such amount as is therapeutically effective to result in an improvement or remediation of the symptoms. The pharmaceutical compositions are administered in a variety of dosage forms, e.g., intravenous dosage forms, subcutaneous dosage forms, and oral dosage forms (e.g., ingestible solutions, drug release capsules). Generally, therapeutic proteins are dosed at 0.1-100 mg/kg, e.g., 0.5-50 mg/kg. Pharmaceutical compositions that include a polypeptide of the invention may be administered to a subject in need thereof, for example, one or more times (e.g., 1-10 times or more) daily, weekly, biweekly, every four weeks, monthly, bimonthly, quarterly, biannually, annually, or as medically necessary. In some embodiments, pharmaceutical compositions that include a polypeptide of the invention may be administered to a subject in need thereof weekly, biweekly, every four weeks, monthly, bimonthly, or quarterly. Dosages may be provided in either a single or multiple dosage regimens. The timing between administrations may decrease as the medical condition improves or increase as the health of the patient declines.

X. Methods of Treatment

The invention is based on the discovery that substituting amino acids from the extracellular portion of ActRIIA into the extracellular portion ActRIIB yields ActRIIB variants with improved properties. The ActRIIB variants generated by introducing residues from ActRIIA into ActRIIB may retain the beneficial properties of ActRIIB, such as an ability to increase muscle mass and high binding affinity to activins A and B, and gain some of the beneficial properties of ActRIIA, such as reduced binding affinity to BMP9, longer serum half-life as an Fc fusion protein, or an ability to increase red blood cell levels. As the ActRIIB variants contain the extracellular portion of the receptor, they will be soluble and able to compete with endogenous activin receptors by binding to and sequestering ligands (e.g., activins A and B, myostatin, GDF11) without activating intracellular signaling pathways. Therefore, the extracellular ActRIIB variants described herein can be used to treat diseases or conditions in which elevated activin signaling has been implicated in pathogenesis (e.g., diseases or conditions in which increased expression of activin receptors or activin receptor ligands has been observed). For example, myostatin has been implicated in promoting fibrosis, inhibiting skeletal muscle growth, and regulating bone homeostasis, and elevated myostatin has been observed in subcutaneous and visceral fat of obese mice and plasma of obese and insulin resistant women. In addition, activin A has been reported to be upregulated in bone disease, adipose tissue, and subcutaneous and visceral fat of obese mice, and has been found to inhibit osteoblast activity and promote fibrosis. Another activin receptor ligand, GDF11, has been found to be overexpressed in a mouse model of hemolytic anemia and associated with defects in red blood cell production, and both type I and type II activin receptors have been linked to pancreatic function and diabetes. Without wishing to be bound by theory, a therapeutic agent that binds to activin receptor ligands (e.g., GDF11, myostatin, and/or activins) and reduces their binding to or interaction with endogenous activin receptors could have therapeutic utility for treating or preventing a variety of diseases or conditions, such as neuromuscular disease, osteogenesis imperfecta, myelofibrosis, myelodysplastic syndromes, thrombocytopenia, neutropenia, and metabolic disease.

In some embodiments, the polypeptides described herein (e.g., a polypeptide including an extracellular ActRIIB variant (e.g., an extracellular ActRIIB variant having the sequence of any one of SEQ ID NOs: 1-15 (e.g., SEQ ID NOs: 2-15)), e.g., an effective amount of an ActRIIB variant) may be administered to increase platelet levels (e.g., increase platelet count), increase or induce megakaryocyte differentiation and/or maturation (e.g., to produce platelets), reduce platelet progenitor accumulation (e.g., by stimulating progenitor cells to progress to maturation), promote or increase platelet formation or production, improve blood clotting, reduce bleeding events, and/or reduce bleeding in the skin (e.g., petechiae or bruising) in a subject in need thereof. In some embodiments, the subject may have or be at risk of developing a disease or condition associated with low platelet levels (e.g., thrombocytopenia). The invention also includes methods of treating a subject having or at risk of developing (e.g., treating, delaying the development of, and/or preventing) thrombocytopenia by administering to the subject an effective amount of a polypeptide described herein (e.g., a polypeptide including an extracellular ActRIIB variant (e.g., an extracellular ActRIIB variant having the sequence of any one of SEQ ID NOs: 1-15 (e.g., SEQ ID NOs: 2-15)), e.g., an effective amount of an ActRIIB variant). In any of the methods described herein, a subject having or at risk of developing low platelet levels (e.g., low platelet counts) has or is at risk of developing thrombocytopenia. In some embodiments, a megakaryocyte can be contacted in vitro with a polypeptide described herein, a nucleic acid encoding the polypeptide, or a vector containing the nucleic acid to generate platelets for the treatment of thrombocytopenia. In some embodiments, the thrombocytopenia is associated with a bone marrow defect, a myelodysplastic syndrome, bone marrow transplantation, myelofibrosis, myelofibrosis treatment (e.g., treatment with a JAK inhibitor, such as with ruxolitinib or fedratinib), Gaucher disease, aplastic anemia, Fanconi anemia, Diamond Blackfan anemia, Shwachman Diamond syndrome, heavy alcohol consumption, cirrhosis of the liver, cancer (e.g., leukemia or lymphoma), an autoimmune disease (e.g., rheumatoid arthritis, lupus (e.g., SLE), antiphospholipid syndrome (APS), Evans syndrome, or immune thyroid disease), a viral infection (e.g., hepatitis C, HIV, chickenpox, mumps, rubella, parvovirus, or Epstein-Barr virus), a bacterial infection (e.g., bacteremia), an enlarged spleen, a vitamin deficiency (e.g., vitamin B-12 deficiency, folate deficiency, or iron deficiency), cancer treatment (e.g., chemotherapy or radiation therapy), thrombotic thrombocytopenic purpura, idiopathic thrombocytopenic purpura, disseminated intravascular coagulation, hemolytic uremic syndrome, paroxysmal nocturnal hemoglobinuria, or a reduction of platelets caused by medication (medication-induced thrombocytopenia, e.g., thrombocytopenia caused by treatment with heparin, quinine, a sulfa-containing antibiotic, such as vancomycin, rifampin, or trimethoprim, or an anticonvulsant, such as phenytoin)), dilution of platelets caused by blood transfusion, hematopoietic stem cell transplantation, ineffective hematopoiesis, acquired amegakaryocytic thrombocytopenia, Pearson syndrome, dyskeratosis congenita, or contraindication to transfusion (e.g., patients of advanced age, patients with allo- or auto-antibodies, pediatric patients, patients with cardiopulmonary disease, patients who object to transfusion for religious reasons (e.g., some Jehovah's Witnesses)). The myelodysplastic syndrome may be myelodysplastic syndrome with unilineage dysplasia (MDS-SLD), myelodysplastic syndrome with multilineage dysplasia (MDS-MLD), myelodysplastic syndrome with ring sideroblasts (MDS-RS, which includes single lineage dysplasia (MDS-RS-SLD) and multilineage dysplasia (MDS-RS-MLD)), myelodysplastic syndrome associated with isolated del chromosome abnormality (MDS with isolated del(5q)), myelodysplastic syndrome with excess blasts (MDS-EB; which includes myelodysplastic syndrome with excess blasts—type 1 (MDS-EB-1) and myelodysplastic syndrome with excess blasts—type 2 (MDS-EB-2)), myelodysplastic syndrome, unclassifiable (MDS-U), or myelodysplastic syndrome/myeloproliferative neoplasm with ring sideroblasts and thrombocytosis (MDS/MPN-RS-T). The myelodysplastic syndrome may be a very low, low, or intermediate risk MDS as determined by the Revised International Prognostic Scoring System (IPSS-R). The myelodysplastic syndrome may be a RS-positive myelodysplastic syndrome (e.g., the subject with a myelodysplastic syndrome may have ring sideroblasts) or a non-RS myelodysplastic syndrome (e.g., the subject with a myelodysplastic syndrome may lack ring sideroblasts). In some embodiments, the RS-positive myelodysplastic syndrome is associated with a splicing factor mutation, such as a mutation in SF3B1. In some embodiments, the MDS is associated with a defect in terminal maturation (often observed in RS-positive MDS and in subjects having splicing factor mutations). In some embodiments, the MDS is associated with a defect in early-stage hematopoiesis (e.g., commitment or early differentiation). In some embodiments, the MDS is associated with elevated endogenous erythropoietin levels. In some embodiments, the myelodysplastic syndrome is associated with hypocellular bone marrow (e.g., the subject with MDS has hypocellular bone marrow). The subject may have a low transfusion burden or a high transfusion burden. In some embodiments, the subject has a low transfusion burden and received 1-3 RBC units in the eight weeks prior to treatment with an ActRIIB variant described herein. In some embodiments, the subject has a low transfusion burden and did not receive a transfusion (received 0 RBC units) in the eight weeks prior to treatment with an ActRIIB variant described herein. In some embodiments, the subject does not respond well to erythropoietin (EPO) or is susceptible to adverse effects of EPO (e.g., hypertension, headaches, vascular thrombosis, influenza-like syndrome, obstruction of shunts, and myocardial infarction). The compositions and methods described herein can also be used to treat subjects that do not respond to an erythroid maturation agent. In some embodiments, the subject has previously been treated with an ESA. In some embodiments, the subject has not previously been treated with an ESA. In some embodiments, the thrombocytopenia is familial thrombocytopenia (also referred to as inherited thrombocytopenia, e.g., thrombocytopenia associated with a genetic mutation, such as May-Hegglin anomaly, Sebastian syndrome, Fechtner syndrome, Epstein's syndrome, Wiskott-Aldrich syndrome, congenital amegakaryocytic thrombocytopenia, platelet storage pool deficiency, Hermansky-Pudlak syndrome, Bernard-Soulier syndrome, Von Willebrand Disease Type 2B, ANKRD26-related thrombocytopenia, thrombocytopenia absent radius syndrome, familial platelet disorder with associated myeloid malignancy (FPD/AML, associated with mutations in RUNX1), thrombocytopenia associated with a mutation in Filamin-A, or thrombocytopenia associated with a mutation in GATA1). In some embodiments, the thrombocytopenia is immune thrombocytopenia. In some embodiments, the methods described herein are directed to affecting myostatin, activin A, activin B, and/or BMP9 signaling (e.g., reducing or inhibiting the binding of activin A, activin B, myostatin, and/or BMP9 to their endogenous receptors, e.g., ActRIIA, ActRIIB, and/or BMPRII) in a subject having or at risk of developing a disease or condition involving low platelet levels (e.g., thrombocytopenia). In some embodiments, affecting myostatin, activin A, activin B, and/or BMP9 signaling results in an increase in the subject's platelet levels (e.g., an increase in platelet count, megakaryocyte differentiation and/or maturation, and/or platelet formation or production) or a reduction in the accumulation of platelet progenitor cells. In some embodiments, the methods described herein increase platelet levels (e.g., platelet counts), increase or induce megakaryocyte differentiation and/or maturation, promote or increase platelet formation or production, reduce the accumulation of platelet progenitor cells, improve blood clotting, reduce bleeding events (e.g., reduce the incidence of bleeding events), and/or reduce bleeding in the skin compared to measurements obtained prior to treatment or compared to measurements obtained from untreated subjects having the same disease or condition. In some embodiments, the subject is identified as having thrombocytopenia prior to treatment with an ActRIIB variant described herein. In some embodiments, the method includes a step of identifying the subject as having thrombocytopenia (e.g., by evaluating platelet levels) prior to treatment with an ActRIIB variant described herein. The method can further include evaluating platelet levels after administration of an ActRIIB variant described herein (e.g., 12 hours, 24 hours, 1, 2, 3, 4, 5, 6, or 7 days, 1, 2, 3, 4, 5, 6, 7, or 8 weeks, or 1, 2, 3, 4, 5, or 6 months or more after treatment initiation).

In some embodiments, the polypeptides described herein (e.g., a polypeptide including an extracellular ActRIIB variant (e.g., an extracellular ActRIIB variant having the sequence of any one of SEQ ID NOs: 1-15 (e.g., SEQ ID NOs: 2-15)), e.g., an effective amount of an ActRIIB variant) may be administered to increase neutrophil levels (e.g., increase neutrophil count), increase or induce the differentiation and/or maturation of progenitor cells (e.g., myeloid progenitors, myeloblasts, or myelocytes) into neutrophils, and/or induce or increase neutrophil formation or production in a subject in need thereof. In some embodiments, the subject may have or be at risk of developing a disease or condition associated with low neutrophil levels (e.g., neutropenia). The invention also includes methods of treating a subject having or at risk of developing (e.g., treating, delaying the development of, and/or preventing) neutropenia by administering to the subject an effective amount of a polypeptide described herein (e.g., a polypeptide including an extracellular ActRIIB variant (e.g., an extracellular ActRIIB variant having the sequence of any one of SEQ ID NOs: 1-15 (e.g., SEQ ID NOs: 2-15)), e.g., an effective amount of an ActRIIB variant). In any of the methods described herein, a subject having or at risk of developing low neutrophil levels (e.g., low neutrophil cell counts) has or is at risk of developing neutropenia. In some embodiments, the neutropenia is associated with a bone marrow defect, a myelodysplastic syndrome, bone marrow transplantation, myelofibrosis, aplastic anemia, Fanconi anemia, Diamond Blackfan anemia, Shwachman Diamond syndrome, paroxysmal nocturnal hemoglobinuria, cancer (e.g., leukemia), a vitamin deficiency (e.g., B-12 deficiency or folate deficiency), an enlarged spleen, an autoimmune disease (e.g., granulomatosis with polyangiitis, lupus (e.g., SLE), Evans syndrome, Felty syndrome, Crohn's disease, or rheumatoid arthritis), a viral infection (e.g., chickenpox, Epstein-Barr, Hepatitis A, Hepatitis B, Hepatitis C, HIV/AIDS, cytomegalovirus, Dengue fever, or measles), a bacterial infection (e.g., tuberculosis, salmonella infection, or sepsis), cancer treatment (e.g., chemotherapy or radiation therapy), treatment with other medications (e.g., a medication used to treat overactive thyroid, such as methimazole and propylthiouracil; an antibiotic, such as vancomycin, penicillin G, trimethoprim, and oxacillin; an antiviral drug, such as ganciclovir and valganciclovir; an anti-inflammatory medication for ulcerative colitis or rheumatoid arthritis, such as sulfasalazine; a drug used to treat irregular heart rhythms, such as quinidine and procainamide; an anticonvulsant, such as phenytoin and valproate; an antipsychotic, such as clozapine; or levamisole), inflammation, hematopoietic stem cell transplantation, ineffective hematopoiesis, Pearson syndrome, dyskeratosis congenita, or contraindication to transfusion (e.g., patients of advanced age, patients with allo- or auto-antibodies, pediatric patients, patients with cardiopulmonary disease, or patients who object to transfusion for religious reasons (e.g., some Jehovah's Witnesses)). The myelodysplastic syndrome may be myelodysplastic syndrome with unilineage dysplasia (MDS-SLD), myelodysplastic syndrome with multilineage dysplasia (MDS-MLD), myelodysplastic syndrome with ring sideroblasts (MDS-RS, which includes single lineage dysplasia (MDS-RS-SLD) and multilineage dysplasia (MDS-RS-MLD)), myelodysplastic syndrome associated with isolated del chromosome abnormality (MDS with isolated del(5q)), myelodysplastic syndrome with excess blasts (MDS-EB; which includes myelodysplastic syndrome with excess blasts—type 1 (MDS-EB-1) and myelodysplastic syndrome with excess blasts—type 2 (MDS-EB-2)), myelodysplastic syndrome, unclassifiable (MDS-U), or myelodysplastic syndrome/myeloproliferative neoplasm with ring sideroblasts and thrombocytosis (MDS/MPN-RS-T). The myelodysplastic syndrome may be a very low, low, or intermediate risk MDS as determined by the Revised International Prognostic Scoring System (IPSS-R). The myelodysplastic syndrome may be a RS-positive myelodysplastic syndrome (e.g., the subject with a myelodysplastic syndrome may have ring sideroblasts) or a non-RS myelodysplastic syndrome (e.g., the subject with a myelodysplastic syndrome may lack ring sideroblasts). In some embodiments, the RS-positive myelodysplastic syndrome is associated with a splicing factor mutation, such as a mutation in SF3B1. In some embodiments, the MDS is associated with a defect in terminal maturation (often observed in RS-positive MDS and in subjects having splicing factor mutations). In some embodiments, the MDS is associated with a defect in early-stage hematopoiesis (e.g., commitment or early differentiation). In some embodiments, the MDS is associated with elevated endogenous erythropoietin levels. In some embodiments, the myelodysplastic syndrome is associated with hypocellular bone marrow (e.g., a subject with MDS has hypocellular bone marrow). The subject may have a low transfusion burden or a high transfusion burden. In some embodiments, the subject has a low transfusion burden and received 1-3 RBC units in the eight weeks prior to treatment with an ActRIIB variant described herein. In some embodiments, the subject has a low transfusion burden and did not receive a transfusion (received 0 RBC units) in the eight weeks prior to treatment with an ActRIIB variant described herein. In some embodiments, the subject does not respond well to erythropoietin (EPO) or is susceptible to adverse effects of EPO (e.g., hypertension, headaches, vascular thrombosis, influenza-like syndrome, obstruction of shunts, and myocardial infarction). The compositions and methods described herein can also be used to treat subjects that do not respond to an erythroid maturation agent. In some embodiments, the subject has previously been treated with an ESA. In some embodiments, the subject has not previously been treated with an ESA. In some embodiments, the neutropenia is chronic idiopathic neutropenia. In some embodiments, the neutropenia is familial neutropenia (also referred to as inherited neutropenia, e.g., cyclic neutropenia, chronic benign neutropenia, or severe congenital neutropenia (SCN), which may be associated with mutations in the genes ELANE (associated with SCN1), HAX1 (associated with SCN3), G6PC3 (associated with SCN4), GFI1 (associated with SCN2), CSF3R, WAS (associated with X-linked neutropenia/X-linked SCN), CXCR4, VPS45A (associated with SCN5), or JAGN1). In some embodiments, the methods described herein are directed to affecting myostatin, activin A, activin B, and/or BMP9 signaling (e.g., reducing or inhibiting the binding of activin A, activin B, myostatin, and/or BMP9 to their endogenous receptors, e.g., ActRIIA, ActRIIB, and/or BMPRII) in a subject having or at risk of developing a disease or condition involving low neutrophil levels (e.g., neutropenia). In some embodiments, affecting myostatin, activin A, activin B, and/or BMP9 signaling results in an increase in the subject's neutrophil levels (e.g., an increase in neutrophil count, e.g., an increase in neutrophil production or formation) or an increase in the differentiation and/or maturation of progenitor cells (e.g., myeloid progenitors, myeloblasts, or myelocytes) into neutrophils. In some embodiments, the methods described herein increase neutrophil levels (e.g., neutrophil cell counts), increase or induce neutrophil formation or production, and/or increase or induce the differentiation and/or maturation of progenitor cells into neutrophils compared to measurements obtained prior to treatment or compared to measurements obtained from untreated subjects having the same disease or condition. In some embodiments, the methods described herein reduce the susceptibility of the subject to infection. In some embodiments, the subject is identified as having neutropenia prior to treatment with an ActRIIB variant described herein. In some embodiments, the method includes a step of identifying the subject as having neutropenia (e.g., by evaluating neutrophil levels) prior to treatment with an ActRIIB variant described herein. The method can further include evaluating neutrophil levels after administration of an ActRIIB variant described herein (e.g., 12 hours, 24 hours, 1, 2, 3, 4, 5, 6, or 7 days, 1, 2, 3, 4, 5, 6, 7, or 8 weeks, or 1, 2, 3, 4, 5, or 6 months or more after treatment initiation).

In some embodiments, the polypeptides described herein (e.g., a polypeptide including an extracellular ActRIIB variant (e.g., an extracellular ActRIIB variant having the sequence of any one of SEQ ID NOs: 1-15 (e.g., SEQ ID NOs: 2-15)), e.g., an effective amount of an ActRIIB variant) may be administered to increase the maturation and/or differentiation of erythroid progenitors (early or late- (e.g., terminal) stage progenitors, e.g., early-stage erythroid progenitors, such burst-forming unit-erythroid cells (BFU-Es) and/or colony forming unit-erythroid cells (CFU-Es), e.g., increase the maturation and/or differentiation of BFU-Es and/or CFU-Es into proerythroblasts, reticulocytes, or red blood cells, e.g., increase proerythroblast and/or reticulocyte numbers), increase late-stage precursor (erythroid precursor) maturation (e.g., terminal maturation, such as the maturation of reticulocytes into red blood cells, or the maturation of erythroblasts into reticulocytes and/or red blood cells), recruit early-stage progenitors into the erythroid lineage, increase the number of early-stage erythroid precursors and/or progenitors (e.g., expand the early-stage precursor population to provide a continuous supply of precursors to replenish polychromatic erythroblasts and allow for a continuous supply of maturing reticulocytes), promote the progression of erythroid precursors and/or progenitors through erythropoiesis, and/or reduce the accumulation of red blood cell progenitor cells (e.g., by stimulating progenitor cells to progress to maturation) in a subject in need thereof. In some embodiments, the subject may have or be at risk of developing a disease or condition associated with low red blood cell levels (e.g., anemia). In some embodiments, the subject may have or be at risk of developing anemia (e.g., the subject may have or be at risk of developing anemia due to other diseases or conditions, such as a myelodysplastic syndrome or myelofibrosis, or due to a medical treatment, such as treatment with a JAK inhibitor (e.g., treatment with ruxolitinib or fedratinib for myelofibrosis)). The invention also includes methods of treating a subject having or at risk of developing (e.g., treating, delaying the development of, and/or preventing) congenital dyserythropoietic anemia, congenital sideroblastic anemia, or anemia associated with a myelodysplastic syndrome, myelofibrosis, myelofibrosis treatment, thalassemia (e.g., α- or β-thalassemia), Pearson syndrome, dyskeratosis congenita, or ineffective hematopoiesis by administering to the subject an effective amount of a polypeptide described herein (e.g., a polypeptide including an extracellular ActRIIB variant (e.g., an extracellular ActRIIB variant having the sequence of any one of SEQ ID NOs: 1-15 (e.g., SEQ ID NOs: 2-15)), e.g., an effective amount of an ActRIIB variant). In some embodiments, the congenital sideroblastic anemia is associated with a mutation in ALAS2, SLC25A38, FECH, GLRXS, HSPA9, HSCB, SLC25A38, or ABCB7. In some embodiments, the congenital sideroblastic anemia is associated with a mutation in PUS1, YARS2, LARS2, TRNT1, MT-ATP6, NDUFB11, or SLC19A2, or with an mtDNA mutation. The myelodysplastic syndrome may be myelodysplastic syndrome with unilineage dysplasia (MDS-SLD), myelodysplastic syndrome with multilineage dysplasia (MDS-MLD), myelodysplastic syndrome with ring sideroblasts (MDS-RS, which includes single lineage dysplasia (MDS-RS-SLD) and multilineage dysplasia (MDS-RS-MLD)), myelodysplastic syndrome associated with isolated del chromosome abnormality (MDS with isolated del(5q)), myelodysplastic syndrome with excess blasts (MDS-EB; which includes myelodysplastic syndrome with excess blasts—type 1 (MDS-EB-1) and myelodysplastic syndrome with excess blasts—type 2 (MDS-EB-2)), myelodysplastic syndrome, unclassifiable (MDS-U), or myelodysplastic syndrome/myeloproliferative neoplasm with ring sideroblasts and thrombocytosis (MDS/MPN-RS-T). The myelodysplastic syndrome may be a very low, low, or intermediate risk MDS as determined by the Revised International Prognostic Scoring System (IPSS-R). The myelodysplastic syndrome may be a RS-positive myelodysplastic syndrome (e.g., the subject with a myelodysplastic syndrome may have ring sideroblasts) or a non-RS myelodysplastic syndrome (e.g., the subject with a myelodysplastic syndrome may lack ring sideroblasts). In some embodiments, the RS-positive myelodysplastic syndrome is associated with a splicing factor mutation, such as a mutation in SF3B1. In some embodiments, the MDS is associated with a defect in terminal maturation (often observed in RS-positive MDS and in subjects having splicing factor mutations, such a subject may have increased erythroid progenitor cells in the bone marrow relative to a healthy subject). In some embodiments, the MDS is associated with a defect in early-stage hematopoiesis (e.g., early-stage erythroid cell development, such as commitment or early differentiation, such a subject may have fewer erythroid progenitor cells in the bone marrow compared to a healthy subject or to a subject with a defect in terminal maturation). In some embodiments, the MDS is associated with elevated endogenous erythropoietin levels. In some embodiments, the myelodysplastic syndrome is associated with hypocellular bone marrow (e.g., a subject with MDS has hypocellular bone marrow). The subject may have a low transfusion burden or a high transfusion burden. In some embodiments, the subject has a low transfusion burden and received 1-3 RBC units in the eight weeks prior to treatment with an ActRIIB variant described herein. In some embodiments, the subject has a low transfusion burden and did not receive a transfusion (received 0 RBC units) in the eight weeks prior to treatment with an ActRIIB variant described herein. In any of the methods described herein, a subject having or at risk of developing low red blood cell levels (e.g., low hemoglobin levels, low hematocrit, or low red blood cell counts) has or is at risk of developing anemia. In some embodiments, the methods described herein are directed to affecting myostatin, activin A, activin B, and/or BMP9 signaling (e.g., reducing or inhibiting the binding of activin A, activin B, myostatin, and/or BMP9 to their endogenous receptors, e.g., ActRIIA, ActRIIB, and/or BMPRII) in a subject having or at risk of developing anemia associated with a myelodysplastic syndrome, myelofibrosis, myelofibrosis treatment, ineffective hematopoiesis (e.g., ineffective erythropoiesis), Pearson syndrome, dyskeratosis congenita, congenital dyserythropoietic anemia, or congenital sideroblastic anemia. In some embodiments, affecting myostatin, activin A, activin B, and/or BMP9 signaling results in an increase in the subject's red blood cell levels, an increase in red blood cell formation or production, an increase the maturation and/or differentiation of erythroid progenitors, an increase in late-stage erythroid precursor maturation, recruitment of early-stage progenitors into the erythroid lineage, an increase in the number of early-stage erythroid precursors and/or progenitors (e.g., an expansion of the early-stage precursor and/or progenitor population), progression of erythroid precursors and/or progenitors through erythropoiesis or a reduction the accumulation of red blood cell progenitor cells. In some embodiments, the subject does not respond well to erythropoietin (EPO) or is susceptible to adverse effects of EPO (e.g., hypertension, headaches, vascular thrombosis, influenza-like syndrome, obstruction of shunts, and myocardial infarction). The compositions and methods described herein can also be used to treat subjects that do not respond to an erythroid maturation agent. In some embodiments, the subject has previously been treated with an ESA. In some embodiments, the subject has not previously been treated with an ESA. In some embodiments, the methods described herein increase red blood cell levels (e.g., hemoglobin levels, hematocrit, red blood cell counts, red blood cell volume, or red cell mass), increase or induce red blood cell formation or production, increase the maturation and/or differentiation of erythroid progenitors, increase late-stage erythroid precursor maturation, recruit early-stage progenitors into the erythroid lineage, increase the number of early-stage erythroid precursors and/or progenitors, promote the progression of erythroid precursors and/or progenitors through erythropoiesis, and/or reduce the accumulation of red blood cell progenitor cells compared to measurements obtained prior to treatment or compared to measurements obtained from untreated subjects having the same disease or condition. In some embodiments, the compositions and methods described herein reduce the need of a subject for a blood transfusion (e.g., reduce transfusion burden, for example, the subject no longer needs blood transfusions, or the subject needs less frequent blood transfusion than before treatment with the compositions and methods described herein). In some embodiments, the compositions and methods described herein slow or inhibit the progression of lower-risk MDS to higher-risk MDS and/or acute myeloid leukemia (AML). For example, treatment of anemia in a subject having a very low, low, or intermediate risk MDS and a low transfusion burden may lead to a hemoglobin increase of greater than or equal to 1.5 g/dL from baseline or pretreatment measurements (e.g., for at least one day, two days, three days, four days, five days, six days, one week, two weeks, three weeks, one month, two months, or longer during treatment). In another example, treatment of anemia in a subject having a very low, low, or intermediate risk MDS and a high transfusion burden may lead to a reduction of 50% or 4 RBC units transfused compared to pretreatment (e.g., comparing an eight-week period during treatment to an eight-week period prior to treatment). In some embodiments, the subject is identified as having anemia (e.g., anemia associated with a myelodysplastic syndrome, myelofibrosis, myelofibrosis treatment, ineffective hematopoiesis, Pearson syndrome, dyskeratosis congenita, congenital dyserythropoietic anemia, or congenital sideroblastic anemia) prior to treatment with an ActRIIB variant described herein. In some embodiments, the method includes a step of identifying the subject as having anemia (e.g., by evaluating red blood cell, hemoglobin, or hematocrit levels) prior to treatment with an ActRIIB variant described herein. The method can further include evaluating red blood cell, hemoglobin, or hematocrit levels after administration of an ActRIIB variant described herein (e.g., 12 hours, 24 hours, 1, 2, 3, 4, 5, 6, or 7 days, 1, 2, 3, 4, 5, 6, 7, or 8 weeks, or 1, 2, 3, 4, 5, or 6 months or more after treatment initiation).

In some embodiments, the polypeptides described herein (e.g., a polypeptide including an extracellular ActRIIB variant (e.g., an extracellular ActRIIB variant having the sequence of any one of SEQ ID NOs: 1-15 (e.g., SEQ ID NOs: 2-15)), e.g., an effective amount of an ActRIIB variant) may be administered to increase lean mass in a subject in need thereof. In some embodiments, the subject may have or be at risk of developing a disease or condition that results in muscle weakness or atrophy (e.g., a neuromuscular disease, cachexia, disuse atrophy, treatment related muscle loss or atrophy, hypotonia, hypoxia, or muscle loss or atrophy associated with a burn injury). The invention also includes methods of treating a subject having or at risk of developing (e.g., treating, delaying the development of, and/or preventing) a neuromuscular disease (e.g., a muscular dystrophy, SMA, CMT, myasthenia gravis, or multiple sclerosis), cachexia (e.g., cancer cachexia, HIV-related cachexia, cardiac cachexia (e.g., cachexia associated with heart failure), cachexia associated with chronic kidney disease, or pulmonary cachexia (e.g., cachexia associated with COPD)), disuse atrophy, treatment related muscle loss or atrophy (e.g., muscle loss of atrophy associated with glucocorticoid treatment, FGF-21 treatment, GLP-1 treatment, bariatric surgery (e.g., gastric bypass), cancer therapy, or treatment for obesity or Type 2 diabetes), hypotonia, hypoxia, or muscle loss or atrophy associated with a burn injury by administering to the subject an effective amount of a polypeptide described herein (e.g., a polypeptide including an extracellular ActRIIB variant (e.g., an extracellular ActRIIB variant having the sequence of any one of SEQ ID NOs: 1-15 (e.g., SEQ ID NOs: 2-15)), e.g., an effective amount of an ActRIIB variant). Muscular dystrophies include Duchenne muscular dystrophy (DMD), facioscapulohumeral muscular dystrophy (FSHD), Becker muscular dystrophy (BMD), myotonic dystrophy (DM), congenital muscular dystrophy, limb-girdle muscular dystrophy (LGMD), distal muscular dystrophy (DD), oculopharyngeal muscular dystrophy (OPMD), and Emery-Dreifuss muscular dystrophy (EDMD). There are thirty three types of congenital muscular dystrophies, which include congenital muscular dystrophy type 1A (MDC1A, associated with mutations in laminin alpha 2), congenital muscular dystrophy type 1C (MDC1C, associated with mutations in FKRP), congenital muscular dystrophy type 1D (MDC1 D, associated with mutations in LARGE), congenital muscular dystrophy type 1B (MDC1B), Fukuyama congenital muscular dystrophy (FCMD, associated with mutations in fukutin), muscle-eye-brain disease (MEB, which may be associated with mutations in POMGnT1), Walker-Warburg Syndrome (WWS, associated with mutations in B3GNT1 (MDDGA type), POMT1 (MDDGA1 type), POMT2 (MDDGA2 type), ISPD (MDDGA7 type), GTDC2 (MDDGA8 type), TMEM5 (MDDGA10 type), B3GALNT2 (MDDGA11 type), or SGK196 (MDDGA12 type)), rigid spine muscular dystrophy (RSMD1, associated with a mutation in SEPN1), Ullrich congenital muscular dystrophy (UCMD, associated in mutations in COLGA1, COL6A2, or COL6A3), and muscular dystrophies associated with mutations in integrin alpha 7, integrin alpha 9, DOK7, laminin NC, SBP2, or choline kinase beta. In some embodiments, the methods described herein increase muscle mass, e.g., increase muscle mass compared to measurements obtained prior to treatment or compared to muscle mass typically observed in untreated subjects having the same disease or condition. In some embodiments, the methods described herein increase lean mass, e.g., increase lean mass compared to measurements obtained prior to treatment or compared to lean mass typically observed in untreated subjects having the same disease or condition. In some embodiments, the muscle is skeletal muscle. In some embodiments, the methods described herein are directed to affecting myostatin, activin A, activin B, and/or BMP9 signaling (e.g., reducing or inhibiting the binding of activin A, activin B, myostatin, and/or BMP9 to their endogenous receptors, e.g., ActRIIA, ActRIIB, and/or BMPRII) in a subject having or at risk of developing a neuromuscular disease, cachexia, disuse atrophy, treatment related muscle loss or atrophy, hypotonia, hypoxia, or muscle loss or atrophy associated with a burn injury. In some embodiments, affecting myostatin, activin A, activin B, and/or BMP9 signaling results in an increase in the subject's muscle mass or an increase in the subject's lean mass. In some embodiments, the subject is identified as having a disease or condition that results in muscle weakness or atrophy (e.g., a neuromuscular disease, cachexia, disuse atrophy, treatment related muscle loss or atrophy, hypotonia, hypoxia, or muscle loss or atrophy associated with a burn injury) prior to treatment with an ActRIIB variant described herein. In some embodiments, the method includes a step of identifying the subject as having a disease or condition that results in muscle weakness or atrophy (e.g., by evaluating lean mass, muscle mass, or strength or by genetic testing for congenital muscular dystrophy) prior to treatment with an ActRIIB variant described herein. The method can further include evaluating lean mass, muscle mass, or strength after administration of an ActRIIB variant described herein (e.g., 12 hours, 24 hours, 1, 2, 3, 4, 5, 6, or 7 days, 1, 2, 3, 4, 5, 6, 7, or 8 weeks, or 1, 2, 3, 4, 5, or 6 months or more after treatment initiation).

In some embodiments, the polypeptides described herein (e.g., a polypeptide including an extracellular ActRIIB variant (e.g., an extracellular ActRIIB variant having the sequence of any one of SEQ ID NOs: 1-15 (e.g., SEQ ID NOs: 2-15)), e.g., an effective amount of an ActRIIB variant) may be administered to reduce the risk or occurrence of bone fracture in a subject in need thereof. In some embodiments, the subject may have or be at risk of developing a disease or condition involving bone damage (e.g., osteogenesis imperfecta, androgen deprivation therapy-related bone loss, estrogen deprivation therapy-related bone loss, neuromuscular disease-related bone loss, burn-induced bone loss (e.g., bone loss associated with a burn injury), or anorexia-related bone loss). The invention also includes methods of treating a subject having or at risk of developing (e.g., treating, delaying the development of, and/or preventing) osteogenesis imperfecta, androgen deprivation therapy-related bone loss, estrogen deprivation therapy-related bone loss, neuromuscular disease-related bone loss, burn-induced bone loss, or anorexia-related bone loss by administering to the subject an effective amount of a polypeptide described herein (e.g., a polypeptide including an extracellular ActRIIB variant (e.g., an extracellular ActRIIB variant having the sequence of any one of SEQ ID NOs: 1-15 (e.g., SEQ ID NOs: 2-15)), e.g., an effective amount of an ActRIIB variant). In some embodiments, the methods described herein increase bone mineral density (e.g., increase bone mass), reduce bone resorption (e.g., reduce bone catabolic activity), increase bone formation (e.g., increase bone anabolic activity or increase osteogenesis), increase bone strength, reduce the risk of bone fracture or reduce the occurrence of bone fracture, increase osteoblast activity or osteoblastogenesis, and/or decrease osteoclast activity or osteoclastogenesis compared to measurements obtained prior to treatment or compared measurements from uncreated subjects having the same disease or condition. In some embodiments, the methods described herein affect myostatin, activin A, activin B, and/or BMP9 signaling (e.g., reduce or inhibit the binding of activin A, activin B, myostatin, and/or BMP9 to their endogenous receptors, e.g., ActRIIA, ActRIIB, and/or BMPRII) in a subject having or at risk of developing osteogenesis imperfecta, androgen deprivation therapy-related bone loss, estrogen deprivation therapy-related bone loss, neuromuscular disease-related bone loss, burn-induced bone loss, or anorexia-related bone loss. In some embodiments, affecting myostatin, activin A, activin B, and/or BMP9 signaling results in an increase in the subject's bone mineral density or bone formation, a decrease in the subject's bone resorption, or a decrease in the risk or occurrence of bone fracture. In some embodiments, the bone is cortical or trabecular bone. In some embodiments, the subject is identified as having a disease or condition involving bone damage (e.g., osteogenesis imperfecta, androgen deprivation therapy-related bone loss, estrogen deprivation therapy-related bone loss, neuromuscular disease-related bone loss, burn-induced bone loss (e.g., bone loss associated with a burn injury), or anorexia-related bone loss) prior to treatment with an ActRIIB variant described herein. In some embodiments, the method includes a step of identifying the subject as having a disease or condition involving bone damage prior to treatment with an ActRIIB variant described herein. The method can further include evaluating bone mineral density, bone formation, or bone resorption after administration of an ActRIIB variant described herein (e.g., 12 hours, 24 hours, 1, 2, 3, 4, 5, 6, or 7 days, 1, 2, 3, 4, 5, 6, 7, or 8 weeks, or 1, 2, 3, 4, 5, or 6 months or more after treatment initiation).

The invention also includes methods of treating a subject having or at risk of developing (e.g., treating, delaying the development of, and/or preventing) a metabolic disease (e.g., obesity, Type 1 diabetes, or Type 2 diabetes) by administering to the subject an effective amount of a polypeptide described herein (e.g., a polypeptide including an extracellular ActRIIB variant (e.g., an extracellular ActRIIB variant having the sequence of any one of SEQ ID NOs: 1-15 (e.g., SEQ ID NOs: 2-15)), e.g., an effective amount of an ActRIIB variant). In some embodiments, the subject may have a disease that results in obesity. In some embodiments, the polypeptides described herein may be administered to a subject to prevent the development of obesity (e.g., in a subject at risk of developing obesity, e.g., a subject who is overweight, who has a family history of obesity, or who has other medical conditions or risk factors linked to increased risk of obesity (e.g., advanced age, or treatment with a medication associated with the development of obesity, such as a glucocorticoid (e.g., a corticosteroids, such as prednisone), a selective serotonin reuptake inhibitor (SSRI, e.g., paroxetine, mirtazapine, fluoxetine, escitalopram, sertraline), a tricyclic antidepressant (e.g., amitriptyline), a mood stabilizer (e.g., valproic acid, lithium), an antipsychotic (e.g., olanzapine, chlorpromazine, clozapine), and a diabetes medication (e.g., insulin, chlorpropamide)) and/or to treat a subject already diagnosed with obesity. The method may also include the step of identifying the subject as having obesity prior to treatment with an ActRIIB variant described herein. In some embodiments, the subject has age-related obesity or metabolic disease. In some embodiments, the subject has treatment-related obesity or metabolic disease. Administration of an ActRIIB variant described herein may reduce bodyweight by decreasing the amount of body fat. In some embodiments, the ActRIIB variant decreases the amount of body fat while maintaining or increasing the amount of lean mass.

In some embodiments, the polypeptides described herein may be administered to a subject to prevent the development of diabetes (e.g., Type 1 or Type 2 diabetes, e.g., in a subject at risk of developing diabetes associated with advanced age or treatment with a medication associated with the development of diabetes, such as a glucocorticoid (e.g., a corticosteroid, e.g., glucocorticoid-induced diabetes mellitus), an SSRI, a serotonin-norepinephrine reuptake inhibitors (SNRI), a mood stabilizer (e.g., lithium and valproic acid), and an antipsychotic (e.g., olanzapine and clozapine)) and/or to treat a subject already diagnosed with diabetes. The method may also include the step of identifying the subject as having diabetes prior to treatment with an ActRIIB variant described herein. Subjects who are likely to develop diabetes, e.g., subjects with a genetic predisposition to diabetes, a family history of diabetes, prediabetes, an autoimmune disease associated with diabetes, another metabolic disease, subjects of advanced age, or subjects treated with a medication associated with the development of diabetes may be administered the polypeptides described herein (e.g., a polypeptide including an extracellular ActRIIB variant (e.g., an extracellular ActRIIB variant having the sequence of any one of SEQ ID NOs: 1-15 (e.g., SEQ ID NOs: 2-15))) prophylactically, such that the extracellular ActRIIB variants may maintain the normal function and health of β-cells and/or prevent or delay autoimmune inflammatory damage to β-cells. In other embodiments, the polypeptides described herein (e.g., a polypeptide including an extracellular ActRIIB variant (e.g., an extracellular ActRIIB variant having the sequence of any one of SEQ ID NOs: 1-15 (e.g., SEQ ID NOs: 2-15)), e.g., an effective amount of an ActRIIB variant) may be administered to individuals before diagnosis with diabetes (e.g., Type 1 and Type 2 diabetes) or the development of clinical symptoms of diabetes, e.g., high blood glucose level, high fasting insulin level, insulin resistance, polyuria, polydipsia, and polyphagia. In some embodiments, the extracellular ActRIIB variants may be administered to patients prior to the patients needing insulin. In some embodiments, the administration of extracellular ActRIIB variants may delay, reduce, or eliminate the need for insulin treatment in diabetic patients. For example, administration of the extracellular ActRIIB variants of the invention to a subject may help to increase the rate of glucose clearance from the blood.

In some embodiments, the methods described herein reduce body fat (e.g., reduce the amount of subcutaneous, visceral, and/or hepatic fat, reduce adiposity, reduce the weights of epididymal and perirenal fat pads, or reduce body fat percentage). In some embodiments, the methods described herein reduce body weight or reduce body weight gain (e.g., reduce the percentage of body weight gain). In some embodiments, the methods described herein reduce the proliferation of adipose cells. In some embodiments, the methods described herein reduce LDL. In some embodiments, the methods described herein reduce triglycerides. In some embodiments, the methods described herein improve the serum lipid profile of the subject. In some embodiments, the methods described herein reduce body fat and increase muscle mass. In some embodiments, the methods described herein reduce blood glucose levels (e.g., fasting glucose levels) or and/or increase glucose clearance. In some embodiments, the methods described herein reduce fasting insulin levels and/or improve insulin sensitivity (e.g., reduce insulin resistance). In some embodiments, the methods described herein regulate insulin biosynthesis and/or secretion from β-cells. These outcomes can be assessed by comparing measurements obtained after treatment to measurements taken prior to treatment. In some embodiments, the methods described herein do not affect the appetite for food intake. In some embodiments, the methods described herein affect myostatin, activin A, activin B, and/or BMP9 signaling (e.g., reduce or inhibit the binding of activin A, activin B, myostatin, and/or BMP9 to their endogenous receptors, e.g., ActRIIA, ActRIIB, and/or BMPRII) in a subject having or at risk of developing a metabolic disease. In some embodiments, affecting myostatin, activin A, activin B, and/or BMP9 signaling results in a reduction body fat (e.g., amount of body fat or body fat percentage), a reduction in body weight or body weight gain, a reduction in fasting insulin levels, an increase in glucose clearance, an improvement in serum lipid profile, or an increase in insulin sensitivity (e.g., a reduction in insulin resistance). The method can further include evaluating body fat (e.g., amount of body fat or body fat percentage), body weight or body weight gain, fasting insulin levels, glucose clearance, serum lipid profile, or insulin sensitivity after administration of an ActRIIB variant described herein (e.g., 12 hours, 24 hours, 1, 2, 3, 4, 5, 6, or 7 days, 1, 2, 3, 4, 5, 6, 7, or 8 weeks, or 1, 2, 3, 4, 5, or 6 months or more after treatment initiation).

In some embodiments, the methods described herein (e.g., the methods of treating any of the diseases or conditions described herein) do not cause any vascular complications in the subject, such as increased vascular permeability or leakage.

In any of the methods described herein, a dimer (e.g., homodimer or heterodimer) formed by the interaction of two Fc domain monomers that are each fused to a polypeptide including an extracellular ActRIIB variant (e.g., an extracellular ActRIIB variant having the sequence of any one of SEQ ID NOs: 1-15 (e.g., SEQ ID NOs: 2-15)) may be used as the therapeutic protein. In any of the methods described herein, a polypeptide including an extracellular ActRIIB variant (e.g., an extracellular ActRIIB variant having the sequence of any one of SEQ ID NOs: 1-15 (e.g., SEQ ID NOs: 2-15)) fused to a moiety (e.g., a wild-type Fc domain, an Fc domain with amino acid substitutions (e.g., one more substitutions that reduce dimerization), an albumin-binding peptide, a fibronectin domain, or a serum albumin) may be used as the therapeutic protein. Nucleic acids encoding the polypeptides described herein, or vectors containing said nucleic acids can also be administered according to any of the methods described herein. In any of the methods described herein, the polypeptide, nucleic acid, or vector can be administered as part of a pharmaceutical composition. Compositions that can be administered to a subject according to the methods described herein are provided in Table 3, below.

TABLE 3

| Row | Composition |
|---|---|
| 1 | A polypeptide comprising an extracellular activin receptor type IIB (ActRIIB) variant, the variant having one or more amino acid substitutions relative to the sequence of GRGEAETRECIYYNANWELERTNQSGLERCEGEQDKRLHCYASWRNSSGTIELVKKGCWL DDFNCYDRQECVATEENPQVYFCCCEGNFCNERFTHLPEAGGPEVTYEPPPTAPT (SEQ ID NO: 17), wherein the variant comprises one or more amino acid substitutions that impart reduced BMP9 binding relative to wild type extracellular ActRIIB and one or more additional amino acid substitutions, wherein the substitutions that reduce BMP9 binding comprise one or more of:<br>d) amino acid substitution E75K;<br>e) amino acid substitutions Q69T and E70D; or<br>f) amino acid substitutions Q69D and E70T,<br>optionally wherein the variant is truncated from the N-terminus by deletion of 1,2, 3, 4, 5, 6, or 7 amino acids. |
| 2 | The polypeptide of row 1, wherein the variant comprises one or more amino acid substitutions selected from the group consisting of I11L, Y12F, L19K, E20D, S25T, L27V, R29P, E31Y, E33D, Q34K, L38R, Y41F, R45K, S47I, S48T, T50S, I51L, L53I, K56Q, F63I, T74K, E76D, N77S, Q79E, and F89M. |
| 3 | The polypeptide of row 1 or 2, wherein the variant comprises amino acid substitutions E75K, E20D, and F63I. |
| 4 | The polypeptide of row 1 or 2, wherein the variant comprises amino acid substitution E75K. |
| 5 | The polypeptide of row 4, wherein the variant comprises amino acid substitutions T74K, E76D, N77S, and Q79E. |
| 6 | The polypeptide of row 5, wherein the variant further comprises one or more additional amino acid substitutions. |
| 7 | The polypeptide of row 6, wherein the variant comprises amino acid substitutions Y41F, R45K, and K56Q. |
| 8 | The polypeptide of row 7, wherein the variant further comprises amino acid substitutions Y12F, L19K, E20D, R29P, E31Y, E33D, L38R, and F63I. |
| 9 | The polypeptide of row 6, wherein the variant comprises amino acid substitutions S25T and S47I. |
| 10 | The polypeptide of row 9, wherein the variant comprises amino acid substitution S48T. |
| 11 | The polypeptide of row 6, wherein the variant comprises amino acid substitution R29P. |
| 12 | The polypeptide of row 6, wherein the variant comprises amino acid substitutions E31Y, E33D, and Q34K. |
| 13 | The polypeptide of row 6, wherein the variant comprises amino acid substitutions Y12F, L19K, and E20D. |
| 14 | The polypeptide of row 6, wherein the variant comprises amino acid substitutions E31Y, E33D, and L38R. |
| 15 | The polypeptide of row 1 or 2, wherein the variant comprises amino acid substitutions Q69T and E70D. |
| 16 | The polypeptide of any one of rows 1,2, and 15, wherein the variant comprises amino acid substitutions Q69T and E70D and additional amino acid substitutions I11L, L27V, Q34K, T50S, I51L, L53I, and F89M. |
| 17 | The polypeptide of row 1 or 2, wherein the variant comprises amino acid substitutions Q69D and E70T. |
| 18 | The polypeptide of any one of rows 1,2, and 17, wherein the variant comprises amino acid substitutions Q69D and E70T and additional amino acid substitutions I11L, L27V, Q34K, T50S, I51L, L53I, and F89M. |
| 19 | The polypeptide of any one of rows 15-18, wherein the variant comprises amino acid substitution E75K. |
| 20 | A polypeptide comprising an ActRIIB variant, the variant having a sequence of GRGEAETRECX$_1$X$_2$YNANWEX$_3$X$_4$RTNQX$_5$GX$_6$EX$_7$CX$_8$GX$_9$X$_{10}$DKRX$_{11}$HCX$_{12}$ASWX$_{13}$NX$_{14}$X$_{15}$ GX$_{16}$X$_{17}$EX$_{18}$VKX$_{19}$GCWLDDX$_{20}$NCYDRX$_{21}$X$_{22}$CVAX$_{23}$X$_{24}$X$_{25}$X$_{26}$PX$_{27}$VYFCCCEGNX$_{28}$CNERF THLPEAGGPEVTYEPPPTAPT (SEQ ID NO: 1), wherein X$_1$ is I or L; X$_2$ is F or Y; X$_3$ is L or K; |

TABLE 3-continued

| Row | Composition |
|---|---|
| | $X_4$ is D or E; $X_5$ is T or S; $X_6$ is L or V; $X_7$ is P or R; $X_8$ is Y or E; $X_9$ is D or E; $X_{10}$ is K or Q; $X_{11}$ is R or L; $X_{12}$ is Y or F; $X_{13}$ is R or K; $X_{14}$ is S or I; $X_{15}$ is S or T; $X_{16}$ is S or T; $X_{17}$ is I or L; $X_{18}$ is I or L; $X_{19}$ is K or Q; $X_{20}$ is F or I; $X_{21}$ is Q, T, or D; $X_{22}$ is E, D, or T; $X_{23}$ is K or T; $X_{24}$ is K or E; $X_{25}$ is D or E; $X_{26}$ is S or N; $X_{27}$ is E or Q; and $X_{28}$ is F or M, and wherein $X_{24}$ is E and/or either $X_{21}$ is T and $X_{22}$ is D or $X_{21}$ is D and $X_{22}$ is T, and wherein the variant has at least one amino acid substitution relative to a wild-type extracellular ActRIIB having the sequence of SEQ ID NO: 17, optionally wherein the variant is truncated from the N-terminus by deletion of 1, 2, 3, 4, 5, 6, or 7 amino acids. |
| 21 | The polypeptide of row 20, wherein $X_1$ is I. |
| 22 | The polypeptide of row 20, wherein $X_1$ is L. |
| 23 | The polypeptide of any one of rows 20-22, wherein $X_2$ is F. |
| 24 | The polypeptide of any one of rows 20-22, wherein $X_2$ is Y. |
| 25 | The polypeptide of any one of rows 20-24, wherein $X_3$ is L. |
| 26 | The polypeptide of any one of rows 20-25, wherein $X_3$ is K. |
| 27 | The polypeptide of any one of rows 20-26, wherein $X_4$ is D. |
| 28 | The polypeptide of any one of rows 20-26, wherein $X_4$ is E. |
| 29 | The polypeptide of any one of rows 20-28, wherein $X_5$ is T. |
| 30 | The polypeptide of any one of rows 20-28, wherein $X_5$ is S. |
| 31 | The polypeptide of any one of rows 20-30, wherein $X_6$ is L. |
| 32 | The polypeptide of any one of rows 20-30, wherein $X_6$ is V. |
| 33 | The polypeptide of any one of rows 20-32, wherein $X_7$ is P. |
| 34 | The polypeptide of any one of rows 20-32, wherein $X_7$ is R. |
| 35 | The polypeptide of any one of rows 20-34, wherein $X_8$ is Y. |
| 36 | The polypeptide of any one of rows 20-35, wherein $X_8$ is E. |
| 37 | The polypeptide of any one of rows 20-36, wherein $X_9$ is D. |
| 38 | The polypeptide of any one of rows 20-36, wherein $X_9$ is E. |
| 39 | The polypeptide of any one of rows 20-38, wherein $X_{10}$ is K. |
| 40 | The polypeptide of any one of rows 20-38, wherein $X_{10}$ is Q. |
| 41 | The polypeptide of any one of rows 20-40, wherein $X_{11}$ is R. |
| 42 | The polypeptide of any one of rows 20-40, wherein $X_{11}$ is L. |
| 43 | The polypeptide of any one of rows 20-42, wherein $X_{12}$ is Y. |
| 44 | The polypeptide of any one of rows 20-42, wherein $X_{12}$ is F. |
| 45 | The polypeptide of any one of rows 20-44, wherein $X_{13}$ is R. |
| 46 | The polypeptide of any one of rows 20-44, wherein $X_{13}$ is K. |
| 47 | The polypeptide of any one of rows 20-46, wherein $X_{14}$ is S. |
| 48 | The polypeptide of any one of rows 20-46, wherein $X_{14}$ is I. |
| 49 | The polypeptide of any one of rows 20-48, wherein $X_{15}$ is S. |
| 50 | The polypeptide of any one of rows 20-48, wherein $X_{15}$ is T. |
| 51 | The polypeptide of any one of rows 20-48, wherein $X_{16}$ is S. |
| 52 | The polypeptide of any one of rows 20-48, wherein $X_{16}$ is T. |
| 53 | The polypeptide of any one of rows 20-52, wherein $X_{17}$ is I. |
| 54 | The polypeptide of any one of rows 20-52, wherein $X_{17}$ is L. |
| 55 | The polypeptide of any one of rows 20-54, wherein $X_{18}$ is I. |

TABLE 3-continued

| Row | Composition |
|---|---|
| 56 | The polypeptide of any one of rows 20-54, wherein $X_{18}$ is L. |
| 57 | The polypeptide of any one of rows 20-56, wherein $X_{19}$ is K. |
| 58 | The polypeptide of any one of rows 20-56, wherein $X_{19}$ is Q. |
| 59 | The polypeptide of any one of rows 20-58, wherein $X_{20}$ is F. |
| 60 | The polypeptide of any one of rows 20-58, wherein $X_{20}$ is I. |
| 61 | The polypeptide of any one of rows 20-60, wherein $X_{21}$ is Q. |
| 62 | The polypeptide of any one of rows 20-60, wherein $X_{21}$ is T. |
| 63 | The polypeptide of any one of rows 20-60, wherein $X_{21}$ is D. |
| 64 | The polypeptide of any one of rows 20-61, wherein $X_{22}$ is E. |
| 65 | The polypeptide of any one of rows 20-60 and 62, wherein $X_{22}$ is D. |
| 66 | The polypeptide of any one of rows 20-60 and 63, wherein $X_{22}$ is T. |
| 67 | The polypeptide of any one of rows 20-66, wherein $X_{23}$ is K. |
| 68 | The polypeptide of any one of rows 20-66, wherein $X_{23}$ is T. |
| 69 | The polypeptide of any one of rows 20-68, wherein $X_{24}$ is K. |
| 70 | The polypeptide of any one of rows 20-60, 62, 63, and 65-68, wherein $X_{24}$ is E. |
| 71 | The polypeptide of any one of rows 20-70, wherein $X_{25}$ is D. |
| 72 | The polypeptide of any one of rows 20-70, wherein $X_{25}$ is E. |
| 73 | The polypeptide of any one of rows 20-72, wherein $X_{26}$ is S. |
| 74 | The polypeptide of any one of rows 20-72, wherein $X_{26}$ is N. |
| 75 | The polypeptide of any one of rows 20-74, wherein $X_{27}$ is E. |
| 76 | The polypeptide of any one of rows 20-74, wherein $X_{27}$ is Q. |
| 77 | The polypeptide of any one of rows 20-76, wherein $X_{28}$ is F. |
| 78 | The polypeptide of any one of rows 20-76, wherein $X_{28}$ is M. |
| 79 | The polypeptide of any one of rows 20-78, wherein $X_{23}$ is T, $X_{24}$ is K, $X_{25}$ is E, and $X_{26}$ is N. |
| 80 | The polypeptide of any one of rows 20-78, wherein $X_{23}$ is T, $X_{24}$ is E, $X_{25}$ is E, and $X_{26}$ is N. |
| 81 | The polypeptide of any one of rows 20-78, wherein $X_{23}$ is K, $X_{24}$ is K, $X_{25}$ is D, and $X_{26}$ is S. |
| 82 | The polypeptide of any one of rows 1-81, wherein the variant has the sequence of any one of SEQ ID NOs: 2-15. |
| 83 | The polypeptide of row 82, wherein the variant has the sequence of SEQ ID NO: 3. |
| 84 | The polypeptide of row 82, wherein the variant has the sequence of SEQ ID NO: 9. |
| 85 | The polypeptide of row 82, wherein the variant has the sequence of SEQ ID NO: 12. |
| 86 | The polypeptide of row 82, wherein the variant has the sequence of SEQ ID NO: 13. |
| 87 | The polypeptide of row 82, wherein the variant has the sequence of SEQ ID NO: 14. |
| 88 | The polypeptide of row 82, wherein the variant has the sequence of SEQ ID NO: 15. |
| 89 | The polypeptide of any one of rows 1-88, wherein the amino acid at position $X_{24}$ is replaced with the amino acid K. |
| 90 | The polypeptide of any one of rows 1-88, wherein the amino acid at position $X_{24}$ is replaced with the amino acid E. |

TABLE 3-continued

| Row | Composition |
|---|---|
| 91 | The polypeptide of any one of rows 1-90, wherein the variant is truncated from the N-terminus by deletion of one amino acid. |
| 92 | The polypeptide of any one of rows 1-90, wherein the variant is truncated from the N-terminus by deletion of two amino acids. |
| 93 | The polypeptide of any one of rows 1-90, wherein the variant is truncated from the N-terminus by deletion of three amino acids. |
| 94 | The polypeptide of any one of rows 1-90, wherein the variant is truncated from the N-terminus by deletion of four amino acids. |
| 95 | The polypeptide of any one of rows 1-90, wherein the variant is truncated from the N-terminus by deletion of five amino acids. |
| 96 | The polypeptide of any one of rows 1-90, wherein the variant is truncated from the N-terminus by deletion of six amino acids. |
| 97 | The polypeptide of any one of rows 1-90, wherein the variant is truncated from the N-terminus by deletion of seven amino acids. |
| 98 | The polypeptide of any one of rows 1-97, further comprising an Fc domain monomer fused to the C-terminus of the polypeptide by way of a linker. |
| 99 | The polypeptide of row 98, wherein the Fc domain monomer comprises the sequence of SEQ ID NO: 19. |
| 100 | The polypeptide of row 98 or 99, wherein the polypeptide forms a dimer. |
| 101 | The polypeptide of any one of rows 1-97, further comprising a wild-type Fc domain fused to the C-terminus of the polypeptide by way of a linker. |
| 102 | The polypeptide of row 101, wherein the wild-type Fc domain comprises the sequence of SEQ ID NO: 71 or SEQ ID NO: 75. |
| 103 | The polypeptide of row 102, wherein the wild-type Fc domain comprises the sequence of SEQ ID NO: 71. |
| 104 | The polypeptide of row 102, wherein the wild-type Fc domain comprises the sequence of SEQ ID NO: 75. |
| 105 | The polypeptide of any one of rows 1-97, further comprising an Fc domain comprising amino acid substitutions fused to the C-terminus of the polypeptide by way of a linker. |
| 106 | The polypeptide of row 105, wherein the Fc domain does not form a dimer. |
| 107 | The polypeptide of any one of rows 1-97, further comprising an albumin-binding peptide fused to the C-terminus of the polypeptide by way of a linker. |
| 108 | The polypeptide of row 107, wherein the albumin-binding peptide comprises the sequence of SEQ ID NO: 72. |
| 109 | The polypeptide of any one of rows 1-97, further comprising a fibronectin domain fused to the C-terminus of the polypeptide by way of a linker. |
| 110 | The polypeptide of row 109, wherein the fibronectin domain comprises the sequence of SEQ ID NO: 73. |
| 111 | The polypeptide of any one of rows 1-97, further comprising a human serum albumin fused to the C-terminus of the polypeptide by way of a linker. |
| 112 | The polypeptide of row 111, wherein the human serum albumin comprises the sequence of SEQ ID NO: 74. |
| 113 | The polypeptide of any one of rows 98-112, wherein the linker is an amino acid spacer. |
| 114 | The polypeptide of row 113, wherein the amino acid spacer is GGG, GGGA (SEQ ID NO: 20), GGGG (SEQ ID NO: 22), GGGAG (SEQ ID NO: 52), GGGAGG (SEQ ID NO: 53), or GGGAGGG (SEQ ID NO: 54). |
| 115 | The polypeptide of row 114, wherein the amino acid spacer is GGG. |
| 116 | The polypeptide of row 103 or 115, wherein the polypeptide has the sequence of SEQ ID NO: 76. |
| 117 | The polypeptide of row 113, wherein the amino acid spacer is GA, GS, GG, GGA, GGS, GGG, GGGS (SEQ ID NO: 21), GGGGA (SEQ ID NO: 23), GGGGS (SEQ ID NO: 24), GGGGG (SEQ ID NO: 25), GGAG (SEQ ID NO: 26), GGSG (SEQ ID NO: 27), AGGG (SEQ ID NO: |

TABLE 3-continued

| Row | Composition |
|---|---|
| | 28), SGGG (SEQ ID NO: 29), GAGA (SEQ ID NO: 30), GSGS (SEQ ID NO: 31), GAGAGA (SEQ ID NO: 32), GSGSGS (SEQ ID NO: 33), GAGAGAGA (SEQ ID NO: 34), GSGSGSGS (SEQ ID NO: 35), GAGAGAGAGA (SEQ ID NO: 36), GSGSGSGSGS (SEQ ID NO: 37), GAGAGAGAGAGA (SEQ ID NO: 38), GSGSGSGSGSGS (SEQ ID NO: 39), GGAGGA (SEQ ID NO: 40), GGSGGS (SEQ ID NO: 41), GGAGGAGGA (SEQ ID NO: 42), GGSGGSGGS (SEQ ID NO: 43), GGAGGAGGAGGA (SEQ ID NO: 44), and GGSGGSGGSGGS (SEQ ID NO: 45), GGAGGGAG (SEQ ID NO: 46), GGSGGGSG (SEQ ID NO: 47), GGAGGGAGGGAG (SEQ ID NO: 48), and GGSGGGSGGGSG (SEQ ID NO: 49), GGGGAGGGGAGGGGA (SEQ ID NO: 50), GGGGSGGGGSGGGGS (SEQ ID NO: 51), AAAL (SEQ ID NO: 55), AAAK (SEQ ID NO: 56), AAAR (SEQ ID NO: 57), EGKSSGSGSESKST (SEQ ID NO: 58), GSAGSAAGSGEF (SEQ ID NO: 59), AEAAAKEAAAKA (SEQ ID NO: 60), KESGSVSSEQLAQFRSLD (SEQ ID NO: 61), GENLYFQSGG (SEQ ID NO: 62), SACYCELS (SEQ ID NO: 63), RSIAT (SEQ ID NO: 64), RPACKIPNDLKQKVMNH (SEQ ID NO: 65), GGSAGGSGSGSSGGSSGASGTGTAGGTGSGSGTGSG (SEQ ID NO: 66), AAANSSIDLISVPVDSR (SEQ ID NO: 67), GGSGGGSEGGGSEGGGSEGGGSEGGGSEGGGSGGGS (SEQ ID NO: 68), EAAAK (SEQ ID NO: 69), or PAPAP(SEQ ID NO: 70). |
| 118 | The polypeptide of any one of rows 1-117, wherein the polypeptide has a serum half-life of at least 7 days. |
| 119 | The polypeptide of any one of rows 1-118, wherein the polypeptide binds to activin A, activin B, and/or myostatin and has reduced or weak binding to human BMP9. |
| 120 | The polypeptide of row 119, wherein the polypeptide does not substantially bind to human BMP9. |
| 121 | The polypeptide of any one of rows 1-120, wherein the polypeptide binds to human activin A with a $K_D$ of 800 pM or less. |
| 122 | The polypeptide of any one of rows 1-121, wherein the polypeptide binds to human activin B with a $K_D$ of 800 pM or less. |
| 123 | The polypeptide of any one of rows 1 -122, wherein the polypeptide binds to human GDF-11 with a $K_D$ of 5 pM or higher. |
| 124 | A nucleic acid molecule encoding a polypeptide of any one of rows 1-123. |
| 125 | A vector comprising the nucleic acid molecule of row 124. |
| 126 | A host cell that expresses a polypeptide of any one of rows 1-123, wherein the host cell comprises a nucleic acid molecule of row 124 or a vector of row 125, wherein the nucleic acid molecule or vector is expressed in the host cell. |
| 127 | A method of preparing a polypeptide of any one of rows 1-123, the method comprising:<br>a) providing a host cell comprising a nucleic acid molecule of row 124 or a vector of row 125, and<br>b) expressing the nucleic acid molecule or vector in the host cell under conditions that allow for the formation of the polypeptide. |
| 128 | A pharmaceutical composition comprising a polypeptide of any one of rows 1-123, a nucleic acid molecule of row 124, or a vector of row 125, and one or more pharmaceutically acceptable carriers or excipients. |
| 129 | The pharmaceutical composition of row 128, wherein the polypeptide is in a therapeutically effective amount. |

EXAMPLES

The following examples are provided to further illustrate some embodiments of the present invention, but are not intended to limit the scope of the invention; it will be understood by their exemplary nature that other procedures, methodologies, or techniques known to those skilled in the art may alternatively be used.

Example 1—Evaluation of ActRIIB Variants Binding Affinity by Surface Plasmon Resonance (SPR)

The GE Biacore 3000 was used to measure the kinetics of the interactions between the ActRIIB-Fc variants and the ligands Activin A, Activin B, growth differentiation factor 11 (GDF11), and BMP-9. ActRIIA, ActRIIB, ActRIIB 2.06, ActRIIB 2.11 and ActRIIB 2.12 were recombinant proteins. All other ActRIIB-Fc variants were expressed by transient expression in HEK293 cells and purified from the conditioned media using Protein-A Sepharose chromatography. Flow cells 1-4 were immobilized with anti-human/anti-mouse capture antibodies from GE using the amine coupling kit. The ActRII-Fc proteins were then captured on the chip in flow cells 2-4, with flow cell 1 being left empty as a reference cell to measure and subtract any nonspecific binding. HBS-EP+ buffer from GE Healthcare™ was used as a running buffer. Each ligand was run in a duplicate concentration series at 40 μl/min to avoid mass transport effects. All data was collected on a CM-5 chip except for GDF-11, which used CM-4. The data was analyzed using Scrubber2 by BioLogic™ Software to calculate the $K_D$ of each interaction (Table 4).

TABLE 4

Comparison of ActRIIB variant binding affinity ($K_D$) to various ligands

| Construct | Activin A ($K_D$) | Activin B ($K_D$) | GDF-11 ($K_D$) | BMP-9 ($K_D$) |
|---|---|---|---|---|
| Vehicle | N/A | N/A | N/A | N/A |
| ActRIIA (SEQ ID NO: 16) | 1 nM | 370 pM | 81 pM | 25 nM |
| ActRIIB (SEQ ID NO: 17) | 63 pM | 23 pM | 120 pM | 280 pM |
| ActRIIB/A variant (SEQ ID NO: 2) | Not detected | Not detected | Not detected | 88 nM |
| ActRIIBΔ9 variant (SEQ ID NO: 3) | 390 nM | 400 nM | 530 nM | 28 nM |
| ActRIIB 2.01 variant (SEQ ID NO: 4) | Not detected | Not detected | Not detected | Not detected |
| ActRIIB 2.02 variant (SEQ ID NO: 5) | Not detected | Not detected | Not detected | Not detected |
| ActRIIB 2.03 variant (SEQ ID NO: 6) | Not detected | Not detected | Not detected | Not detected |
| ActRIIB 2.04 variant (SEQ ID NO: 7) | Not detected | Not detected | Not detected | Not detected |
| ActRIIB 2.05 variant (SEQ ID NO: 8) | Not detected | Not detected | Not detected | Not detected |
| ActRIIB 2.06 variant (SEQ ID NO: 9) | 53 pM | 100 pM | 27 pM | 300 pM |
| ActRIIB 2.07 variant (SEQ ID NO: 10) | Not detected | Not detected | Not detected | Not detected |
| ActRIIB 2.08 variant (SEQ ID NO: 11) | Not detected | Not detected | Not detected | Not detected |
| ActRIIB 2.09 variant (SEQ ID NO: 12) | 100 pM | 160 pM | Ka 2e6 | 440 pM |
| ActRIIB 2.10 variant (SEQ ID NO: 13) | 450 pM | 280 pM | Ka 1.5e6 | 1.7 nM |
| ActRIIB 2.11 variant (SEQ ID NO: 14) | 780 pM | 370 pM | 240 pM | 2.7 nM |
| ActRIIB 2.12 variant (SEQ ID NO: 15) | 140 pM | 160 pM | 130 pM | 31 nM |

Example 2—Evaluation of ActRIIB Variants Using a Gene Luciferase Reporter Assay

C2C12-BRE-Luciferase and HEK293-SBE-Luciferase cells were plated on 96 well plates in DMEM supplemented with 2% FBS and placed in an incubator for no less than three hours to acclimate to the plate surface. For each ActRIIB/A-Fc variant or positive control (ActRIIA-Fc and ActRIIB-Fc), a dilution series was made in 2% DMEM and incubated with GDF-11, Activin A, Activin B, and BMP-9 for 30 minutes at 37° C. ActRIIA, ActRIIB, ActRIIB 2.06, ActRIIB 2.11 and ActRIIB 2.12 were recombinant proteins. All others were conditioned media from transiently transfected cells. Media in the plates was aspirated and the ActRIIB/A/ligand mixtures were added to the plates as media replacement. Remaining wells were used for replicates of positive controls and background. The plates were incubated overnight, and then read using Promega Steady Glo (Promega Corporation, Madison, WI, USA) and the Molecular Devices Spectramax M5e (Molecular Devices LLC, San Jose, CA, USA). The cell-based assays demonstrate the ability of the variants to inhibit signaling at the endogenous cell surface receptors. The variants, with the exception of ActRIIB/A and ActRIIB 2.11, have comparable inhibition of Activin A, Activin B, and GDF-11, but diminished BMP9 inhibition compared to ActRIIB-Fc, as shown in Table 5.

TABLE 5

Results from luciferase reporter assay

| Construct | Activin A | Activin B | GDF-11 | BMP-9 |
|---|---|---|---|---|
| ActRIIA (SEQ ID NO: 16) | 390 ng/mL | 210 ng/mL | 390 ng/mL | 100 μg/mL |
| ActRIIB (SEQ ID NO: 17) | 65 ng/mL | 240 ng/mL | 140 ng/mL | 82 ng/mL |
| ActRIIB/A variant (SEQ ID NO: 2) | >1 μg/mL | >1 μg/mL | >1 μg/mL | 83 μg/mL |
| ActRIIBΔ9 variant (SEQ ID NO: 3) | 480 ng/mL | 400 ng/mL | 230 ng/mL | 13 μg/mL |
| ActRIIB 2.06 variant (SEQ ID NO: 9) | 49 ng/mL | 150 ng/mL | 110 ng/mL | 52 μg/mL |
| ActRIIB 2.09 variant (SEQ ID NO: 12) | 58 ng/mL | 400 ng/mL | 300 ng/mL | 2.6 μg/mL |
| ActRIIB 2.10 variant (SEQ ID NO: 13) | 64 ng/mL | 200 ng/mL | 170 ng/mL | 9.2 μg/mL |
| ActRIIB 2.11 variant (SEQ ID NO: 14) | >1 μg/mL | >1 μg/mL | 980 ng/mL | >100 μg/mL |
| ActRIIB 2.12 variant (SEQ ID NO: 15) | 270 ng/mL | 160 ng/mL | 15 ng/mL | >100 μg/mL |

In a separate experiment, C2C12-BRE-Luciferase and HEK293-SBE-Luciferase cells were plated on 96 well plates in DMEM supplemented with 10% FBS and placed in an incubator overnight to acclimate to the plate surface. For the recombinant protein ActRIIB 2.12-Fc, a dilution series was made in 0.1% DMEM and incubated with GDF-11, Activin A, Activin B, or BMP-9 for 60 minutes at 37° C. Media in the plates was aspirated and the ActRIIB 2.12-Fc/ligand mixtures were added to the plates as media replacement. Remaining wells were used for replicates of positive controls and background. The plates were incubated overnight, and then read using Promega Steady Glo and the Molecular Devices Spectramax M5e. Results from this assay are shown in FIGS. 2A-2D.

Example 3—ActRIIB 2.12-Fc Increased Trabecular Bone, Inhibited Trabecular Bone Catabolism, and Enhanced Trabecular Bone Anabolism in Mice Thirteen-week-old male C57Bl/6 mice (n=10/group) were sourced from Taconic Biosciences (Hudson, NY, USA). Mice were assigned to either a vehicle control group or a treatment group that received 20 mg/kg ActRIIB 2.12-Fc. Vehicle or ActRIIB 2.12-Fc was administered twice weekly intraperitoneally for 5 weeks. Declomycin and calcein (all chemicals obtained from Sigma-Aldrich, St. Louis, MO, USA, unless noted) were administered (15 mg/kg, subcutaneously) five and two days before study termination, respectively, to fluorochrome label actively forming bone surfaces.

Bone Histomorphometry and Structural Analysis

Trabecular bone at the proximal tibial metaphysis was evaluated using static and dynamic histomorphometry (Aguirre et al., J Bone Miner. Res 22:877-888, 2007, and Yarrow et al., J. Neurotrauma 31:834-845, 2014). Tibiae were fixed in 10% phosphate-buffered formalin, dehydrated in ethanol, and embedded undecalcified in methyl methacrylate. Four mm-thick longitudinal sections of proximal tibiae were prepared using a Leica/Jung 2265 (Leica Biosystems Inc. Buffalo Grove, IL, USA). Sections underwent Von Kossa staining with a tetrachrome counterstain (Polysciences Inc., Warrington, PA) to assess trabecular bone structure. Eight mm-thick sections remained unstained to assess fluorochrome-based bone formation indices. The proximal tibia region of interest (ROI) began 0.3 mm distal to the growth plate and excluded the primary spongiosa and trabecular bone within 0.25 mm of the endocortical border.

Trabecular bone volume ratio (BV/TV), trabecular number (Tb.N), thickness (Tb.Th), and separation (Tb.Sp), proximal tibia osteoblast (Ob.S/BS) and osteoclast (Oc.S/BS) surfaces were determined with the Osteomeasure System (Osteometrics, Atlanta, GA). Fluorochrome-based bone formation indices were measured under ultraviolet illumination. Mineralizing surface was calculated as the percentage of trabecular (MS/BS), periosteal (Ps.MS/BS), and endocortical (Ec.MS/BS) bone surfaces with double fluorochrome labels. Mineral apposition rate (MAR) was calculated by dividing the interlabel distance by the time interval between administration of fluorochrome labels. Bone formation rate (BFR/BS) was calculated by multiplying MS/BS by MAR. The terminology used was based on recommendations by the Histomorphometry Nomenclature Committee of the American Society of Bone and Mineral Research (Dempster et al., J. Bone Miner. Res 28:2-17, 2013).

Representative Micro-Computed Tomography Images of Tibia

Ex vivo tibia samples were selected from vehicle- and ActRIIB 2.12-Fc-treated mice for representative images. Tibias were scanned using a PerkinElmer QFX MicroCT (PerkinElmer Inc., Boston, MA, USA) at 90 kV and 160 µA with a field of view of 10 mm for three minutes. Representative images of the proximal and full-length tibia subvolumes are 50 and 200 slices distal of the proximal epiphyseal growth plate, respectively. The proximal tibia subvolume represents the region used for trabecular analysis using AnalyzePro Bone Microarchitecture Analysis (BMA, AnalyzeDirect, Stilwell, KS, USA). Images were generated using the Scanco Medical MicroCT Analysis Software (Scanco Medical, Brüttisellen, Switzerland) 3D Display function.

Statistics

All statistical analyses were performed using GraphPad Prism 8 software (GraphPad Software, La Jolla, CA, USA). To assess differences in bone histomorphometry between vehicle- and ActRIIB 2.12-Fc-treated mice, unpaired Student's t-tests were utilized. Significance values were designated using the following notations: *p 0.05; p 0.01; *p 0.001.

Figure 3A:
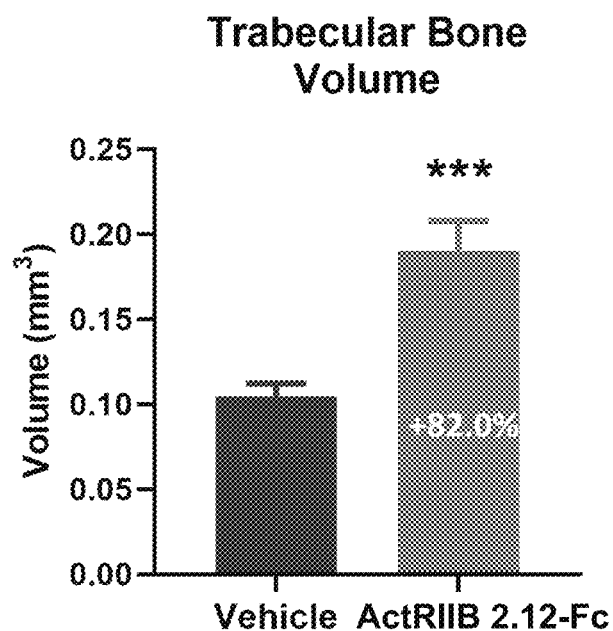
FIGS. 3A-3F are a series of graphs and images showing that, relative to vehicle-treated mice, ActRIIB 2.12-Fc-treated mice had increased trabecular bone. ActRIIB 2.12-Fc-treated mice had increased trabecular bone volume (FIG. 3A), increased trabecular bone volume fraction (FIG. 3B), increased trabecular number (FIG. 3C), and increased trabecular thickness (FIG. 3D). ActRIIB 2.12-Fc-treated mice also had reduced trabecular separation (FIG. 3E).
Figure 3B:
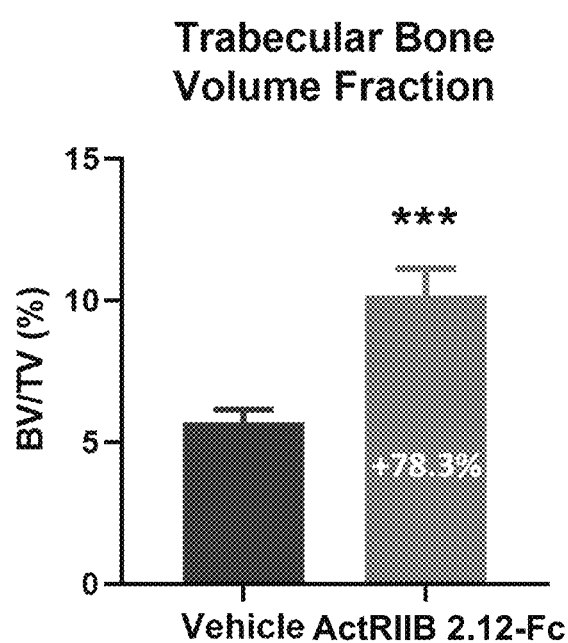
Figure 3C:
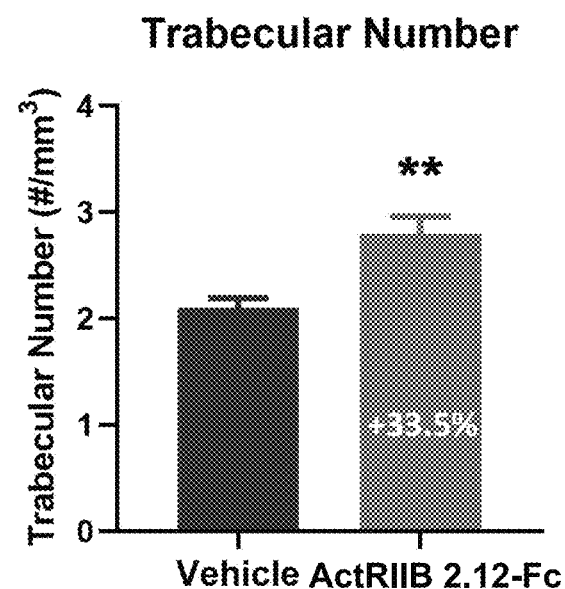
Figure 3D:
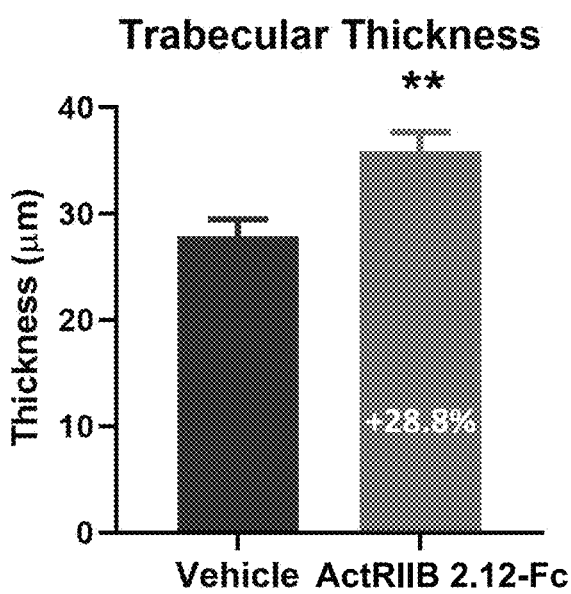
Figure 3E:
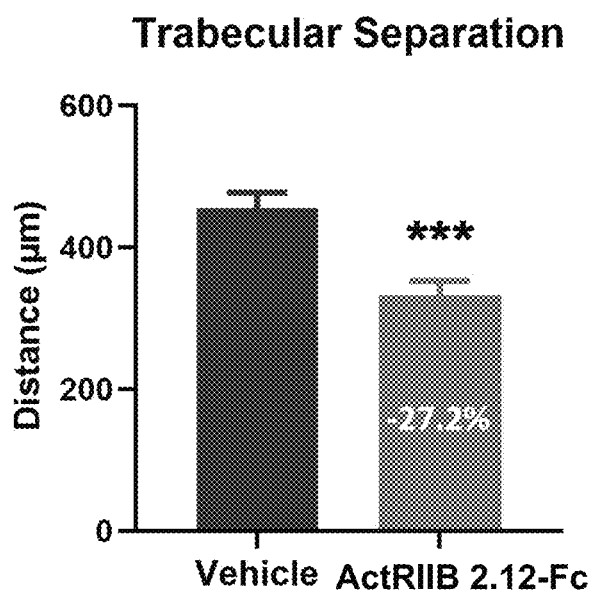
Figure 3F:
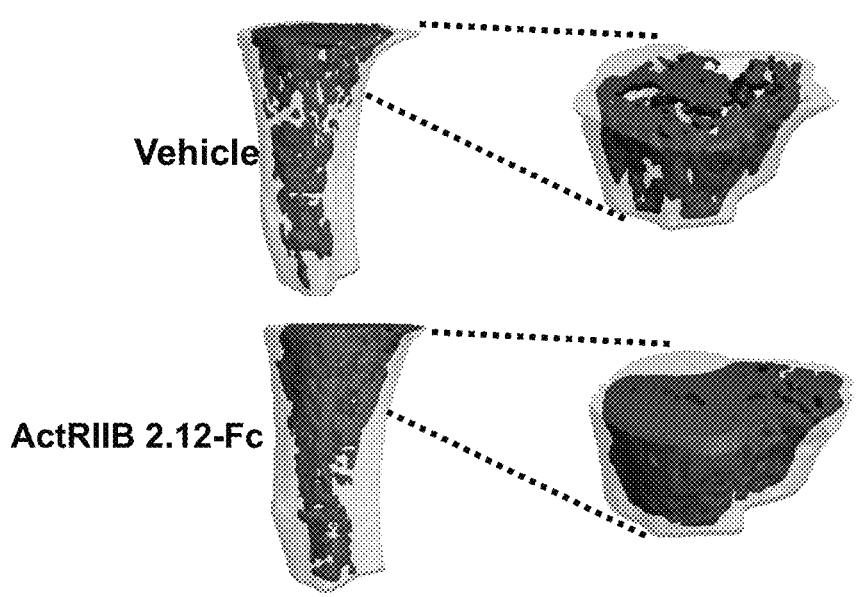
Figure 4A:
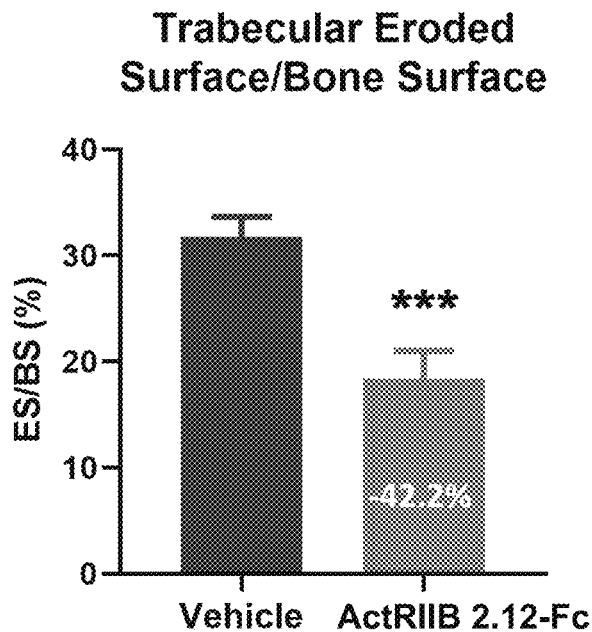
FIGS. 4A-4G are a series of graphs showing that ActRIIB 2.12-Fc-treated mice had reduced bone catabolism and enhanced bone anabolism in proximal tibia (relative to vehicle-treated mice). ActRIIB 2.12-Fc-treated mice had reductions in trabecular eroded surface (FIG. 4A) and trabecular osteoclast number (FIG. 4B). Moreover, ActRIIB 2.12-Fc-treated mice had significant increases in trabecular mineralizing surface (FIG. 4C), trabecular mineral apposition rate (FIG. 4D), trabecular bone formation rate (FIG. 4E), and ratio of osteoblasts to osteoclasts (FIG. 4G), and a trend toward increased osteoblast number (FIG. 4F). *p<0.05; p<0.01; *p<0.001 versus vehicle. Data displayed are mean+SEM.
Figure 4B:
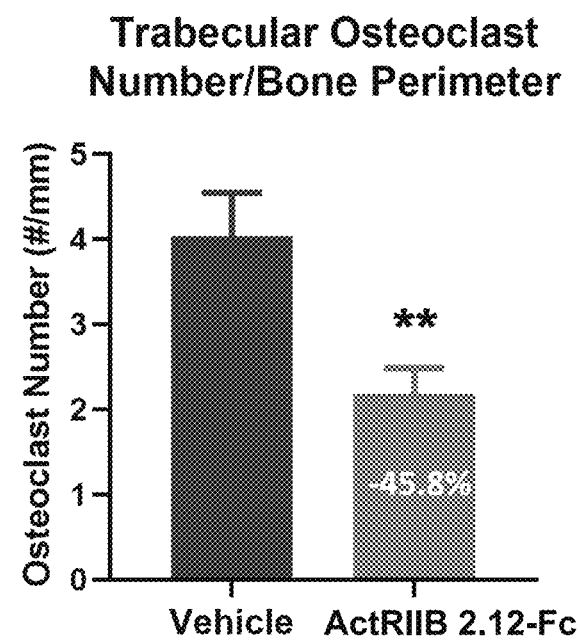
Figure 4C:
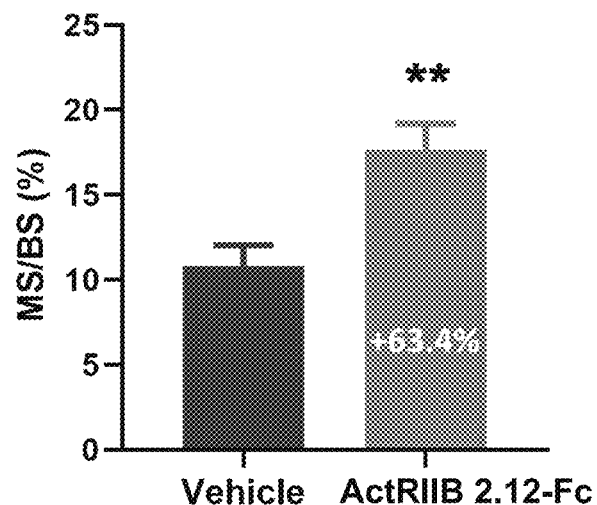
Figure 4D:
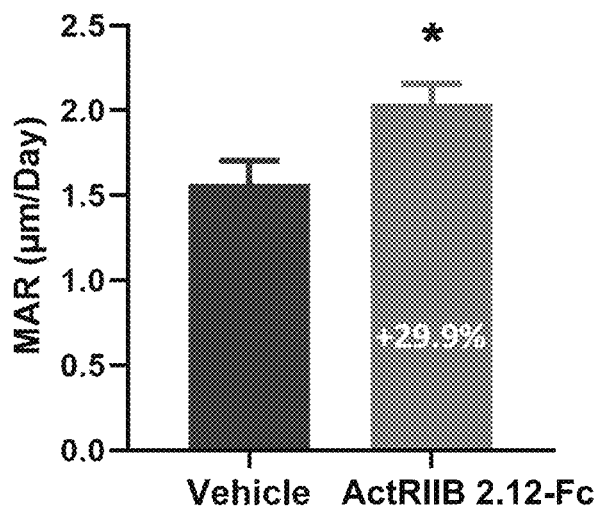
Figure 4E:
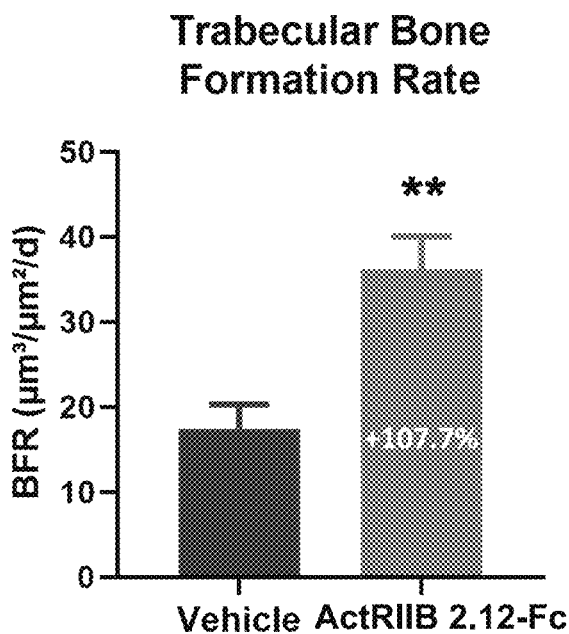
Figure 4F:
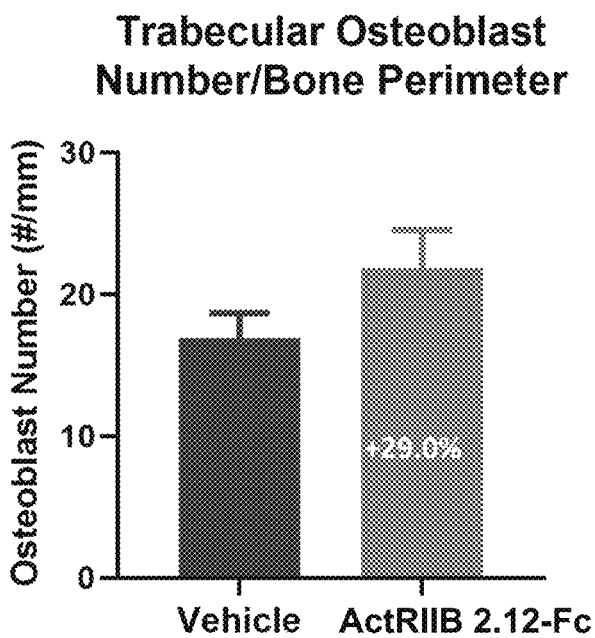
Figure 4G:
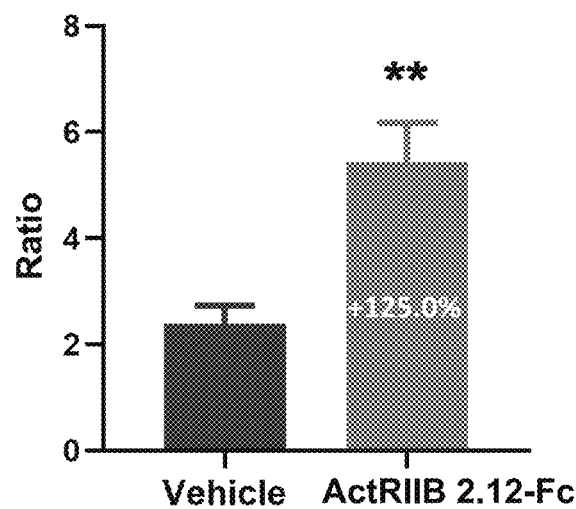

As shown in FIGS. 3A-3F, ActRIIB 2.12-Fc-treated mice had increased trabecular bone relative to vehicle-treated mice. Specifically, ActRIIB 2.12-Fc-treated mice were observed to have increased trabecular bone volume (FIG. 3A), trabecular bone volume fraction (FIG. 3B), trabecular number (FIG. 3C), and trabecular thickness (FIG. 3D). Moreover, ActRIIB 2.12-Fc-treated mice had reduced trabecular separation (FIG. 3E). Representative µCT images from vehicle- and ActRIIB 2.12-Fc-treated mouse tibias are shown in FIG. 3F. ActRIIB 2.12-Fc-treated mice also had reduced bone catabolism and enhanced bone anabolism in proximal tibia (relative to vehicle-treated mice, FIGS. 4A-4G). Specifically, ActRIIB 2.12-Fc-treated mice exhibited reductions in trabecular eroded surface (FIG. 4A) and trabecular osteoclast number (FIG. 4B). Moreover, ActRIIB 2.12-Fc-treated mice exhibited significant increases in trabecular mineralizing surface (FIG. 4C), trabecular mineral apposition rate (FIG. 4D), trabecular bone formation rate (FIG. 4E), and ratio of osteoblasts to osteoclasts (FIG. 4G), and a trend for increased osteoblast number (FIG. 4F). Data displayed are mean+SEM.

Example 4—Effect of ActRIIB Variants on Lean Mass and Hematology

To assess the effects of ActRIIB variants on lean mass and hematology, six-week-old wild type female C57Bl/6 mice were enrolled in the study. Pre-dosing, mice were weight and lean mass determined using a small rodent nuclear magnetic resonance (NMR) analyzer (Bruker, Minispec LF50). Once baseline levels were determined, each mouse was injected, twice weekly, via IP injection with vehicle (n=15) or ActRIIB variant 2.06 (SEQ ID NO: 9)-hFc (n=10), ActRIIB variant 2.09 (SEQ ID NO: 12)-hFc (n=10), or ActRIIB variant 2.10 (SEQ ID NO: 13)-hFc (n=10) at a dose of 10 mg/kg. The study was terminated after 14 days, and blood was sampled from the submandibular vein in restrained conscious mice. EDTA was used as an anticoagulant and blood analyzed using a Heska HT5 veterinary blood analyzer. Terminal body and lean mass were also determined. Serum exposure levels of each variant were quantified by ELISA from terminal bleeds.

Figure 5A:
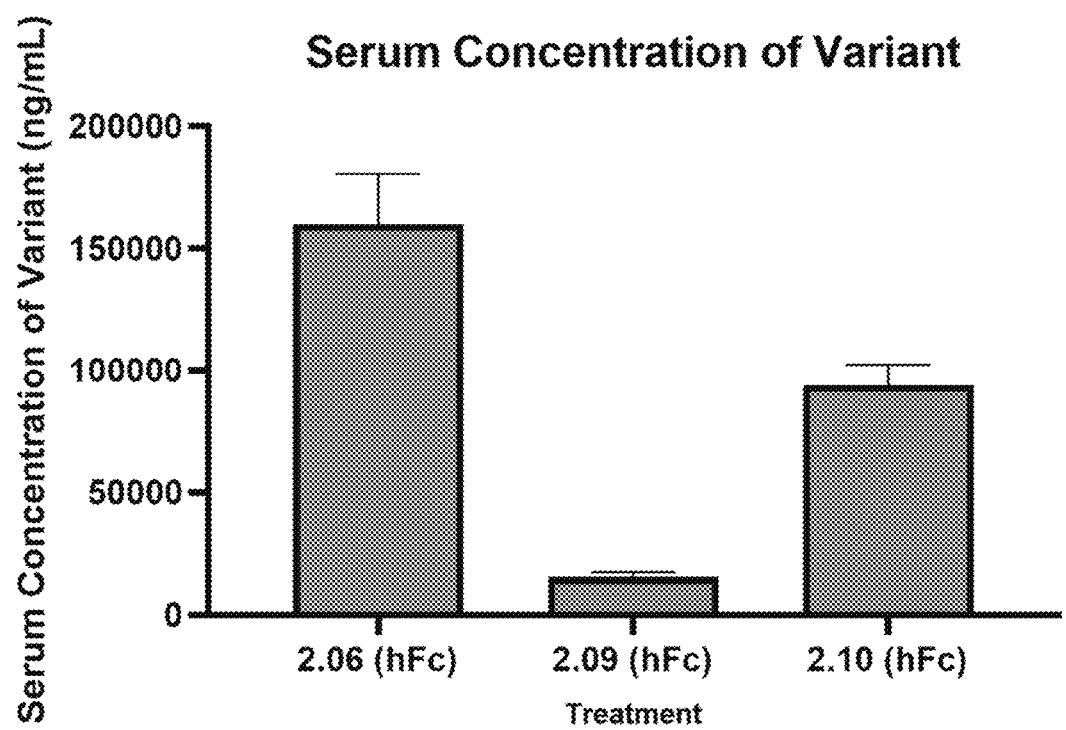
FIGS. 5A-5G are a series of graphs showing the effects of ActRIIB variants on lean mass and hematology. Six-week-old wild type female C57Bl/6 mice were enrolled in the study and were injected, twice weekly, via IP injection with vehicle (n=15) or ActRIIB variant 2.06-hFc (n=10), ActRIIB variant 2.09-hFc (n=10), or ActRIIB variant 2.10-hFc (n=10) at a dose of 10 mg/kg.
Figure 5B:
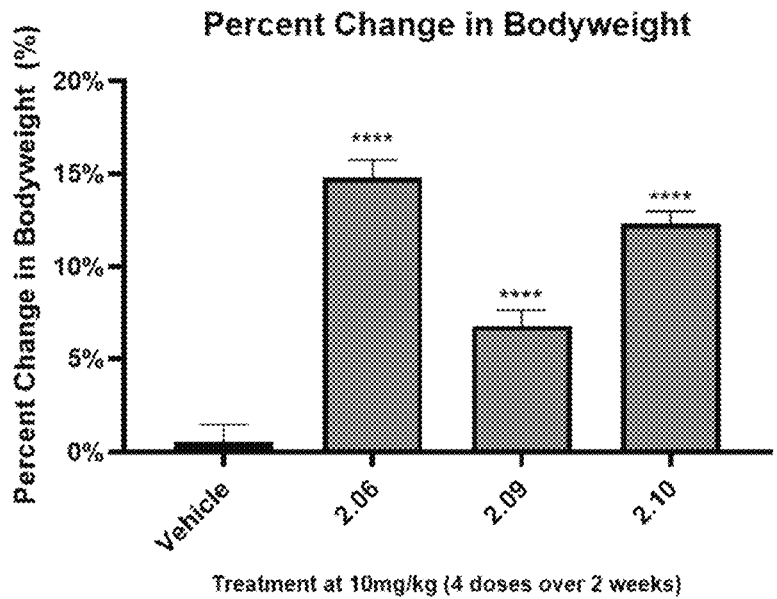
Figure 5C:
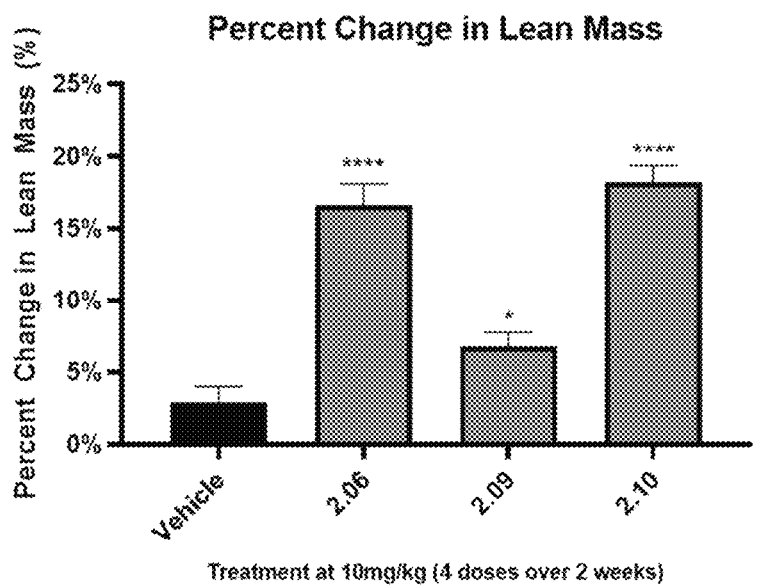
Figure 5D:
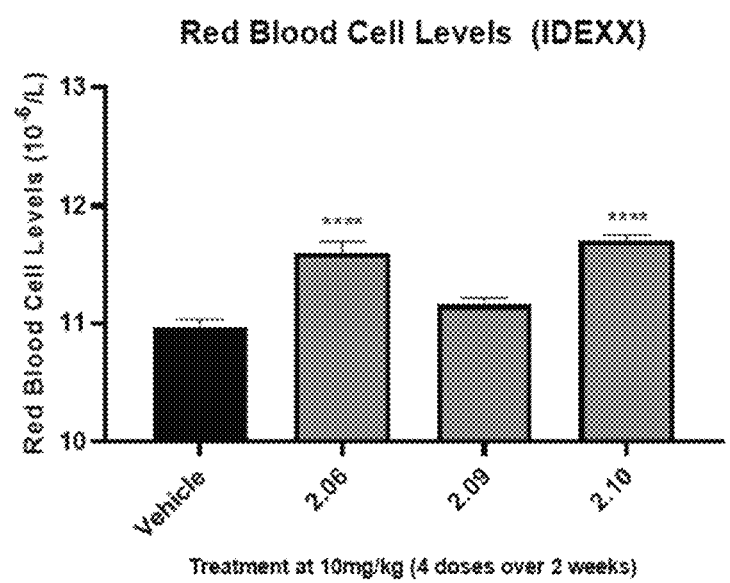
Figure 5E:
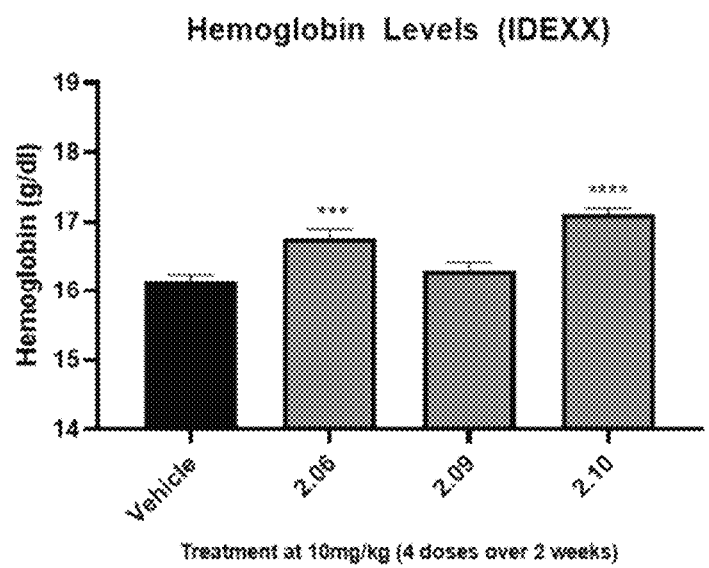
Figure 5F:
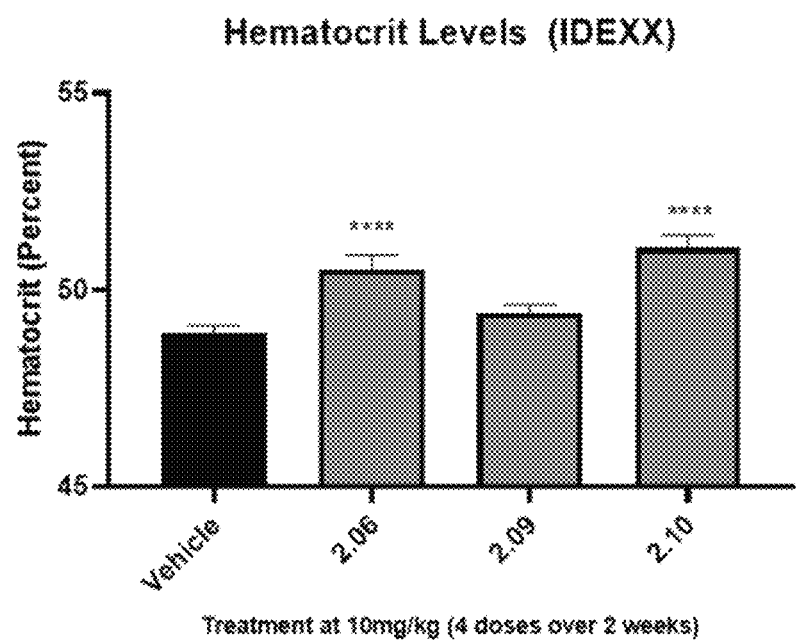
Figure 5G:
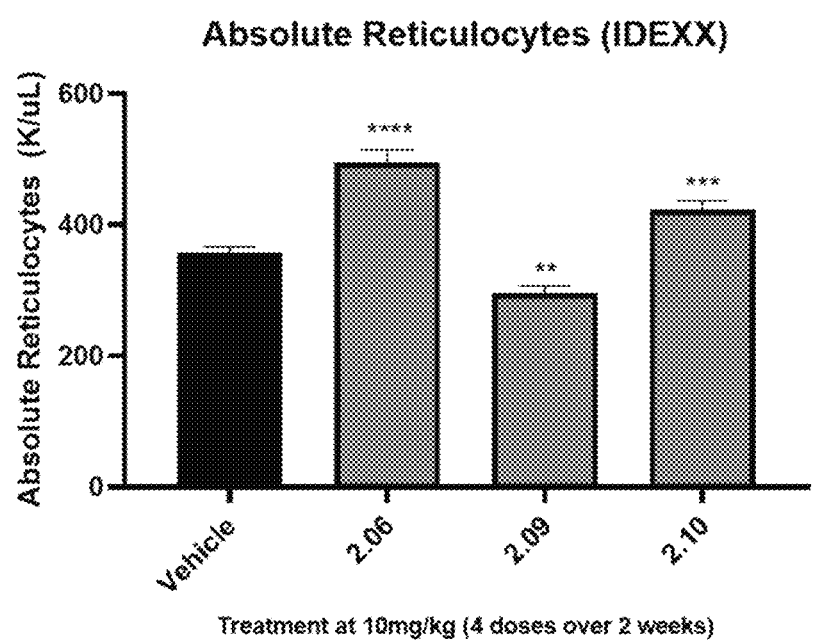

FIG. 5A shows the serum concentration of each variant administered in this experiment. Data are shown as average±SEM. The percent changes in bodyweight and lean mass observed after treatment are shown in FIGS. 5B-5C. Data are shown as average±SEM. Statistics were performed using 1-way ANOVA with a Fisher's LSD post-test and are shown relative to vehicle. *P≤0.05 and **P<0.0001. FIGS. 5D-5G show the effect of the ActRIIB variants on red cell mass parameters, including RBC levels, hemoglobin levels, hematocrit levels, and reticulocytes. Data are shown as average±SEM. Statistics were performed using 1-way ANOVA with a Fisher's LSD post test and are shown relative to vehicle. P<0.01, *P<0.001, and **P<0.0001.

Example 5—Treatment of Neuromuscular Disease by Administration of an Extracellular ActRIIB Variant According to the methods disclosed herein, a physician of skill in the art can treat a subject, such as a human patient, having a neuromuscular disease (e.g., SMA, CMT, myasthenia gravis, or congenital muscular dystrophy) so as to reduce muscle atrophy or weakness, increase muscle mass, increase lean mass, and/or maintain or improve muscle strength. The method of treatment can include diagnosing or identifying a subject as a candidate for treatment based on standard clinical tests for muscle diseases (e.g., blood test, muscle biopsy, genetic test, and/or electromyogram). To treat the subject, a physician of kill in the art can administer to the subject a composition containing an extracellular ActRIIB variant (e.g., an extracellular ActRIIB variant having the sequence of any one of SEQ ID NOs: 1-15 (e.g., SEQ ID NOs: 2-15)). The composition containing the extracellular ActRIIB variant may be administered to the subject, for example, by parenteral injection (e.g., intravenous or subcutaneous injection) or by local administration (e.g., injection into the muscle) to treat neuromuscular disease. The extracellular ActRIIB variant (e.g., an extracellular ActRIIB variant having the sequence of any one of SEQ ID NOs: 1-15 (e.g., SEQ ID NOs: 2-15)) is administered in a therapeutically effective amount, such as from 0.01 to 500 mg/kg (e.g., 0.01, 0.1, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 100, 150, 200, 250, 300, 350, 400, 450, or 500 mg/kg). In some embodiments, the extracellular ActRIIB variant is administered bimonthly, once a month, once every four weeks, once every two weeks, or at least once a week or more (e.g., 1, 2, 3, 4, 5, 6, or 7 times a week or more). The extracellular ActRIIB variant is administered in an amount sufficient reduce muscle atrophy or weakness, increase muscle mass or lean mass, or maintain or improve muscle strength. Following administration of the composition to a patient, a practitioner of skill in the art can monitor the patient's improvement in response to the therapy by a variety of methods. For example, a physician can monitor the patient's muscle mass, lean mass, muscle strength, and motor function. A finding that the patient exhibits increased muscle mass or lean mass or maintains or improves muscle strength following administration of the composition compared to test results prior to administration of the composition indicates that the patient is responding favorably to the treatment. Subsequent doses can be determined and administered as needed.

Example 6—Treatment of Thrombocytopenia by Administration of an Extracellular ActRIIB Variant According to the methods disclosed herein, a physician of skill in the art can treat a subject, such as a human patient, having thrombocytopenia (e.g., thrombocytopenia associated with a myelodysplastic syndrome or myelofibrosis) so as to increase platelet levels (e.g., increase platelet count), increase platelet production, and/or increase megakaryocyte differentiation and/or maturation. The method of treatment can include diagnosing or identifying a subject as a candidate for treatment based on a blood test measuring platelet levels (e.g., platelet count). To treat the subject, a physician of kill in the art can administer to the subject a composition containing an extracellular ActRIIB variant (e.g., an extracellular ActRIIB variant having the sequence of any one of SEQ ID NOs: 1-15 (e.g., SEQ ID NOs: 2-15)). The composition containing the extracellular ActRIIB variant may be administered to the subject, for example, by parenteral injection (e.g., intravenous or subcutaneous injection) to treat thrombocytopenia. The extracellular ActRIIB variant (e.g., an extracellular ActRIIB variant having the sequence of any one of SEQ ID NOs: 1-15 (e.g., SEQ ID NOs: 2-15)) is administered in a therapeutically effective amount, such as from 0.01 to 500 mg/kg (e.g., 0.01, 0.1, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 100, 150, 200, 250, 300, 350, 400, 450, or 500 mg/kg). In some embodiments, the extracellular ActRIIB variant is administered bimonthly, once a month, once every four weeks, once every two weeks, or at least once a week or more (e.g., 1, 2, 3, 4, 5, 6, or 7 times a week or more). The extracellular ActRIIB variant is administered in an amount sufficient to increase platelet levels (e.g., increase platelet count), increase platelet production, and/or increase megakaryocyte differentiation and/or maturation.

Following administration of the composition to a patient, a practitioner of skill in the art can monitor the patient's improvement in response to the therapy by a variety of methods. For example, a physician can monitor the patient's platelet count using a blood test. A finding that the patient's platelet levels are increased (e.g., a finding of an increased platelet count) following administration of the composition compared to test results prior to administration of the composition indicates that the patient is responding favorably to the treatment. Subsequent doses can be determined and administered as needed.

Example 7—Treatment of Neutropenia by Administration of an Extracellular ActRIIB Variant According to the methods disclosed herein, a physician of skill in the art can treat a subject, such as a human patient, having neutropenia (e.g., neutropenia associated with a myelodysplastic syndrome or myelofibrosis) so as to increase neutrophil levels (e.g., increase neutrophil count), increase neutrophil production, and/or increase the differentiation and/or maturation of progenitor cells (e.g., myeloid progenitors, myeloblasts, or myelocytes) into neutrophils. The method of treatment can include diagnosing or identifying a subject as a candidate for treatment based on a blood test measuring neutrophil levels (e.g., neutrophil count). To treat the subject, a physician of kill in the art can administer to the subject a composition containing an extracellular ActRIIB variant (e.g., an extracellular ActRIIB variant having the sequence of any one of SEQ ID NOs: 1-15 (e.g., SEQ ID NOs: 2-15)). The composition containing the extracellular ActRIIB variant may be administered to the subject, for example, by parenteral injection (e.g., intravenous or subcutaneous injection) to treat neutropenia. The extracellular ActRIIB variant (e.g., an extracellular ActRIIB variant having the sequence of any one of SEQ ID NOs: 1-15 (e.g., SEQ ID NOs: 2-15)) is administered in a therapeutically effective amount, such as from 0.01 to 500 mg/kg (e.g., 0.01, 0.1, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 100, 150, 200, 250, 300, 350, 400, 450, or 500 mg/kg). In some embodiments, the extracellular ActRIIB variant is administered bimonthly, once a month, once every four weeks, once every two weeks, or at least once a week or more (e.g., 1, 2, 3, 4, 5, 6, or 7 times a week or more). The extracellular ActRIIB variant is administered in an amount sufficient to increase neutrophil levels (e.g., increase neutrophil count), increase neutrophil production, and/or increase the differentiation and/or maturation of progenitor cells (e.g., myeloid progenitors, myeloblasts, or myelocytes) into neutrophils.

Following administration of the composition to a patient, a practitioner of skill in the art can monitor the patient's improvement in response to the therapy by a variety of methods. For example, a physician can monitor the patient's neutrophil count using a blood test. A finding that the patient's neutrophil levels are increased (e.g., a finding of an increased neutrophil count) following administration of the composition compared to test results prior to administration of the composition indicates that the patient is responding favorably to the treatment. Subsequent doses can be determined and administered as needed.

Example 8—Treatment of Myelofibrosis by Administration of an Extracellular ActRIIB Variant According to the methods disclosed herein, a physician of skill in the art can treat a subject, such as a human patient, having myelofibrosis so as to increase red blood cell count, increase hemoglobin levels, increase hematocrit, increase the maturation and/or differentiation of erythroid progenitors increase late-stage erythroid precursor maturation, increase the number of early-stage erythroid precursors and/or progenitors, promote the progression of erythroid precursors and/or progenitors through erythropoiesis, or recruit early-stage progenitors into the erythroid lineage. The method of treatment can include diagnosing or identifying a subject as a candidate for treatment based on a blood test measuring red blood cell count, optionally alongside an imaging test (e.g., an X-ray or MRI) or bone marrow biopsy. To treat the subject, a physician of kill in the art can administer to the subject a composition containing an extracellular ActRIIB variant (e.g., an extracellular ActRIIB variant having the sequence of any one of SEQ ID NOs: 1-15 (e.g., SEQ ID NOs: 2-15)). The composition containing the extracellular ActRIIB variant may be administered to the subject, for example, by parenteral injection (e.g., intravenous or subcutaneous injection) to treat myelofibrosis. The extracellular ActRIIB variant (e.g., an extracellular ActRIIB variant having the sequence of any one of SEQ ID NOs: 1-15 (e.g., SEQ ID NOs: 2-15)) is administered in a therapeutically effective amount, such as from 0.01 to 500 mg/kg (e.g., 0.01, 0.1, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 100, 150, 200, 250, 300, 350, 400, 450, or 500 mg/kg). In some embodiments, the extracellular ActRIIB variant is administered bimonthly, once a month, once every four weeks, once every two weeks, or at least once a week or more (e.g., 1, 2, 3, 4, 5, 6, or 7 times a week or more). The extracellular ActRIIB variant is administered in an amount sufficient to increase red blood cell count, increase hemoglobin levels, increase hematocrit, increase the maturation and/or differentiation of erythroid progenitors, increase late-stage erythroid precursor maturation, increase the number of early-stage erythroid precursors and/or progenitors, promote the progression of erythroid precursors and/or progenitors through erythropoiesis, or recruit early-stage progenitors into the erythroid lineage.

Following administration of the composition to a patient, a practitioner of skill in the art can monitor the patient's improvement in response to the therapy by a variety of methods. For example, a physician can monitor the patient's red blood cell count, hemoglobin levels, and hematocrit using a blood test. A finding that the patient's red blood cell count, hemoglobin levels, and/or hematocrit are increased following administration of the composition compared to test results prior to administration of the composition indicates that the patient is responding favorably to the treatment. Subsequent doses can be determined and administered as needed.

Example 9—Treatment of Osteogenesis Imperfecta by Administration of an Extracellular ActRIIB Variant According to the methods disclosed herein, a physician of skill in the art can treat a subject, such as a human patient, having osteogenesis imperfecta so as to increase bone mineral density, increase bone formation, reduce bone loss, or reduce the risk or occurrence of bone fracture. The method of treatment can include diagnosing or identifying a subject as a candidate for treatment based on family history, clinical presentation (e.g., frequent fractures, short stature, blue sclera, and/or hearing loss), X-ray visualization of fractures, or genetic testing. To treat the subject, a physician of skill in the art can administer to the subject a composition containing an extracellular ActRIIB variant (e.g., an extracellular ActRIIB variant having the sequence of any one of SEQ ID NOs: 1-15 (e.g., SEQ ID NOs: 2-15)). The composition containing the extracellular ActRIIB variant may be administered to the subject, for example, by parenteral injection (e.g., intravenous or subcutaneous injection) to treat osteogenesis imperfecta. The extracellular ActRIIB variant (e.g., an extracellular ActRIIB variant having the sequence of any one of SEQ ID NOs: 1-15 (e.g., SEQ ID NOs: 2-15)) is administered in a therapeutically effective amount, such as from 0.01 to 500 mg/kg (e.g., 0.01, 0.1, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 100, 150, 200, 250, 300, 350, 400, 450, or 500 mg/kg). In some embodiments, the extracellular ActRIIB variant is administered bimonthly, once a month, once every four weeks, once every two weeks, or at least once a week or more (e.g., 1, 2, 3, 4, 5, 6, or 7 times a week or more). The extracellular ActRIIB variant is administered in an amount sufficient to increase bone mineral density, increase bone formation, reduce bone loss, or reduce the risk or occurrence of bone fracture.

Following administration of the composition to a patient, a practitioner of skill in the art can monitor the patient's improvement in response to the therapy by a variety of methods. For example, a physician can monitor the patient's bone mineral density by performing dual X-ray absorptiometry or the patient's occurrence of bone fractures based on self-reporting or X-ray imaging. A finding that the patient exhibits increased bone mineral density, increased bone formation, reduced bone loss, or a reduced risk or occurrence of bone fracture following administration of the composition compared to test results prior to administration of the composition indicates that the patient is responding favorably to the treatment. Subsequent doses can be determined and administered as needed.

Example 10—Treatment of Metabolic Disease by Administration of an Extracellular ActRIIB Variant According to the methods disclosed herein, a physician of skill in the art can treat a subject, such as a human patient, having a metabolic disease (e.g., obesity, Type 1 diabetes, or Type 2 diabetes) so as to reduce body weight, body fat or percent body fat, or improve the serum lipid profile of the subject. To treat the subject, a physician of skill in the art can administer to the subject a composition containing an extracellular ActRIIB variant (e.g., an extracellular ActRIIB variant having the sequence of any one of SEQ ID NOs: 1-15 (e.g., SEQ ID NOs: 2-15)). The composition containing the extracellular ActRIIB variant may be administered to the subject, for example, by parenteral injection (e.g., intravenous or subcutaneous injection) to treat obesity. The extracellular ActRIIB variant (e.g., an extrallelular ActRIIB variant having the sequence of any one of SEQ ID NOs: 1-15 (e.g., SEQ ID NOs: 2-15)) is administered in a therapeutically effective amount, such as from 0.01 to 500 mg/kg (e.g., 0.01, 0.1, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 100, 150, 200, 250, 300, 350, 400, 450, or 500 mg/kg). In some embodiments, the extracellular ActRIIB variant is administered bimonthly, once a month, once every four weeks, once every two weeks, or at least once a week or more (e.g., 1, 2, 3, 4, 5, 6, or 7 times a week or more). The extracellular ActRIIB variant is administered in an amount sufficient to reduce body weight, body fat or percent body fat, or improve the serum lipid profile of the subject.

Following administration of the composition to a patient, a practitioner of skill in the art can monitor the patient's improvement in response to the therapy by a variety of methods. For example, a physician can monitor the patient's symptoms using standard clinical tests and patient self-reporting. A finding that the patient's body weight, body fat, or percent body fat is reduced, or that the patient's serum lipid profile is improved following administration of the composition compared to test results prior to administration of the composition indicates that the patient is responding favorably to the treatment. Subsequent doses can be determined and administered as needed.

Example 11—Treatment of Anemia Associated with a Myelodysplastic Syndrome by Administration of an Extracellular ActRIIB Variant According to the methods disclosed herein, a physician of skill in the art can treat a subject, such as a human patient, having a myelodysplastic syndrome (e.g., anemia due to a low, very low, or intermediate risk myelodysplastic syndrome) so as to increase red blood cell count, increase hemoglobin levels, increase hematocrit, increase the maturation and/or differentiation of erythroid progenitors increase late-stage erythroid precursor maturation, increase the number of early-stage erythroid precursors and/or progenitors, promote the progression of erythroid precursors and/or progenitors through erythropoiesis, or recruit early-stage progenitors into the erythroid lineage. The method of treatment can include diagnosing or identifying a subject as a candidate for treatment using the IPSS-R. To treat the subject, a physician of kill in the art can administer to the subject a composition containing an extracellular ActRIIB variant (e.g., an extracellular ActRIIB variant having the sequence of any one of SEQ ID NOs: 1-15 (e.g., SEQ ID NOs: 2-15)). The composition containing the extracellular ActRIIB variant may be administered to the subject, for example, by parenteral injection (e.g., intravenous or subcutaneous injection) to treat the myelodysplastic syndrome (e.g., anemia associated with the myelodysplastic syndrome). The extracellular ActRIIB variant (e.g., an extracellular ActRIIB variant having the sequence of any one of SEQ ID NOs: 1-15 (e.g., SEQ ID NOs: 2-15)) is administered in a therapeutically effective amount, such as from 0.01 to 500 mg/kg (e.g., 0.01, 0.1, 0.2, 0.3, 0.4, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 35, 40, 45, 50, 100, 150, 200, 250, 300, 350, 400, 450, or 500 mg/kg). In some embodiments, the extracellular ActRIIB variant is administered bimonthly, once a month, once every four weeks, once every two weeks, or at least once a week or more (e.g., 1, 2, 3, 4, 5, 6, or 7 times a week or more). The extracellular ActRIIB variant is administered in an amount sufficient to increase red blood cell count, increase hemoglobin levels, increase hematocrit, increase the maturation and/or differentiation of erythroid progenitors, increase late-stage erythroid precursor maturation, increase the number of early-stage erythroid precursors and/or progenitors, promote the progression of erythroid precursors and/or progenitors through erythropoiesis, or recruit early-stage progenitors into the erythroid lineage.

Following administration of the composition to a patient, a practitioner of skill in the art can monitor the patient's improvement in response to the therapy by a variety of methods. For example, a physician can monitor the patient's red blood cell count, hemoglobin levels, and hematocrit using a blood test. A finding that the patient's red blood cell count, hemoglobin levels, and/or hematocrit are increased following administration of the composition compared to test results prior to administration of the composition indicates that the patient is responding favorably to the treatment. Subsequent doses can be determined and administered as needed.

Other Embodiments

While the invention has been described in connection with specific embodiments thereof, it will be understood that it is capable of further modifications and this application is intended to cover any variations, uses, or adaptations of the invention following, in general, the principles of the invention and including such departures from the present disclosure come within known or customary practice within the art to which the invention pertains and may be applied to the essential features hereinbefore set forth.

All publications, patents, and patent applications are herein incorporated by reference in their entirety to the same extent as if each individual publication, patent or patent application was specifically and individually indicated to be incorporated by reference in its entirety.

Other embodiments are within the following claims.

```
                              SEQUENCE LISTING

Sequence total quantity: 78
SEQ ID NO: 1            moltype = AA  length = 115
FEATURE                 Location/Qualifiers
source                  1..115
                        mol_type = protein
                        organism = synthetic construct
                        note = Synthetic Construct
VARIANT                 11
                        note = MISC_FEATURE -  Xaa is Ile or Leu
VARIANT                 12
                        note = MISC_FEATURE -  Xaa is Phe or Tyr
VARIANT                 19
                        note = MISC_FEATURE -  Xaa is Leu or Lys
VARIANT                 20
                        note = MISC_FEATURE -  Xaa is Asp or Glu
VARIANT                 25
                        note = MISC_FEATURE -  Xaa is Thr or Ser
VARIANT                 27
                        note = MISC_FEATURE -  Xaa is Leu or Val
VARIANT                 29
                        note = MISC_FEATURE -  Xaa is Pro or Arg
VARIANT                 31
                        note = MISC_FEATURE -  Xaa is Tyr or Glu
VARIANT                 33
                        note = MISC_FEATURE -  Xaa is Asp or Glu
VARIANT                 34
                        note = MISC_FEATURE -  Xaa is Lys or Gln
VARIANT                 38
                        note = MISC_FEATURE -  Xaa is Arg or Leu
VARIANT                 41
                        note = MISC_FEATURE -  Xaa is Tyr or Phe
VARIANT                 45
                        note = MISC_FEATURE -  Xaa is Arg or Lys
VARIANT                 47
                        note = MISC_FEATURE -  Xaa is Ser or Ile
VARIANT                 48
                        note = MISC_FEATURE -  Xaa is Ser or Thr
VARIANT                 50
                        note = MISC_FEATURE -  Xaa is Ser or Thr
VARIANT                 51
                        note = MISC_FEATURE -  Xaa is Ile or Leu
VARIANT                 53
                        note = MISC_FEATURE -  Xaa is Ile or Leu
VARIANT                 56
                        note = MISC_FEATURE -  Xaa is Lys or Gln
VARIANT                 63
                        note = MISC_FEATURE -  Xaa is Phe or Ile
VARIANT                 69
                        note = MISC_FEATURE -  Xaa is Gln, Thr, or Asp
VARIANT                 70
                        note = MISC_FEATURE -  Xaa is Glu, Asp, or Thr
VARIANT                 74
                        note = MISC_FEATURE -  Xaa is Lys or Thr
VARIANT                 75
                        note = MISC_FEATURE -  Xaa is Lys or Glu
VARIANT                 76
                        note = MISC_FEATURE -  Xaa is Asp or Glu
VARIANT                 77
                        note = MISC_FEATURE -  Xaa is Ser or Asn
VARIANT                 79
                        note = MISC_FEATURE -  Xaa is Glu or Gln
VARIANT                 89
                        note = MISC_FEATURE -  Xaa is Phe or Met
SEQUENCE: 1
GRGEAETREC XXYNANWEXX RTNQXGXEXC XGXXDKRXHC XASWXNXXGX XEXVKXGCWL  60
DDXNCYDRXX CVAXXXXPXV YFCCCEGNXC NERFTHLPEA GGPEVTYEPP PTAPT       115

SEQ ID NO: 2            moltype = AA  length = 115
FEATURE                 Location/Qualifiers
source                  1..115
                        mol_type = protein
                        organism = synthetic construct
                        note = Synthetic Construct
```

```
SEQUENCE: 2
GRGEAETREC IFYNANWEKD RTNQSGLEPC YGDQDKRRHC FASWKNSSGT IELVKQGCWL   60
DDINCYDRQE CVAKKDSPEV YFCCCEGNFC NERFTHLPEA GGPEVTYEPP PTAPT       115

SEQ ID NO: 3              moltype = AA   length = 115
FEATURE                   Location/Qualifiers
source                    1..115
                          mol_type = protein
                          organism = synthetic construct
                          note = Synthetic Construct
SEQUENCE: 3
GRGEAETREC IYYNANWELD RTNQSGLERC EGEQDKRLHC YASWRNSSGT IELVKKGCWL   60
DDINCYDRQE CVATKENPQV YFCCCEGNFC NERFTHLPEA GGPEVTYEPP PTAPT       115

SEQ ID NO: 4              moltype = AA   length = 115
FEATURE                   Location/Qualifiers
source                    1..115
                          mol_type = protein
                          organism = synthetic construct
                          note = Synthetic Construct
SEQUENCE: 4
GRGEAETREC IYYNANWELE RTNQSGLERC EGEQDKRLHC YASWRNSSGT IELVKKGCWL   60
DDFNCYDRQE CVAKKDSPEV YFCCCEGNFC NERFTHLPEA GGPEVTYEPP PTAPT       115

SEQ ID NO: 5              moltype = AA   length = 115
FEATURE                   Location/Qualifiers
source                    1..115
                          mol_type = protein
                          organism = synthetic construct
                          note = Synthetic Construct
SEQUENCE: 5
GRGEAETREC IYYNANWELE RTNQTGLERC EGEQDKRLHC YASWRNISGT IELVKKGCWL   60
DDFNCYDRQE CVAKKDSPEV YFCCCEGNFC NERFTHLPEA GGPEVTYEPP PTAPT       115

SEQ ID NO: 6              moltype = AA   length = 115
FEATURE                   Location/Qualifiers
source                    1..115
                          mol_type = protein
                          organism = synthetic construct
                          note = Synthetic Construct
SEQUENCE: 6
GRGEAETREC IYYNANWELE RTNQTGLERC EGEQDKRLHC YASWRNITGT IELVKKGCWL   60
DDFNCYDRQE CVAKKDSPEV YFCCCEGNFC NERFTHLPEA GGPEVTYEPP PTAPT       115

SEQ ID NO: 7              moltype = AA   length = 115
FEATURE                   Location/Qualifiers
source                    1..115
                          mol_type = protein
                          organism = synthetic construct
                          note = Synthetic Construct
SEQUENCE: 7
GRGEAETREC IYYNANWELE RTNQSGLEPC EGEQDKRLHC YASWRNSSGT IELVKKGCWL   60
DDFNCYDRQE CVAKKDSPEV YFCCCEGNFC NERFTHLPEA GGPEVTYEPP PTAPT       115

SEQ ID NO: 8              moltype = AA   length = 115
FEATURE                   Location/Qualifiers
source                    1..115
                          mol_type = protein
                          organism = synthetic construct
                          note = Synthetic Construct
SEQUENCE: 8
GRGEAETREC IYYNANWELE RTNQSGLERC YGDKDKRLHC YASWRNSSGT IELVKKGCWL   60
DDFNCYDRQE CVAKKDSPEV YFCCCEGNFC NERFTHLPEA GGPEVTYEPP PTAPT       115

SEQ ID NO: 9              moltype = AA   length = 115
FEATURE                   Location/Qualifiers
source                    1..115
                          mol_type = protein
                          organism = synthetic construct
                          note = Synthetic Construct
SEQUENCE: 9
GRGEAETREC IYYNANWELE RTNQSGLERC EGEQDKRLHC FASWKNSSGT IELVKQGCWL   60
DDFNCYDRQE CVAKKDSPEV YFCCCEGNFC NERFTHLPEA GGPEVTYEPP PTAPT       115

SEQ ID NO: 10             moltype = AA   length = 115
FEATURE                   Location/Qualifiers
source                    1..115
                          mol_type = protein
                          organism = synthetic construct
```

```
                           note = Synthetic Construct
SEQUENCE: 10
GRGEAETREC IFYNANWEKD RTNQSGLERC EGEQDKRLHC YASWRNSSGT IELVKKGCWL     60
DDFNCYDRQE CVAKKDSPEV YFCCCEGNFC NERFTHLPEA GGPEVTYEPP PTAPT         115

SEQ ID NO: 11              moltype = AA   length = 115
FEATURE                    Location/Qualifiers
source                     1..115
                           mol_type = protein
                           organism = synthetic construct
                           note = Synthetic Construct
SEQUENCE: 11
GRGEAETREC IYYNANWELE RTNQSGLERC YGDQDKRRHC YASWRNSSGT IELVKKGCWL     60
DDFNCYDRQE CVAKKDSPEV YFCCCEGNFC NERFTHLPEA GGPEVTYEPP PTAPT         115

SEQ ID NO: 12              moltype = AA   length = 115
FEATURE                    Location/Qualifiers
source                     1..115
                           mol_type = protein
                           organism = synthetic construct
                           note = Synthetic Construct
SEQUENCE: 12
GRGEAETREC LYYNANWELE RTNQSGVERC EGEKDKRLHC YASWRNSSGS LEIVKKGCWL     60
DDFNCYDRTD CVATEENPQV YFCCCEGNMC NERFTHLPEA GGPEVTYEPP PTAPT         115

SEQ ID NO: 13              moltype = AA   length = 115
FEATURE                    Location/Qualifiers
source                     1..115
                           mol_type = protein
                           organism = synthetic construct
                           note = Synthetic Construct
SEQUENCE: 13
GRGEAETREC LYYNANWELE RTNQSGVERC EGEKDKRLHC YASWRNSSGS LEIVKKGCWL     60
DDFNCYDRDT CVATEENPQV YFCCCEGNMC NERFTHLPEA GGPEVTYEPP PTAPT         115

SEQ ID NO: 14              moltype = AA   length = 115
FEATURE                    Location/Qualifiers
source                     1..115
                           mol_type = protein
                           organism = synthetic construct
                           note = Synthetic Construct
SEQUENCE: 14
GRGEAETREC LYYNANWELE RTNQSGVERC EGEKDKRLHC YASWRNSSGS LEIVKKGCWL     60
DDFNCYDRTD CVATKENPQV YFCCCEGNMC NERFTHLPEA GGPEVTYEPP PTAPT         115

SEQ ID NO: 15              moltype = AA   length = 115
FEATURE                    Location/Qualifiers
source                     1..115
                           mol_type = protein
                           organism = synthetic construct
                           note = Synthetic Construct
SEQUENCE: 15
GRGEAETREC LYYNANWELE RTNQSGVERC EGEKDKRLHC YASWRNSSGS LEIVKKGCWL     60
DDFNCYDRDT CVATKENPQV YFCCCEGNMC NERFTHLPEA GGPEVTYEPP PTAPT         115

SEQ ID NO: 16              moltype = AA   length = 109
FEATURE                    Location/Qualifiers
source                     1..109
                           mol_type = protein
                           organism = Homo sapiens
SEQUENCE: 16
GAILGRSETQ ECLFFNANWE KDRTNQTGVE PCYGDKDKRR HCFATWKNIS GSIEIVKQGC     60
WLDDINCYDR TDCVEKKDSP EVYFCCCEGN MCNEKFSYFP EMEVTQPTS               109

SEQ ID NO: 17              moltype = AA   length = 115
FEATURE                    Location/Qualifiers
source                     1..115
                           mol_type = protein
                           organism = Homo sapiens
SEQUENCE: 17
GRGEAETREC IYYNANWELE RTNQSGLERC EGEQDKRLHC YASWRNSSGT IELVKKGCWL     60
DDFNCYDRQE CVATEENPQV YFCCCEGNFC NERFTHLPEA GGPEVTYEPP PTAPT         115

SEQ ID NO: 18              moltype = AA   length = 512
FEATURE                    Location/Qualifiers
source                     1..512
                           mol_type = protein
                           organism = Homo sapiens
SEQUENCE: 18
```

```
MTAPWVALAL LWGSLCAGSG RGEAETRECI YYNANWELER TNQSGLERCE GEQDKRLHCY    60
ASWRNSSGTI ELVKKGCWLD DFNCYDRQEC VATEENPQVY FCCCEGNFCN ERFTHLPEAG   120
GPEVTYEPPP TAPTLLTVLA YSLLPIGGLS LIVLLAFWMY RHRKPPYGHV DIHEDPGPPP   180
PSPLVGLKPL QLLEIKARGR FGCVWKAQLM NDFVAVKIFP LQDKQSWQSE REIFSTPGMK   240
HENLLQFIAA EKRGSNLEVE LWLITAFHDK GSLTDYLKGN IITWNELCHV AETMSRGLSY   300
LHEDVPWCRG EGHKPSIAHR DFKSKNVLLK SDLTAVLADF GLAVRFEPGK PPGDTHGQVG   360
TRRYMAPEVL EGAINFQRDA FLRIDMYAMG LVLWELVSRC KAADGPVDEY MLPFEEEIGQ   420
HPSLEELQEV VVHKKMRPTI KDHWLKHPGL AQLCVTIEEC WDHDAEARLS AGCVEERVSL   480
IRRSVNGTTS DCLVSLVTSV TNVDLPPKES SI                                512

SEQ ID NO: 19           moltype = AA  length = 225
FEATURE                 Location/Qualifiers
source                  1..225
                        mol_type = protein
                        organism = Homo sapiens
SEQUENCE: 19
THTCPPCPAP ELLGGPSVFL FPPKPKDTLM ISRTPEVTCV VVDVSHEDPE VKFNWYVDGV    60
EVHNAKTKPR EEQYNSTYRV VSVLTVLHQD WLNGKEYKCK VSNKALPVPI EKTISKAKGQ   120
PREPQVYTLP PSREEMTKNQ VSLTCLVKGF YPSDIAVEWE SNGQPENNYK TTPPVLDSDG   180
PFFLYSKLTV DKSRWQQGNV FSCSVMHEAL HNHYTQKSLS LSPGK                  225

SEQ ID NO: 20           moltype = AA  length = 4
FEATURE                 Location/Qualifiers
source                  1..4
                        mol_type = protein
                        organism = synthetic construct
                        note = Synthetic Construct
SEQUENCE: 20
GGGA                                                                 4

SEQ ID NO: 21           moltype = AA  length = 4
FEATURE                 Location/Qualifiers
source                  1..4
                        mol_type = protein
                        organism = synthetic construct
                        note = Synthetic Construct
SEQUENCE: 21
GGGS                                                                 4

SEQ ID NO: 22           moltype = AA  length = 4
FEATURE                 Location/Qualifiers
source                  1..4
                        mol_type = protein
                        organism = synthetic construct
                        note = Synthetic Construct
SEQUENCE: 22
GGGG                                                                 4

SEQ ID NO: 23           moltype = AA  length = 5
FEATURE                 Location/Qualifiers
source                  1..5
                        mol_type = protein
                        organism = synthetic construct
                        note = Synthetic Construct
SEQUENCE: 23
GGGGA                                                                5

SEQ ID NO: 24           moltype = AA  length = 5
FEATURE                 Location/Qualifiers
source                  1..5
                        mol_type = protein
                        organism = synthetic construct
                        note = Synthetic Construct
SEQUENCE: 24
GGGGS                                                                5

SEQ ID NO: 25           moltype = AA  length = 5
FEATURE                 Location/Qualifiers
source                  1..5
                        mol_type = protein
                        organism = synthetic construct
                        note = Synthetic Construct
SEQUENCE: 25
GGGGG                                                                5

SEQ ID NO: 26           moltype = AA  length = 4
FEATURE                 Location/Qualifiers
source                  1..4
                        mol_type = protein
```

```
                              organism = synthetic construct
                              note = Synthetic Construct
SEQUENCE: 26
GGAG                                                                    4

SEQ ID NO: 27                 moltype = AA  length = 4
FEATURE                       Location/Qualifiers
source                        1..4
                              mol_type = protein
                              organism = synthetic construct
                              note = Synthetic Construct
SEQUENCE: 27
GGSG                                                                    4

SEQ ID NO: 28                 moltype = AA  length = 4
FEATURE                       Location/Qualifiers
source                        1..4
                              mol_type = protein
                              organism = synthetic construct
                              note = Synthetic Construct
SEQUENCE: 28
AGGG                                                                    4

SEQ ID NO: 29                 moltype = AA  length = 4
FEATURE                       Location/Qualifiers
source                        1..4
                              mol_type = protein
                              organism = synthetic construct
                              note = Synthetic Construct
SEQUENCE: 29
SGGG                                                                    4

SEQ ID NO: 30                 moltype = AA  length = 4
FEATURE                       Location/Qualifiers
source                        1..4
                              mol_type = protein
                              organism = synthetic construct
                              note = Synthetic Construct
SEQUENCE: 30
GAGA                                                                    4

SEQ ID NO: 31                 moltype = AA  length = 4
FEATURE                       Location/Qualifiers
source                        1..4
                              mol_type = protein
                              organism = synthetic construct
                              note = Synthetic Construct
SEQUENCE: 31
GSGS                                                                    4

SEQ ID NO: 32                 moltype = AA  length = 6
FEATURE                       Location/Qualifiers
source                        1..6
                              mol_type = protein
                              organism = synthetic construct
                              note = Synthetic Construct
SEQUENCE: 32
GAGAGA                                                                  6

SEQ ID NO: 33                 moltype = AA  length = 6
FEATURE                       Location/Qualifiers
source                        1..6
                              mol_type = protein
                              organism = synthetic construct
                              note = Synthetic Construct
SEQUENCE: 33
GSGSGS                                                                  6

SEQ ID NO: 34                 moltype = AA  length = 8
FEATURE                       Location/Qualifiers
source                        1..8
                              mol_type = protein
                              organism = synthetic construct
                              note = Synthetic Construct
SEQUENCE: 34
GAGAGAGA                                                                8

SEQ ID NO: 35                 moltype = AA  length = 8
FEATURE                       Location/Qualifiers
```

```
source                  1..8
                        mol_type = protein
                        organism = synthetic construct
                        note = Synthetic Construct
SEQUENCE: 35
GSGSGSGS                                                                        8

SEQ ID NO: 36           moltype = AA   length = 10
FEATURE                 Location/Qualifiers
source                  1..10
                        mol_type = protein
                        organism = synthetic construct
                        note = Synthetic Construct
SEQUENCE: 36
GAGAGAGAGA                                                                      10

SEQ ID NO: 37           moltype = AA   length = 10
FEATURE                 Location/Qualifiers
source                  1..10
                        mol_type = protein
                        organism = synthetic construct
                        note = Synthetic Construct
SEQUENCE: 37
GSGSGSGSGS                                                                      10

SEQ ID NO: 38           moltype = AA   length = 12
FEATURE                 Location/Qualifiers
source                  1..12
                        mol_type = protein
                        organism = synthetic construct
                        note = Synthetic Construct
SEQUENCE: 38
GAGAGAGAGA GA                                                                   12

SEQ ID NO: 39           moltype = AA   length = 12
FEATURE                 Location/Qualifiers
source                  1..12
                        mol_type = protein
                        organism = synthetic construct
                        note = Synthetic Construct
SEQUENCE: 39
GSGSGSGSGS GS                                                                   12

SEQ ID NO: 40           moltype = AA   length = 6
FEATURE                 Location/Qualifiers
source                  1..6
                        mol_type = protein
                        organism = synthetic construct
                        note = Synthetic Construct
SEQUENCE: 40
GGAGGA                                                                          6

SEQ ID NO: 41           moltype = AA   length = 6
FEATURE                 Location/Qualifiers
source                  1..6
                        mol_type = protein
                        organism = synthetic construct
                        note = Synthetic Construct
SEQUENCE: 41
GGSGGS                                                                          6

SEQ ID NO: 42           moltype = AA   length = 9
FEATURE                 Location/Qualifiers
source                  1..9
                        mol_type = protein
                        organism = synthetic construct
                        note = Synthetic Construct
SEQUENCE: 42
GGAGGAGGA                                                                       9

SEQ ID NO: 43           moltype = AA   length = 9
FEATURE                 Location/Qualifiers
source                  1..9
                        mol_type = protein
                        organism = synthetic construct
                        note = Synthetic Construct
SEQUENCE: 43
GGSGGSGGS                                                                       9
```

| | | |
|---|---|---|
| SEQ ID NO: 44<br>FEATURE<br>source | moltype = AA  length = 12<br>Location/Qualifiers<br>1..12<br>mol_type = protein<br>organism = synthetic construct<br>note = Synthetic Construct | |
| SEQUENCE: 44<br>GGAGGAGGAG GA | | 12 |
| SEQ ID NO: 45<br>FEATURE<br>source | moltype = AA  length = 12<br>Location/Qualifiers<br>1..12<br>mol_type = protein<br>organism = synthetic construct<br>note = Synthetic Construct | |
| SEQUENCE: 45<br>GGSGGSGGSG GS | | 12 |
| SEQ ID NO: 46<br>FEATURE<br>source | moltype = AA  length = 8<br>Location/Qualifiers<br>1..8<br>mol_type = protein<br>organism = synthetic construct<br>note = Synthetic Construct | |
| SEQUENCE: 46<br>GGAGGGAG | | 8 |
| SEQ ID NO: 47<br>FEATURE<br>source | moltype = AA  length = 8<br>Location/Qualifiers<br>1..8<br>mol_type = protein<br>organism = synthetic construct<br>note = Synthetic Construct | |
| SEQUENCE: 47<br>GGSGGGSG | | 8 |
| SEQ ID NO: 48<br>FEATURE<br>source | moltype = AA  length = 12<br>Location/Qualifiers<br>1..12<br>mol_type = protein<br>organism = synthetic construct<br>note = Synthetic Construct | |
| SEQUENCE: 48<br>GGAGGGAGGG AG | | 12 |
| SEQ ID NO: 49<br>FEATURE<br>source | moltype = AA  length = 12<br>Location/Qualifiers<br>1..12<br>mol_type = protein<br>organism = synthetic construct<br>note = Synthetic Construct | |
| SEQUENCE: 49<br>GGSGGGSGGG SG | | 12 |
| SEQ ID NO: 50<br>FEATURE<br>source | moltype = AA  length = 15<br>Location/Qualifiers<br>1..15<br>mol_type = protein<br>organism = synthetic construct<br>note = Synthetic Construct | |
| SEQUENCE: 50<br>GGGGAGGGGA GGGGA | | 15 |
| SEQ ID NO: 51<br>FEATURE<br>source | moltype = AA  length = 15<br>Location/Qualifiers<br>1..15<br>mol_type = protein<br>organism = synthetic construct<br>note = Synthetic Construct | |
| SEQUENCE: 51<br>GGGGSGGGGS GGGGS | | 15 |
| SEQ ID NO: 52<br>FEATURE<br>source | moltype = AA  length = 5<br>Location/Qualifiers<br>1..5<br>mol_type = protein<br>organism = synthetic construct<br>note = Synthetic Construct | |
| SEQUENCE: 52 | | |

```
                                                    -continued
GGGAG                                                                    5

SEQ ID NO: 53          moltype = AA  length = 6
FEATURE                Location/Qualifiers
source                 1..6
                       mol_type = protein
                       organism = synthetic construct
                       note = Synthetic Construct
SEQUENCE: 53
GGGAGG                                                                   6

SEQ ID NO: 54          moltype = AA  length = 7
FEATURE                Location/Qualifiers
source                 1..7
                       mol_type = protein
                       organism = synthetic construct
                       note = Synthetic Construct
SEQUENCE: 54
GGGAGGG                                                                  7

SEQ ID NO: 55          moltype = AA  length = 4
FEATURE                Location/Qualifiers
source                 1..4
                       mol_type = protein
                       organism = synthetic construct
                       note = Synthetic Construct
SEQUENCE: 55
AAAL                                                                     4

SEQ ID NO: 56          moltype = AA  length = 4
FEATURE                Location/Qualifiers
source                 1..4
                       mol_type = protein
                       organism = synthetic construct
                       note = Synthetic Construct
SEQUENCE: 56
AAAK                                                                     4

SEQ ID NO: 57          moltype = AA  length = 4
FEATURE                Location/Qualifiers
source                 1..4
                       mol_type = protein
                       organism = synthetic construct
                       note = Synthetic Construct
SEQUENCE: 57
AAAR                                                                     4

SEQ ID NO: 58          moltype = AA  length = 14
FEATURE                Location/Qualifiers
source                 1..14
                       mol_type = protein
                       organism = synthetic construct
                       note = Synthetic Construct
SEQUENCE: 58
EGKSSGSGSE SKST                                                         14

SEQ ID NO: 59          moltype = AA  length = 12
FEATURE                Location/Qualifiers
source                 1..12
                       mol_type = protein
                       organism = synthetic construct
                       note = Synthetic Construct
SEQUENCE: 59
GSAGSAAGSG EF                                                           12

SEQ ID NO: 60          moltype = AA  length = 12
FEATURE                Location/Qualifiers
source                 1..12
                       mol_type = protein
                       organism = synthetic construct
                       note = Synthetic Construct
SEQUENCE: 60
AEAAAKEAAA KA                                                           12

SEQ ID NO: 61          moltype = AA  length = 18
FEATURE                Location/Qualifiers
source                 1..18
                       mol_type = protein
                       organism = synthetic construct
```

```
                                     note = Synthetic Construct
SEQUENCE: 61
KESGSVSSEQ LAQFRSLD                                                          18

SEQ ID NO: 62           moltype = AA   length = 10
FEATURE                 Location/Qualifiers
source                  1..10
                        mol_type = protein
                        organism = synthetic construct
                        note = Synthetic Construct
SEQUENCE: 62
GENLYFQSGG                                                                   10

SEQ ID NO: 63           moltype = AA   length = 8
FEATURE                 Location/Qualifiers
source                  1..8
                        mol_type = protein
                        organism = synthetic construct
                        note = Synthetic Construct
SEQUENCE: 63
SACYCELS                                                                      8

SEQ ID NO: 64           moltype = AA   length = 5
FEATURE                 Location/Qualifiers
source                  1..5
                        mol_type = protein
                        organism = synthetic construct
                        note = Synthetic Construct
SEQUENCE: 64
RSIAT                                                                         5

SEQ ID NO: 65           moltype = AA   length = 17
FEATURE                 Location/Qualifiers
source                  1..17
                        mol_type = protein
                        organism = synthetic construct
                        note = Synthetic Construct
SEQUENCE: 65
RPACKIPNDL KQKVMNH                                                           17

SEQ ID NO: 66           moltype = AA   length = 36
FEATURE                 Location/Qualifiers
source                  1..36
                        mol_type = protein
                        organism = synthetic construct
                        note = Synthetic Construct
SEQUENCE: 66
GGSAGGSGSG SSGGSSGASG TGTAGGTGSG SGTGSG                                      36

SEQ ID NO: 67           moltype = AA   length = 17
FEATURE                 Location/Qualifiers
source                  1..17
                        mol_type = protein
                        organism = synthetic construct
                        note = Synthetic Construct
SEQUENCE: 67
AAANSSIDLI SVPVDSR                                                           17

SEQ ID NO: 68           moltype = AA   length = 36
FEATURE                 Location/Qualifiers
source                  1..36
                        mol_type = protein
                        organism = synthetic construct
                        note = Synthetic Construct
SEQUENCE: 68
GGSGGGSEGG GSEGGGSEGG GSEGGGSEGG GSGGGS                                      36

SEQ ID NO: 69           moltype = AA   length = 5
FEATURE                 Location/Qualifiers
source                  1..5
                        mol_type = protein
                        organism = synthetic construct
                        note = Synthetic Construct
SEQUENCE: 69
EAAAK                                                                         5

SEQ ID NO: 70           moltype = AA   length = 5
FEATURE                 Location/Qualifiers
source                  1..5
```

```
                              mol_type = protein
                              organism = synthetic construct
                              note = Synthetic Construct
SEQUENCE: 70
PAPAP                                                                        5

SEQ ID NO: 71                 moltype = AA   length = 227
FEATURE                       Location/Qualifiers
source                        1..227
                              mol_type = protein
                              organism = Homo sapiens
SEQUENCE: 71
DKTHTCPPCP APELLGGPSV FLFPPKPKDT LMISRTPEVT CVVVDVSHED PEVKFNWYVD            60
GVEVHNAKTK PREEQYNSTY RVVSVLTVLH QDWLNGKEYK CKVSNKALPA PIEKTISKAK           120
GQPREPQVYT LPPSRDELTK NQVSLTCLVK GFYPSDIAVE WESNGQPENN YKTTPPVLDS           180
DGSFFLYSKL TVDKSRWQQG NVFSCSVMHE ALHNHYTQKS LSLSPGK                         227

SEQ ID NO: 72                 moltype = AA   length = 11
FEATURE                       Location/Qualifiers
source                        1..11
                              mol_type = protein
                              organism = synthetic construct
                              note = Synthetic Construct
SEQUENCE: 72
DICLPRWGCL W                                                                11

SEQ ID NO: 73                 moltype = AA   length = 93
FEATURE                       Location/Qualifiers
source                        1..93
                              mol_type = protein
                              organism = Homo sapiens
SEQUENCE: 73
GPVEVFITET PSQPNSHPIQ WNAPQPSHIS KYILRWRPKN SVGRWKEATI PGHLNSYTIK            60
GLKPGVVYEG QLISIQQYGH QEVTRFDFTT TST                                         93

SEQ ID NO: 74                 moltype = AA   length = 609
FEATURE                       Location/Qualifiers
source                        1..609
                              mol_type = protein
                              organism = Homo sapiens
SEQUENCE: 74
MKWVTFISLL FLFSSAYSRG VFRRDAHKSE VAHRFKDLGE ENFKALVLIA FAQYLQQCPF            60
EDHVKLVNEV TEFAKTCVAD ESAENCDKSL HTLFGDKLCT VATLRETYGE MADCCAKQEP           120
ERNECFLQHK DDNPNLPRLV RPEVDVMCTA FHDNEETFLK KYLYEIARRH PYFYAPELLF           180
FAKRYKAAFT ECCQAADKAA CLLPKLDELR DEGKASSAKQ RLKCASLQKF GERAFKAWAV           240
ARLSQRFPKA EFAEVSKLVT DLTKVHTECC HGDLLECADD RADLAKYICE NQDSISSKLK           300
ECCEKPLLEK SHCIAEVEND EMPADLPSLA ADFVESKDVC KNYAEAKDVF LGMFLYEYAR           360
RHPDYSVVLL LRLAKTYETT LEKCCAAADP HECYAKVFDE FKPLVEEPQN LIKQNCELFE           420
QLGEYKFQNA LLVRYTKKVP QVSTPTLVEV SRNLGKVGSK CCKHPEAKRM PCAEDYLSVV           480
LNQLCVLHEK TPVSDRVTKC CTESLVNRRP CFSALEVDET YVPKEFNAET FTFHADICTL           540
SEKERQIKKQ TALVELVKHK PKATKEQLKA VMDDFAAFVE KCCKADDKET CFAEEGKKLV           600
AASQAALGL                                                                  609

SEQ ID NO: 75                 moltype = AA   length = 226
FEATURE                       Location/Qualifiers
source                        1..226
                              mol_type = protein
                              organism = Homo sapiens
SEQUENCE: 75
DKTHTCPPCP APELLGGPSV FLFPPKPKDT LMISRTPEVT CVVVDVSHED PEVKFNWYVD            60
GVEVHNAKTK PREEQYNSTY RVVSVLTVLH QDWLNGKEYK CKVSNKALPA PIEKTISKAK           120
GQPREPQVYT LPPSRDELTK NQVSLTCLVK GFYPSDIAVE WESNGQPENN YKTTPPVLDS           180
DGSFFLYSKL TVDKSRWQQG NVFSCSVMHE ALHNHYTQKS LSLSPG                          226

SEQ ID NO: 76                 moltype = AA   length = 345
FEATURE                       Location/Qualifiers
source                        1..345
                              mol_type = protein
                              organism = synthetic construct
                              note = Synthetic Construct
SEQUENCE: 76
GRGEAETREC LYYNANWELE RTNQSGVERC EGEKDKRLHC YASWRNSSGS LEIVKKGCWL            60
DDFNCYDRDT CVATKENPQV YFCCCEGNMC NERFTHLPEA GGPEVTYEPP PTAPTGGGDK           120
THTCPPCPAP ELLGGPSVFL FPPKPKDTLM ISRTPEVTCV VVDVSHEDPE VKFNWYVDGV           180
EVHNAKTKPR EEQYNSTYRV VSVLTVLHQD WLNGKEYKCK VSNKALPAPI EKTISKAKGQ           240
PREPQVYTLP PSRDELTKNQ VSLTCLVKGF YPSDIAVEWE SNGQPENNYK TTPPVLDSDG           300
SFFLYSKLTV DKSRWQQGNV FSCSVMHEAL HNHYTQKSLS LSPGK                           345

SEQ ID NO: 77                 moltype = AA   length = 10
```

```
                         -continued

FEATURE              Location/Qualifiers
source               1..10
                     mol_type = protein
                     organism = synthetic construct
VARIANT              1
                     note = Any amino acid
VARIANT              3
                     note = Any amino acid
VARIANT              5
                     note = Any amino acid
VARIANT              7
                     note = Any amino acid
VARIANT              9
                     note = Any amino acid
SEQUENCE: 77
XPXPXPXPXP                                                               10

SEQ ID NO: 78        moltype = AA   length = 6
FEATURE              Location/Qualifiers
source               1..6
                     mol_type = protein
                     organism = synthetic construct
SEQUENCE: 78
HHHHHH                                                                    6
```

The invention claimed is:

1. A method of treating a subject having or at risk of developing thrombocytopenia, comprising administering to the subject a therapeutically effective amount of a polypeptide comprising an extracellular activin receptor type IIB (ActRIIB) variant, the variant having one or more amino acid substitutions relative to the sequence of GRGEAETRECIYYNANWELERTNQSGLERCEGEQDKRLHCYASWRNSSGTIELVKKGC WLDDFNCYDRQECVATEENPQVYFCCCEGNFCNERFTHLPEAGGPEVTYEPPPTAPT (SEQ ID NO: 17) that impart reduced BMP9 binding relative to wild type extracellular ActRIIB, wherein the substitutions that reduce BMP9 binding comprise one or more of:
 (a) an amino acid substitution E75K;
 (b) amino acid substitutions Q69T and E70D; or
 (c) amino acid substitutions Q69D and E70T, optionally wherein the variant is truncated from the N-terminus by deletion of 1, 2, 3, 4, 5, 6, or 7 amino acids.

2. The method of claim 1, wherein:
 (a) the thrombocytopenia is associated with a bone marrow defect, a myelodysplastic syndrome, bone marrow transplantation, myelofibrosis, myelofibrosis treatment, ineffective hematopoiesis, Gaucher disease, aplastic anemia, Fanconi anemia, Diamond Blackfan anemia, Shwachman Diamond syndrome, heavy alcohol consumption, cirrhosis of the liver, cancer, an autoimmune disease, a viral infection, a bacterial infection, an enlarged spleen, a vitamin deficiency, cancer treatment, thrombotic thrombocytopenia purpura, idiopathic thrombocytopenia purpura, disseminated intravascular coagulation, hemolytic uremic syndrome, paroxysmal nocturnal hemoglobinuria, a reduction of platelets caused by medication, a dilution of platelets caused by a blood transfusion, hematopoietic stem cell transplantation, acquired amegakaryocytic thrombocytopenia, Pearson syndrome, dyskeratosis congenita, or contraindication to transfusion;
 (b) the thrombocytopenia is familial thrombocytopenia; or
 (c) the thrombocytopenia is immune thrombocytopenia.

3. A method of treating a subject having or at risk of developing neutropenia, comprising administering to the subject a therapeutically effective amount of a polypeptide comprising an extracellular activin receptor type IIB (ActRIIB) variant, the variant having one or more amino acid substitutions relative to the sequence of GRGEAETRECIYYNANWELERTNQSGLERCEGEQDKRLHCYASWRNSSGTIELVKKGC WLDDFNCYDRQECVATEENPQVYFCCCEGNFCNERFTHLPEAGGPEVTYEPPPTAPT (SEQ ID NO: 17) that impart reduced BMP9 binding relative to wild type extracellular ActRIIB, wherein the substitutions that reduce BMP9 binding comprise one or more of:
 (a) an amino acid substitution E75K;
 (b) amino acid substitutions Q69T and E70D; or
 (c) amino acid substitutions Q69D and E70T,
optionally wherein the variant is truncated from the N-terminus by deletion of 1, 2, 3, 4, 5, 6, or 7 amino acids.

4. The method of claim 3, wherein:
 (a) the neutropenia is associated with a bone marrow defect, a myelodysplastic syndrome, bone marrow transplantation, myelofibrosis, ineffective hematopoiesis, aplastic anemia, Fanconi anemia, Diamond Blackfan anemia, Shwachman Diamond syndrome, paroxysmal nocturnal hemoglobinuria, cancer, a vitamin deficiency, an enlarged spleen, an autoimmune disease, a viral infection, a bacterial infection, cancer treatment, a reduction in neutrophils caused by medication, inflammation, hematopoietic stem cell transplantation, Pearson syndrome, dyskeratosis congenita, or contraindication to transfusion;
 (b) the neutropenia is chronic idiopathic neutropenia; or
 (c) the neutropenia is familial neutropenia.

5. A method of treating a subject having congenital dyserythropoietic anemia, congenital sideroblastic anemia, myelofibrosis, anemia associated with myelofibrosis treatment, Pearson syndrome, dyskeratosis congenita, or a myelodysplastic syndrome, comprising administering to the subject a therapeutically effective amount of a polypeptide comprising an extracellular activin receptor type IIB (ActRIIB) variant, the variant having one or more amino acid substitutions relative to the sequence of GRGEAETRECIYYNANWELERTNQSGLERCEGEQDKRLHCYASWRNSSGTIELVKKGC WLDDFNCYDRQECVATEENPQVYFCCCEGNFCNERFTHLPEAGGPEVTYEPPPT- APT (SEQ ID NO: 17) that impart reduced BMP9 binding relative to wild type extracellular ActRIIB and one or more additional amino acid substitutions, wherein the substitutions that reduce BMP9 binding comprise one or more of:
(a) an amino acid substitution E75K;
(b) amino acid substitutions Q69T and E70D; or
(c) amino acid substitutions Q69D and E70T, optionally wherein the variant is truncated from the N-terminus by deletion of 1, 2, 3, 4, 5, 6, or 7 amino acids.

6. A method of treating a subject having or at risk of developing a neuromuscular disease, disuse atrophy, treatment-related muscle loss or atrophy, hypotonia, muscle loss or atrophy associated with hypoxia, muscle loss or atrophy associated with a burn injury, HIV-related cachexia, cardiac cachexia, cachexia associated with chronic kidney disease, or pulmonary cachexia, comprising administering to the subject a therapeutically effective amount of a polypeptide comprising an extracellular activin receptor type IIB (ActRIIB) variant, the variant having one or more amino acid substitutions relative to the sequence of GRGEAETRECIYYNANWELERTNQSGLERCEGEQDKRLHCYASWRNSSGTIELVKKGC WLDDFNCYDRQECVATEENPQVYFCCCEGNFCNERFTHLPEAGGPEVTYEPPPTAPT (SEQ ID NO: 17) that impart reduced BMP9 binding relative to wild type extracellular ActRIIB, wherein the substitutions that reduce BMP9 binding comprise one or more of:
(a) an amino acid substitution E75K;
(b) amino acid substitutions Q69T and E70D; or
(c) amino acid substitutions Q69D and E70T, optionally wherein the variant is truncated from the N-terminus by deletion of 1, 2, 3, 4, 5, 6, or 7 amino acids.

7. A method of treating a subject having or at risk of developing osteogenesis imperfecta, bone loss associated with bariatric surgery, bone loss associated with androgen or estrogen deprivation therapy, neuromuscular disease-related bone loss, burn-induced bone loss, or anorexia-related bone loss, comprising administering to the subject a therapeutically effective amount of a polypeptide comprising an extracellular activin receptor type IIB (ActRIIB) variant, the variant having one or more amino acid substitutions relative to the sequence of GRGEAETRECIYYNANWELERTNQSGLERCEGEQDKRLHCYASWRNSSGTIELVKKGC WLDDFNCYDRQECVATEENPQVYFCCCEGNFCNERFTHLPEAGGPEVTYEPPPTAPT (SEQ ID NO: 17) that impart reduced BMP9 binding relative to wild type extracellular ActRIIB, wherein the substitutions that reduce BMP9 binding comprise one or more of:
(a) an amino acid substitution E75K;
(b) amino acid substitutions Q69T and E70D; or
(c) amino acid substitutions Q69D and E70T, optionally wherein the variant is truncated from the N-terminus by deletion of 1, 2, 3, 4, 5, 6, or 7 amino acids.

8. A method of treating a metabolic disease in a subject, said method comprising administering to the subject a therapeutically effective amount of a polypeptide comprising an extracellular activin receptor type IIB (ActRIIB) variant, the variant having one or more amino acid substitutions relative to the sequence of GRGEAETRECIYYNANWELERTNQSGLERCEGEQDKRLHCYASWRNSSGTIELVKKGC WLDDFNCYDRQECVATEENPQVYFCCCEGNFCNERFTHLPEAGGPEVTYEPPPTAPT (SEQ ID NO: 17) that impart reduced BMP9 binding relative to wild type extracellular ActRIIB, wherein the substitutions that reduce BMP9 binding comprise one or more of:
(a) an amino acid substitution E75K;
(b) amino acid substitutions Q69T and E70D; or
(c) amino acid substitutions Q69D and E70T, optionally wherein the variant is truncated from the N-terminus by deletion of 1, 2, 3, 4, 5, 6, or 7 amino acids.

9. The method of claim 8, wherein the metabolic disease is age-related metabolic disease or treatment-related metabolic disease.

10. The method of claim 8, wherein the metabolic disease is obesity, Type 1 diabetes, or Type 2 diabetes.

* * * * *